United States Patent
DeAngelis et al.

(10) Patent No.: US 10,953,304 B2
(45) Date of Patent: Mar. 23, 2021

(54) SELF-CONFIGURABLE TRACKING TAGS AND METHODS OF USE

(71) Applicant: Isolynx, LLC, Haverhill, MA (US)

(72) Inventors: Douglas J. DeAngelis, Ipswich, MA (US); Edward G. Evansen, West Newbury, MA (US); Gerard M. Reilly, Newton, MA (US); Brian D. Rhodes, Andover, MA (US); Joseph M. Gaudreau, Lowell, MA (US); Kirk M. Sigel, Ithaca, NY (US); Alexander T. Farkas, Chatham, MA (US)

(73) Assignee: ISOLYNX, LLC, Haverhill, MA (US)

( * ) Notice: Subject to any disclaimer, the term of this patent is extended or adjusted under 35 U.S.C. 154(b) by 0 days.

(21) Appl. No.: 16/455,212

(22) Filed: Jun. 27, 2019

(65) Prior Publication Data

US 2019/0366188 A1    Dec. 5, 2019

Related U.S. Application Data

(63) Continuation of application No. 15/814,649, filed on Nov. 16, 2017, now Pat. No. 10,413,802, which is a
(Continued)

(51) Int. Cl.
  *A63B 71/06*   (2006.01)
  *H04W 4/02*   (2018.01)
  (Continued)

(52) U.S. Cl.
  CPC ...... *A63B 71/0619* (2013.01); *G06K 7/10366* (2013.01); *H04W 4/023* (2013.01);
  (Continued)

(58) Field of Classification Search
  CPC ............ A63B 71/0605; A63B 71/0619; A63B 2024/0025; A63B 24/0021;
  (Continued)

(56) References Cited

U.S. PATENT DOCUMENTS 5,978,972 A   11/1999 Stewart et al.
6,661,342 B2   12/2003 Hall et al.
(Continued)

FOREIGN PATENT DOCUMENTS

EP    3629236    4/2020
WO   2001/008417 A1   2/2001
(Continued)

OTHER PUBLICATIONS

Cho et al. (Jan. 1, 2010) "Error modeling for an untethered ultra-wideband system for construction indoor asset tracking," Automation in Construction. 19(1):43-54.
(Continued)

*Primary Examiner* — Orlando Bousono
(74) *Attorney, Agent, or Firm* — Lathrop GPM LLP

(57) ABSTRACT

Systems, methods and software products optimize installation and operation of an object tracking system. Performance of the athlete tracking system is continually monitored and optimized based upon one or more of: statically positioned tags, grouping tags within two or more tag sets to assign ping rates, selecting receiver configuration and aim dynamically based upon environmental and situational conditions. Tracking tags are improved to facilitate coupling of the tag to an athlete and may be self-configurable. A trackable protection pad allows a tracking tag to be positioned substantially horizontal when the athlete is competing. A data replay tool replays location tracking information in chronological order and visually plots location of tracking tags and errors in the determined location. A tag manager automatically configures the tracking tags. A robotic vehicle automated installation of the object tracking system.

8 Claims, 82 Drawing Sheets

Related U.S. Application Data continuation of application No. 14/960,026, filed on Dec. 4, 2015, now Pat. No. 9,950,238, which is a continuation of application No. PCT/US2014/040914, filed on Jun. 4, 2014.

(60) Provisional application No. 61/830,961, filed on Jun. 4, 2013, provisional application No. 61/900,786, filed on Nov. 6, 2013, provisional application No. 61/930,378, filed on Jan. 22, 2014, provisional application No. 61/945,559, filed on Feb. 27, 2014, provisional application No. 61/971,940, filed on Mar. 28, 2014.

(51) Int. Cl.

| | | |
|---|---|---|
| *H04W 4/08* | (2009.01) | |
| *H04W 4/029* | (2018.01) | |
| *H04W 4/80* | (2018.01) | |
| *G06K 7/10* | (2006.01) | |

(52) U.S. Cl.
CPC ........... *H04W 4/027* (2013.01); *H04W 4/029* (2018.02); *H04W 4/08* (2013.01); *H04W 4/80* (2018.02)

(58) Field of Classification Search
CPC ............ A63B 24/0062; A63B 2220/30; A63B 2220/40; A63B 2220/836; A63B 2225/50; A63B 69/0028; G06K 7/10366; H04W 4/008; H04W 4/028; H04W 4/08; A61B 5/02438; A61B 5/0816; A61B 5/14542; A61B 2503/10; A43B 3/0005
See application file for complete search history.

(56) References Cited

U.S. PATENT DOCUMENTS

| | | | |
|---|---|---|---|
| 6,707,487 | B1 | 3/2004 | Aman et al. |
| 6,710,713 | B1 | 3/2004 | Russo |
| 6,998,987 | B2 | 2/2006 | Lin |
| 2002/0116147 | A1 | 8/2002 | Vock et al. |
| 2003/0163287 | A1 | 8/2003 | Vock et al. |
| 2004/0006424 | A1 | 1/2004 | Joyce et al. |
| 2004/0178955 | A1 | 9/2004 | Menache et al. |
| 2006/0125691 | A1 | 6/2006 | Menache et al. |
| 2006/0152303 | A1 | 7/2006 | Liang et al. |
| 2006/0160488 | A1 | 7/2006 | Sueoka et al. |
| 2007/0126558 | A1 | 6/2007 | Donato |
| 2007/0213126 | A1 | 9/2007 | Deutsch et al. |
| 2008/0140233 | A1 | 6/2008 | Seacat |
| 2008/0287860 | A1 | 11/2008 | Tgavalekos et al. |
| 2009/0048039 | A1 | 2/2009 | Holthouse et al. |
| 2009/0082835 | A1 | 3/2009 | Jaax et al. |
| 2009/0231198 | A1 | 9/2009 | Walsh et al. |
| 2010/0134241 | A1* | 6/2010 | Gips ................ H04W 52/0229 340/5.1 |
| 2010/0184563 | A1 | 7/2010 | Molyneus et al. |
| 2010/0283630 | A1 | 11/2010 | Alonso |
| 2011/0068906 | A1* | 3/2011 | Shafer ................ G06K 7/0008 340/10.3 |
| 2011/0072132 | A1* | 3/2011 | Shafer ................ G06Q 10/087 709/224 |
| 2011/0135149 | A1 | 6/2011 | Gefen |
| 2011/0205022 | A1 | 8/2011 | Cavallaro et al. |
| 2012/0036198 | A1 | 2/2012 | Marzencki et al. |
| 2012/0087212 | A1 | 4/2012 | Vartanian et al. |
| 2012/0123960 | A1 | 5/2012 | Vock et al. |
| 2012/0126973 | A1 | 5/2012 | Deangelis et al. |
| 2013/0066448 | A1 | 3/2013 | Alonso |
| 2013/0321211 | A1* | 12/2013 | Chakraborty ........ G06Q 10/087 342/451 |
| 2013/0324152 | A1* | 12/2013 | Lee ................... H04W 52/0254 455/456.1 |
| 2014/0128752 | A1 | 5/2014 | Donaldson |

FOREIGN PATENT DOCUMENTS

| | | |
|---|---|---|
| WO | 2014/197600 A1 | 12/2014 |
| WO | 2015/187991 A1 | 12/2015 |

OTHER PUBLICATIONS

Fraunhofer IIS 2010 Annual Report at 83 (available at http://www.eas.iis.fraunhofer.de/content/dam/eas/de/documents/iahresbericht/JB10_eng_low_res_tcm182-91049.pdf.

InMotio—Tactical, Training and Performance Management video (available at https://www.youtube.com/watch?v=dq1n7IYePJI).

International Search Report with Written Opinion corresponding to International Patent Application No. PCT/2014/040914, dated Oct. 13, 2014.

IsoLynx Real-Time Player Tracking & Game Analysis Technology (2010), available at http://web.archive.org/web/20100604012151/http://www.finishlynx.com/isolynx/.

Kolodziej et al. (Dec. 31, 2006) "UWB—Ultra Wideband," In; Local Positioning Systems. Taylor & Francis, Florida, USA. pp. 120-121.

*Lynx System Developers, Inc. et al v. Zebra Enterprise Solutions Corporation et al.*; case no. 1:2015cv12297; United States District Court District of Massachusetts [case citation for consideration by Examiner; no NPL document provided].

Val Schmidt et al. (Oct. 1, 2010) "Underwater Tracking of Humpback Whales (*Megaptera novaeangliae*) With High-Frequency Pingers and Acoustic Recording Tags," IEEE Journal of Oceanic Engineering. 35(4):821-836.

Zebra Intros Next-Gen RTLS Leveraging Ultra-Wideband Technology, RFID Journal available at http://www.rfidjournal.com/articles/view?7889.

Supplementary European Search Report corresponding to European Patent Application No. 14807007, dated Dec. 2, 2016.

Extended European Search Report for EP 17209166.2 dated Jan. 26, 2018, 9 pp.

Extended European Search Report for EP 17209140.7 dated Mar. 26, 2018, 9 pp.

Australian Patent Application No. 2019229392; Examination Report No. 1 dated Jul. 21, 2020; 4 pgs.

European Patent Application No. 19209896.0; Extended European Search Report and Opinion dated Dec. 16, 2019; 6 pgs.

European Patent Application No. 19209896.0; Communication pursuant to Article 94(3) EPC dated Jul. 3, 2020; 4 pgs.

* cited by examiner

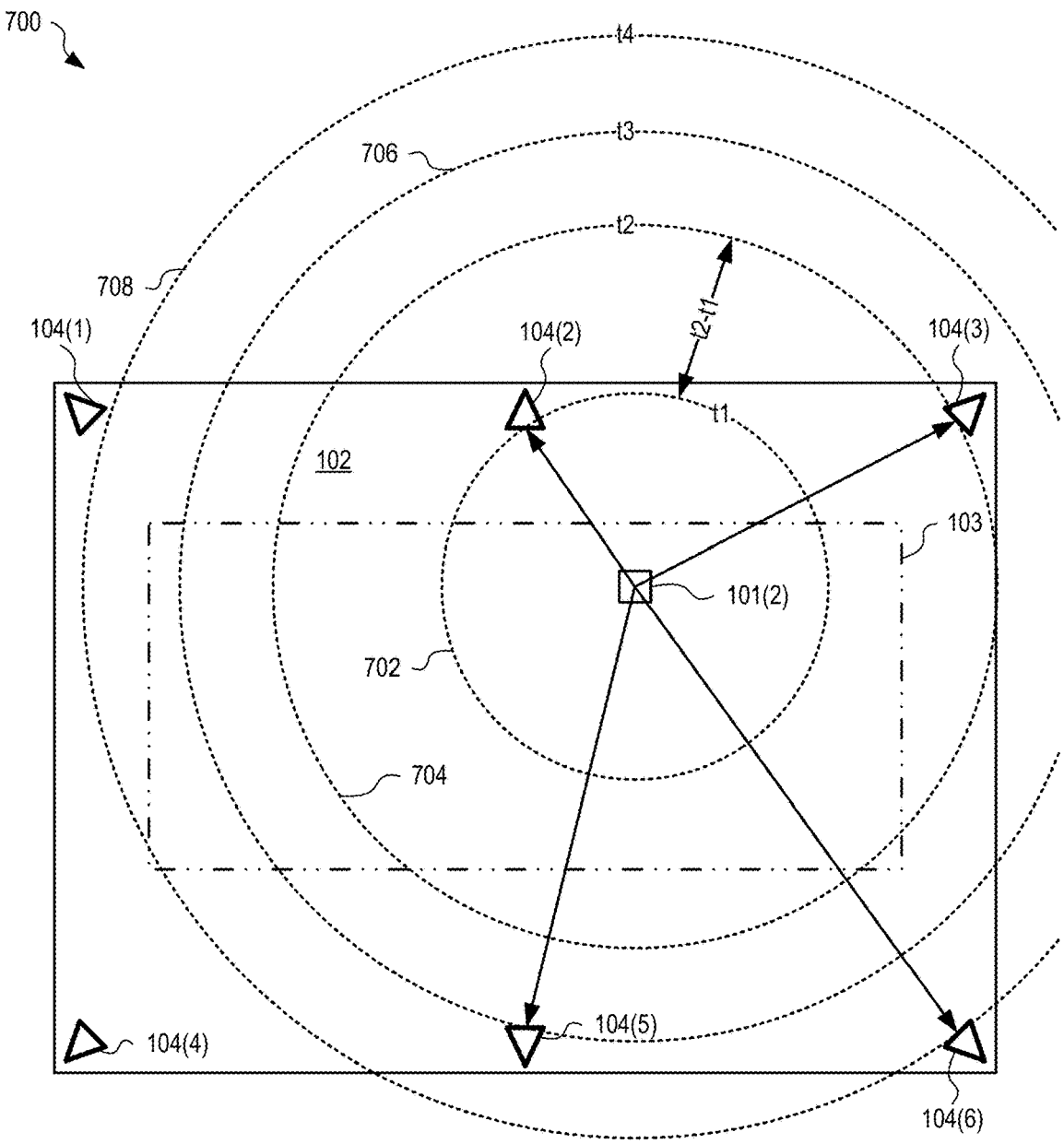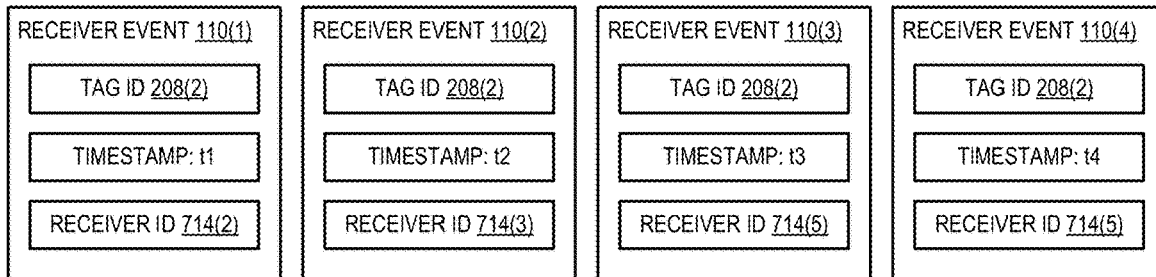
FIG. 7

2100
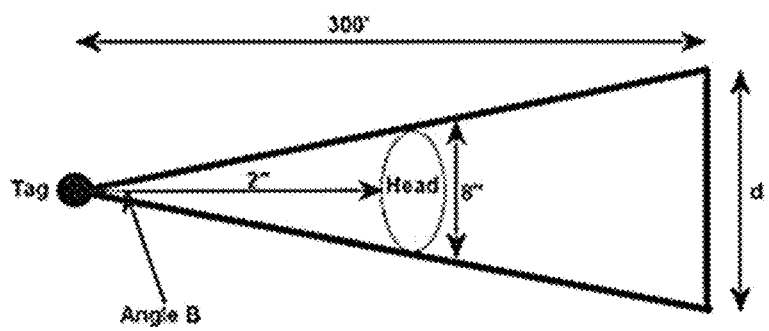
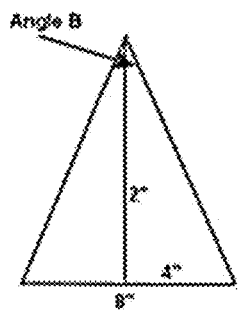
tan(1/2B) = 4/2
1/2B = arctan(2)
B = ~126 degrees
To calculate d:
1/2(d) / 300' = tan(63)
1/2(d) = tan(63) * 300
d = ~1176'
FIG. 21
2200
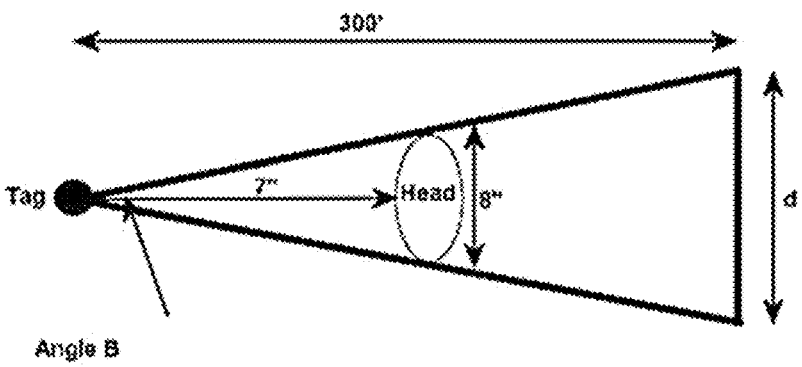
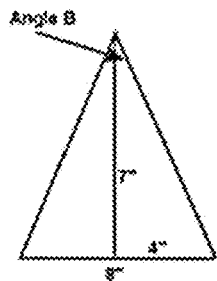
tan(1/2B) = 4/7
1/2B = arctan(4/7)
B = ~60 degrees
To calculate d'
1/2(d) / 300' = tan(30)
1/2(d) = tan(30) * 300
d = ~345'
FIG. 22

| Edit Team A | | | | | |
|---|---|---|---|---|---|
| Num | Player Name | Position | TagID-L | TagID-R | Spd |
| 3 | Player 1 | K | ---- | ---- | 12 |
| 11 | Player 2 | WR | ---- | ---- | 12 |
| 12 | Player 3 | QB | ---- | ---- | 12 |
| 15 | Player 6 | QB | ---- | ---- | 12 |
|  |  |  |  |  | 25 |

| Num | Player Name | Position | TagID-L | TagID-R | Spd |
|---|---|---|---|---|---|
| 3 | Player 1 | K | --- --- | --- --- | 12 |
| 11 | Player 2 | WR | --- --- | --- --- | 12 |
| 12 | Player 3 | QB | ////// | --- --- | 12 |
| 12 | Player 4 | DB | --- --- | --- --- | 12 |
| 14 | Player 5 | P | --- --- | --- --- | 12 |
| 15 | Player 6 | QB | --- --- | --- --- | 12 |
| 18 | Player 7 | WR | --- --- | --- --- | 12 |
| 22 | Player 8 | RB | --- --- | --- --- | 12 |
| 23 | Player 9 | DB | --- --- | --- --- | 12 |
| 24 | Player 10 | CB | --- --- | --- --- | 12 |
| 25 | Player 11 | FS | --- --- | --- --- | 12 |
| 26 | Player 12 | DB | --- --- | --- --- | 12 |
| 27 | Player 13 | SS | --- --- | --- --- | 12 |
| 28 | Player 14 | SS | --- --- | --- --- | 12 |
| 31 | Player 15 | CB | --- --- | --- --- | 12 |
| 32 | Player 16 | CB | --- --- | --- --- | 12 |
| 34 | Player 17 | RB | --- --- | --- --- | 12 |
| 37 | Player 18 | CB | --- --- | --- --- | 12 |
| 39 | Player 19 | RB | --- --- | --- --- | 12 |
| 43 | Player 20 | DB | --- --- | --- --- | 12 |
| 46 | Player 21 | RB | --- --- | --- --- | 12 |
| 47 | Player 22 | TE | --- --- | --- --- | 12 |
| 48 | Player 23 | LS | --- --- | --- --- | 12 |

53 Players    36 Tags

Range: 5    State: On    [Add Tag] — 3002    [Done] [Cancel]

| Num | Player Name | Position | TagID-L | TagID-R | Spd |
|---|---|---|---|---|---|
| 3 | Player 1 | K | --- --- | --- --- | 12 |
| 11 | Player 2 | WR | --- --- | --- --- | 12 |
| 12 | Player 3 | QB | --- --- | --- --- | 12 |
| 12 | Player 4 | DB | 00214FCA | 00214FD2 | 12 |
| 14 | Player 5 | P | | --- --- | 12 |
| 15 | Player 6 | QB | --- --- | --- --- | 12 |
| 18 | Player 7 | WR | --- --- | --- --- | 12 |
| 22 | Player 8 | RB | --- --- | --- --- | 12 |
| 23 | Player 9 | DB | --- --- | --- --- | 12 |
| 24 | Player 10 | CB | --- --- | --- --- | 12 |
| 25 | Player 11 | FS | --- --- | --- --- | 12 |
| 26 | Player 12 | DB | --- --- | --- --- | 12 |
| 27 | Player 13 | SS | --- --- | --- --- | 12 |
| 28 | Player 14 | SS | --- --- | --- --- | 12 |
| 31 | Player 15 | CB | --- --- | --- --- | 12 |
| 32 | Player 16 | CB | --- --- | --- --- | 12 |
| 34 | Player 17 | RB | --- --- | --- --- | 12 |
| 37 | Player 18 | CB | --- --- | --- --- | 12 |
| 39 | Player 19 | RB | --- --- | --- --- | 12 |
| 43 | Player 20 | DB | --- --- | --- --- | 12 |
| 46 | Player 21 | RB | --- --- | --- --- | 12 |
| 47 | Player 22 | TE | --- --- | --- --- | 12 |
| 48 | Player 23 | LS | --- --- | --- --- | 12 |

53 Players     38 Tags

Range: 5    State: On    [Add Tag] — 3002    [Done] [Cancel]

*FIG. 31*

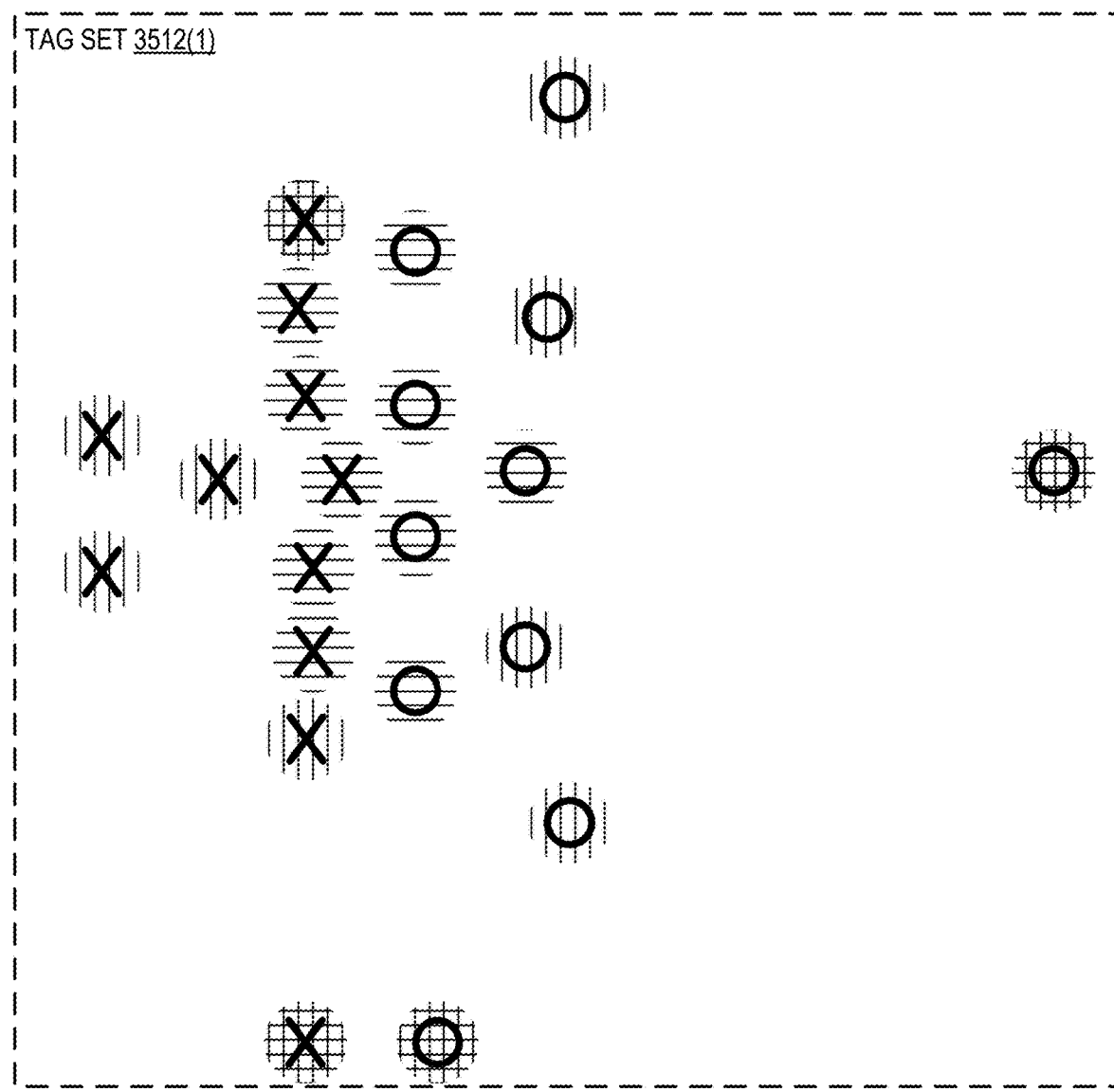
 SUB-TAG SET 3512(1)(1) – SKILL PLAYERS
 SUB-TAG SET 3512(1)(2) – MOBILE PLAYERS
 SUB-TAG SET 3512(1)(3) - LINEMEN
*FIG. 39*

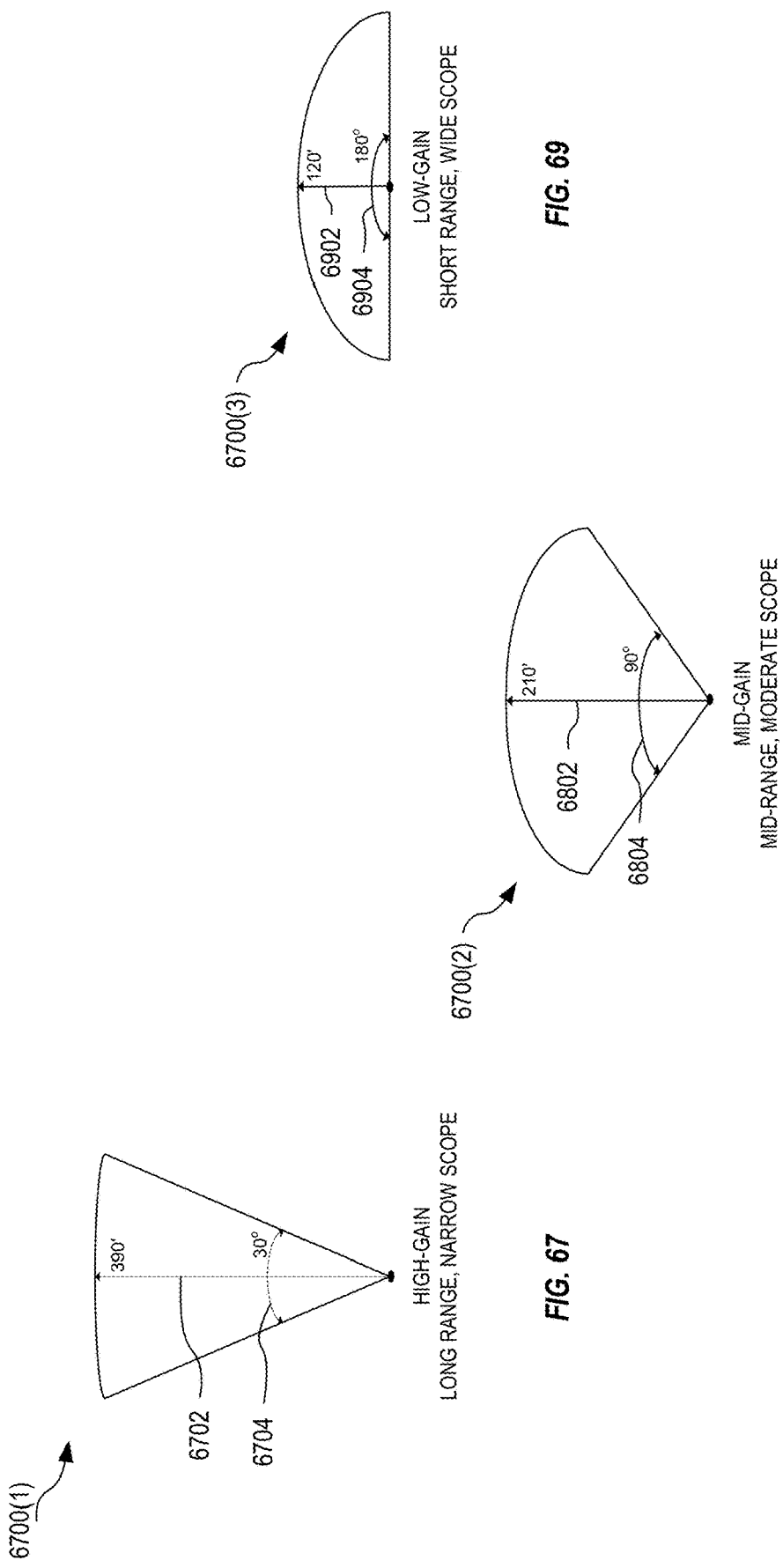

THREE RECEIVER BOUNDING BOX
FOR POSITIVE THRESHOLD VALUE

THREE RECEIVER BOUNDING BOX
FOR NEGATIVE THRESHOLD VALUE

FOUR RECEIVER BOUNDING BOX FOR
POSITIVE THRESHOLD VALUE

FOUR RECEIVER BOUNDING BOX
FOR NEGATIVE THRESHOLD VALUE

| TagID | X | Y | Timestamp | Error Code | Convergence | Sensor List |
|---|---|---|---|---|---|---|
| 232 | -1 | -1 | 0.000 | 2 | 0 | 03-04-05 |
| 234 | 1.99 | -10.83 | 0.004 | 0 | 102 | 01-02 |
| 235 | 22.14 | 31.8 | 0.013 | 0 | 58 | 05-06-08-09 |
| 232 | 1.08 | 20.7 | 0.100 | 0 | 180 | 02-03-04-05 |
| 234 | -1 | -1 | 0.104 | 4 | 104 | 05-06-08-09 |
| 235 | 0.82 | 32.1 | 0.113 | 0 | 63 | 02-03-04-05 |
| 232 | 1.1 | 21.1 | 0.204 | 0 | 212 | 05-06-08-09 |
| 234 | -1 | -1 | 0.213 | 4 | 0 | 02-03-04-05 |
| 235 | -1 | -1 | 0.300 | 3 | 0 | 03-04-05 |
| 232 | -1 | 21.5 | 0.304 | 4 | 0 | 03-04-05 |
| 234 | 0.85 | 32.5 | 0.313 | 0 | 88 | 01-02 |
| 235 | 1.12 | 21.8 | 0.400 | 0 | 250 | 05-06-08-09 |
| 232 | -1 | -32.71 | 0.404 | 1 | 112 | 02-03-04-05 |
| 234 | 0.83 | 22.3 | 0.413 | 0 | 92 | 05-06-08-09 |
| 235 | 1.14 | -10.76 | 0.500 | 0 | 245 | 02-03-04-05 |
| 232 | -1 | 32.84 | 0.504 | 0 | 108 | 05-06-08-09 |
| 234 | 0.82 | 22.6 | 0.513 | 0 | 103 | 02-03-04-05 |
| 235 | 1.17 | -10.75 | 0.600 | 0 | 287 | 05-06-08-09 |
| 232 | 1.12 | 33.03 | 0.604 | 0 | 117 | 02-03-04-05 |
| 234 | 0.84 | 22.6 | 0.613 | 0 | 84 | 05-06-08-09 |
| 235 | -1 | -10.71 | 0.700 | 0 | 0 | 01-02-03 |
| 232 | 0.97 | 33.18 | 0.704 | 0 | 130 | 03-04-05 |
| 234 | 0.85 | 33.18 | 0.713 | 0 | 65 | 05-06-08-09 |

SELF-CONFIGURABLE TRACKING TAGS AND METHODS OF USE

RELATED APPLICATIONS

This application is a continuation of U.S. patent application Ser. No. 15/814,649, filed Nov. 16, 2017, which is a continuation of U.S. patent application Ser. No. 14/960,026, filed Dec. 4, 2015, now U.S. Pat. No. 9,950,238, which is a continuation of PCT/US2014/040914, filed Jun. 4, 2014, which claims priority to U.S. Provisional Patent Application No. 61/830,961 titled "Athlete Tracking System Improvements and Tools," filed Jun. 4, 2013, U.S. Provisional Patent Application No. 61/900,786 titled "Object Tracking Systems With Automatic Optimization And Associated Methods," filed Nov. 6, 2013, U.S. Provisional Patent Application No. 61/930,378 titled "Object Tracking Systems With Automatic Optimization And Associated Methods," filed Jan. 22, 2014, U.S. Provisional Patent Application No. 61/945,559 titled "Automated Installation And Calibration Systems and Methods For An Object Tracking System," filed Feb. 27, 2014, and U.S. Provisional Patent Application No. 61/971,940 titled "Automatic Object Tracking System Optimizer And Associated Methods," filed Mar. 28, 2014. Each of the above referenced applications is incorporated herein by reference.

BACKGROUND

Commercially available ultra-wideband (UWB) tags are designed to meet the common demands of environments such as hospitals, manufacturing and inventory tracking. One of the major requirements for operating in these environments is an extended operating life. Extended operating life requires a large battery size, thereby resulting in a larger overall size of the tracking tag. Further, the tracking tag is enclosed within a waterproof protective casing that has an access door to allow replacement of the battery. To ensure that the case is waterproof, the access door typically includes a seal. The device includes a battery holder that allows the battery to be replaced. All these features result in a relatively large tracking tag. Large tracking tags are a distraction to, and have an influence on, the object being tracked.

Installation, configuration, and calibration of an RF tag based object tracking system for use in a sports environment is a labor intensive and iterative process that requires expert knowledge. Receivers are first installed around a perimeter of the sports environment and each receiver is manually aimed, by eye, at a predetermined location within the sporting environment such that uniform coverage of a specific region of the sports environment (e.g., a portion of a playing surface) is achieved. An initial system performance evaluation is completed by recording and manually analyzing location data determined by the object tracking system for an RF tag placed on a technician as he/she walks a predetermined path within the sports environment. The predetermined path is designed to establish receiver coverage of the sports environment by the object tracking system. The RF tag is placed in such a way that it is free of obstruction by the technician's body (e.g., the tag is on top of a hat worn by the technician).

This recording and manual analysis process is iteratively repeated, typically using three different paths of increasing granularity. After analyzing the location data from a current path, the technician will either manually adjust one or both of pan and tilt of one or more receivers and repeat the current path, or continue the process by performing the next path. This approach requires that the technician has a system expert's intimate knowledge of receiver characteristics and associated skill to extract information from the location data recorded for each test path. The expert knowledge required is at a very high premium and the application of the knowledge varies from technician to technician.

Thus, installation of an RF tag based object tracking system (a) requires highly specific expert knowledge, (b) is time intensive, (c) is a labor intensive incremental adjustment process, (d) may result in the RF tag based object tracking system operating at adequate but not optimal performance, and (e) result in inconsistent performance from installation to installation.

Any given sports environment easily includes hundreds of athletes and other objects that are tracked by an object tracking system, where each athlete and/or object is configured with at least one tracking tag that transmits a wireless signal (ping) that is located by the object tracking system. While such tracking systems may be optimized for the sports environment during installation, such systems do not automatically monitor and/or optimize their performance during operation.

Receivers of an RF tag based object tracking system are positioned around an area of interest such that each receiver covers a portion of the area of interest and in combination the receivers cover all of the area of interest. For a sports environment, the tracked area is for example a field of play and may include sideline areas.

During installation, each receiver is configured with a single, fixed, set of characteristics that are selected to enable the receiver to detect "pings" (i.e. low power signal transmissions) transmitted from one or more RF tags located within a defined portion of the area of interest that is assigned to that receiver based upon anticipated environmental conditions. For example, one receiver may be configured with a high gain antenna and matching analog conditioning circuitry that includes a 6.5 GHz band pass filter.

In practice, the sports environment is subjected to continual change, both environmental and situational. Environmental changes within the sports environment include the introduction of powerful electromagnetic signals (e.g. Wi-Fi or wireless broadcast camera signal). Since the RF tag based object tracking system is based upon the receivers detecting pings from the RF tags, changes in the spectral content of the sports environment are often catastrophic upon the system's ability to locate the RF tags.

Situational changes (e.g., movement of the RF tags within the sports environment) result in changes of RF tag density (i.e., the number of tags within a certain area), and thereby changes in the amount and/or frequency of pings received by each receiver of the object tracking system. The static configuration of each receiver is selected to also adequately cover anticipated situational changes. Although situational changes are not usually catastrophic to locating the RF tags, tuning the object tracking system to handle worst case tag/ping densities comes at the expense of system performance in other areas. These changing situations and environmental conditions are problematic because the receivers are statically configured for optimal performance under specific conditions.

Since each receiver configuration is static, the object tracking system cannot perform optimally for all environmental and situational conditions. The dynamically changing environmental and situational conditions places constantly changing demands on each receiver. These demands make it impossible to consistently achieve optimal performance of the object tracking system since it is statically configured to meet only certain of these environmental and situational conditions.

Exacerbating this problem, the likelihood of environmental and situational changes is greatest on "Game Day" when the integrity of the object tracking system is most crucial.

In an attempt to have the object tracking system operate reliably on "Game Day," all environmental and situational conditions likely to exist on "Game Day" are anticipated and receivers of the object tracking system are configured in anticipation of these conditions. The specialized configuration (e.g., additional circuitry) required to operate effectively with the anticipated conditions often have negative effects under different conditions. Therefore, when the object tracking system is statically configured to meet all anticipated "worst case" conditions, the object tracking system invariably has inherently sub-optimal performance when these anticipated conditions are not prevailing.

Further, where "game day" conditions are not fully anticipated, a catastrophic failure to determine locations of the RF tags may still occur within the object tracking system when such unanticipated conditions occur. Such catastrophic failure typically terminates operation of the object tracking system and requires a team of technicians to visit the stadium to physically swap out the installed receivers for receivers configured to handle the unanticipated conditions—if identified. Such receiver replacement is costly and time consuming and addresses the current environmental condition. However, such receiver replacement does not take into account any future unanticipated conditions that the system will be ill-equipped to handle.

SUMMARY OF THE EMBODIMENTS

An Improved Tracking Tag

In one embodiment, an ultra-wide band tracking tag for use in sports includes a partial housing having an open lower portion, a battery coupled directly to a printed circuit board, a potting compound for potting the printed circuit board and battery within the partial housing to make the tag waterproof, a sealing compound for protecting sensitive components positioned on the printed circuit board from the potting compound, and one or more straps attached to the partial housing to facilitate coupling of the tag to an athlete.

In another embodiment, a UWB tracking tag is configured for attachment to an athlete and includes a UWB transceiver, a battery, and two or more straps for coupling the tag to the athlete.

Trackable Protection Pad

In one embodiment, a trackable protection pad for use by an athlete includes a first tracking tag configured with the protection pad and is positioned such that the first tracking tag is substantially horizontal when the athlete is competing.

Location Data Visualization

In one embodiment, a data replay tool replays location tracking information, and includes a replay module having machine readable instructions stored within memory that when executed by a processor sends the location tracking information in chronological order to one or a plurality of visual display tools.

In another embodiment, a computer implemented tool visually displays performance of an athlete tracking system that generates tracking position information for each signal received from a tracking tag located within a tracking area. The tracking position information includes a determined location, a position error, and a timestamp. The tool includes a visual plotting module having machine readable instructions stored within memory and executed by a processor to perform, for each signal transmitted by the tracking tag, the step of: displaying a symbol on a graphical representation of the tracking area at a position representing the location of the tag within the tracking area, wherein the symbol is selected based upon one or more of: (a) the accuracy of the determined location based upon the receiver events, and (b) errors in the determined location.

Receiver Modifications

In one embodiment, a receiver detects a UWB tracking tag in a game day environment and includes a wireless receiver for receiving a signal from the tracking tag, and a band pass filter centered at a center frequency of the signal and inserted immediately after the antenna. The band pass filter reduces the effect of noise from the game day environment within the wireless receiver.

Tag Manager

In one embodiment, a tag manager configures an athlete tracking system. The tag manager includes software, stored within memory of a portable computing device configured with a wireless transceiver for communicating with a tracking tag associated with an athlete tracked by the athlete tracking system, that when executed by a processor of the portable computing device implement the steps of: automatically assigning a tag ID of the tracking tag to the athlete within a roster list, and communicating the roster list to the athlete tracking system.

Continuous Accuracy Measurement

In one embodiment, a method continuously evaluates performance of an athlete tracking system. The athlete tracking system determines the location of a test tag fixedly positioned within a tracking area of the athlete tracking system and a positioning error of the athlete tracking system is determined based upon a difference between the determined location and a known location of the test tag.

Object Tracking System Optimization

In one embodiment, a method automatically optimizes performance of an object tracking system. An optimizer receives locations of each of a plurality of tags, where each tag is attached to an object tracked by the object tracking system. Identifiers of the tags are grouped within two or more tag sets and each tag identified within a first tag set of the two or more tag sets is configured with a first ping rate and tags identified within the other tags sets of the two or more tag sets are configured with a second ping rate. The first ping rate is higher than the second ping rate.

In another embodiment, a software product has instructions, stored on computer-readable media, wherein the instructions, when executed by a computer, perform steps for automatically optimizing performance of an object tracking system. The software product includes instructions for receiving locations of each of a plurality of tags, where each tag is attached to an object tracked by the object tracking system, instructions for grouping identifiers of the tags within two or more tag sets based upon the location of the tag relative to a field of play, wherein tags identified within a first of the two or more tag sets are located on the field of play and tags identified within the other of the two or more tag sets are not located on the field of play, and instructions for configuring each tag identified within the first tag set with a first ping rate and configuring tags identified within the other tags sets with a second ping rate. The first ping rate is higher than the second ping rate.

In another embodiment, an optimizer automatically optimizes performance of an object tracking system and includes a processor, a memory, software, stored within the memory, having machine readable instructions that when executed by the processor perform the steps of: receiving locations of each of a plurality of tags, where each tag is attached to an object tracked by the object tracking system; grouping identities of the tags within two or more tag sets based upon the location of the tag relative to a field of play, wherein tags identified within a first of the two or more tag sets are located on the field of play and tags identified within the other of the two or more tag sets are not located on the field of play; and configuring each tag identified within the first tag set with a first ping rate and configuring tags identified within the other tags sets with a second ping rate. The first ping rate is higher than the second ping rate.

Self-Configurable Tracking Tag

In one embodiment, a self-configurable tracking tag determines location of an object. The tracking tag includes a processor, a transmitter for transmitting, under control of the processor, pings at a ping rate and that are detectable by an object tracking system, a movement sensor coupled with the processor for sensing movement of the tracking tag, and a memory storing an algorithm having machine readable instructions that when executed by the processor perform the steps of: determining, using the movement sensor, movement of the tag, and adjusting the ping rate based upon the movement.

Optimizing Performance Based Upon Dynamic Tag Locations

In one embodiment, a method automatically optimizes performance of an object tracking system having a plurality of receivers for receiving ping signals from a plurality of tags, where each tag is attached to an object tracked by the object tracking system. An optimizer receives locations of each of the plurality of tags and groups identifiers of the tags within two or more tag sets, where a first of the tag sets identifies tags attached to objects involved in a situation of interest. The optimizer determines a first receiver group based upon the location of tags identified within the first tag set and location of each of the plurality of receivers. A center of a smallest 3D polygonal shape bounding the locations of tags identified in the first tag set is determined and aim of an antenna of each receiver within the first receiver group is incrementally aimed towards the center while a number of receiver events per second generated by the receiver for tags identified within the first tag set increases.

Optimizing Performance for Dynamic Environmental Changes (Filter)

In one embodiment, a method optimizes performance of an object tracking system. A number of receiver events per second generated by a receiver of the object tracking system is determined and the receiver is controlled to switch between an analog front end without a filter and an analog front end with a filter based upon the receiver events per second.

In another embodiment, a system optimizes performance of an object tracking system and includes an optimizer implemented as a computer with machine readable instructions stored on non-transitory media of the computer and executed by a processor of the computer to perform the steps of: determining a number of receiver events per second generated by a receiver of the object tracking system; and controlling, based upon the receiver events per second, the receiver to switch between a first analog front end configured without a filter and a second analog front end configured with a filter.

Generic Receiver with Multiple Analog Front Ends

In one embodiment, a reconfigurable receiver for use within an object tracking system includes a plurality of analog front ends, each generating a digital signal; a digital back end for processing one of the digital signals; and a digital switch for selecting, under control of the digital back end, the one digital signal.

Optimizing Performance Based upon Dynamic Situation Changes

In one embodiment, a method optimizes performance of an object tracking system. An optimizer configured with the object tracking system determines a bounding rectangle for locations of RF tags attached to objects of interest. The optimizer determines a location of the bounding rectangle relative to a location of a receiver of the object tracking system and controls the receiver to switch from a first analog front end to a second analog front end based upon the relative location of the bounding rectangle. The first analog front end is configured with a first range and a first scope and the second analog front end is configured with a second range that is different from the first range and a second scope that is different from the second scope.

Automatic Installation and Calibration with Robotic Vehicle

In one embodiment, an automated installation and calibration (AIC) system for an object tracking system includes a wirelessly controlled vehicle, an RF tag configured with the vehicle, and a controller for (a) receiving location data for the RF tag from the object tracking system, (b) controlling the vehicle to follow a path based upon the location data, and (c) adjusting orientation of at least one receiver of the object tracking system based upon analysis of the location data associated with the receiver.

In another embodiment, an automated installation and calibration method for an object tracking system, includes the steps of: receiving location data generated by the object tracking system for an RF tag attached to a wirelessly controlled vehicle; controlling movement of the vehicle to follow a path based upon the location data; determining a data set of locates from the location data based upon an area of consideration for a receiver of the object tracking system; and adjusting the orientation of the receiver based upon analysis of the data set.

In another embodiment, a software product has instructions, stored on non-transitory computer-readable media, wherein the instructions, when executed by a computer, perform steps for automating installation and calibration of an object tracking system. The software product includes instructions for receiving location data generated by the object tracking system for an RF tag attached to a wirelessly controlled vehicle; instructions for controlling movement of the vehicle to follow a path based upon the location data; instructions for determining a data set of locates from the location data based upon an area of consideration for a receiver of the object tracking system; and instructions for adjusting the orientation of the receiver based upon analysis of the data set.

BRIEF DESCRIPTION OF THE FIGURES

FIG. 7 shows exemplary propagation of one ping from one tag to each of s plurality of receivers of the system of FIG. 1.

FIG. 21 shows a first scenario where the tag of FIG. 1 is mounted in the pads along the neck hole and positioned 2" from the players head and neck.

FIG. 22 shows a second scenario where the tag of FIG. 1 is mounted in the pads and positioned 7" from the players head and neck.

FIG. 29 shows the roster list of FIG. 28 being edited within a simple editor provided by the software of the tag manager.

FIG. 30 is a screen shot illustrating exemplary addition of tag IDs to the roster list.

FIG. 31 shows the software of FIG. 28 inserting the read tag IDs into the proper row and column of the roster list of FIG. 28

FIG. 39 shows exemplary sub-grouping of tags within the first tag set of FIG. 35 into sub-tag sets.

FIGS. 67-69 show exemplary scope and range characteristics of antennae of the receiver of FIG. 66.

FIG. 86 shows a portion of exemplary recorded data of FIG. 82 selected by the visual data selector within the analysis tool.

DETAILED DESCRIPTION OF THE EMBODIMENTS

Definitions

Figure 1:
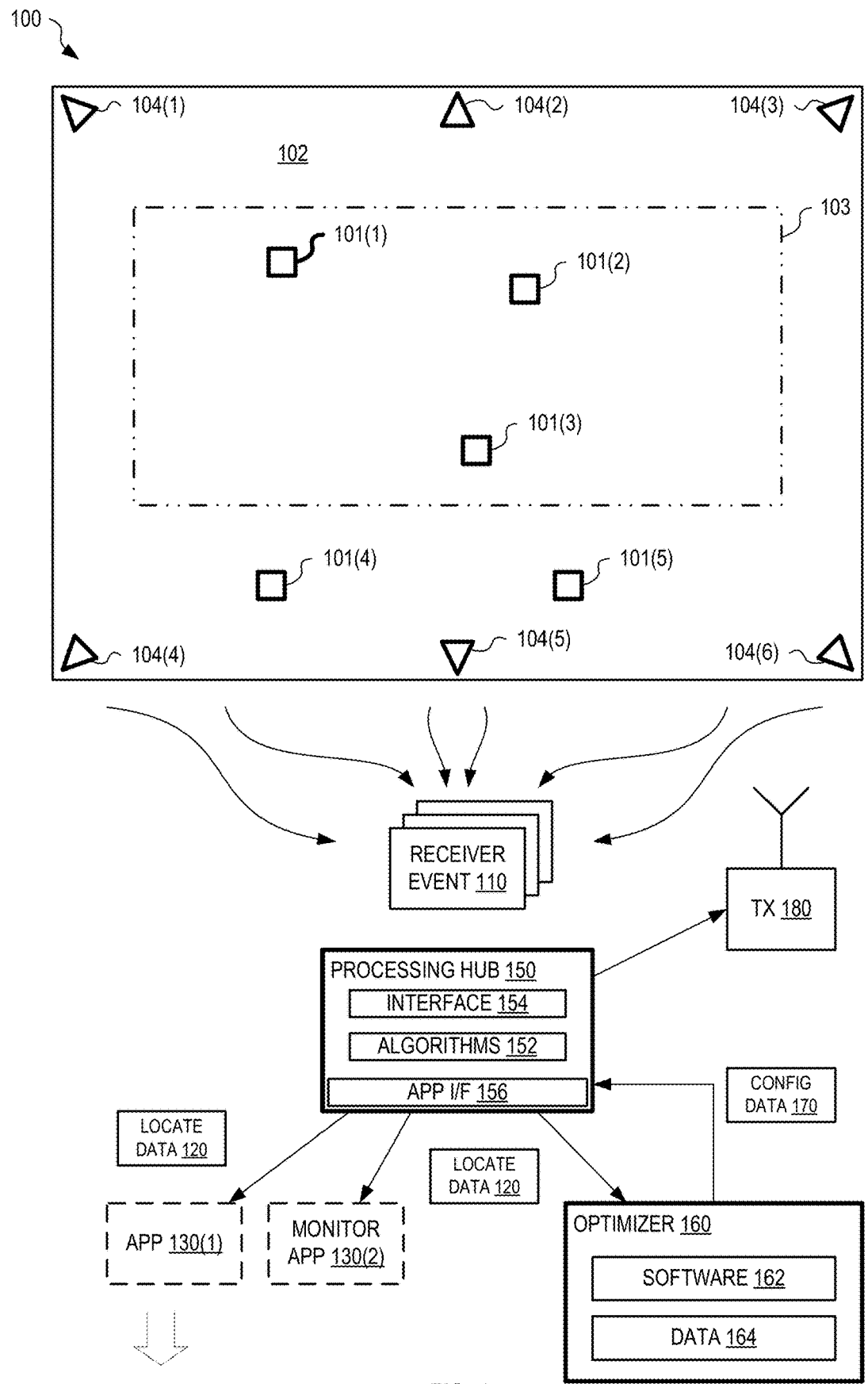
FIG. 1 shows one exemplary object tracking system with automatic optimization, in an embodiment.

The following terms are used herein and the accompanying definitions may be helpful in understanding the technology described herein.

Object Tracking System: A system for real time tracking of the location of objects within an operational area, where the determined location is defined based upon axes relative to the operational area.

Ping: A single transmission from a single tag. For example, a single tag programmed with a 25 Hz ping rate generates twenty-five pings per second. Pings may preferably be lower power transmissions.

Receiver Event: When a receiver detects a ping, it generates a receiver event. For example, if one ping is detected by ten receivers, ten receiver events are generated within the object tracking system.

Locate: Successful position calculation of a ping. For example, a tag transmits a ping that is detected by some number of receivers, resulting in some number of receiver events. If the object tracking system is successful in calculating a position of the tag based upon these receiver events, then the calculated position is called a Locate.

System Bandwidth: The maximum number of receiver events the object tracking system can handle per second.

Ping Budget: The total number of pings targeted for an environment based upon an anticipated average number of receiver events expected per ping and a total available system bandwidth of the object tracking system.

Locate-to-Ping Ratio: The ratio of successful locates to the number of pings.

Ping Rate Allocation System: A system providing an automated method for setting the ping rate of tags to achieve the highest possible accuracy of locates based upon the ping budget and prioritization of the object (e.g., athlete) to which the tag is attached.

Field Perimeter: The X, Y coordinates defining a field of play (e.g., an area of interest where location is tracked more accurately, such as an American football field, a soccer pitch, a running track, and so on) using the coordinate system of the object tracking system.

Max Athlete Speed: The maximum speed at which an athlete may move in an environment. Typically assumed to be 10 yards/second.

Receiver Event Allocation System: An automated method for allocating resources of the object tracking system to maximize performance based upon priority of tracked object while remaining within bandwidth limitations of the object tracking system.

Receiver Priority Group: Collections of receivers grouped together based on their priority to system performance.

SBWT: System Bandwidth Target. The target operating bandwidth of the object tracking system; typically 85% of the system bandwidth.

System Optimizer: An automated method for dynamically allocating resources (e.g., portions of the system bandwidth) of the object tracking system, in response to athlete behavior, event flow, and changing environmental conditions to maintain the very best performance of the object tracking system at all times.

Tag Set: A collection of tags sharing a common priority level within the object tracking system.

Tag Set Boundary: Minimum boundary, shaped as a rectangle or other shape, aligned to the operational axes of the object tracking system, that contains all tags of a defined group (Tag Set).

TS1BT: Tag Set 1 Bandwidth Target. This defines the bandwidth allocated to the highest priority tag set and is used during automatic adjustment of receiver gain. TS1BT is typically set to 70% of SBWT (System Bandwidth Target).

Object Tracking System Overview

An Object Tracking System determines the location of objects in a defined area (e.g., to within inches) hundreds of times per second for each object.

FIG. 1 shows one exemplary object tracking system 100 with automatic optimization. System 100 tracks the location of tags 101 within an operational area 102 (i.e., a tracking environment). System 100 has six receivers 104, positioned at known locations around operational area 102, and in communication with a processing hub 150. System 100 may have three or more receivers without departing from the scope hereof. Tags 101 are attached to objects to be tracked (e.g., athletes, balls, officials, and other equipment of interest), and thereby these tags 101 move within operational area 102. Each receiver 104 is receptive to ultra-wideband (UWB) wireless signals, called "pings" herein (see pings 402 of FIGS. 4 and 5), from tags 101 and sends one receiver event 110 to processing hub 150 for each detected ping. Algorithms 152 within processing hub 150 processes receiver events 110 and generate locate data 120 for use by one or more applications 130 via an application interface 156 configured with hub 150. Applications 130 may include a graphic display generator that generates a graphic display showing detected locations of players on a field of play 103 (e.g., an area in which the activity of interest occurs, such as an American football field, a soccer field, an athletic running track, and so on), for example.

Figure 2:
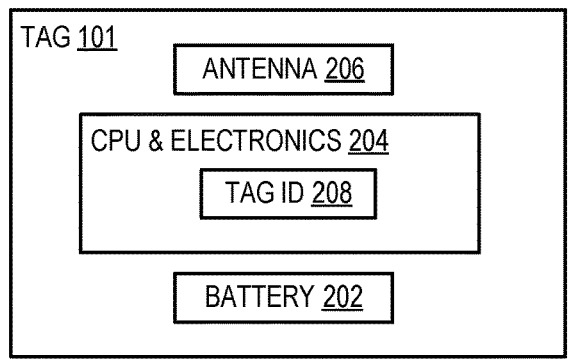
FIG. 2 shows one exemplary tag that includes a battery, circuitry, and an antenna, in an embodiment.
Figure 3:
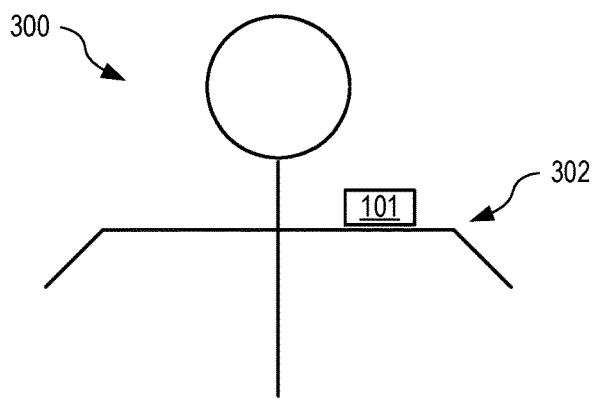
FIG. 3 shows the tag of FIG. 1 attached to an athlete.
Figure 4:
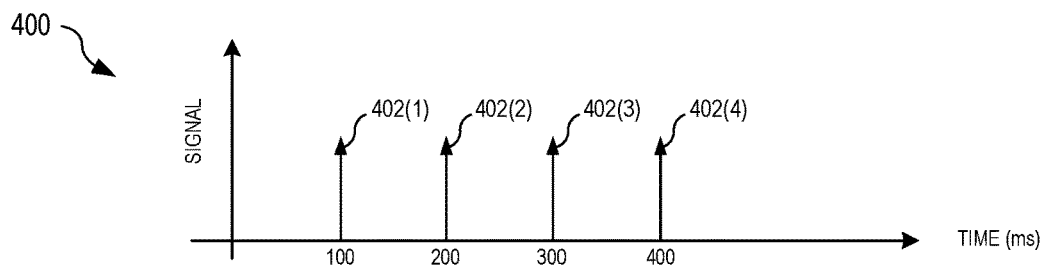
FIG. 4 is a graph illustrating one exemplary ping rate of the tag of FIG. 1.
Figure 5:
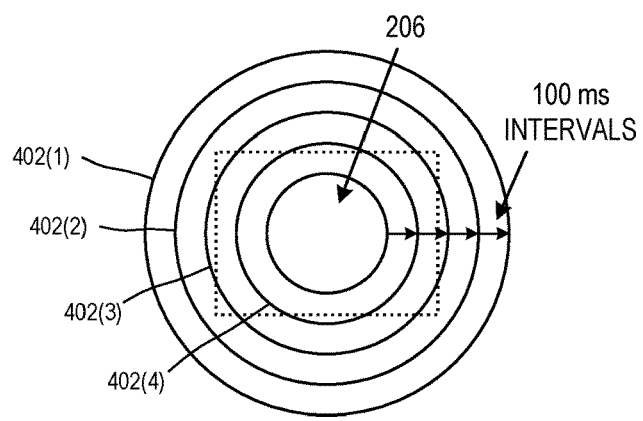
FIG. 5 shows exemplary radial propagation of one ping from the tag of FIG. 1.

FIG. 2 shows tag 101 of FIG. 1 in further exemplary detail. Tag 101 includes a battery 202, circuitry 204, and an antenna 206. Each tag 101 has a unique tag ID 208 for identification. FIG. 3 shows tag 101 of FIGS. 1 and 2 attached to an object of interest (e.g. athlete). In the example of FIG. 3, tag 101 is positioned on a shoulder 302 of an athlete 300 and tag ID 208 is associated with athlete 200. FIG. 4 is a graph illustrating exemplary pings 402 from tag 101, where tag 101 is configured to emit pings 402 at an exemplary programmable ping rate of 10 Hz. FIG. 5 shows exemplary radial propagation of ping 402 from tag 101 (not to scale). Each ping 402 contains information (e.g. tag ID 208 and battery level) specific to the transmitting tag 101 and, in certain embodiments, ping 402 may include information (e.g. biometric data) about the object associated with the tag. A primary function of each tag 101 is to periodically generate ping 402. However, tag 101 may also receive transmissions that configure properties, such as ping rate, dynamically. Tag 101 may include software 210 that includes machine readable instructions that are executed to implement this functionality within tag 101.

Figure 6:
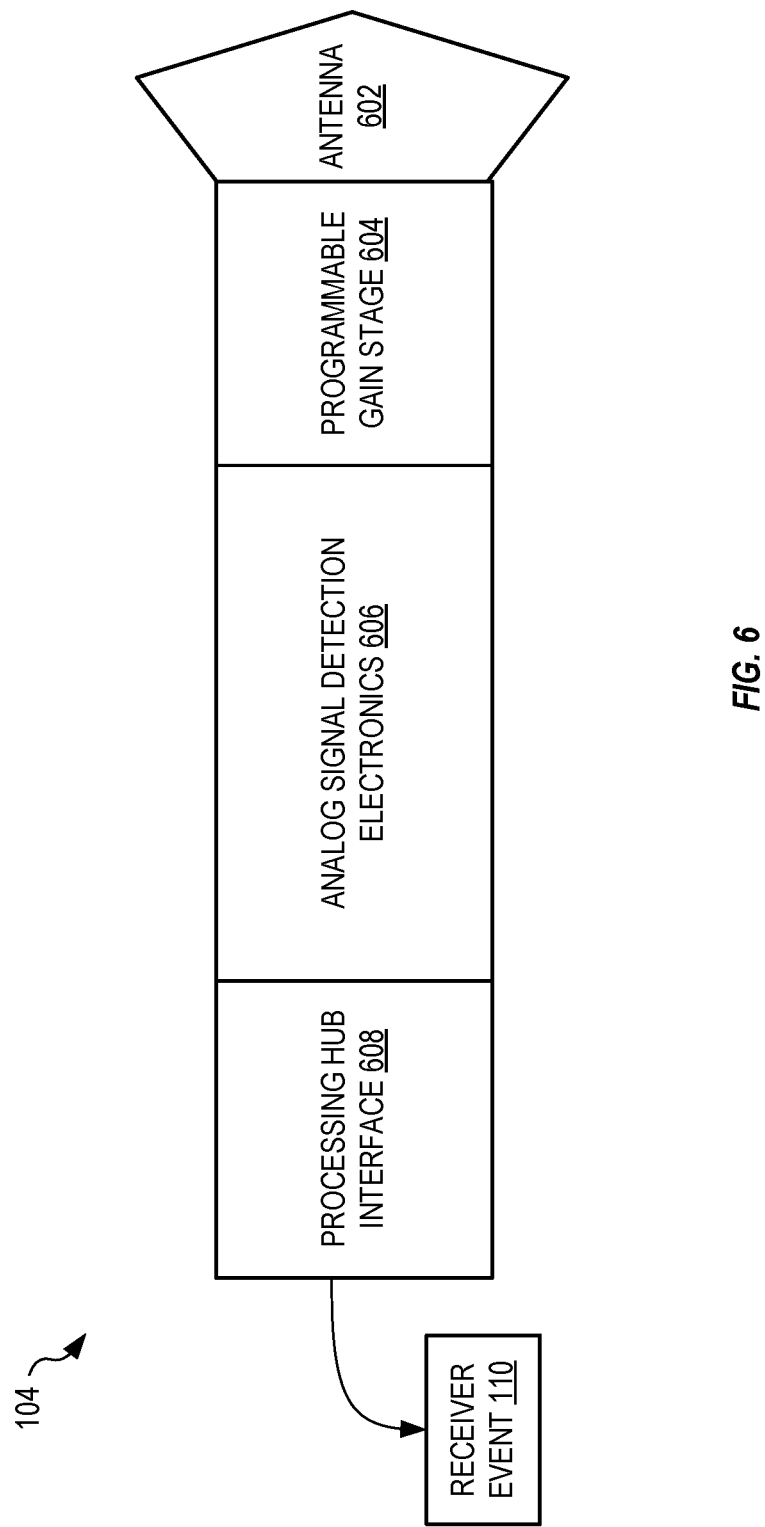
FIG. 6 is a schematic showing one exemplary receiver for receiving the ping of FIGS. 4 and 5 when transmitted by the tag of FIG. 1, in an embodiment.

FIG. 6 is a schematic showing one exemplary receiver 104 of FIG. 1 for receiving pings 402 transmitted by tag 101. Receiver 104 includes a transmit/receive antenna 602, a programmable gain stage 604, analog signal detection electronics 606 and a communication interface 608. Analog signal detection electronics 606 operates to generate receiver events 110 that include information received from tag 101 and a time of detection by receiver 104.

As shown in FIG. 1, an optimizer 160 may be communicatively coupled with processing hub 150 to process locate data 120 and to generate configuration data 170 for dynamically controlling system 100 to have optimal performance. For example, performance of system 100 may be optimized as weather and other environmental conditions change during a monitored game, where changes in environmental conditions affect range and detectability of pings 402 by receivers 104. In another example, tags 101 are dynamically configured based upon and their location, such as when on field of play 103 (i.e., when the athlete is actively participating in a current play) as opposed to when off field of play 103 (i.e., when the athlete is not involved in a current play).

Processing hub 150 includes a communication interface 154 for communicating with receivers 104, via communication interface 608, to receive receiver events 110. Algorithms 152 process receiver events 110 from multiple receivers 104 to locate tags 101 and generate locate data 120. For example, based upon three or more receiver events 110 resulting from one ping 402 from one tag 101, algorithms 152 generate locate data 120 to include tag ID 208 and a determined location of tag 101. Application interface 156 communicates with one or more applications 130. For example, each application 130 receives locate data 120 from hub 500 and may further process this information to generate displays indicative of the location within an operation environment of objects (e.g., athletes) associated with tags 101 based upon tag ID 208.

In one embodiment, optimizer 160 is a computer with at least one processor and memory containing machine readable instructions that, when executed by the processor, perform the functionality of optimizer 160 as described herein. In another embodiment, optimizer 160 is implemented within processing hub 150 and comprises machine readable instructions stored within a memory of hub 150 and executed by a processor of hub 150 to perform functionality of optimizer 160 as described herein. Optimizer 160 generates configuration data 170 that configures various properties of object tracking system 100, such as for example ping rate of tags 101, analog gain of each receiver 104, and parameters used within algorithms 152 of hub 150.

Basic Location Operation:

The process of locating an object associated with tag 101 begins when tag 101 generates ping 402. As shown in FIG. 5, ping 402 propagates radially outward from antenna 206 of tag 101 toward receivers 104, positioned around the perimeter of operational area 102. Receivers 104 within a transmission range of tag 101, and having a line of sight (LOS) to tag 101, receive ping 402. By "LOS", as used herein, it is meant a straight line of wireless transmission that is not obstructed. LOS does not necessarily relate to visual line of sight. Signal strength of ping 402 at each receiver 104 depends upon a distance between tag 101 and that receiver 104, and whether there were any obstructions, such as player bodies or other objects, between the tag and the receiver (i.e., preventing LOS). Whether, or not, receiver 104 is able to decode information (e.g., tag ID 208 and other information) of ping 402 depends upon the signal strength of ping 402 at the receiver and the gain setting of programmable gain stage 604 of the receiver. If the signal strength and gain setting are sufficient to allow analog signal detection electronics 606 to decode the information within ping 402, analog signal detection electronics 606 time-stamps that information and passes it along as receiver event 110 to processing hub 150. Where processing hub 150 receives at least three receive events 110 for ping 402 (i.e., at least three receivers 104 receive and decode the same ping 402 based upon tag ID 208 and time stamp within each receiver event 110), algorithms 152 within processing hub 150 have a sufficient number of data points (time stamps) to attempt a location of tag 101 using time difference of arrival (TDOA) techniques, as discussed in further detail below.

Since ping 402 travels outward at a constant speed in all directions, the time it takes to reach each receiver 104 depends directly upon the distance between tag 101 and that receiver. That is, ping 402 reaches receivers 104 in order based upon the distance of each receiver from tag 101. FIG. 7 shows exemplary propagation of ping 402 from tag 101(2) to each of receivers 104(2), 104 (3), 104 (5), and 104 (6) within operational area 102. Concentric rings 702, 704, 706, and 708, represent the position of ping 402 at times t1, t2, t3, and t4, respectively.

Figure 8:
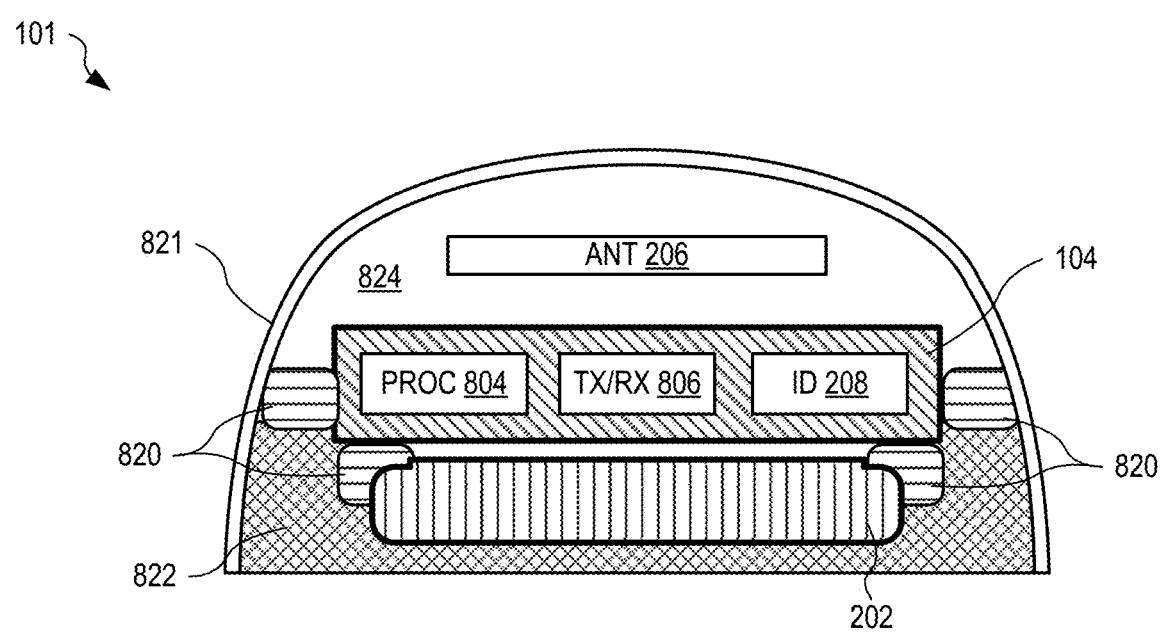
FIG. 8 shows the tag of FIGS. 1 and 2 in further exemplary detail.

In the example of FIG. 7, ping 402 reaches first receiver 104(2) (ring 702) at time t1, then reaches receiver 104(3) (ring 704) at time t2, then reaches receiver 104(5) (ring 706) at time t3, and then reaches receiver 104(6) (ring 708) at time t4. Thus, receiver 104(2) generates a receiver event 110(1) including tag ID 208 of tag 101(2) and a time stamp of t1, receiver 104(3) generates a receiver event 110(2) including tag ID 208 of tag 101(2) and a time stamp of t2, receiver 104(5) generates a receiver event 110(3) including tag ID 208 of tag 101(2) and a time stamp of t3, and receiver 104(6) generates a receiver event 110(4) including tag ID 208 of tag 101(2) and a time stamp of t4. Each receiver event 110 also identifies the generating receiver 410. For example, receiver event 110(1) includes a receiver ID 714(2) that identifies receiver 104(2), receiver event 110(2) includes a receiver ID 714(3) that identifies receiver 104(3), receiver event 110(3) includes a receiver ID 714(5) that identifies receiver 104(5), and receiver event 110(4) includes a receiver ID 714(6) that identifies receiver 104(6). Although the example of FIG. 8 shows t1, t2, t3, and t4 having different values, t1, t2, t3, and t4 need not be different.

A TDOA for receiver events 110(1) and 110(2) is t2-t1; a TDOA for receiver events 110(1) and 110(3) is t3-t1; a TDOA for receiver events 110(1) and 110(4) is t4-t1; a TDOA for receiver events 110(2) and 110(3) is t3-t2; a TDOA for receiver events 110(2) and 110(4) is t4-t2; and a TDOA for receiver events 110(3) and 110(4) is t4-t3.

In one embodiment, receivers 104 are fixed at known (e.g., measured during installation) locations around operational area 102 such that the location of each receiver 104 relative to the operational area is known to algorithms 152, allowing algorithms 152 to calculate the location of tag 101(2) relative to receivers 104, and thereby relative to operational area 102, based upon TDOA times determined from receiver events 110. Such algorithms are known in the art, and are therefore not described in further detail herein.

A successful calculation of a location of the tag 101 by processing hub 150 is called a Locate. Locate data 120 contains many such locates as determined for each tag 101 within operational area 102. Locates, within locate data 120, are made available to applications 130 in real-time (i.e., almost instantaneously). Thus, applications 130 have real-time identification and location information of each tag 101 and its associated object within operational area 102.

Not all pings 402 result in locates. During typical operation of object tracking system 100, nearly 50% of all pings 402 generated by tags 101 fail to result in a locate. There are many reasons that locates cannot be successfully calculated. For example, where fewer than three receivers 104 successfully decode any one ping 402, algorithms 152 cannot determine a location. In another example, where three receiver events 110 are received for one ping 402, algorithms 152 may fail to converge on a single location and therefore fail to determine a location of tag 101. Even when processing hub 150 fails to determine a valid locate for a particular ping 402, the processing hub still makes information (e.g., the reason for failing to produce a locate and the specific receivers 104 that provided receiver events 110) about ping 402 available in real-time. Although information of failed locates is not useful in most applications 130 since it does not provide tracking data, such information is extremely useful for monitoring the behavior and health of system 100 during operation and for optimizing performance of system 100 using optimizer 160.

Tag Modifications

FIG. 8 shows tag 101 of FIGS. 1 and 2 in further exemplary detail. Tag 101 is a physical device that includes a battery 202, antenna 206, and CPU and electronics 204 that are formed of a circuit board 802 with a processor 804 (e.g., a microcontroller), a transceiver 806 that couples with antenna 206. Antenna 206, circuit board 802, and battery 202 are protected by an open casing 821 and a potting material 822. A protective material 820 (e.g., hot glue) is applied around the circuit board 802 and battery 202 to prevent potting material 822 from contacting sensitive components that require an air surround.

Figure 9:
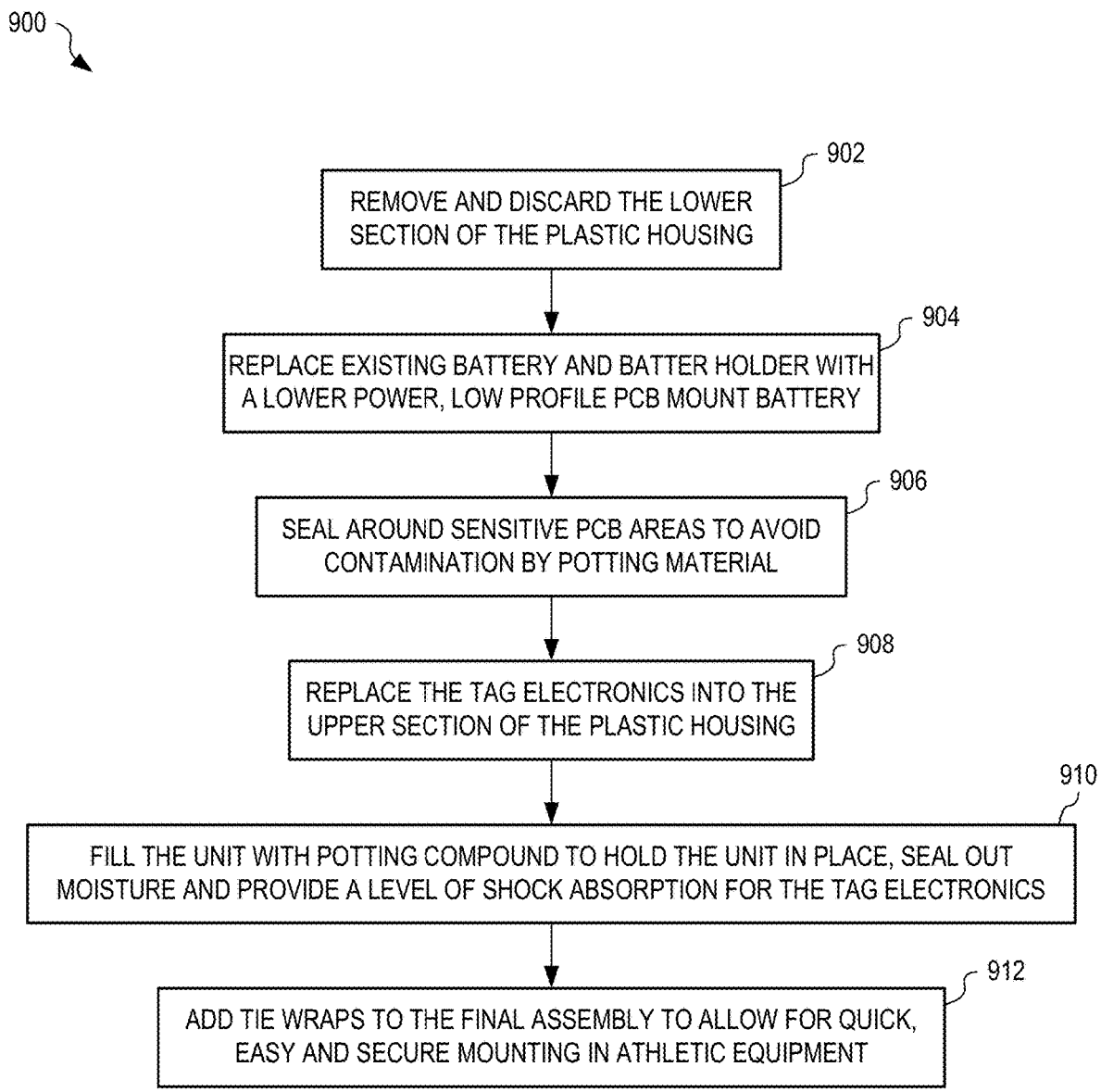
FIG. 9 is a flowchart illustrating one exemplary method for modifying a commercial UWB tag for use with the system of FIG. 1, in an embodiment.

FIG. 9 is a flowchart illustrating one exemplary method 900 for modifying a commercially available UWB tag for use with system 100. Specifically, method 900 modifies mechanical aspects of the commercially available UWB tag to reduce the overall unit size, permitting configuration of the tag into a wide variety of athletic equipment, and ruggedizing the tag to survive the rigors of athletic competition.

In step 902, method 900 removes and discards the lower section of the plastic housing. In one example of step 902, the four screws securing the molded plastic bottom panel of the commercial tag are removed, and the bottom portion of the case is removed and discarded. In step 904, method 900 replaces the existing battery and battery holder with a lower power, low profile direct PCB mount battery. In one example of step 904, the battery is removed from the battery holder, and the battery holder is unsoldered and removed from the printed circuit board. Battery leads are trimmed to achieve a lower profile and the new battery with integrated leads is soldered into the previous battery position without a battery holder.

In step 906, method 900 seals around sensitive PCB areas to avoid contamination by potting material. In one example of step 906, hot glue is used to seal the area around the battery and the circuit board to protect components located beneath the battery that require open air to operate (e.g., an open-air filter component). Potting material that reaches any sensitive components will significantly affect tag transmission performance.

In step 908, method 900 replaces the tag electronics into the upper section of the plastic housing. In one example of step 908, antenna 206, circuit board 802, and battery 202 are positioned within casing 821.

In step 910, method 900 fills the underside of the unit with potting compound to hold the unit in place, seal out moisture and provide a level of shock absorption for the tag electronics. In one example of step 910, potting material 822 is installed around and over battery 202 to form the bottom of the tag. The level of the potting material is made no higher than the circuit board enclosure, but covering the battery for physical and electrical protection.

In step 912, method 900 adds tie-wraps to the final assembly to allow for quick, easy and secure mounting with athletic equipment. In one example of step 912, tie-wraps are screwed to the underside of case 821 to facilitate attachment of tag 101 to objects being tracked.

When complete, method 900 reduces the height of the tag by approximately 28%; the commercially available tag has a height of 0.810", and the modified tag (i.e., tag 101) has a height of 0.583".

Figure 10:
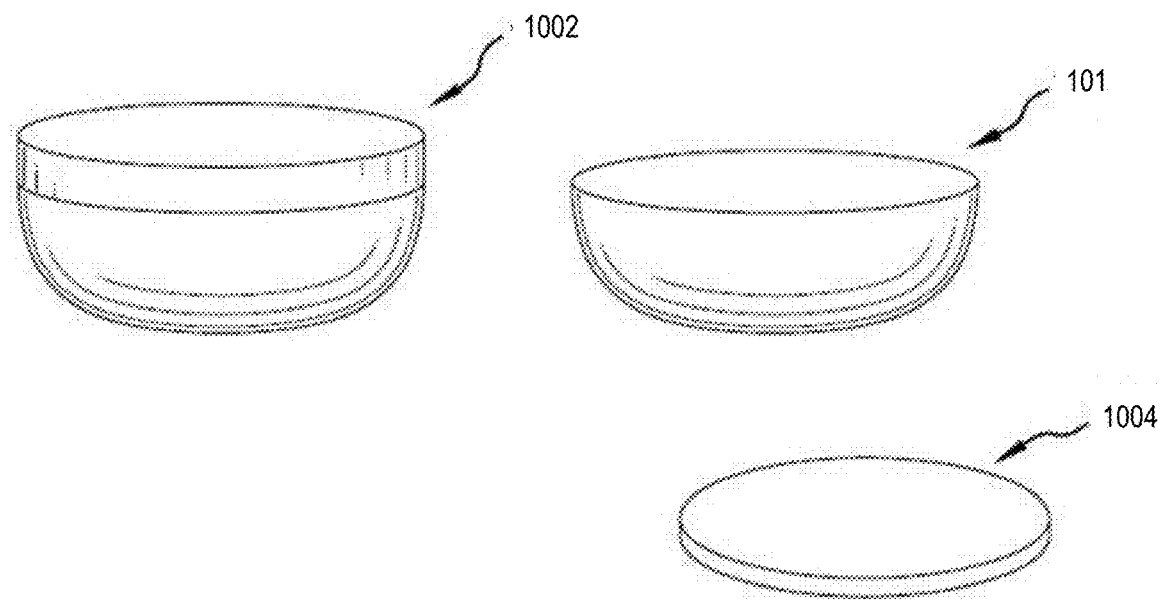
FIGS. 10 through 12 show visual comparisons between a commercially available UWB tag and the tag of FIGS. 1 and 2 resulting from the modifications based upon the method of FIG. 9.
Figure 11:
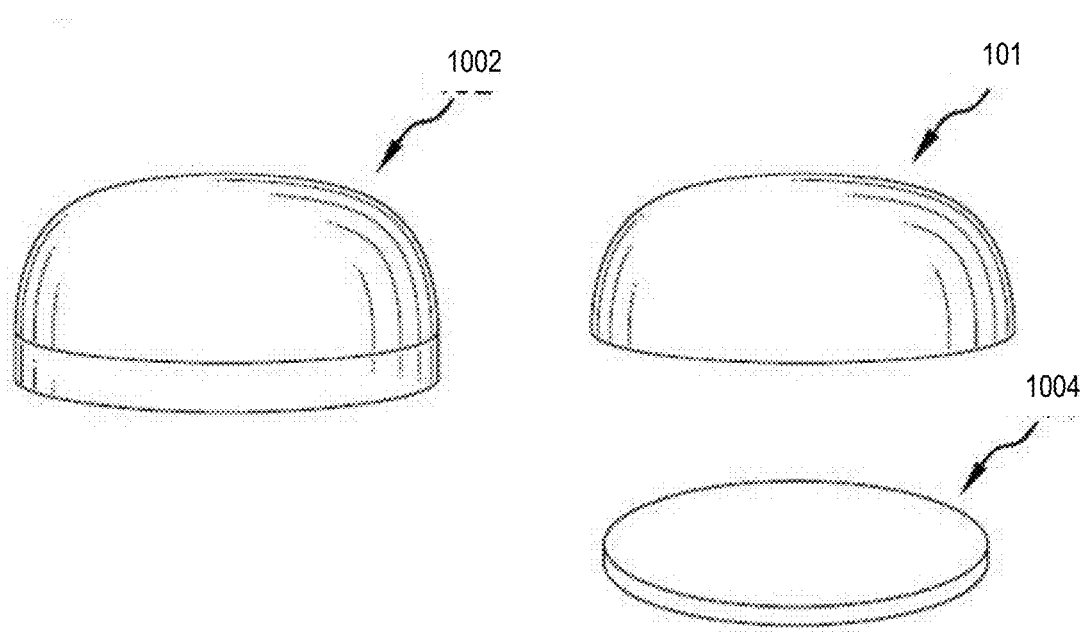
Figure 12:
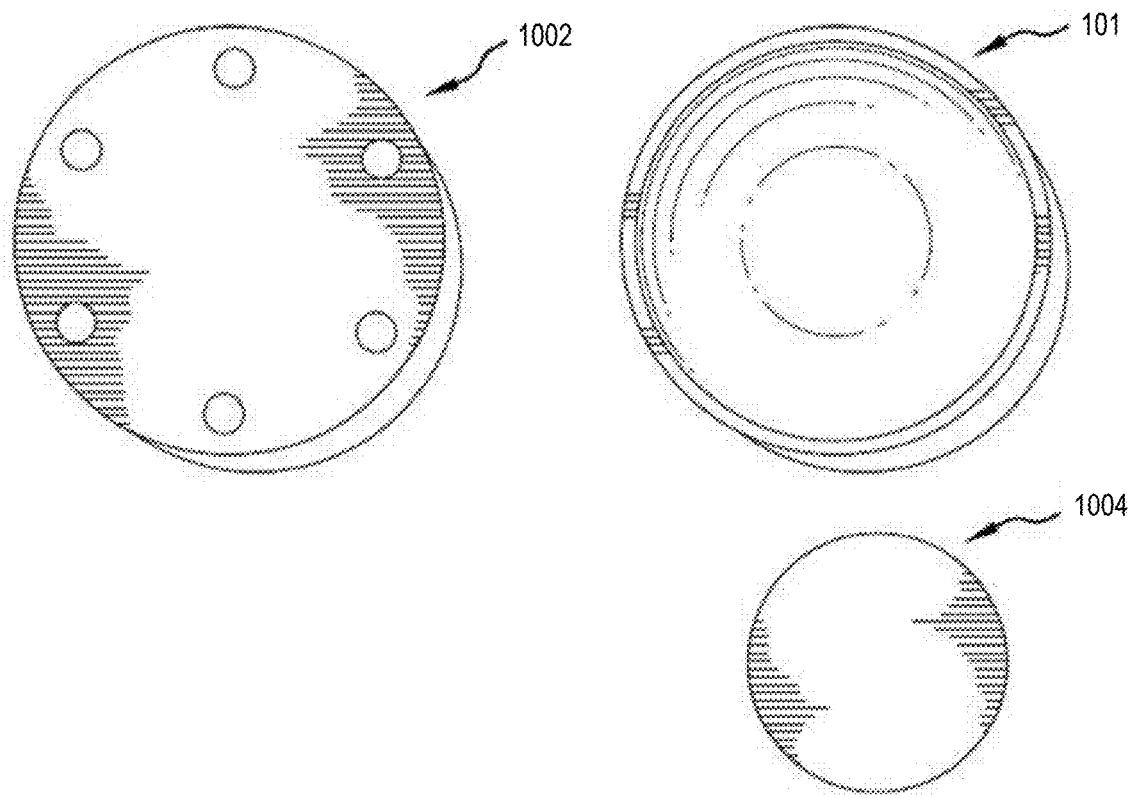

FIGS. 10 through 12 show visual comparisons between a commercially available UWB tag and tag 101 created by implementing method 900 of FIG. 9. As shown, tag 101 is much thinner and more rugged that the commercially available tag 1002. An American quarter 1004 is shown as a size reference.

Figure 13:
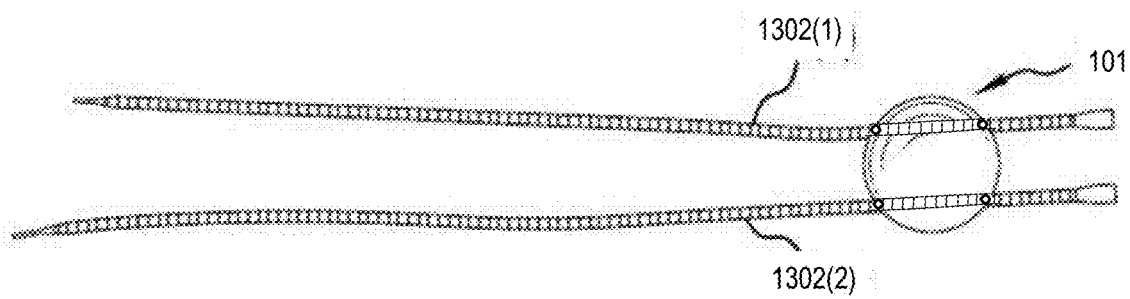
FIGS. 13 and 14 show exemplary attachment of two tie-wraps to the main body of the tag of FIGS. 1 and 2 such that attachment of the tag to an athlete's sporting equipment is simplified.
Figure 14:
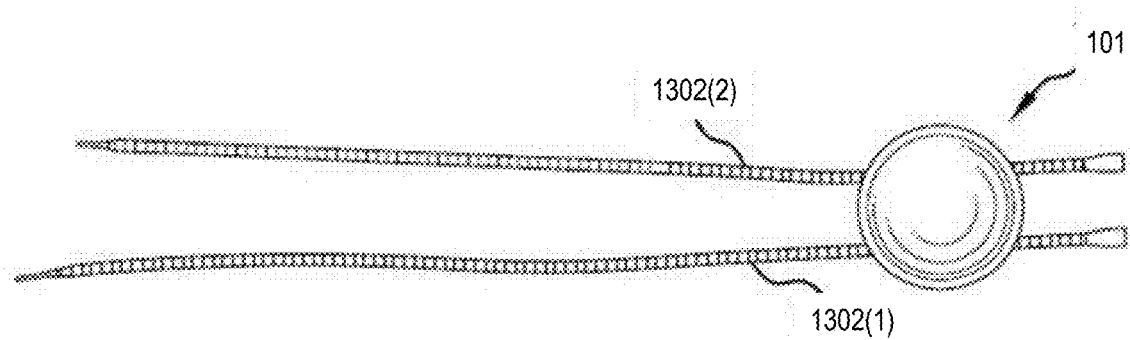

FIGS. 13 and 14 show exemplary attachment of two tie-wraps 1302 to the main body of tag 101 such that attachment of tag 101 to an athlete's sporting equipment is simplified.

In one example of use, tag 101 is attached to an object of interest (e.g. athlete) and programmed to emit ping 402 at a defined rate. As shown in FIG. 5, ping 402 propagates radially outward from tag 101 and includes information (e.g. tag ID 208 and a level of battery 202) specific to tag 101 and, in certain embodiments, may include information about the object it is associated with (e.g. biometric data of the athlete). Although a primary function of tag 101 is to ping, tag 101 may also receive wireless transmissions to allow properties, such as ping rate, to be configured dynamically.

Mounting Tags on Athletes

Figure 15:
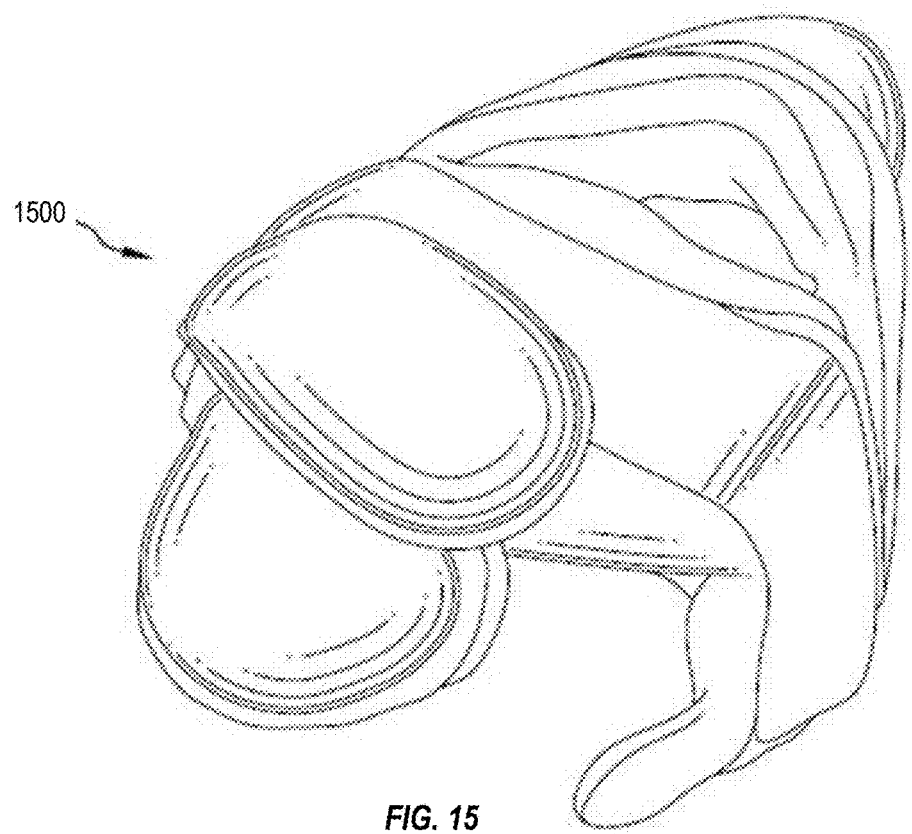
FIG. 15 shows an exemplary shoulder pad.

Tag 101, configured with tie-wraps 1302 as shown in FIGS. 13 and 14, has a high degree of installation flexibility that allows tag 101 to be mounted in any one of a wide range of shoulder pad styles having varying construction techniques. FIG. 15 shows an exemplary shoulder pad 1500 for use by an athlete participating in an American Football game. The primary concerns when mounting tags 101 in shoulders pads include (a) player safety, (b) range of motion, (c) horizontal mounting, and (d) physical protection of the tag. To meet these concerns the following points should be considered:

To protect players from injury (a), tag 101 is preferably mounted within the shoulder pads (e.g., shoulder pad 1500) leaving a layer of padding material between the tag and the player's body.

Tag 101 is preferably mounted within the shoulder pads such that the tag does not hinder a player's range of shoulder motion (b).

Tag 101 is preferably placed such that the transmission plane of the tag is oriented as horizontal as possible (c). If tag 101 is mounted at an angle from horizontal, then signal reception may be compromised as the transmission would be directed toward the ground and/or overshoot receiver 104 positioned around operational area 102.

For protection of tag 101 (d), the tag is preferably mounted within the shoulder pads (i.e., not positioned on top of the shoulder pads). Tag 101 is also preferably mounted such that the tag does not become the point of contact during a collision between two players.

Figure 16:
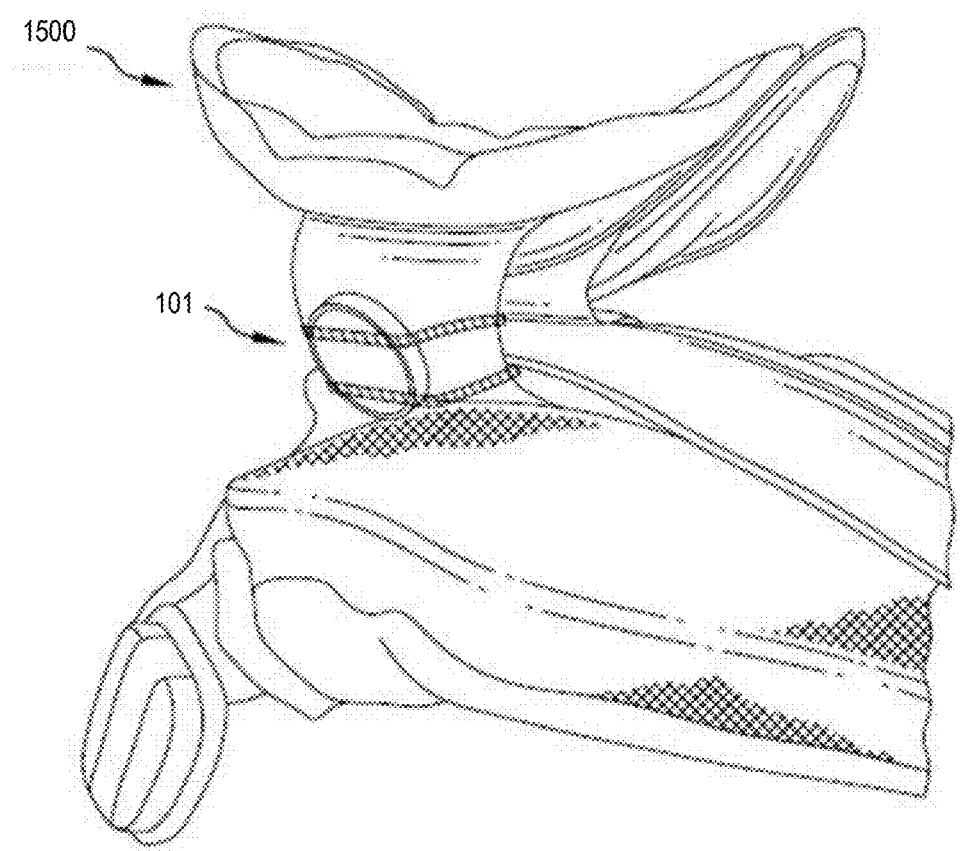
FIG. 16 shows the shoulder pad of FIG. 15 lifted and the tag of FIGS. 1, 2, 13 and 14 attached around a hinging portion such that the tag is protected within the shoulder pads.

FIG. 16 shows shoulder pad 1500 of FIG. 15 lifted, and tag 101 attached around a hinging portion such that tag 101 is protected within the shoulder pad. Virtually all manufactured shoulder pads have a mounting location that meets these requirements to an acceptable level. With the player's safety and range of motion addressed and tag 101 adequately protected, the focus moves to optimizing performance of tag 101.

Figure 17:
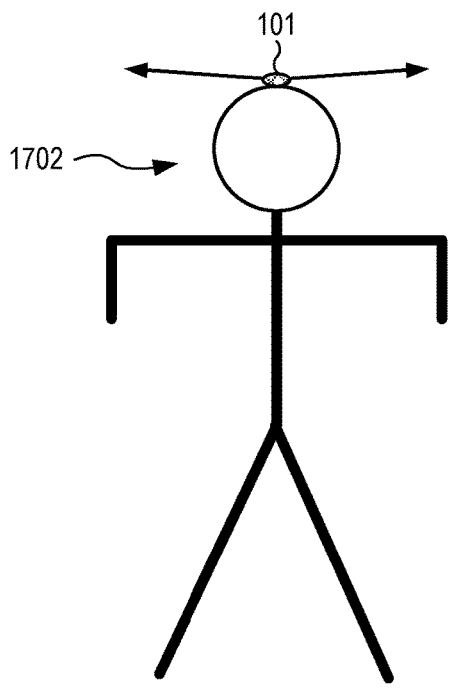
FIG. 17 shows the tag of FIG. 1 positioned within a helmet worn by a player that provides a 360° radial transmission pattern when the tag is absolutely horizontal.
Figure 18:
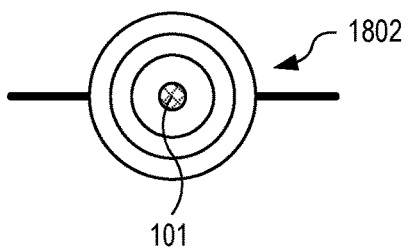
FIG. 18 is a top view of the tag positioned on the head of the player illustrating propagation of a ping from the tag.
Figure 19:
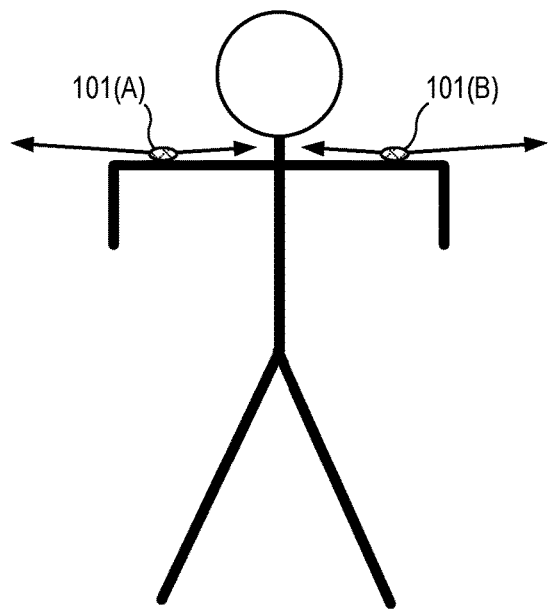
FIG. 19 shows the tag of FIG. 1 positioned on a shoulder of a player, wherein the transmission from the tag is partially obstructed by the player's neck and head.
Figure 20:
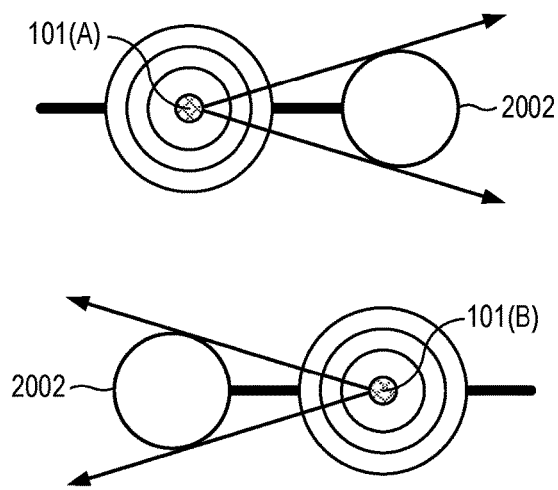
FIG. 20 is a top view of each shoulder of FIG. 19 illustrating exemplary blocking of the emitted ping by the players neck and head.

FIG. 17 shows tag 101 positioned on top of a player's head 1702 (e.g., configured within a helmet worn by the player) to provide a 360° radial transmission pattern 1802, as shown in FIG. 18, when the tag is horizontal. FIG. 19 shows two tags 101, each positioned on a different shoulder of the player. The transmission of pings 402 from each tag 101 is partially obstructed by the player's neck and head 2002. as shown in FIG. 20. To minimize the impact of this line of sight obstruction between tag 101 and receivers 104, tags 101 are placed on the shoulder as far away from the neck and head as possible while meeting the concerns described above. This reduces transmission blocking to the greatest extent possible.

In an American Football game example, assume a player is standing with their shoulders facing an end zone and tag 101 has its line of site to a line of receiver 104 that are 300' away blocked by the players head and neck.

FIG. 21 shows a first scenario 2100 where tag 101 is mounted in the pads along the neck hole and positioned 2" from the players head and neck. Given the proximity of tag 101 to the player's neck and head, a wide angle (e.g., 126°) of transmission is blocked by the athlete's head and neck. At a range of 300', the length (d) of a transmission blockage is approximately 1176 feet, thus eliminating an entire side of operating area 102 and any receivers 104 positioned along that side.

FIG. 22 shows a second scenario 2200 where tag 101 is mounted in the pads (e.g., as shown in FIG. 16) and positioned 7" from the players head and neck. As shown in FIG. 21, this mounting position for tag 101 greatly reduces the portion of the transmission blocked by the neck and head by about 50% to approximately 60°. In this example, at a range of 300', the length (d) of the transmission blockage is reduced to approximately 345 feet, thereby allowing a much greater line of site access for receivers 104 to receive pings 402 from tag 101.

Shoulder Centerline Mounting

Consideration is also given to how an athlete moves while playing their sport. Continuing with the American Football example, a player may be in a bent forward position while lining up for a play to start, and may be bent slightly forward while running during the play. In most football situations, other than walking around between plays, a player has some sort of bend in their hips, with his torso tilted forward. Therefore, to achieve optimum tag transmission the tag is mounted as far back from the centerline of the shoulders as possible while meeting the other concerns of positioning described above. This positions tag 101 substantially horizontal during game play and thereby optimizes propagation of pings 402 from the tag.

Benefits of Mounting Tags on Shoulders

A. Elimination of Single Point of Failure

Mounting two tags 101, each within a different shoulder pad of the same player, has certain advantages over using a single tag mounted in the player's helmet. For example, if a player is fitted with a single tag (e.g., configured in the helmet as shown in FIGS. 17 and 18) fails at any time during game play, positional information of that player would be lost for the remainder of the game. Such information loss for the player over an extended time during game play may misrepresent player participation and within tracking system 100, automatic play start and stop detection malfunctions, and play type detection malfunctions may occur. By placing two tags 101 in both left and right shoulder pads of a single player, redundant player position data is achieved, thus eliminating a single point of failure within tracking system 100. In American Football there are also many occurrences during play where a single tag 101 on one shoulder of a player may have no line of sight to a sufficient number of receivers 104 (a minimum of three receiver events 110 for a single ping 402 is required to determine a location) to calculate positional data. During these occurrences the opposing shoulder tag 101 is likely to still have line of sight to at least three receivers 104 resulting in continued determination of positional data for the tracked player.

B. Centerline Constant

When both left shoulder and right shoulder tags 101 are functioning normally, and have adequate line of site to receivers 104, their positional data may be combined to form a single player object. This single player object combines positional data from both tags to create a center line representation of the player's position. This center line calculated position provides a more accurate representation of the center of a player's position on the playing field.

C. Rotational Information

Figure 23:
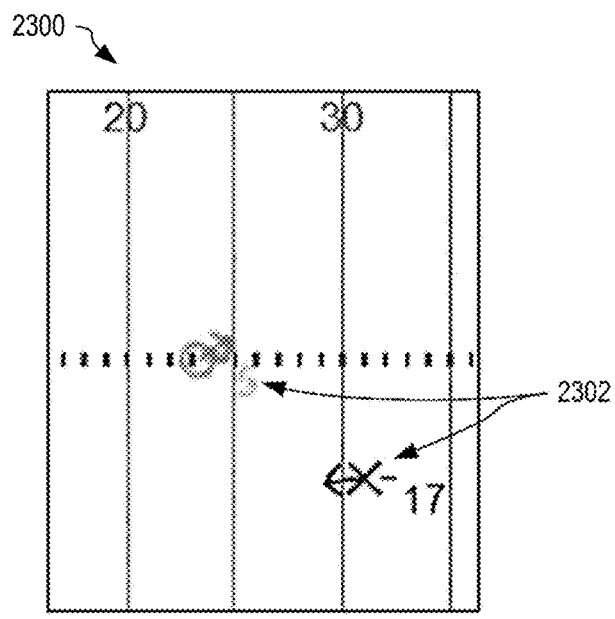
FIGS. 23, 24, and 25 show exemplary displays illustrating player objects that include an arrow to indicate the direction that the player is facing, in an embodiment.
Figure 24:
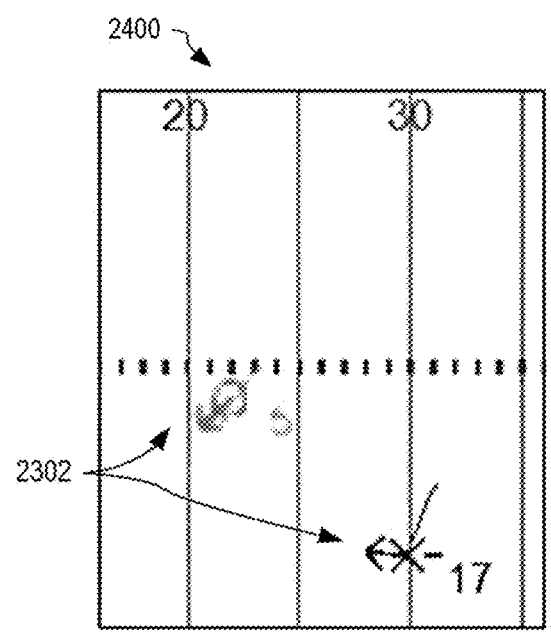
Figure 25:
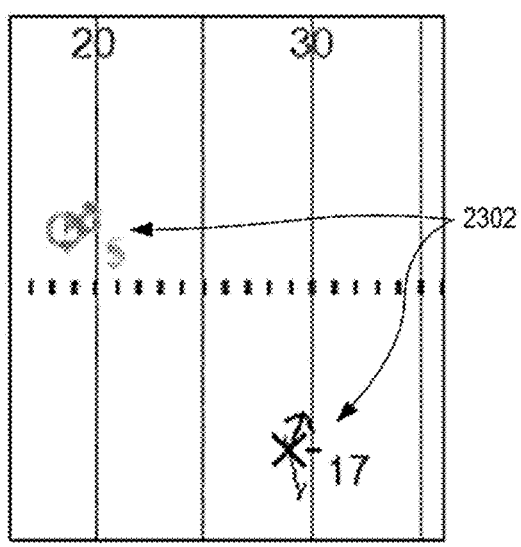

Using the relative positional data from two tags 101 positioned on the left and right shoulders of a player, prior to creating the single player object as described above, allows system 100 to determine a direction (rotation) that the player is facing. FIGS. 23, 24, and 25 show exemplary displays 2300, 2400, and 2500, respectively, illustrating player objects 2302 that include an arrow to indicate the direction that the player is facing. Rotational data is a useful addition to locate data 120, particularly for a coaching application 130. Further, the inclusion of rotational data greatly eases the task of creating avatar representations from game data sets created by recording locate data 120 (e.g., within an application 130) during a game.

AcceloTag

As discussed in further detail below, object tracking system 100 has a bandwidth limit for the number of receiver events 110 (and thereby a number of pings 402) that it may continuously handle. To avoid saturation of system 100, tags 101 may be configured with a ping rate (i.e., a rate at which tag 101 generates pings 402, such as ten pings per second for example) based upon the (a) the bandwidth limit of system 100 and (b) the expected activity of each object (e.g., a player/athlete) to which the tags are configured. Objects that are expected to have greater movement and/or activity are of most interest to application 130, and ultimately viewers thereof, connected to system 100. Thus, tracking tags attached to these objects are typically configured with a higher ping rate such that system 100 determines the location of these objects more frequently. Where the expected activity of the object is accurately predicted, this method of operation works well. However, where the activity of the object does not occur as expected, the allocated ping rates may result in non-optimal tracking by system 100. For example, where a player is expected to have a high level of activity, a high ping rate is allocated to one or more tags 101 attached to that player. When the player does not exhibit the expected activity, bandwidth of the tracking system is wasted. Where another player is not expected to have a high activity level, tags associated with that player are configured with a low ping rate. However, if that player does exhibit a high level of activity, system 100 may not track that player with the accuracy and reliability commensurate with the activity due to the lower ping rate.

Figure 26:
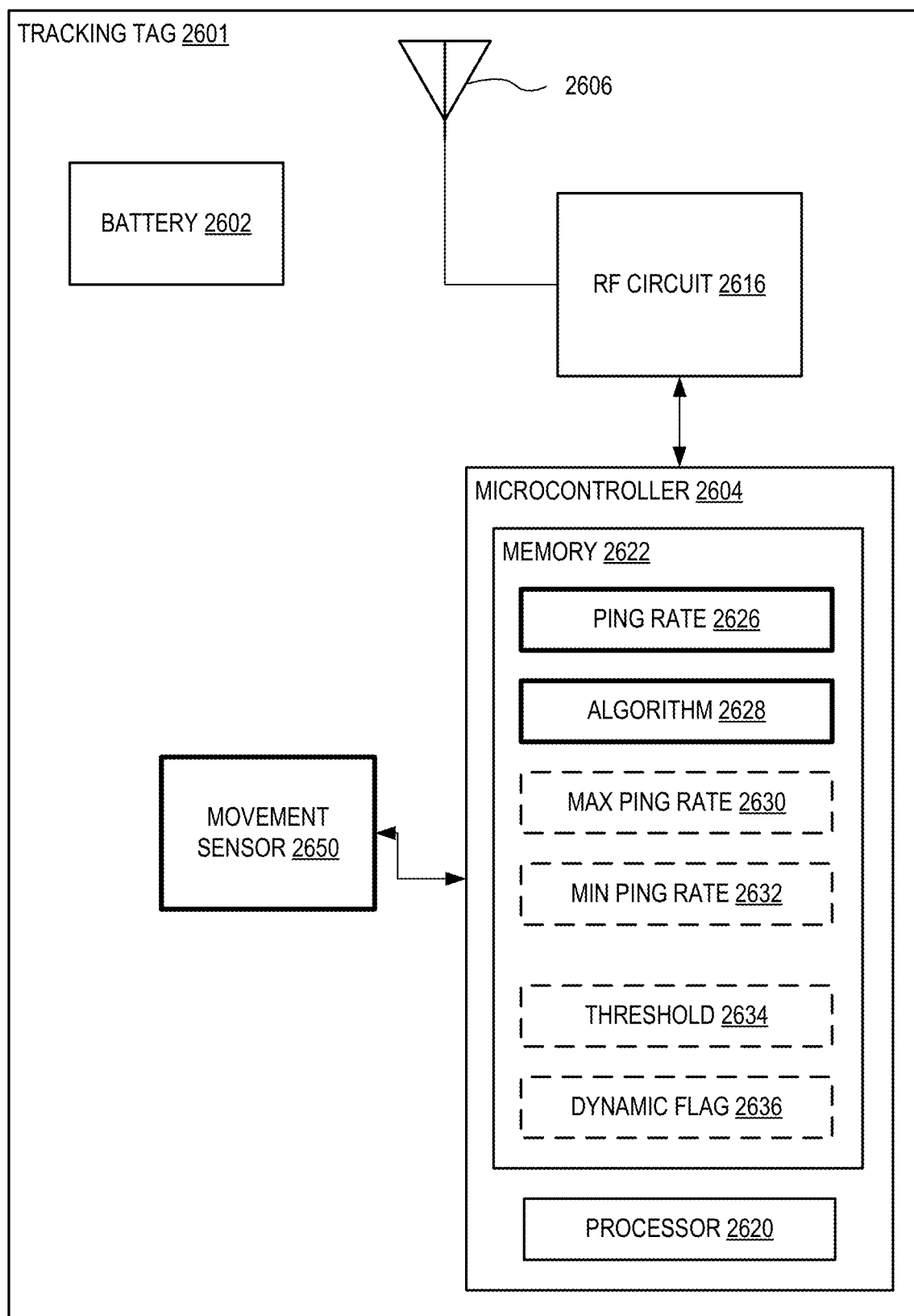
FIG. 26 shows one exemplary tracking tag with a movement sensor for use with the object tracking system of FIG. 1, in an embodiment.

FIG. 26 shows one exemplary tag 2601 that is similar to tag 101 of FIGS. 1, 2 and 8, including a battery 2602, a microcontroller 2604, an antenna 2606, and an RF circuit 2616, but is further configured with a movement sensor 2650. Microcontroller 2604 includes a processor 2620 and memory 2622 shown storing a ping rate 2626 and an algorithm 2628. RF circuit 2616 is for example a transceiver for receiving and transmitting radio signals via antenna 2606. For example, RF circuit 2616, under control of microcontroller 2604, generates pings (e.g., ping 402, FIGS. 4 and 5), based upon ping rate 2626, that are detected by receivers 104 of system 100. Movement sensor 2650 is for example one or more of an accelerometer, a GPS receiver, and so on, that operates to determine movement of tag 2601. In one embodiment, movement sensor 2650 includes three orthogonally orientated accelerometers that cooperate to detect acceleration of tag 2601 in three dimensions.

Algorithm 2628 contains machine readable instructions (i.e., software) that are executed by processor 2620 to detect movement of tag 2601 using movement sensor 2650. Algorithm 2628 thereby detects movement and/or activity of an athlete configured with tag 2601. Algorithm 2628 may utilize acceleration information from movement sensor 2650 to determine activity as a speed of tracking tag 2601 in a horizontal plane. Based upon this determined activity, algorithm 2628 may increase and/or decrease ping rate 2626, thereby adjusting the rate at which pings are transmitted from tracking tag 2601. In one example of operation, when algorithm 2628 detects that tracking tag 2601 is stationary or moving very little, algorithm 2628 reduces the value of ping rate 2626, thereby reducing the rate at which pings are transmitted from tracking tag 2601. In another example of operation, when algorithm 2628 detects that determined activity (e.g., speed) of tracking tag 2601 has increased above a predefined threshold, algorithm 2628 increases the value of ping rate 2626, thereby increasing the rate at which pings are transmitted from tracking tag 2601.

Tracking tag 2601 is optionally configured (e.g., predefined within memory 2622 or automatically set by system 100) with ping rate limits, such as one or both of a maximum ping rate 2630 and a minimum ping rate 2632 that define a maximum and a minimum rate, respectively, that tag 2601 may transmit pings. For example, maximum ping rate 2630 and/or minimum ping rate 2632 may be set by the object tracking system based upon one or more of bandwidth limitations, a number of active tracking tags 2601, and a type of expected activity (e.g., sport and event types). When configured with one or both ping rate limits, algorithm 2628 operates to adjust ping rate 2626 between minimum ping rate 2632 and maximum ping rate 2630. Thus, automatic optimization of object tracking system 100, as described above, may be used in combination with automatic ping rate adjustment of tracking tag 2601.

Use of algorithm 2628 and movement sensor 2650 within tracking tag 2601 increases reliability of system 100 to track objects configured with tag 2601 as compared to tracking of objects configured with tag 101, particularly when objects becomes more active than expected. In an American football example, a lineman is not expected to move very quickly and a ping rate of tags 2601 associated with the lineman is configured with a relatively low ping rate. However, if the lineman unexpectedly receives the ball and runs towards the end zone, ping rate 2626 of tracking tag 2601 is automatically increased by algorithm 2628, based upon activity detected by movement sensor 2650 thereby enabling the tracking system to determine location (i.e., locates) for the lineman at an increased rate commensurate with the actual motion of the lineman.

In one embodiment, algorithm 2628 compares detected motion from movement sensor 2650 to a predefined threshold 2634, wherein algorithm 2628 increases ping rate 2626 when detected motion is greater than predefined threshold 2634 (e.g., until ping rate 2626 reaches maximum ping rate 2630), and wherein algorithm 2628 decreases ping rate 2626 (e.g., until ping rate 2626 reaches a minimum ping rate 2632) when detected motion is less than predefined threshold 2634.

Algorithm 2628 may be configured specifically to the type of activity (e.g., type of sporting event) being tracked. For example, algorithm 2628 may be configured to determine ping rate 2626 using a specific formula and detected motion, where the specific formula calculates ping rate 2626 proportional to the detected motion given the limitations of the type of activity. Examples of formulae that determine and/or change ping rate 2626 relative to sensed motion from movement sensor 2650 may include one or more of a simple linear relationship, a thresholded relationship, a weighted relationship, and a non-linear relationship.

In one example of operation, microcontroller 2604 runs algorithm 2628 to set ping rate 2626 to a default or baseline rate that is predetermined by designers of the system and/or dynamically by system 100. During a tracked event, microcontroller 2604 executes algorithm 2628 to read movement sensor 2650 (e.g., by either sampling analog outputs or reading digital outputs of movement sensor 2650) and to adjust or change ping rate 2626 to control the rate at which pings are transmitted from tracking tag 2601.

Since algorithm 2628 automatically controls ping rate 2626 in real-time based upon actual activity of the object being tracked (as opposed to predicted activity), bandwidth of the tracking system is automatically allocated to tags associated with the active objects. Least active objects automatically have a lower ping rate as compared to more active objects. For example, during a play in an American football game, players that are most involved in manipulating (e.g., throwing, catching and running with) the football, both for offensive and defensive teams, are the ones moving and changing directions at the highest rate. Players that have a brief interaction with the play may stop moving or slow down significantly. Thus, each tracking tag 2601 automatically configures itself such that players with the highest level of motion and change of direction have the highest ping rates and lesser active players have a correspondingly lower ping rate. The tracking system is therefore automatically optimized to track the more active (e.g., faster) players and is less burdened by tracking of slower players; equivocal location calculations are not required for all players. Further, since this technique is automatic and autonomous within each tag, no additional reconfiguration or reconfiguration overhead occurs within receivers or location processors of system 100.

In an alternate embodiment, within each tracking tag 2601, algorithm 2628 determines activity of tracking tag 2601 based upon movement sensor 2650 and sends (e.g., by including a value indicative of the activity and/or acceleration within each ping transmitted from tag 2601) an indication of the activity to the object tracking system. The object tracking system may utilize an algorithm to determine an optimal ping rate for each tracking tag 2601, and then automatically set (e.g., wirelessly) ping rate 2626 of each tracking tag 2601 individually and/or collectively (e.g., in groups). In this embodiment, the object tracking system advantageously learns current activity of all tracking tags 2600 and may determine each individual ping rate based upon activity of all tracking tags and the system bandwidth.

In yet another embodiment, memory 2622 may store a dynamic flag 2636, configured (e.g., set wirelessly) by the object tracking system 100, that determines whether algorithm 2628 automatically, or not, changes ping rate 2626 based upon determined activity. For example, the object tracking system may set dynamic flag 2636 to "false" for tags 2601 associated with players not currently participating on the field of play, wherein ping rate 2626 remains at a low rate even if the player is actively warming up for example. Object tracking system 100 sets dynamic flag 2636 to "true" for players that are actively participating on field of play 103.

Figure 27:
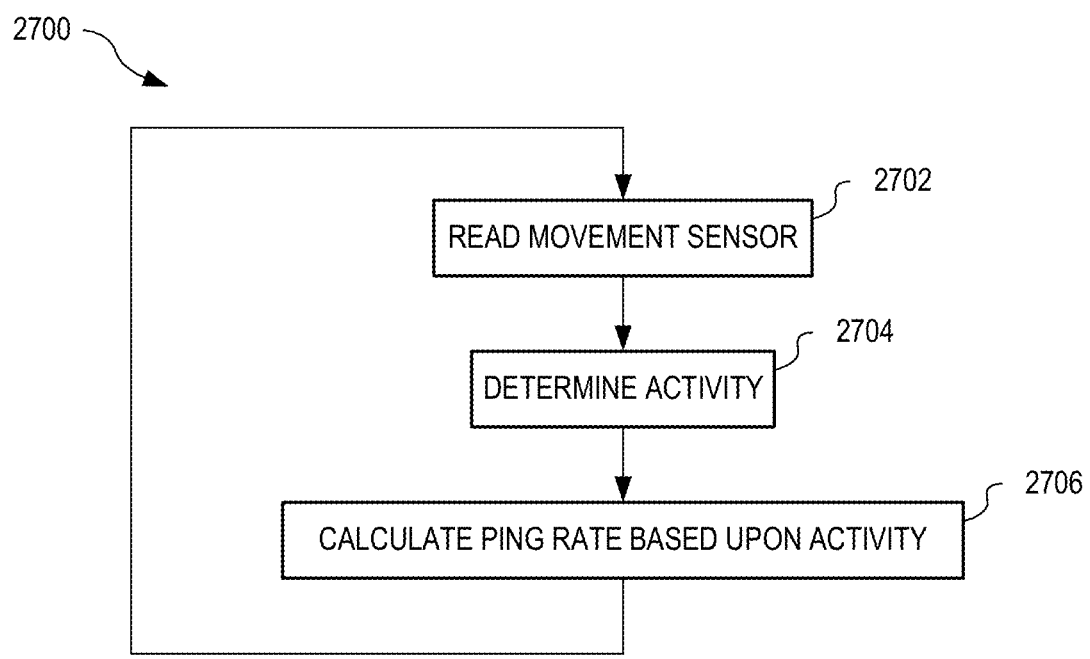
FIG. 27 is a flowchart illustrating one exemplary method for automatically configuring the ping rate within the tracking tag of FIG. 26, in an embodiment.

FIG. 27 is a flowchart illustrating one exemplary method 2700 for automatically configuring ping rate 2626 within tracking tag 2601. Method 2700 is, for example, implemented within algorithm 2628 of tracking tag 2601.

In step 2702, method 2700 reads the movement sensor. In one example of step 2702, under control of algorithm 2628, processor 2620 reads movement sensor 2650. In step 2704, method 2700 determines activity based upon the information read from the movement sensor. In one example of step 2704, algorithm 2628 determines activity based upon information read from movement sensor 2650. In step 2706, method 2700 calculates ping rate based upon the activity determined in step 2704. In one example of step 2706, algorithm 2628 calculates ping rate 2726, based upon, using a linear formula with determined activity, maximum ping rate 2630 and minimum ping rate 2632. Steps 2702 through 2706 repeat to continuously update ping rate 2626 based upon activity determined from movement sensor 2650.

Player Tag Management System

For useful operation of system 100 of FIG. 1, configuration as to which tag(s) 101 is installed on which tracked object (e.g., athlete) is critical. Where multiple tags are installed on a single object, it is also important that system 100 knows the location (e.g. left shoulder vs. right shoulder of the athlete) of each tag on the object. The assignment of specific tags 101 to athletes, and the configuration of those tags, is technically straightforward for an individual tag. However, in the "game day" environment, managing a large number (i.e., hundreds) of tags in a relatively short period before the start of an event is challenging.

Figure 28:
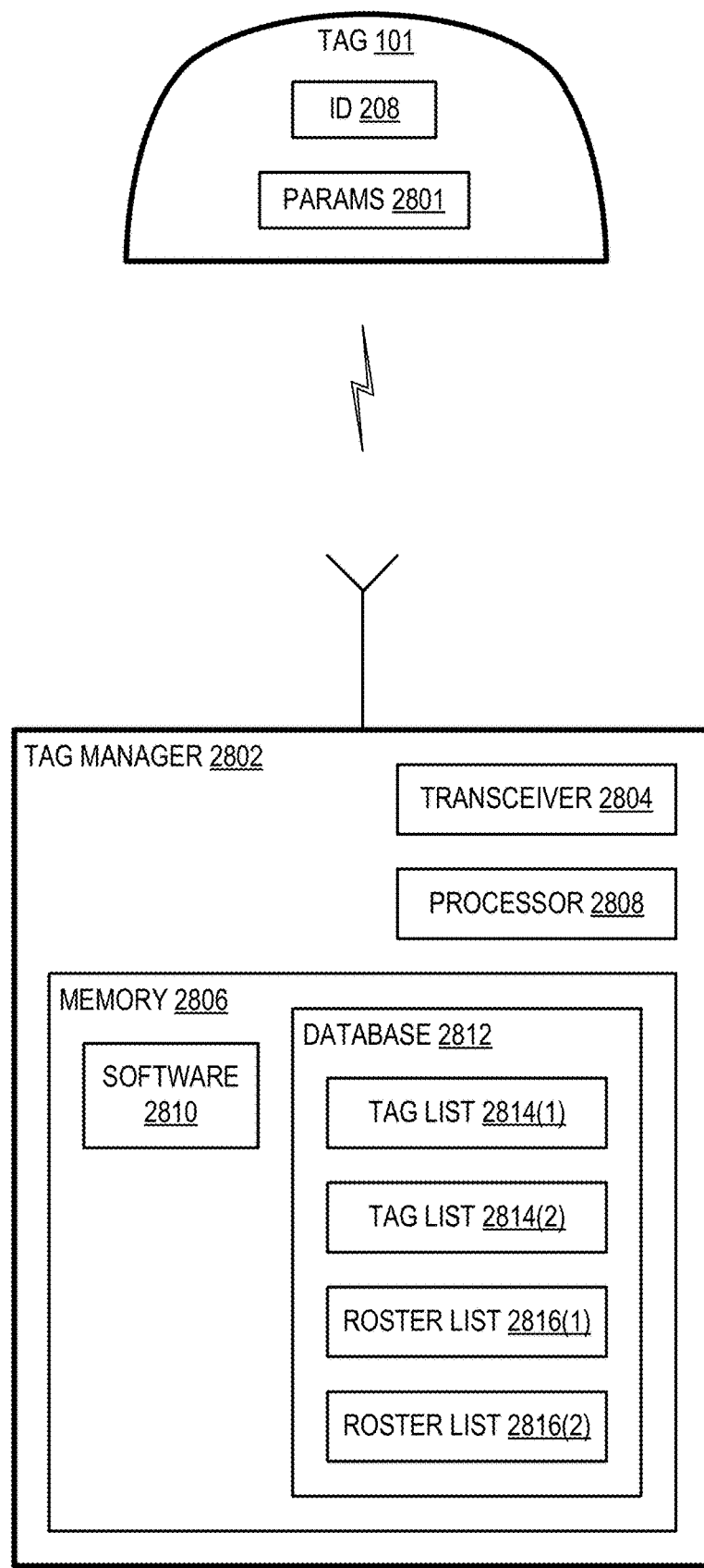
FIG. 28 shows one exemplary tag manager for managing and configuring the tags of FIG. 1.

FIG. 28 shows one exemplary tag manager 2802 for managing and configuring tags 101. Tag manager 2802 is a computer that includes a wireless transceiver 2804 for communicating with tag 101, a memory 2806, and a processor 2808. Tag manager 2802 includes software 2810 that has machine readable instructions stored within memory 2806 and executed by processor 2808 to provide functionality of tag manager 2802 as described below. In one embodiment, tag manager 2802 is a tablet PC and software 2810 is a standard Windows program.

In the following example, two tags 101 are installed in the left and right shoulder pads of an American football player. However, the following procedure process applies to any number of sports where one or more tags are to be installed on each athlete.

As described above, each tag 101 includes unique tag ID 208. Tag 101 also has other one or more parameters 2801 that are configurable. Parameters may control features including: on/off, ping rate, and external I/O interface. Tag manager 2802 is also used to configure multiple tags 101 collectively, such as setting parameters 2801 for tags attached to all athletes in a locker room before and/or after a sporting event. Transceiver 2804 has low sensitivity and wireless range such that communication with tag 101 only occurs when tag is in close proximity to tag manager 2806 thus limiting the possibility of inadvertently programming tags installed in equipment of other players.

A typical sporting event involves hundreds of tags, and without tag manager 2802, alphanumeric tag ID 208 of each tag 101 would need to be manually entered into a tag assignment table together with identification of the athlete to which the tag is associated. Typically, these type of tag ID's are long strings of seemingly random alphanumeric characters (e.g. 8-digit hexadecimal numbers). Entering hundreds of these numbers manually almost inevitably leads to human error. With such a manual method, the first sign of a data entry error is typically when an athlete later walks out on the field and is his tags cannot be read. At that point, it is usually too late to find and correct the error resulting in data for that tag ID which is missing or, even worse, inaccurate for the entire event.

Tag manager 2802 includes tag list 2814 (e.g., a file stored in memory 2806 and/or within a database 2812) that includes a list of tag IDs 208 for a particular collection of tags 101. Tag manager 2802 builds tag list 2814 by automatically reading tag ID 208 from each tag 101 within the collection (e.g., say a bag or a box of tags). Continuing with the American football example, to install two tags in each of 50 pairs of shoulder pads, the first step would be to create two tag lists 2814(1), 2814(2), each having 50 tags, one list for the left shoulders and one for the right shoulders, respectively.

Tag manager 2802 also includes a roster list 2816 (e.g., a file stored within memory 2806 and/or within database 2812) that contains information about each athlete on a single team. For each player, at a minimum, roster list 2816 contains a player number or name and a tag ID 208 for each tag that installed on or associated with the athlete, as well as the position of the tag on the athlete (e.g. left shoulder). Where tag 101 supports configurable parameters 2801 (e.g. ping rate) then those settings would also be stored in roster list 2816.

Tag manager 2802 creates and manages roster list 2816, which is also used by applications 108 of system 100 where each tag ID 208 is associated with a player's name or number.

Roster list 2816 may be created prior to tag installation, thereby reducing the workload of the person installing the tags. For example, the player numbers, names, and desired tag speeds are usually known ahead of time. FIG. 29 shows roster list 2816 being edited within a simple editor provided by software 2810 of tag manager 2802.

Having prepared two bags of tags 101 and their associated tag lists 2814(1) and 2814(2), tags 101 may be physically installed in all the shoulder bags, as described above. During installation, no attention need be paid to the tag ID of individual tags. The process just involves installing any tag from the Left Shoulder bag in all of the left shoulders and any tag from the Right Shoulder bag in the right shoulders.

As each set of pads is completed, or when installation of tags in all pads is complete, tag manager 2802 is used to automatically add the tag IDs 208 to roster list 2816. FIG. 30 is a screen shot 3000 illustrating exemplary addition of tag IDs 208 to roster list 2816. A user of tag manager 2802 clicks in the "TagID" column for a specific set of shoulder pads that have already had their tags installed. The user then aims the transceiver 2804 at that pair of pads and clicks an "Add Tags" button 3002. Upon selection of "Add Tag" button 3002, tag manager 2802 reads all tags within wireless range of transceiver 2804. Software 2810 then verifies that only two tag IDs have been read. If not, software prompts the user to try again. Software 2810 then verifies that one of the read tag IDs is from the left tag list 2814(1) and that the other tag ID is from the right tag list 2814(2). Then software 2810 inserts the read tag IDs into the proper row and column of roster list 2816, as shown in FIG. 31.

In general, tags 101 are installed in the shoulder pads sometime well before the first event in which they are to be used. On the day of an event, all tags 101 are programmed. At a minimum, each tag 101 is activated (i.e., turned on), and optionally other parameters are configured (ping rate, external I/O, etc.). Tag manager 2802 provides a fast and reliable method of configuring all of the tags associated with a single team, even in the hectic environment of a pre-game locker room.

Figure 32:
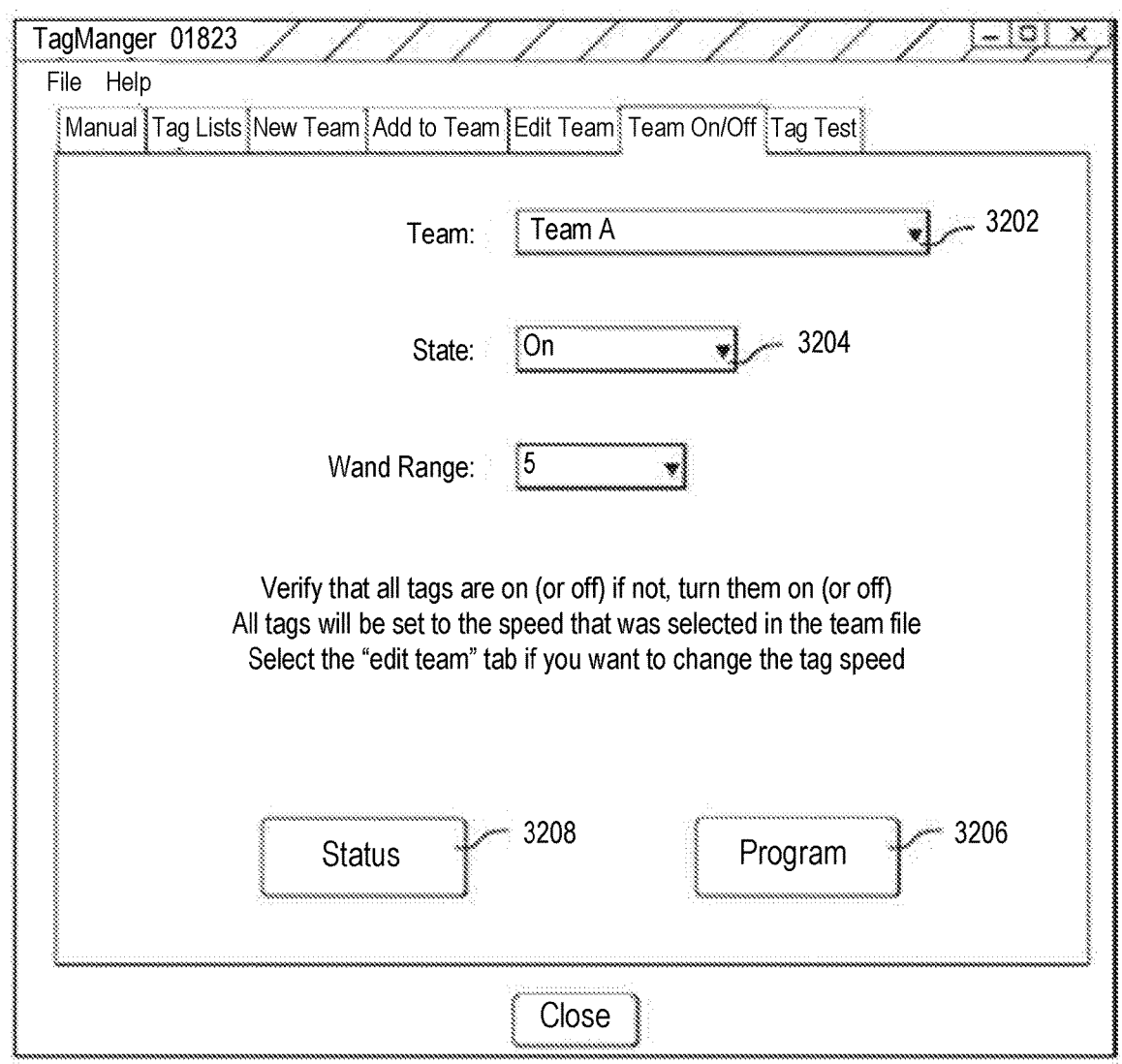
FIG. 32 shows one exemplary control screen of the tag manager of FIG. 28 for configuring all tags used for a specific team.

FIG. 32 shows one exemplary control screen 3200 of tag manager 2802 for configuring all tags 101 used for a specific team. Pull-down list 3202 selects a particular roster list 2816, pull-down list 3204 selects a particular configuration for parameters 2801 (e.g., turn the tags on and configure them, or turn them off), and "Program" button 3206 activates the programming of the tags listed within the selected roster file 2816. Once button 3206 is selected, tag manager 2802 continuously scans for tags 101 within range of transceiver 2804. For each tag 101 with tag ID 208 listed within roster list 2816, tag manager 2802 turns it on and configures it as specified in the roster list.

Figure 33:
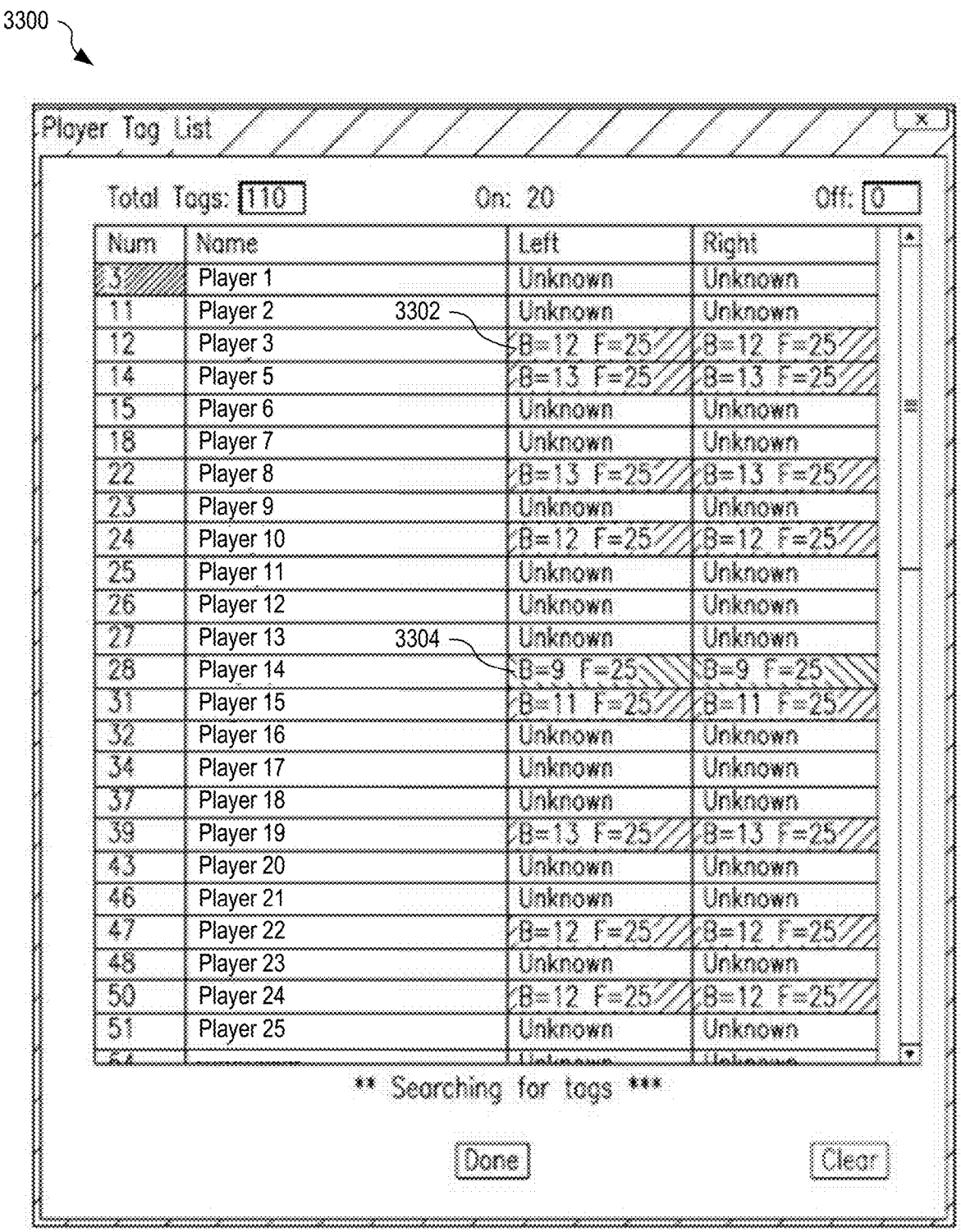
FIG. 33 shows one exemplary status screen that is selected by clicking on the status button of the control screen of FIG. 32.

FIG. 33 shows one exemplary status screen 3300 that is selected by clicking on status button 3208 of control screen 3200. Status screen 3300 shows roster list 2816 where, as each individual tag is detected and programmed, the tag ID is highlighted in green 3302 or yellow 3304 to indicate that it is ready. Yellow 3304 indicates that the battery level of the tag is low. Green 3302 indicates that the battery of the tag is OK. As tag manager 2802 moves around the locker room, more and more tags 101 are automatically programmed and marked as "ready". When the last tag is programmed, tag manager 2802 displays a message saying that the entire roster's tags have been successfully programmed.

If you get to the end of the locker room and some tags have been accidentally missed, it's a very simple matter to scroll through roster list 2816 to identify which tag(s) have not been programmed (i.e., not highlighted in green or yellow). The system will tell you for example that a left shoulder tag of Player #12 (Player 3) has not yet been programmed.

Continuous Accuracy Measurement:

In system 100 of FIG. 1, location accuracy is extremely important and it is absolutely crucial where system 100 is used at high profile sporting events. Where system 100 is operating without interference, locate data 120 defining the location of each tag 101 is regularly reported (many times a second) and is reliably and consistently accurate. However, various anomalous conditions may arise that degrade the accuracy of system 100.

System 100 may include a continuous accuracy monitoring application 130(2) that provides a continuous measure of location accuracy within system 100. Where application 130(2) determines that accuracy of system 100 is affected beyond a pre-set threshold, an operator is immediately notified and may take appropriate corrective action.

System 100 uses the precise physical location (X,Y,Z) of each receiver 104, as well as the location (e.g., X, Y, Z position relative to receivers 104) of one or more test tags 101. The calibration and accuracy of system 100 depends upon knowing these precise locations. The position measurements of all other tags 101 by system 100 are indirectly based on these test tags. Once installed, system 100 is robust and reliable by design, but there are various events and situations that may compromise accuracy of the position measurements for all tags by the system. Distinct from catastrophic system failures, compromised location accuracy may easily go unnoticed for an extended period, resulting in a data set for the event which, at best, is suspect or, at worst, is completely unusable.

Application 130(2) constantly monitors the system's overall accuracy of measurement and immediately alerts an operator of system 100 when measured accuracy is outside a pre-set threshold. When system 100 is installed, some number of test tags are physically mounted at fixed locations within or around operating area 102 (e.g., within the sports facility). In one embodiment, test tags 101 are permanently mounted with a continuous power supply in place of battery 202. System 100 may include two or three test tags 101 on each side of operating area 102, spaced at roughly even intervals. When system 100 is installed, the precise (X, Y, Z) positions of these test tags are measured (e.g., by a laser measurement device) to the same level of exactness as the determined location of receivers 104.

When these test tags are installed there are a set of conditions that must be met for the continuous accuracy monitoring system to work:

Each test tag 101 is triangulated upon using a subset of all receivers 104 of system 100.

Each receiver 104 is involved in the triangulation of at least one test tag 101.

Once system 100 is installed, the position of each test tag 101, as determined by system 100, is recorded. Ideally, the position of each test tag 101 determined by system 100 exactly matches the laser measured position of each test tag 101. In reality, however, there is always a small discrepancy; the accepted error range is +/−6 inches for example. The discrepancy is recorded upon the initial triangulation of each test tag. During the initial installation the only significance to those error measurements is that they should be less than the maximum allowed system error. If not, it indicates a problem with the installation that must be fixed before proceeding.

Once installation is complete, continuous accuracy monitoring application 130(2) continuously reads the reported position of each test tag 101. Each reported position may vary slightly due to noise within system 100. System 100 averages the incoming position measurements for each test tag 101 to reduce the system noise. Application 130(2) then calculates the error using the averaged position measurement and the laser measured position of the test tag 101. System 100 then compares this measured error to the acceptable error (e.g., +/− six inches) for that tag. If the difference between these two errors is greater than the pre-determined threshold, or if the measured error itself is greater than the maximum acceptable error, then application 130(2) generates an alert condition.

The alert condition consists of popping up a message on the operator's PC, logging the condition in a log file and broadcasting the event on the PC's network to all connected system application programs that a system operator would use.

One of the advantages of the design of system 100, particularly as deployed for sporting venues, is that there is a great deal of redundancy built in. Even if many important individual components fail, system 100 continues to work with a reasonable level of smoothly decreased accuracy or throughput. While system 100 is still usable in that case, it is still very important to be aware of the fault. Error conditions that the Continuous Accuracy monitoring application 130(2) may detect include:

Hardware failure of a receiver 104

Hardware failure of a cable to receiver 104

Hardware failure of an Ethernet port to receiver 104

Hardware failure of a test tag 101

Physical blockage of a test tag 101

Physical obstructions between a receiver 104 and the field

Very heavy rain

Application 130(2) may not determine the cause of any problem, only that something is causing a measurable drop in the accuracy of system 100. It is up to the operator to then determine the specific cause of the problem using all the diagnostic tools at their disposal.

Figure 34:
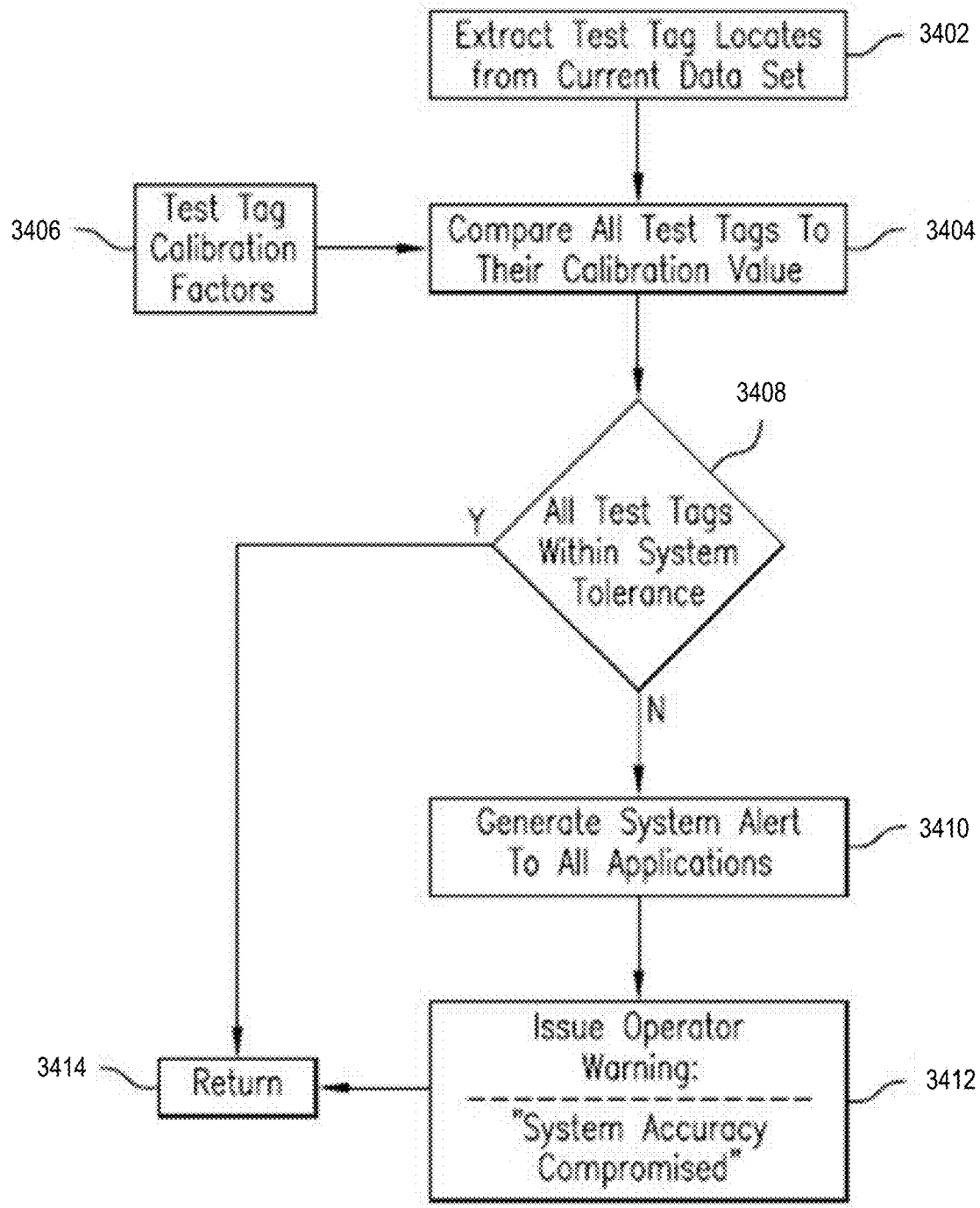
FIG. 34 is a flowchart illustrating one exemplary method for continuous accuracy monitoring, in an embodiment.

FIG. 34 is a flowchart illustrating one exemplary method 3400 for continuous accuracy monitoring, in an embodiment. Method 3400 is for example implemented within continuous accuracy monitoring application 130(2). In an alternate embodiment, method 3400 is implemented within processing hub 150.

In step 3402, method 3400 extracts test tag locates from a current data set. In one example of step 3402, locations of test tags 101 resulting from receiver events 110 of pings 402 emitted by the test tags are extracted from locate data 120. In step 3404, method 3400 compares all test tag locations to their calibration value. In one example of step 3404, determined locations of test tags 101 are compared to test tag calibration factors input in step 3406.

Step 3408 is a decision. If, in step 3408, method 3400 determines that the determined locations of all test tags are within system tolerances, method 3400 continues with step 3414 and terminates until invoked again; otherwise method 3400 continues with step 3410. In step 3410, method 3400 generates a system alert to all applications. In one example of step 3410, processing hub 150 generates and sends an alert to applications 130 to indicate the determined location error. In step 3412, method 3400 issues an operator warning indicating that system accuracy is compromised. In one example of step 3412, processing hub 150 issues an operator warning to one or more operators of system 100.

Method 3400 then terminates. Method 3400 is invoked periodically or continuously to evaluate performance of system 100.

Uses of Continuous Accuracy Monitoring:

When an operator arrives at a sports facility and activates system 100, without any additional equipment, the operator may immediately verify that system 100 is working correctly and that nothing significant has changed since the last time it was used. If a piece of equipment fails suddenly (e.g. a cable is cut) continuous accuracy monitoring application 130(2) will provide an immediate warning that something has gone wrong. In some cases, continuous accuracy monitoring application 130(2) notifies the operator of conditions that cannot or will not be immediately corrected. Continuous accuracy monitoring application 130(2) may also indicate when the condition is causing a slight degradation in the quality of locate data 120 but is still sufficiently accurate to continue use of system 100. In those cases, it is still useful to be notified so that any collected data may automatically or manually be annotated to indicate that the quality is reduced. This may be very helpful when later analyzing collected locate data 120.

Automatic Optimization of the Object Tracking System

Continuing with the example of FIG. 1, optimizer 160 dynamically allocates bandwidth and resources of system 100 in response to athlete behavior, event flow, and changing environmental conditions to automatically maintain optimal performance of object tracking system 100.

Optimizer 160 utilizes a three-tiered approach for automatically, and dynamically, adjusting object tracking system 100 such that the bulk of receiver events 110 are received, and locates are determined, for tags associated with objects having the most value, such as tags attached to active athletes on field of play 103. Optimizer 160 calculates a locate-to-ping ratio of system 100 based upon pings 402 generated by tags 101 and resulting locates within locate data 120. The locate-to-ping ratio is for example a percentage value determined by dividing the number of generated locates by the number of pings 402 expected during a defined period. Optimizer 160 operates to maintain the locate-to-ping ratio at a desired value (e.g., fifty-five percent) such that the bandwidth of system 100 is not saturated. Optimizer 160 may also calculate a locate-to-ping ratio (see locate-to-ping ratio 4340 of FIG. 43) for one or more specific tags 101 and operate to simultaneously increase the locate-to-ping ratio for tags attached to athletes of particular interest, while keeping the system bandwidth of system 100 at a safe margin below saturation.

TABLE 1

Example Parameters

| Parameters | Value | Type |
| --- | --- | --- |
| Target (Locations) | 1320 | Locates/sec |
| Locate-to-ping ratio | 55% | % of Good Pings from total |
| Total Ping Budget | 2400 | Total # of pings to work with |
| Number of Players | 96 | 48 Players per team |
| Players on Field | 22 | 11 Players from each team |
| Number of Linemen on Field | 10 | 5 Linemen on field/team |
| Number of mobile players on field | 8 | 4 mobile players on field/team |
| Number of skill players on field | 4 | 2 skill players on field/team |
| Max Player Speed | 10 | yards/sec |

Ping Rate Allocation

In many sports (e.g. American football) tracked by system 100, a large number of tagged athletes are located within operational area 102, although a far smaller number of these athletes are of specific interest at any given time. Table 1 Example Parameters shows exemplary configuration parameters of system 100 for an American football event where ninety-six tagged players are involved in the event. In this example, the bandwidth of system 100 is limited to handle two-thousand four-hundred pings per second. Assuming that each of the ninety-six player has one tag 101 that is configured to a uniform ping rate, and configured to exploit the available bandwidth of system 100, then the maximum ping rate that each tag may be configured to is twenty-five pings per second (2400/96=25). Considering a Max Athlete Speed of 10 yards/sec and locate-to-ping ratio of 55%, the potential distance traveled by a player between valid locates is 26.2 inches (See Table 2 Uniform Distribution Example).

TABLE 2

Uniform Distribution Example

| Parameters | Value | Type |
| --- | --- | --- |
| Number of Tags | 96 | |
| Ping rate per Tag | 25 | |
| Pings used from total ping budget | 2400 | |
| Located pings/tag/sec | 14 | |
| Time between locates | 0.07 | Seconds |
| Potential distance traveled (yds) | 0.73 | Yards |
| Potential distance traveled (inches) | 26.2 | Inches |
| Remaining ping budget | 0 | |

In the example above, the total ping budget is consumed; however, performance of system 100 in this configuration is not optimal. While it is important to know if players are on the side lines, it is not necessarily important to know precisely where they are on the sideline at any given instant. However, it is very important to know where the players currently playing on the field are as accurately as possible.

Figure 35:
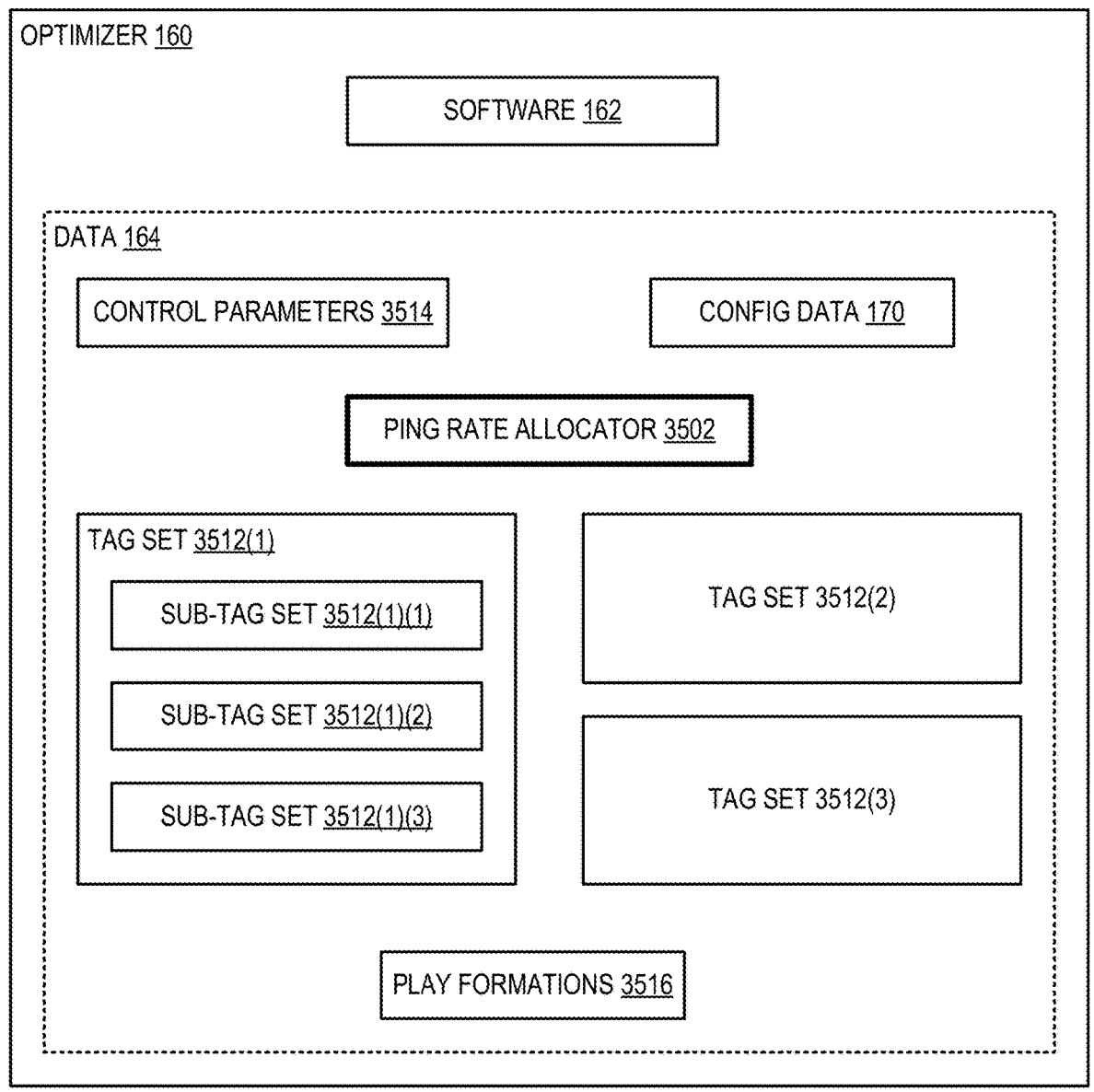
FIG. 35 shows the optimizer of FIG. 1 in further exemplary detail, and illustrating tag set management functionality of the optimizer, in an embodiment.

FIG. 35 shows optimizer 160 of FIG. 1 in further exemplary detail, illustrating tag set management functionality within data 164. Optimizer 160 includes a ping rate allocator 3502 that is implemented within software 162 as machine readable instructions that are loaded and executed within optimizer 160.

Figure 36:
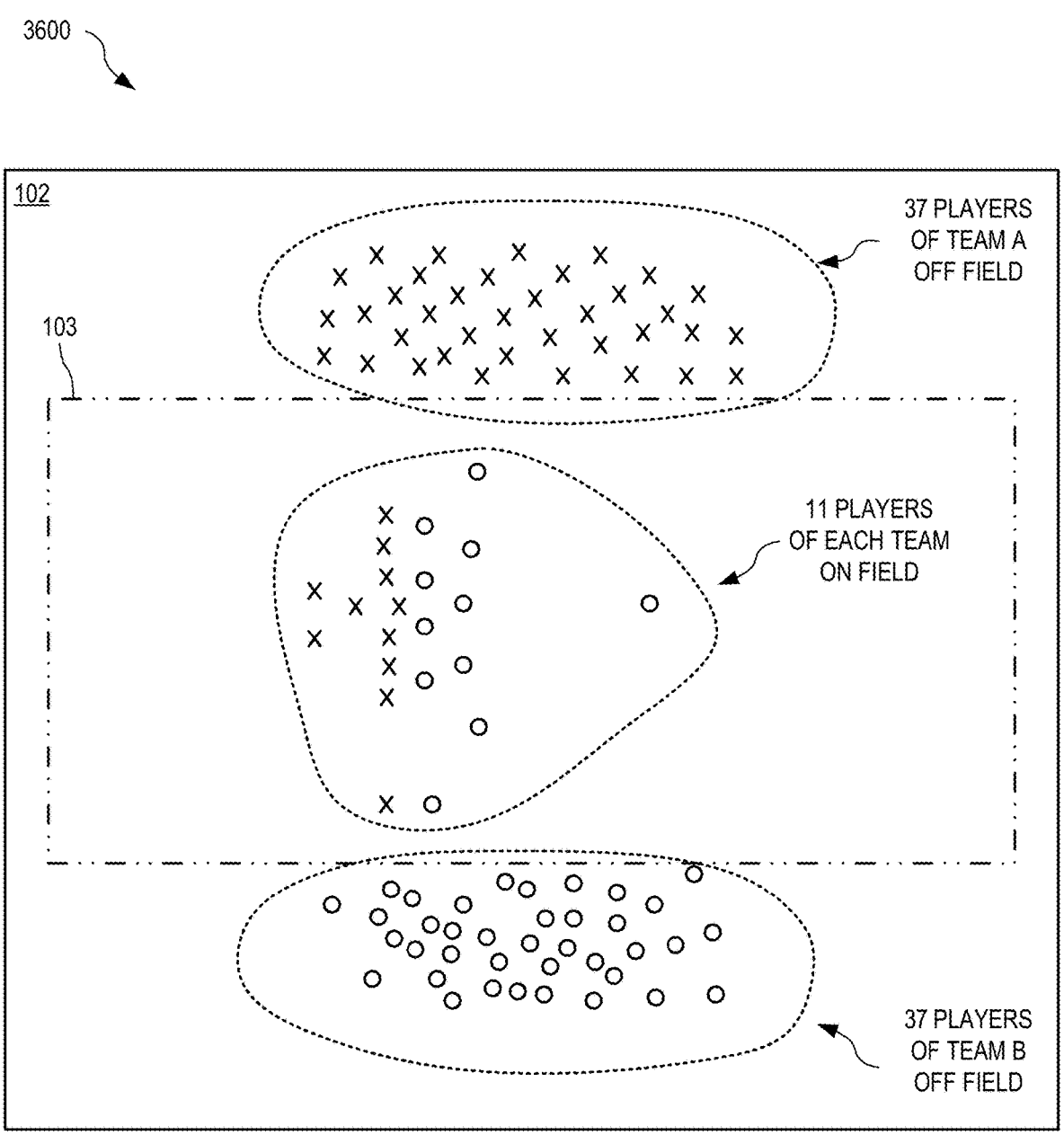
FIG. 36 shows one exemplary scenario where two American football teams (Team A and Team B) are setting up for a next play in an American football game.

FIG. 36 shows one exemplary scenario 3600 where two American football teams (Team A and Team B) are setting up for a next play in an American football game. Each player of each team is equipped with one tag 101 such that system 100 of FIG. 1 may determine and track a location of each player. In scenario 3600, a tracked location of each player of team A is represented by an "X", and a tracked location of each player of team B is represented by an "0". There are ninety-six players in total (forty-eight on each team). Thirty-seven players of team A are on one sideline of field of play 103, thirty-seven players of team B are on the opposite sideline of field of play 103, and eleven players of each team are on field of play 103 preparing to play.

First, ping rate allocator 3502 groups identifiers (e.g., tag ID 208) of tags 101 within tag sets 3512 (including sub-tag sets where used) based upon a reported location of each tag 101 from processing hub 150, knowledge of the perimeter of field of play 103, and optionally the team assignment of each tag 101. Then, ping rate allocator 3502 configures each tag 101, using transmitter 180 for example, with a ping rate based upon which tag set 3512 its identifier is included within. For example, tags 101 identified within tag set 3512(1) are configured with a higher ping rate than tags identified within tag set 3512(2). Ping rate allocator 3502 determines the ping rates for each tag set 3512 based upon control parameters 3514 that include information such as: a ping budget that defines the maximum number of pings per second that system 100 handles, and an off-field ping rate that defines a ping rate for tags 101 of objects not located on field of play 103.

In one example of operation, ping rate allocator 3502 includes tag IDs 208 of tags 101 located on field of play 103 within tag set 3512(1), includes tag IDs 208 of tags 101 associated with players of team A that are not on field of play 103 within tag set 3512(2) and includes tag IDs 208 of tags 101 associated with players of team B that are not on field of play 103 within tag set 3512(3). Ping rate allocator 3502 then determines and assigns a ping rate to each tag 101 based upon knowledge of the ping budget of system 100 and tag set 3512 in which the tag identifier is grouped. In this example, ping rate allocator 3502 sets tags identified within tag set 3512(1) (the higher priority tag set) to operate with a faster ping rate than tags identified within tag sets 3512(2) and tag set 3512(3) (the lower priority tag sets). Ping rate allocator 3502 may operate with more or fewer tag sets 3512 without departing from the scope hereof. For example, more tag sets may be used where different sports are being tracked by system 100. Tags configured with a faster ping rate produce higher location accuracy as compared to tags configured with a slower ping rate.

Figure 37:
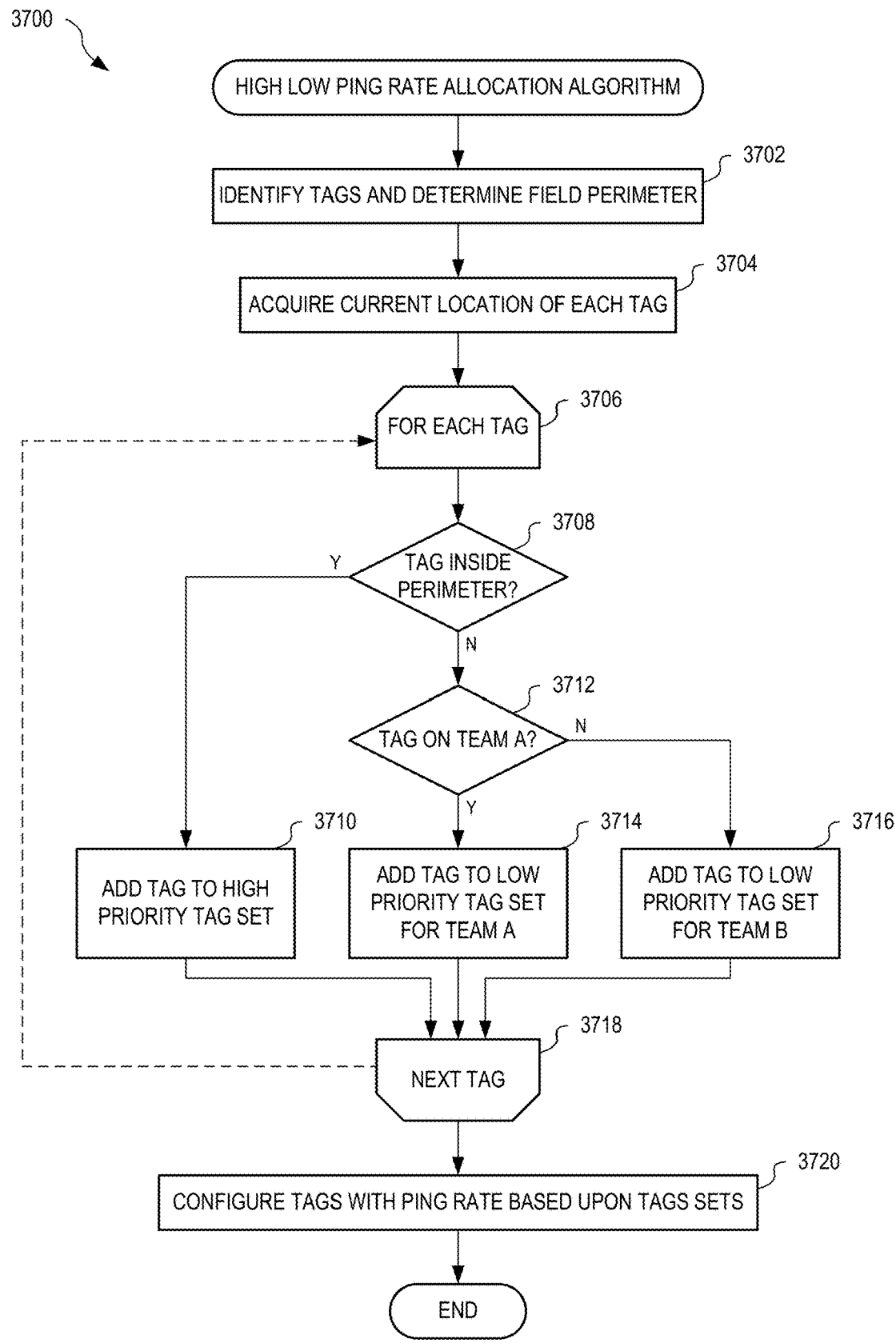
FIG. 37 is a flowchart illustrating one exemplary method for automatic optimization of the object tracking system of FIG. 1 based upon grouping of tags within tag sets, in an embodiment.

FIG. 37 is a flowchart illustrating one exemplary method 3700 for automatic optimization of object tracking system 100 of FIG. 1, based upon grouping of tags 101 within tag sets 3512. Method 3700 is for example implemented within ping rate allocator 3502 of FIG. 35. In step 3702, method 3700 identifies tags and determines the field perimeter. In one example of step 3702, ping rate allocator 3502 identifies tags 101 active within system 100 and determines, from measured and/or predefined parameters 3514 stored within optimizer 160, details of a perimeter of field of play 103. In step 3704, method 3700 acquires current location of each tag. In one example of step 3704, ping rate allocator 3502 receives locate data 120 from processing hub 150. Steps 3706 through 3718 form a loop that is iterated for each tag identified in step 3702.

Step 3708 is a decision. If, in step 3708, method 3700 determines that the determined location of the current tag is within the determined perimeter, method 3700 continues with step 3710; otherwise method 3700 continues with step 3712. In step 3710, method 3700 assigns the current tag to a high priority tag set. In one example of step 3710, ping rate allocator 3502 adds tag ID 208 of tag 101 to tag set 3512(1). Method 3700 continues with step 3718.

Step 3712 is a decision. If, in step 3712, method 3700 determines that the current tag is on a player of team A, method 3700 continues with step 3714; otherwise method 3700 continues with step 3716. In one example of step 3712, ping rate allocator 3502 utilizes tag ID 208 of the current tag 101 to lookup associated information, within a database defining tag assignments for example, defining the player that the current tag 101 is assigned to. In step 3714, method 3700 adds the current tag to a low priority tag set for team A. In one example of step 3714, ping rate allocator 3502 adds tag ID 208 of current tag 101 to tag set 3512(2). Method 3700 continues with step 3718. In step 3716, method 3700 assigns the current tag to a low priority tag set for team B. In one example of step 3716, ping rate allocator 3502 adds tag ID 208 of current tag 101 to tag set 3512(3).

In step 3718, method 3700 returns to step 3706 to repeat steps 3708 through 3718 for subsequently selected tags. Once all tags are processed, method 3700 continues with step 3720. In step 3720, method 3700 configures each tag based upon the assigned tag set. In one example of step 3720, optimizer 160 generates configuration data 170 with (a) a ping rate of one-hundred pings per second for each tag 101 having its tag ID 208 within tag set 3512(1) and (b) a ping rate of one ping per second for each tag having its tag ID 208 within either tag set 3512(2) or tag set 3512(3). In another embodiment, a ping rate for each tag set is determined based upon the number of tag IDs in each tag set and the SBWT. In yet another embodiment, configuring of each tag occurs independently within one of steps 3510, 3514, and 3516 within the loop of steps 3506-3518.

Figure 38:
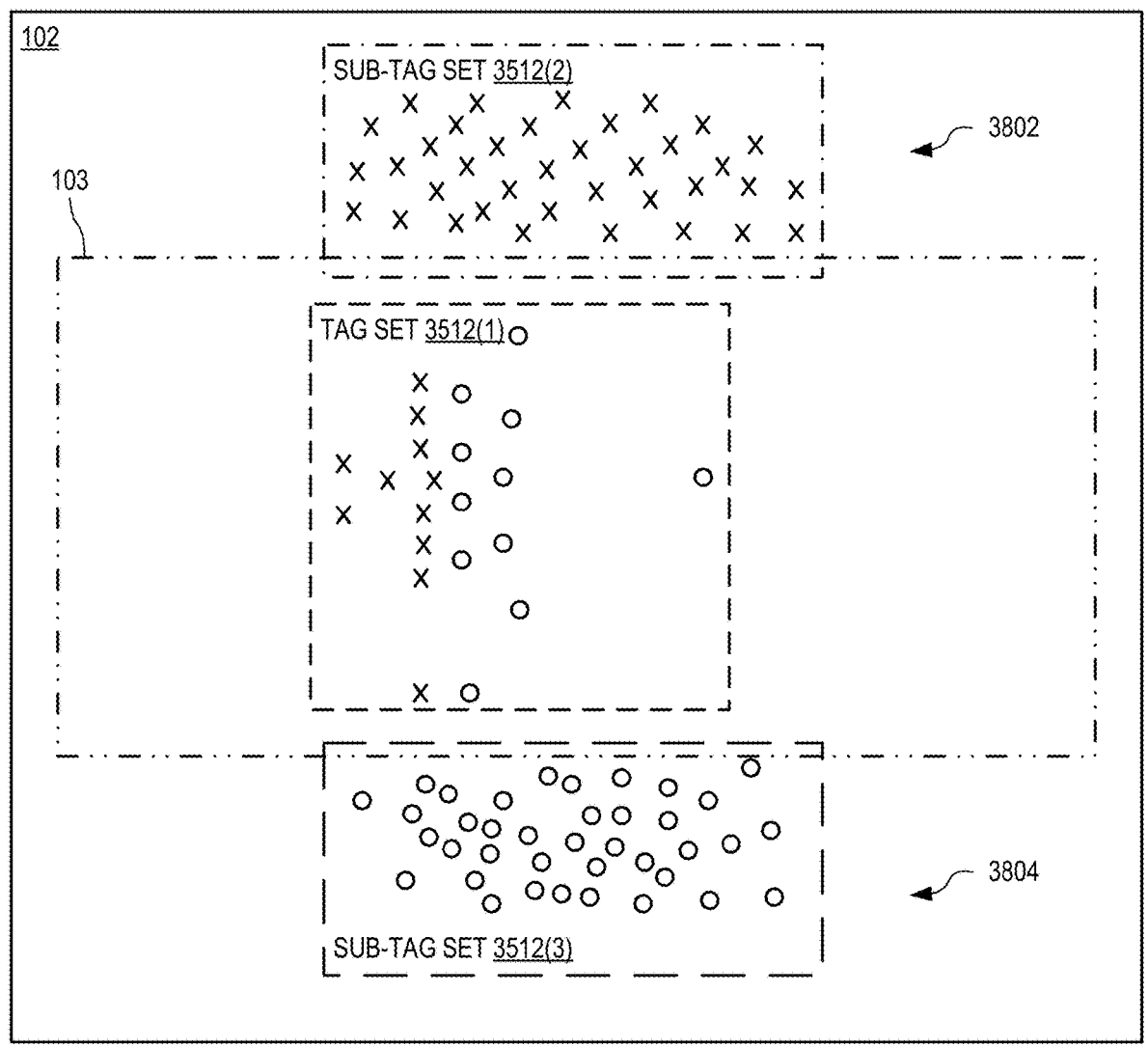
FIG. 38 shows an exemplary visual representation of tags grouped according to determined location within the operational area of FIG. 1 and perimeter of the field of play.

FIG. 38 shows an exemplary visual representation 3800 of tags 101 grouped according to determined location within operational area 102 and perimeter of field of play 103, where tags within the perimeter of field of play 103 are shown within tag set 3512(1), tags 101 of team A that are located on first sideline 3802 are shown within tag set 3512(2), and tags 101 of team B that are located on second sideline 3804 are shown within tag set 3512(3).

Using assumptions defined within Table 1 Example Parameters, ping rate allocator 3502 determines a different ping rate for tags 101 identified within each tag set 3512 based upon the ping budget of system 100, the number of priority tag sets 3512, and the number of tags 101 identified within each priority tag set 3512. In the example of Table 3 High/Low Prioritization Example, ping rate allocator 3502 sets the ping rate of tags 101 identified within tag set 3512(1) to 100 Hz, and the ping rate of tags 101 identified within tag sets 3512(2) and 3512(3) to 1 Hz. With a ping rate increased from twenty-five to one-hundred pings per second for tags 101 identified within tag set 3512(1), the potential distance traveled between valid Locates for those tags is reduced from 26.2 inches (determined by the "Uniform Distribution Example" above) to 6.5 inches.

TABLE 3

High/Low Prioritization Example

| Parameters | Value | Type |
| --- | --- | --- |
| Low Priority Players (tag set 3512(2)) | 74 | On the side lines |
| Ping rate for Low priority | 1 | Pings per second |
| Pings used from total ping budget | 74 | |
| Remaining ping budget | 2326 | |
| High Priority Players (tag set 3512(1)) | 22 | On the field of play |
| Ping setting/high priority player | 100 | Pings/Player/Sec |
| Pings used from total ping budget | 2200 | |
| Valid pings/player on field/sec | 55 | Valid Locates/Sec |
| Time between locates | 0.0182 | Seconds |
| Potential distance traveled (yds) | 0.18 | Yards |
| Potential distance traveled (inches) | 6.5 | Inches |
| Remaining ping budget | 126 | |

Continuing with the American football example, of the twenty-two players on field of play 103, expected activity of each these players is based upon their designated playing position. Ping Rate Allocator 3502 thereby further divides the twenty-two tags identified within tag set 3512(1) into three sub-tag sets 3512(1)(1), 3512(1)(2), and 3512(1)(3).

FIG. 39 shows exemplary sub-grouping of identifiers of tags 101 within tag set 3512(1) (shown as positioned on field of play 103) into sub-tag sets 3512(1)(1), 3512(1)(2), and 3512(1)(3). Although three sub-tag sets are used in this example, ping rate allocator 3502 may use more of fewer sub-tag sets without departing from the scope hereof. Each sub-tag set is assigned a priority level based upon the expected activity level of the associated player and/or a priority of that player.

Table 4 High/Low & Position Prioritization Example shows exemplary sub-grouping of players based upon position and player priority.

TABLE 4

High/Low & Position Prioritization Example

| Parameters | Value | Type |
|---|---|---|
| Sideline Players (Tag Sets 2 & 3) | 74 | On the side lines |
| Ping rate for Low priority | 1 | Pings per second |
| Pings used from total ping budget | 74 | |
| Remaining ping budget | 2326 | |
| Linemen on Field (Tag Set 1.3) | 10 | 5 Linemen per team on field |
| Ping rate for linemen | 30 | 30 pings/lineman |
| Pings used from budget for linemen | 300 | |
| Valid pings/player on field/sec | 16.5 | Valid Locates/Sec |
| Time between locates | 0.0606 | Seconds |
| Potential distance traveled (yds) | 0.61 | Yards |
| Potential distance traveled (inches) | 21.8 | Inches |
| Remaining Ping budget | 2026 | total - sideline - linemen |
| Mobile Players on field (Tag Set 1.2) | 8 | Mobile players on field |
| Ping setting/mobile player on field | 100 | Pings/Player/Sec |
| Pings used from budget for linemen | 800 | |
| Valid pings/player on field/sec | 55 | Valid Locates/Sec |
| Time between locates | 0.0182 | Seconds |
| Potential distance traveled (yds) | 0.18 | Yards |
| Potential distance traveled (inches) | 6.5 | Inches |
| Remaining Ping budget | 1226 | total - sideline - linemen-mobile |
| Skill Players on field (Tag Set 1.1) | 4 | Skill players on field |
| Ping setting/mobile player on field | 300 | Pings/Player/Sec |
| Pings used from budget for linemen | 1200 | |
| Valid pings/player on field/sec | 165 | Valid Locates/Sec |
| Time between locates | 0.0061 | Seconds |
| Potential distance traveled (yds) | 0.06 | Yards |
| Potential distance traveled (inches) | 2.2 | Inches |
| Remaining Ping budget | 26 | |

Continuing with the example of American football, linemen do not typically move very quickly, or travel a great distance, during any particular play of the game. Therefore, identifiers of tags 101 assigned to linemen (defined within the tag database during tag allocation/assignment for example) are grouped within a lowest priority sub-tag set 3512(1)(3). In this example there are ten linemen on field of play 103 (five on each team). Ping rate allocator 3502 thereby configures tags 101 identified within sub-tag set 3512(1)(3) with a ping rate of 30 pings/sec, which results in a potential distance traveled between valid locates of 21.8 inches.

Mobile Players, which includes linebackers and running backs for example, move more quickly than linemen and travel greater distances than the linemen in a play. In this example, tag IDs 208 of tags 101 assigned to eight mobile players on field of play 103 (four on each team) are grouped within a middle priority sub-tag set 3512(1)(2). Ping rate allocator 3502 configures tags 101 identified within sub-tag set 3512(1)(2) with a ping rate of 100 pings/sec, resulting in a potential distance traveled between valid Locates of 6.5 inches.

Skill Players, which may include receivers and defensive backs, are most likely the fastest moving players that cover the greatest distances in a play. In this example there are four skill players (two on each team). Tag IDs 208 of tags 101 assigned to these skill players are therefore grouped within the highest priority sub-tag set 3512(1)(1). Ping rate allocator 3502 configures tags 101 identified within sub-tag set 3512(1)(1) with a highest ping rate of 300 pings/sec resulting in a potential distance traveled between valid locates of 2.2 inches.

Figure 40:
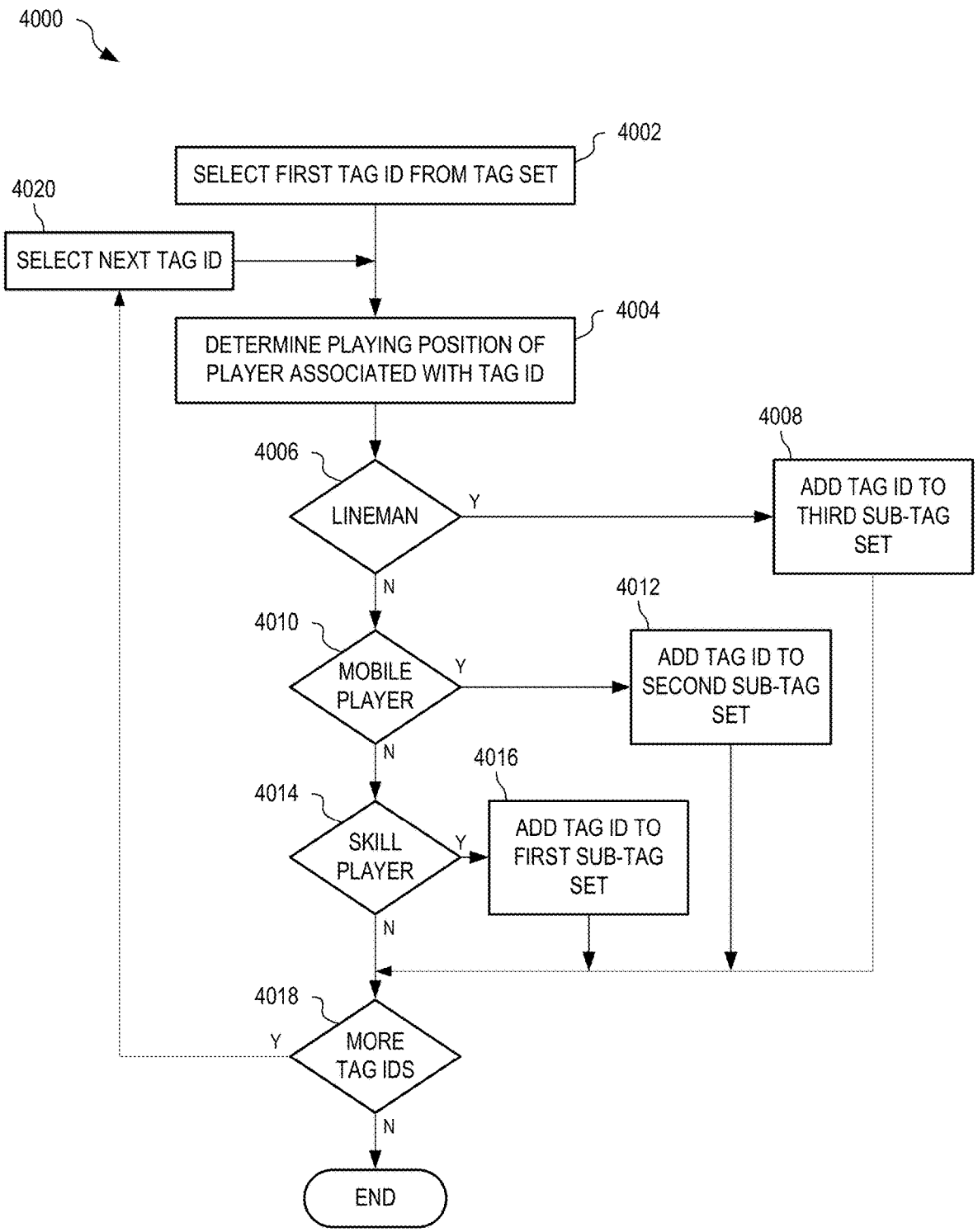
FIG. 40 is a flowchart illustrating one exemplary method for sub-grouping of tag IDs within a high priority tag set into first, second, and third sub-tag sets.

FIG. 40 is a flowchart illustrating one exemplary method 4000 for sub-grouping of tag IDs 208 within a high priority tag set (e.g., tag set 3512(1)) into first, second, and third sub-tag sets (e.g., sub-tag sets 3512(1)(1), 3512(1)(2), and 3512(1)(3)). Method 4000 is for example implemented within ping rate allocator 3502 of FIG. 35. Although three sub-tag sets are used in these examples, method 4000 may be modified to use more of fewer sub-tag sets without departing from the scope hereof.

In step 4002, method 4000 selects a first tag ID from the tag set. In one example of step 4002, ping rate allocator 3502 selects a first tag ID 208 from tag set 3512(1). In step 4004, method 4000 determines the playing position of the player associated with the tag ID. In one example of step 4004, ping rate allocator 3502 accesses looks up associated information of current tag ID 208 within a database defining tag assignments for example, to determine the position of a player associated with the tag ID.

Step 4006 is a decision. If, in step 4006, method 4000 determines that the player associated with the current tag ID is a lineman, method 4000 continues with step 4008; otherwise method 4000 continues with step 4010. In step 4008, method 4000 adds the current tag ID to the third sub-tag set. In one example of step 4008, current tag ID 208 is added to sub-tag set 3512(1)(3). Method 4000 then continues with step 4018.

Step 4010 is a decision. If, in step 4010, method 4000 determines that the player associated with the current tag ID is a mobile player, method 4000 continues with step 4012; otherwise method 4000 continues with step 4014. In step 4012, method 4000 adds the current tag ID to the second sub-tag set. In one example of step 4012, current tag ID 208 is added to sub-tag set 3512(1)(2). Method 4000 then continues with step 4018.

Step 4014 is a decision. If, in step 4014, method 4000 determines that the player associated with the current tag ID is a skill player, method 4000 continues with step 4016; otherwise method 4000 continues with step 4018. In step 4016, method 4000 adds the current tag ID to the first sub-tag set. In one example of step 4016, current tag ID 208 is added to sub-tag set 3512(1)(1). Method 4000 then continues with step 4018.

Step 4018 is a decision. If, in step 4018, method 4000 determines that there are more tag IDs to process, method 4000 continues with step 4020; otherwise method 4000 terminates. In step 4020, method 4000 selects the next tag ID within the tag set. In one example of step 4020, ping rate allocator 3502 selects a next tag ID 208 from tag set 3512(1). Method 4000 then continues with step 4004.

Steps 4002 through 4020 repeat to process all tag IDs within the tag set, and to add each tag ID to one of the first, second and third sub-tag sets.

Play Type

In addition to player positions, ping rate allocator 3502 may also consider what type of play is about to be executed on the field when configuring the ping rates of tags 101. Most sports, including American football, have a defined number of formations or situations. In American football, a team may line up in one of: a "short yardage" formation, a "kick off" formation, a "running" formation, and a "passing" formation, and so on. These formations are well known in the sport, together with expected player motion resulting from each specific formation. Ping rate allocator 3502 compares relative locations of tags 101 on field of play 103 against the relative positions of players within play formations 3516 to determine a type of play that is likely to occur next. Play formations 3516 is for example a database of predetermined formations that result in a predictive play. By matching the location of tags 101 of one or both teams on the field of play to formations within play formations 3516, ping rate allocator 3502 determines likely motion of each player and configures the tag 101 of these players accordingly.

Figure 41:
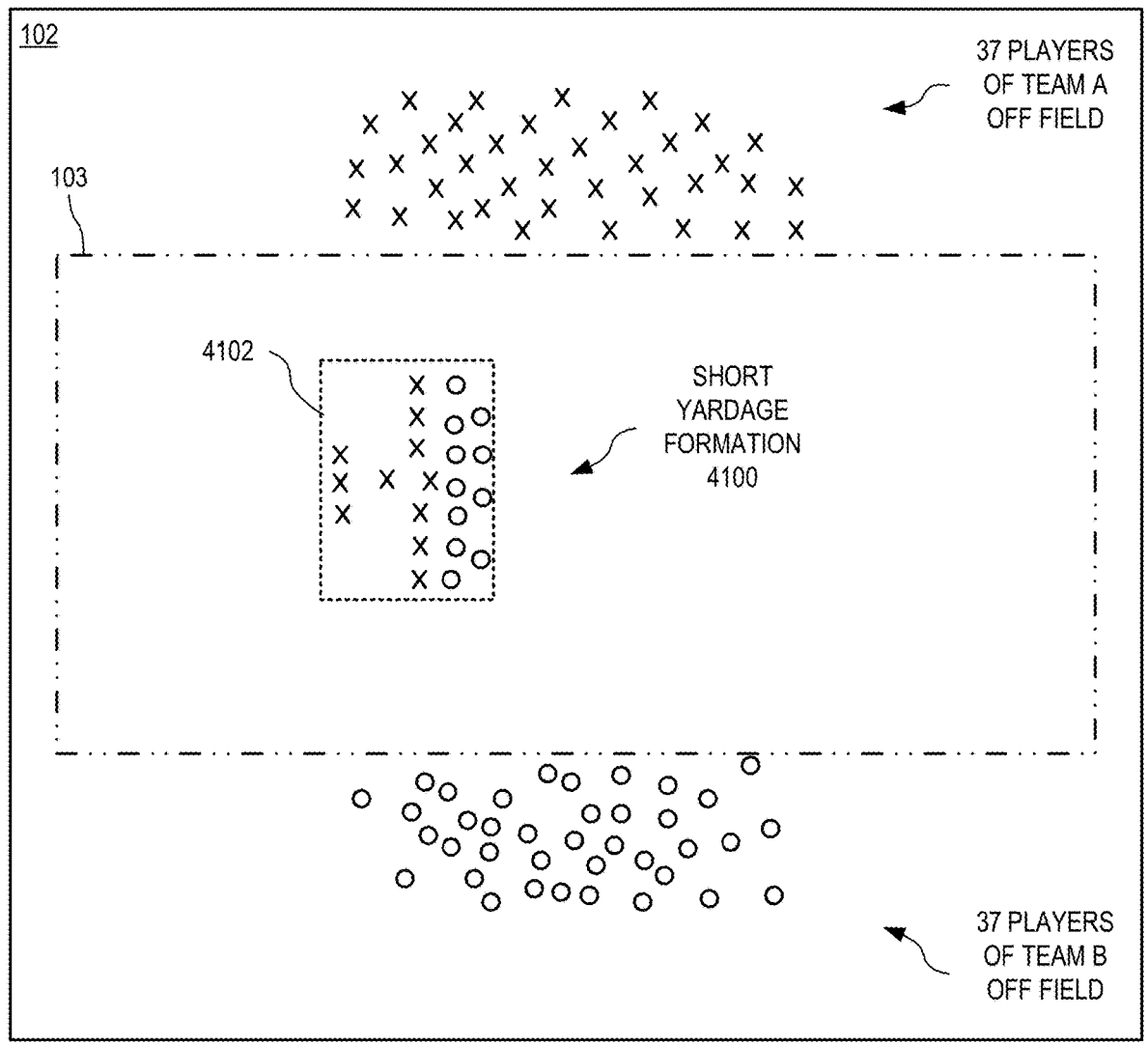
FIG. 41 shows one exemplary short yardage formation in an American football game.

FIG. 41 shows one exemplary short yardage formation 4100 in an American football game. Short yardage formation 4100 is typically used when the offensive team needs a very small amount of yardage on the upcoming play. The teams typically line up in a tight formation, where all players are bounded by a bounding rectangle 4102 of a first size. Short yardage formation 4100 almost invariably results in low speed motion and very limited distances traveled by all players on field of play 103. Therefore, ping rate allocator 3502, upon matching short yardage formation 4100 within play formations 3516, uses high low ping rate algorithm shown in method 3700 of FIG. 37 (and detailed within Table 3 High/Low Prioritization Example and FIG. 38) to assign ping rates to each tag 101.

Figure 42:
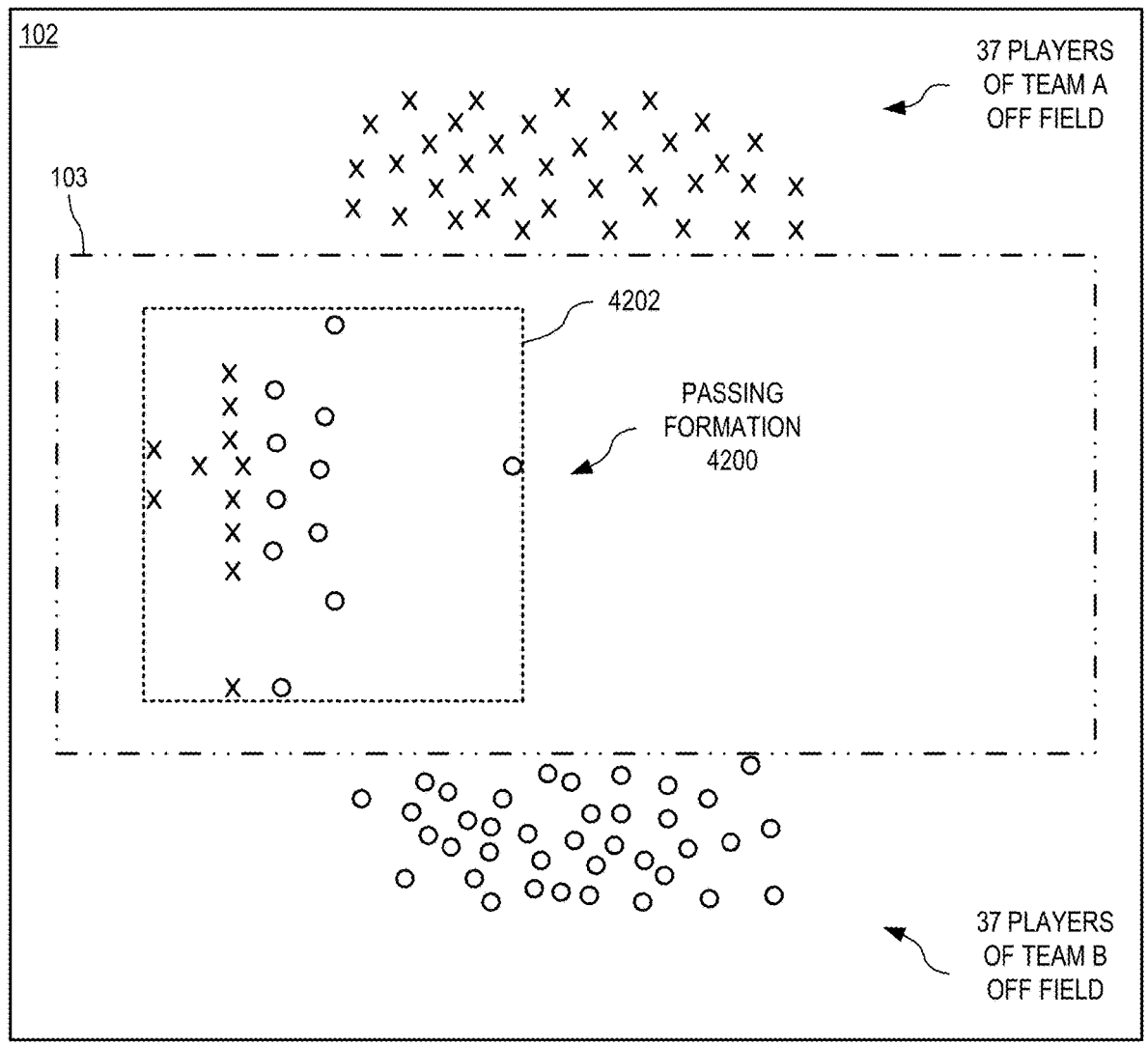
FIG. 42 shows one exemplary passing formation in an American football game.

FIG. 42 shows one exemplary passing formation 4200 in an American football game. Passing formation 4200 is very commonly used during a game when a team is hoping to make a passing play to advance the ball further up the field as compared to a short yardage play. As shown, players in passing formation 4200 are more spread out, having a bounding rectangle 4202 of a second size that is significantly larger than the first size of bounding rectangle 4102 of short yardage formation 4100. In particular, within passing formation 4200, skill players are positioned wide from the linemen. Passing formation 4200 has a much higher likelihood of differentiation in the speed, and distances traveled, by athletes based on their position, as compared to athlete movement with short yardage formation 4100. Therefore, ping rate allocator 3502 uses the more complex High/Low and Position prioritization as shown in FIG. 39, and detailed in Table 4 High/Low & Position Prioritization Example.

In the examples of FIGS. 41 and 42, the bounding rectangle is used to determine the type of play likely to occur. In an alternate embodiment, the relationship between the determined positions of the players is used to determine the expected type of play. In another embodiment, one or more ping rates of tags 101 associated with certain players (e.g., the quarterback in American Football) are given fixed ping rates such that accuracy of location of these players is maintained.

Receiver Event Allocation

Once receivers 104 are physically mounted, angled and aimed, the primary receiver property to adjust, within programmable gain stage 604, FIG. 6, is gain. Programmable gain stage 604 determines receiver sensitivity and how well it detects pings 402. When set to a maximum gain (highest sensitivity), the receiver detects the highest number of pings 402 and thus the average number of receiver events per ping increases. Similarly, when set to a minimum gain (lowest sensitivity), the receiver detects the lowest number of pings 402 and thus the average number of receiver events per ping decreases. System bandwidth of object tracking system 100, FIG. 1, is defined as the total number of receiver events 110 that system 100 processes without becoming saturated and overloaded.

Figure 43:
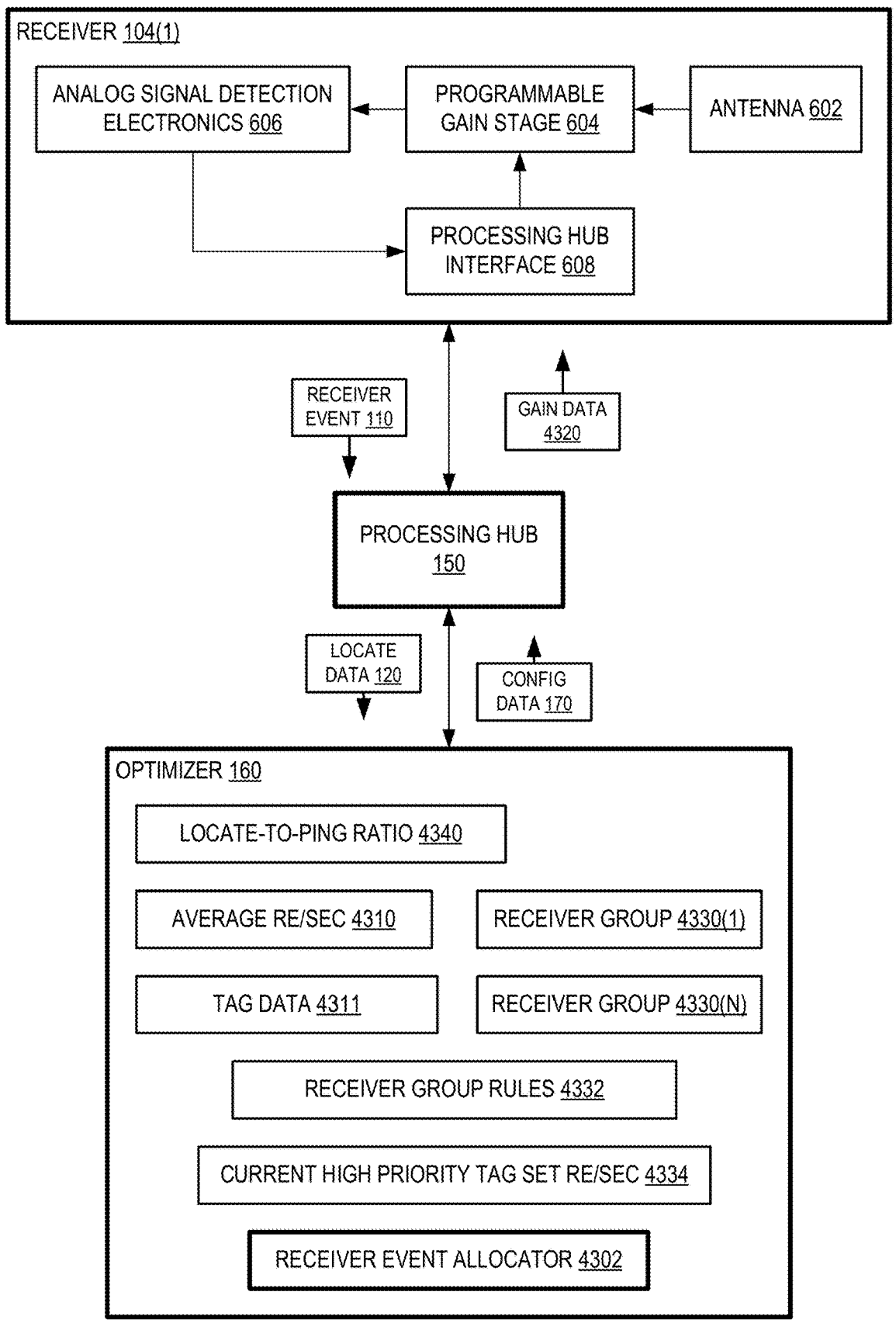
FIG. 43 shows the optimizer of FIG. 1 illustrating exemplary detail for controlling gain of the receivers.

FIG. 43 shows optimizer 160 of FIG. 1 illustrating exemplary detail for controlling gain of receiver 104. In particular, optimizer 160 is configured with a receiver event allocator 4302 that controls programmable gain stage 604 of each receiver 104. Receiver event allocator 4302 operates to automatically adjust gain properties of each receiver 104 within system 100 such that system 100 operates at, or near, eighty-five percent of system bandwidth for example. Other percentages of the system bandwidth may be used without departing from the scope hereof. This allows system 100 to process as many pings 402 as possible, maximizing accuracy of locate data 120, without risking overload of system 100 by exceeding the system bandwidth. That is, without the bandwidth control provided by receiver event allocator 4302, system 100 would be at risk of exceeding the system bandwidth and thereby causing delay and errors within locate data 120.

As described above, each receiver 104 generates one receiver event 110 for each ping 402 detected. Depending on the physical mounting (location, angle & aim) of receivers 104, the location of tags 101 relative to the receivers 104, and the gain (i.e. sensitivity) of each receiver 104, each ping 402 generated by tags 101 may be detected by any number (zero to all) of receivers 104, thereby resulting in no receiver events 110 or resulting in any number of receiver events 110 up to a maximum of one receiver event 110 from each receiver 104 within system 100. For example, where system 100 includes twelve receivers 104, each ping 402 may result in zero to twelve receiver events 110. As noted above, system 100 operates most efficiently, in terms of accuracy of locate data 120 and system bandwidth use, when the average number of receiver events 110 per ping 402 is greater than four and less than five.

Figure 44:
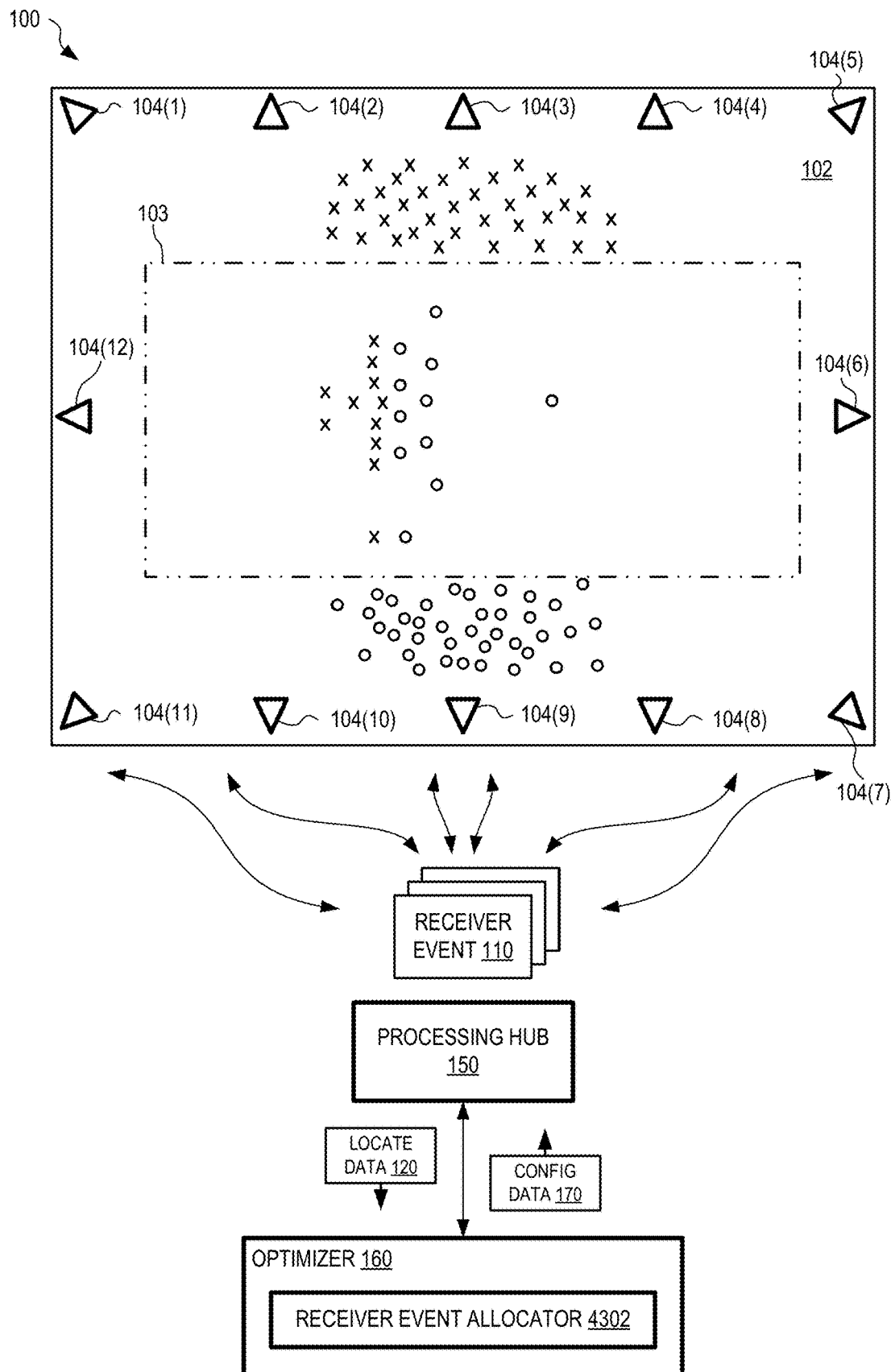
FIG. 44 shows the system of FIG. 1 configured with twelve receivers, in an embodiment.

FIG. 44 shows system 100 configured with twelve receivers 104(1)-(12). Assumptions for a unified gain example are shown in Table 5 Unified Gain Assumptions.

TABLE 5

| Unified Gain Assumptions | |
|---|---|
| System Bandwidth | 12,750 Receiver Events/Second |
| System Bandwidth Target (SBWT): 85% of System Bandwidth | 10,880 Receiver Events/Second |
| Receivers in system | 12 |
| Tags in System | 96 |
| All tags are of equal priority | |
| Tag Ping Rate | 25 Pings/Second |

Where each ping 402 generated by each tag 101 is detected by each receiver 104 within system 100, twenty-eight-thousand-eight-hundred receiver events 110 are generated each second, as shown in Equation 1:

$$96*25*12=28,800 \tag{1}$$

Since this is more than double the system bandwidth of 12,750 receiver events/second, system 100 would be overloaded and potentially enter a failure condition. Therefore, receiver event allocator 4302 is configured to control gain properties of receivers 104 such that, on average, each ping 402 is detected by four-and-a-half receivers 104. The number of receiver events 110 generated is thereby reduced to ten-thousand-eight-hundred, as shown in Equation 2:

$$96*25*4.5=10,800 \tag{2}$$

In this generalized example, reducing the number of receiver events 110 to ten-thousand-eight-hundred provides a high percentage of successful locates within locate data 120 and operates system 100 at SBWT. Receiver event allocator 4302 processes locate data 120, determines an average number of receiver events 110 generated for each ping 402, and automatically adjusts programmable gain stage 604 of each receiver 104 such that this average is equal to four-and-a-half.

There are many conditions which, alone or in combination, may affect the signal strength of ping 402 before it reaches receiver 104. For example, (a) obstructions (such as human bodies) in the "line of sight" between tag 101 and receiver 104, (b) rain and other weather conditions, and (c) distance between tag 101 and receiver 104. Each condition reduces the signal strength of ping 402 received by receiver 104. When the signal strength of ping 402 falls below a certain level due to these changing conditions, then receiver 104 does not detect ping 402 at certain gain settings. Receiver event allocator 4302 operates to dynamically adjust the gains of receivers 104 in response to these changing conditions and thus adjusts the sensitivity of receivers 104 to detecting ping 402.

Figure 45:
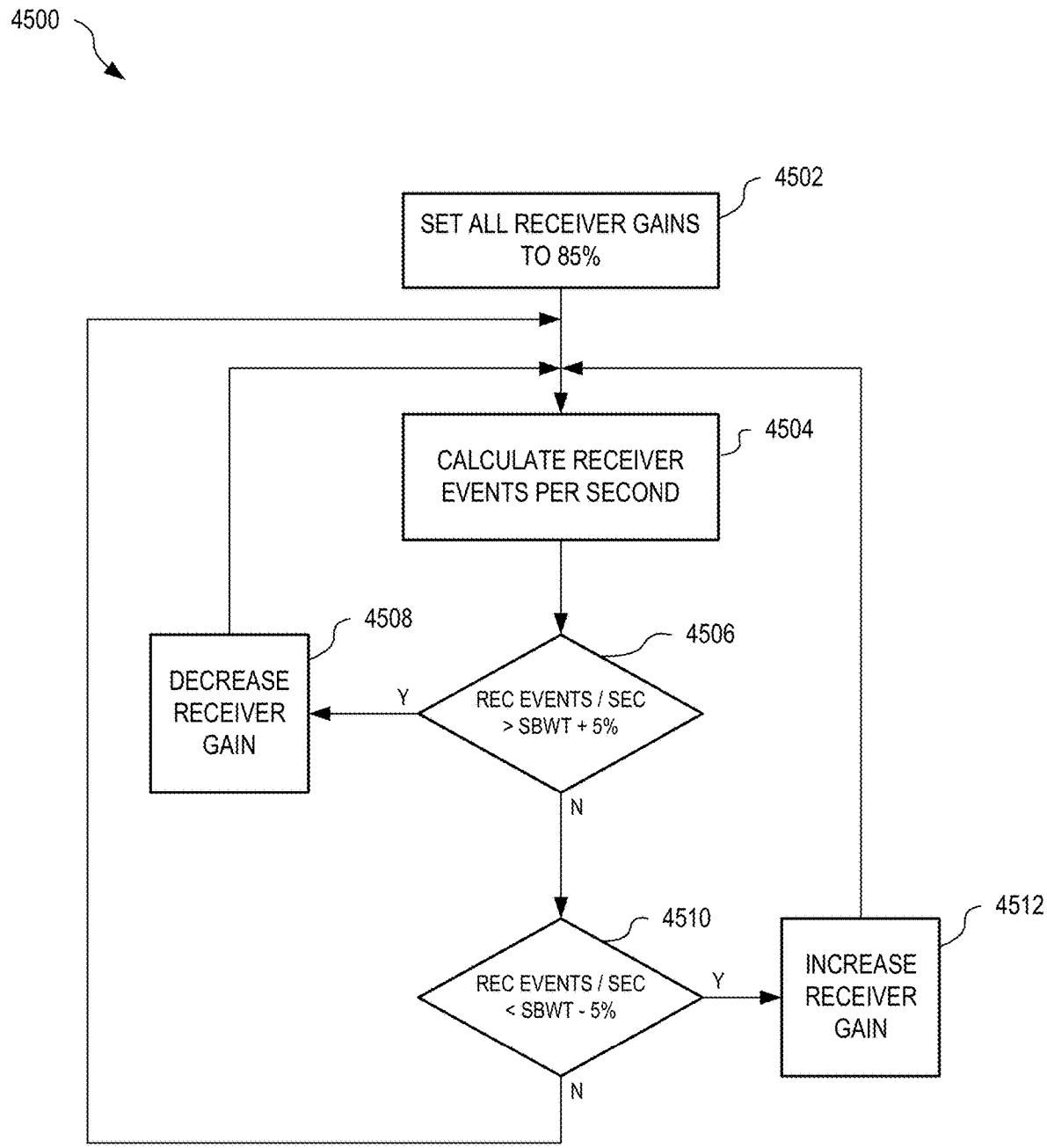
FIG. 45 is a flowchart illustrating one exemplary method for automatic optimization of the object tracking system of FIG. 44 by automatically adjusting gain of all receivers based upon average receiver events per second within the system, in an embodiment.

FIG. 45 is a flowchart illustrating one exemplary method 4500 for automatic optimization of object tracking system 100 of FIG. 44 by automatically adjusting gain of all receivers 104 based upon average receiver events per second within system 100. Method 4500 is for example implemented within receiver event allocator 4302 of FIGS. 43 and 44.

In step 4502, method 4500 sets the gain of all receivers to an 85% level. In one example of step 4502, receiver event allocator 4302 sends configuration data 170 to processing hub 150 which then sends gain data 4320 to each receiver 104. Each receiver 104 then sets (e.g., from communication interface 608) the gain of programmable gain stage 604 based upon gain data 4320.

In step 4504, method 4500 calculates the average receiver events per second within system 100. In one example of step 4504, receiver event allocator 4302 processes locate data 120 and determines average receiver events per second 4310.

Step 4506 is a decision. If, in step 4506, method 4500 determines that the average receiver events per second is greater than the SBWT plus five percent, method 4500 continues with step 4508; otherwise method 4500 continues with step 4510. In step 4508, method 4500 decreases the gain of receivers. In one example of step 4508, receiver event allocator 4302 sends configuration data 170 containing a reduced gain value to processing hub 150, which then sends the reduces gain value as gain data 4320 to each receiver 104. Within each receiver 104, communication interface 608 sets programmable gain stage 604 based upon gain data 4320.

Step 4510 is a decision. If, in step 4510, method 4500 determines that the average receiver events per second is less than SBWT minus five percent, method 4500 continues with step 4512; otherwise method 4500 continues with step 4504. In step 4512, method 4500 increases the gain of receivers. In one example of step 4512, receiver event allocator 4302 sends configuration data 170 containing an increased gain value to processing hub 150, which then sends the increased gain value as gain data 4320 to each receiver 104. Within each receiver 104, communication interface 608 sets programmable gain stage 604 based upon gain data 4320.

Steps 4504 through 4512 repeat periodically (e.g., once per second) to automatically adjust gain of all receivers 104 based upon the average number of receiver events 110 within system 100. Receiver event allocator 4302 implements method 4500 to periodically and/or continually monitor and adjust average receiver events per second 4310 to be within five percent of SBWT thereby preventing receiver event overload of system 100, while also maintaining sufficient receiver events to calculate locates for locate data 120.

The example of FIGS. 43, 44 and 45 illustrates the general concepts of controlling gain of receivers 104 within system 100 based upon changing conditions. A further advancement of receiver gain control to maximize the Locate accuracy for high priority tags is achieved within system 100 by grouping identities of receivers 104 into receiver priority groups 4330. Gains of receivers 104 identified within each priority receiver group 4330 are controlled independently of receivers identified within other priority groups by determining a locate-to-ping ratio for these high priority tags, while remaining within system bandwidth limitations.

Achieving this balance requires dynamic monitoring of activity of receiver events 110, on a per tag 101 basis, and adjusting the gain of each receiver 104 individually to allocate the system bandwidth (i.e., the number of receiver events received by processing hub 150) to receivers 104 thereby providing system 100 with the best configuration to maximize the locate-to-ping ratio, and thus the accuracy of the associated locates, of the high priority tags in the system, while remaining safely under the system bandwidth limitation.

Figure 46:
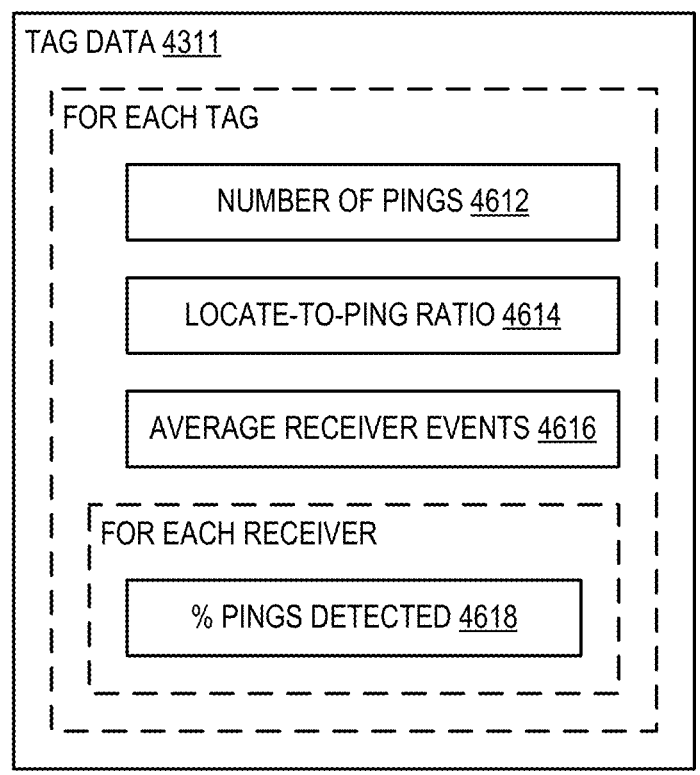
FIG. 46 shows the tag data of FIG. 43 in further exemplary detail.

FIG. 46 shows tag data 4311 of FIG. 43 in further exemplary detail. Receiver event allocator 4302 constantly monitors receiver events 110 and, individually for each tag 101, whether each ping results in a valid locate or not, determines, for a specified sample period (e.g., two seconds): a number of pings 4612, a locate-to-ping ratio 4614, an average receiver events 4616, and, for each receiver, a percentage of pings detected 4618. Number of pings 4612 is the number of pings 402 transmitted by tag 101 for the specified sample period (e.g., fifty, where the tag ping rate is twenty-five per second and the specified sample period is two seconds). Locate-to-ping ratio 4614 is a ratio of the number of locates resulting from detected pings 402 of tag 101 over the specified sample period to the number of pings 4612 for that tag. Average receiver events 4616 is the average number of receiver events 110 for tag 101 over the specified sample period. Together with number of pings 4612, average receiver events 4616 may be used to calculate the average system bandwidth consumed by each individual tag 101. For each receiver 104, percentage of pings detected 4618 is the number of pings 402 detected for tag 101 during the specified sample period, irrespective of whether the ping results in a locate. Percentage of pings detected 4618 may be used to track which receivers are being used at any given time.

Tag data 4311 is aggregated based upon tag sets 3512, and optionally sub-tag sets thereof, as shown in FIGS. 35, 38, and 39. Continuing with the American football example of FIGS. 36-42 and 44, three exemplary tag sets 3512(1)-(3) are used to aggregate tag data 4311. In terms of allocating receiver events, tag set 3512(1) "Players on Field" is given priority by receiver event allocator 4302 over tag sets 3512(2) and 3512(3) that identify tags of plays off the field of play.

Tag Set Boundary

Figure 47:
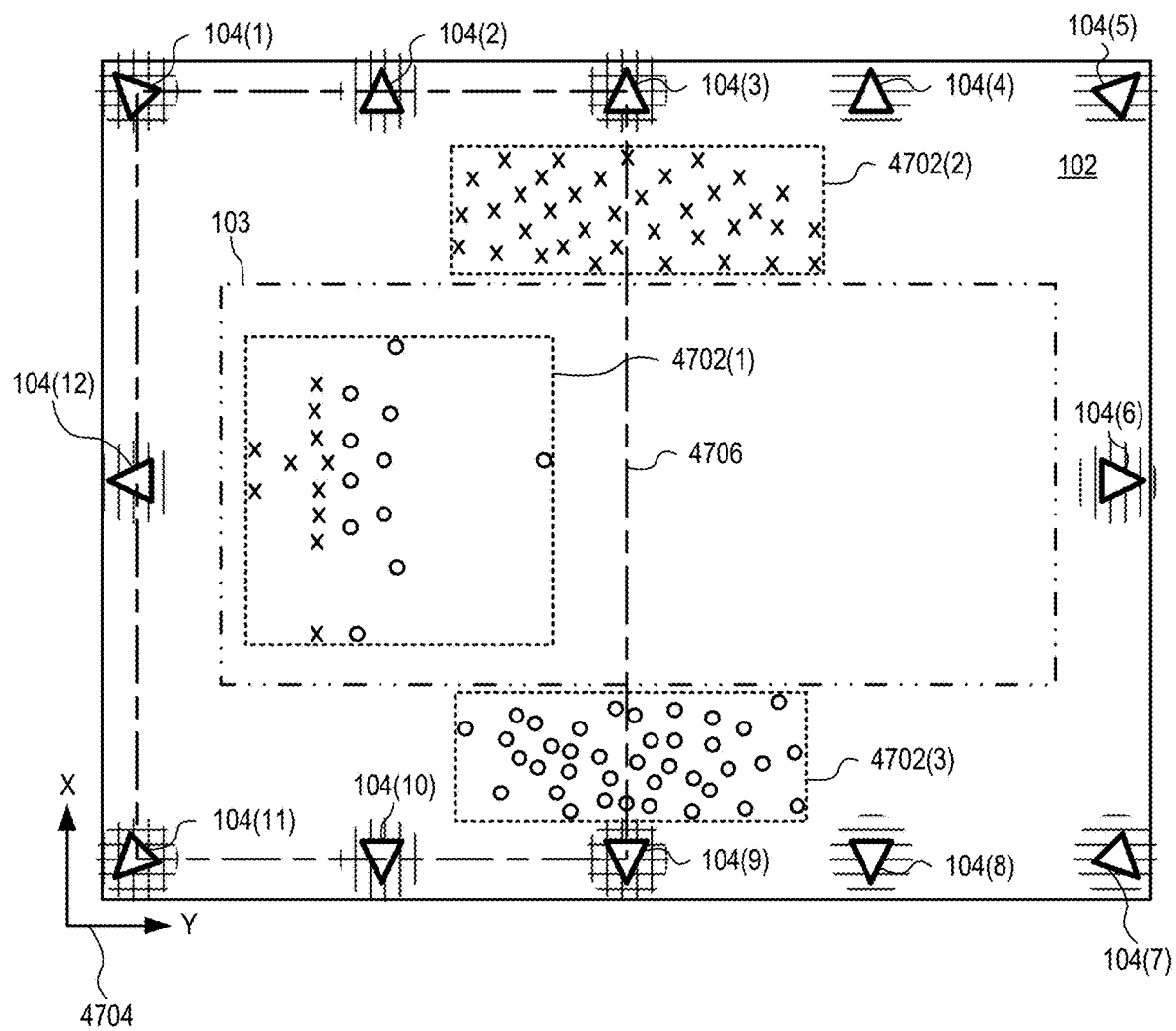
FIG. 47 shows exemplary tag set boundaries that bound tags based upon the tag sets of FIGS. 38, 41 and 42.

FIG. 47 shows exemplary tag set boundaries 4702 that bound tags 101 based upon tag sets 3512 of FIGS. 35, 38 and 39. Receiver event allocator 4302 determines each tag set boundary 4702 as having coordinates of the minimum rectangle, aligned along axis 4704 of system 100, that contains all tags 101 within the associated tag set 3512. In particular, the location of tags 101 identified within tag set 3512(1) are bounded by tag set boundary 4702(1), the locations of tags 101 identified within tag set 3512(2) are bounded by tag set boundary 4702(2), and the locations of tags 101 identified within tag set 3512(3) are bounded by tag set boundary 4702(3).

Receiver Priority

Receiver event allocator 4302 determines receiver groups 4330 based upon the importance of each receiver 104 for determining Locates of tags 101 identified within high priority tag set 3512(1). In the example of FIG. 47, there are three receiver groups 4330(1)-(3). Receiver groups 4330 are determined by receiver event allocator 4302 using receiver group rules 4332 that include, for example: receiver group 4330(1) identifies the four receivers 104 that define the smallest rectangle 4706 encompassing tag set boundary 4702(1) (i.e., enclosing all high priority tags 101 identified within tag set 3512(1)); receiver group 4330(2) is defined as identifying receivers 104 located along the sides of rectangle 4706 defined by receiver group 4330(1), whether these receivers are on the line or at a distance perpendicular to the line; and receiver group 4330(3) is defined as identifying all receivers outside rectangle 4706 defined by receiver group 4330(1).

It is important to note that tag set boundaries 4702 and receiver groups 4330 change as tags 101 identified within tag set 3512(1) (i.e., the players associated with the identified tags) move around on field of play 103. Therefore, tag set boundaries 4702 and receiver groups 4330 are continually evaluated.

Dynamic Receiver Gain Adjustment:

Receiver event allocator 4302 continuously adjusts gain of each receiver 104 to maximize locate-to-ping ratio 4314 of tags 101 identified within the highest priority tag set 3512(1) while preserving system bandwidth by carefully allocating receiver events 110 that are not directly associated with tags 101 grouped within tag set 3512(1). The gain of all receivers 104 is initially set to a nominal gain value (e.g., eighty-five percent of maximum gain). Receiver event allocator 4302 thereafter adjusts the gain of each receiver 104 based on receiver groups 4330 to maximize locate-to-ping ratio 4314 of tags 101 identified within high priority tag set 3512(1), at the expense of tags 101 identified within lower priority tag sets 3512(2) and 3512(3), while keeping the total number of receiver events 110 handled by system 100 at the SBWT.

The first, and arguably most important, step of dynamic receiver gain adjustment by receiver event allocator 4302 targets maximizing the performance of tags 101 identified within high priority tag set 3512(1). Receiver event allocator 4302 allocates a large percentage (e.g., seventy percent) of SBWT, known as the Tag Set 1 Bandwidth Target "TS1BT", to this first stage of receiver adjustment. Continuing with the above American football example, TS1BT is set to 7,586 receiver events per second as shown in Equation 3:

$$12{,}750 * 0.85 * 0.70 = 7{,}586 \quad (3)$$

Figure 48:
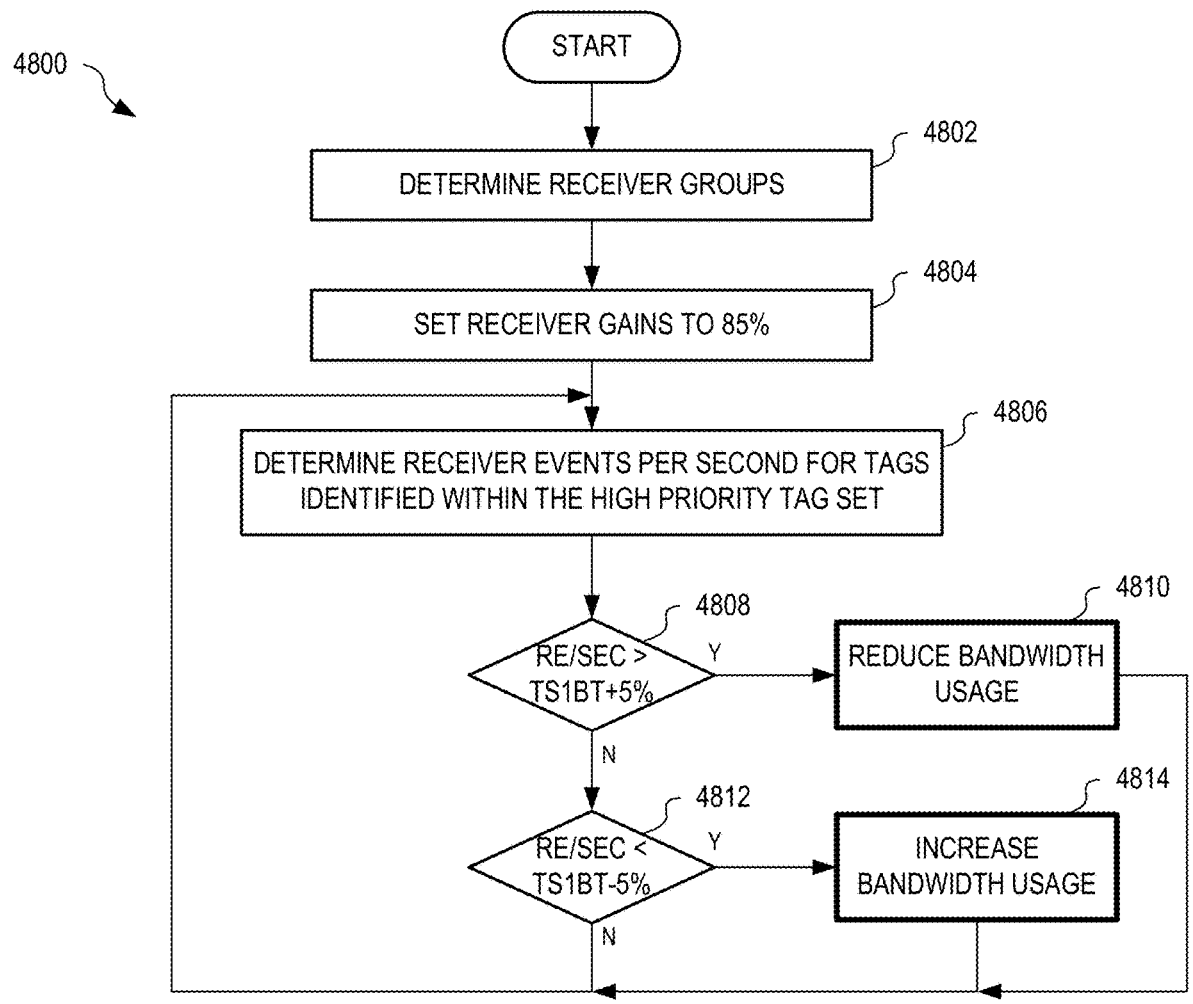
FIGS. 48, 49, 50, 51, and 52 collectively show a flowchart illustrating one exemplary method for automatic optimization of the object tracking system of FIG. 1 by controlling gain of the receivers based upon receiver events associated with the highest priority tag set of FIG. 35, in an embodiment.
Figure 49:
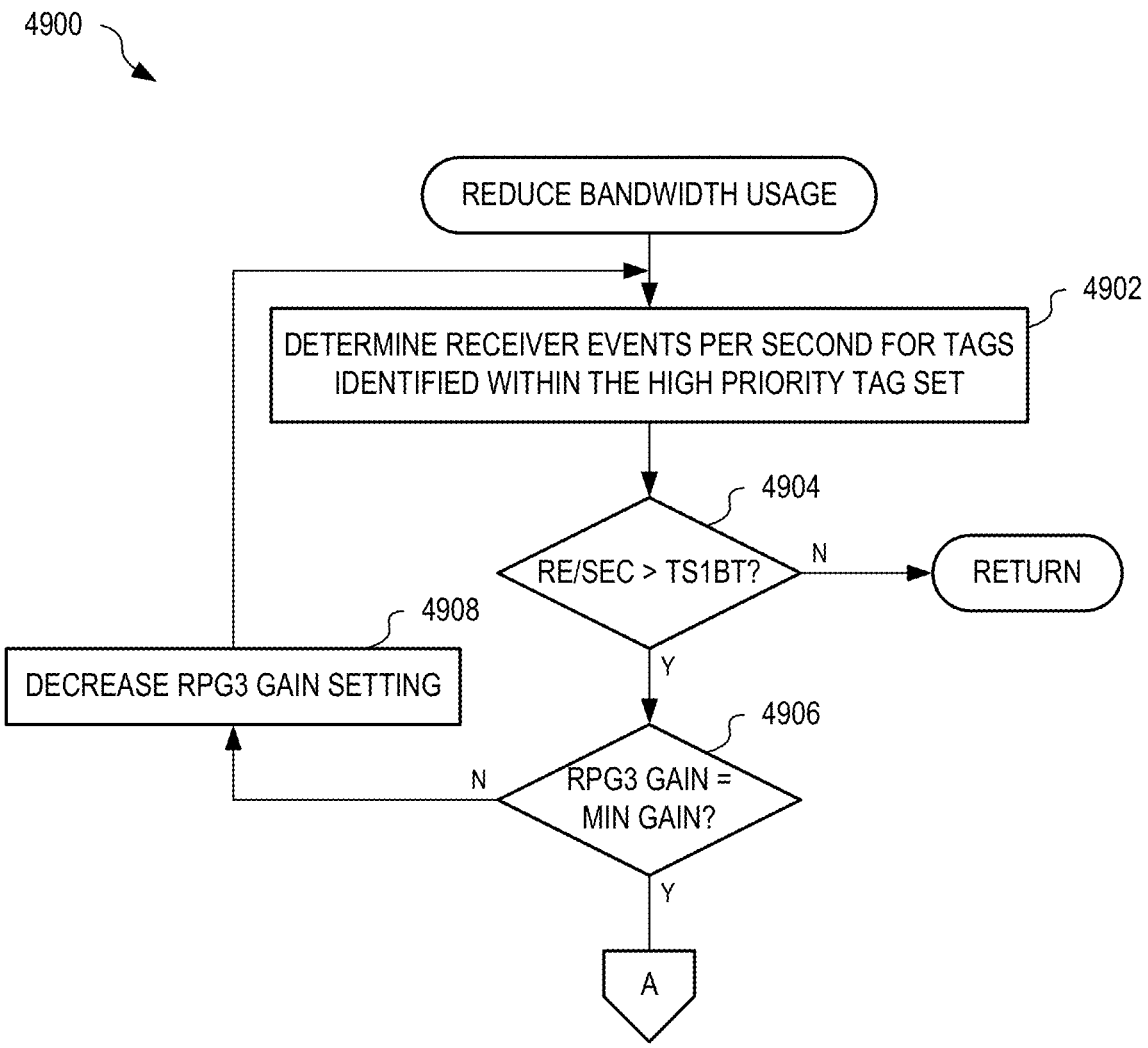
Figure 50:
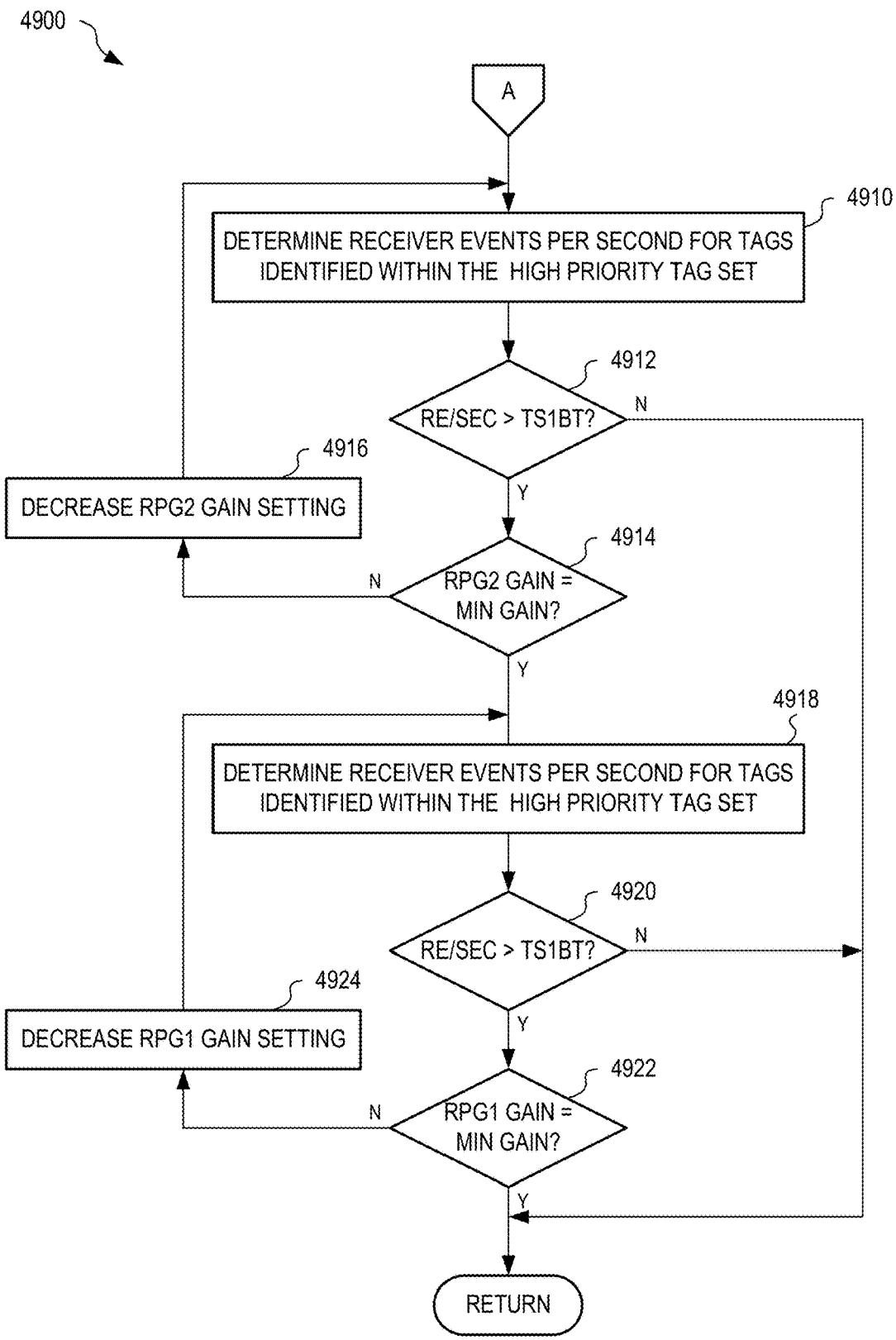
Figure 51:
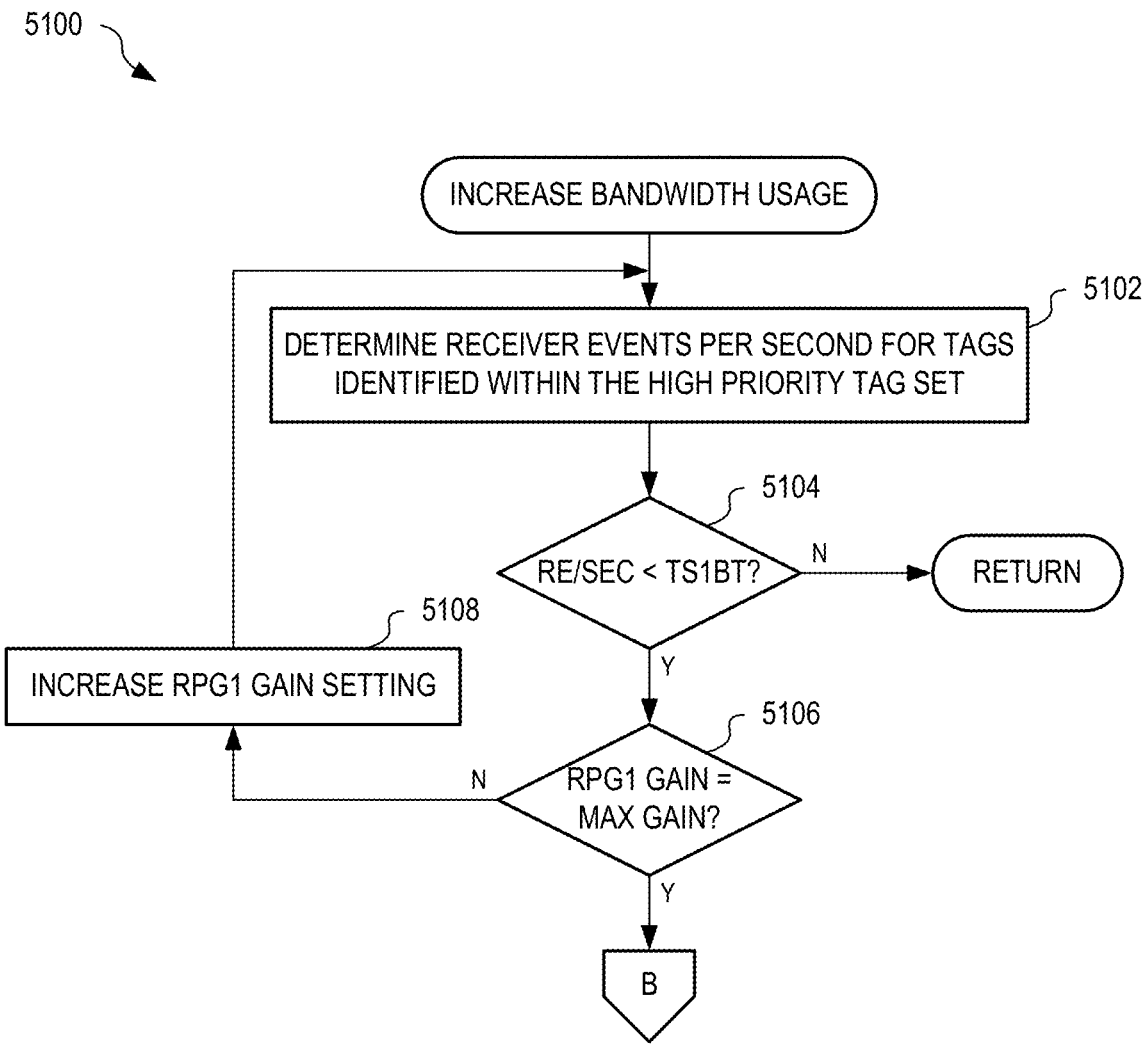
Figure 52:
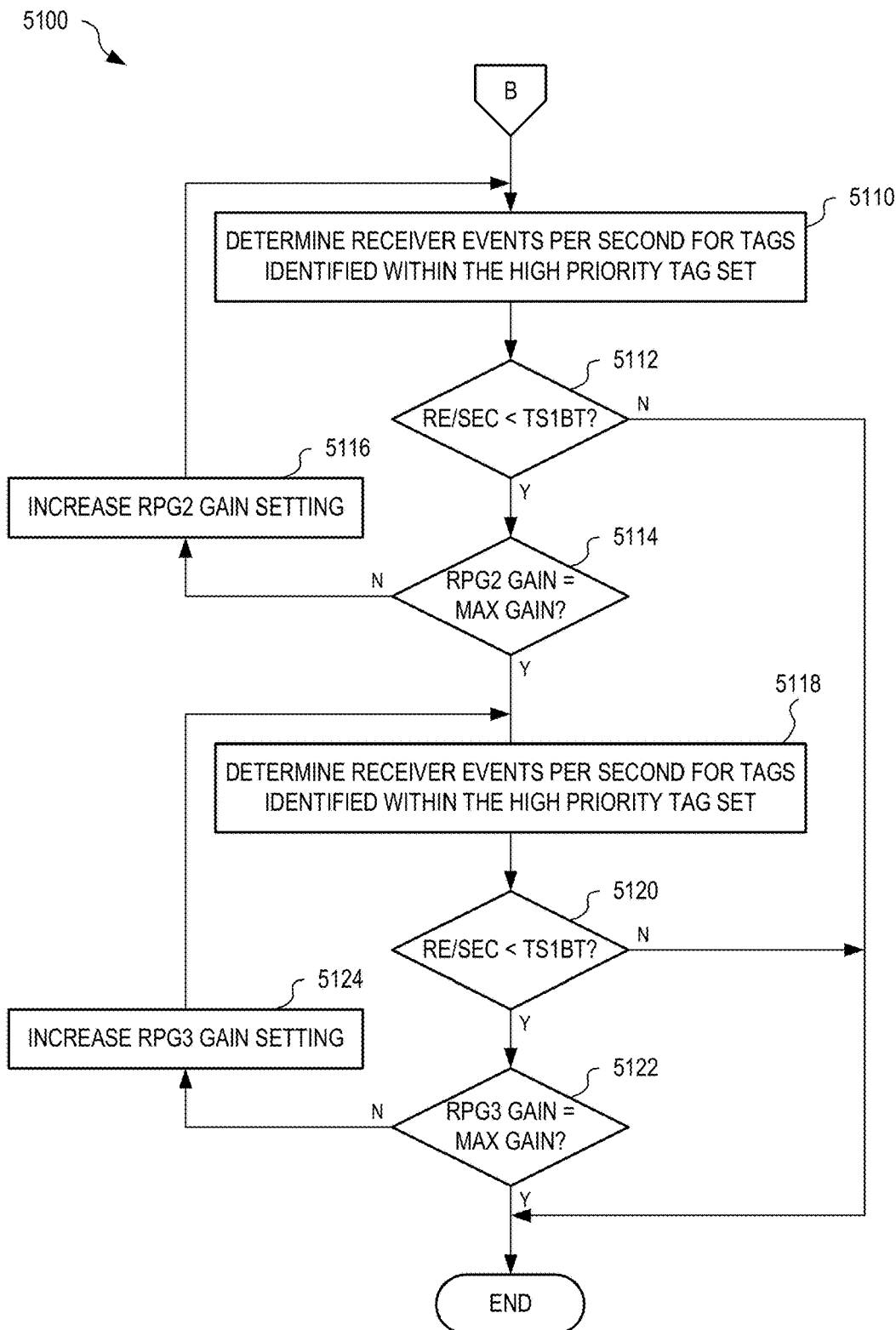

FIG. 48 is a flowchart illustrating one exemplary method 4800 for automatic optimization of object tracking system 100 of FIG. 1 by controlling gain of receivers 104 based upon receiver events 110 associated with highest priority tag set 3512(1) of FIG. 35. Method 4800 is for example implemented within receiver event allocator 4302 and is invoked continuously or periodically to manage system bandwidth usage of system 100. FIGS. 49 and 50 are flowcharts showing one exemplary sub-method 4900 for decreasing usage of the system bandwidth of system 100. Sub-method 4900 is invoked from method 4800 for example. FIGS. 51 and 52 are flowcharts showing one exemplary sub-method 5100 for increasing usage of system bandwidth of system 100. Sub-method 5100 is invoked from method 4800 for example. FIGS. 48 through 52 are best viewed together with the following description.

Using method 4800 and sub-methods 4900 and 5100, receiver event allocator 4302 controls system bandwidth usage of system 100. Gain settings of receivers 104 are automatically decreased when the determined total number of receiver events for tags 101 identified within high priority tag set 3512(1) exceeds TS1BT by more than five percent. Similarly, receiver event allocator 4302 automatically increases gain settings of receivers 104 when the determined total number of receiver events for tags 101 identified within high priority tag set 3512(1) falls below TS1BT by more than five percent.

To preserve the locate-to-ping ratio of tags 101 identified within high priority tag set 3512(1), when reducing gain settings (i.e., to reduce the number of receiver events 110 occurring within system 100), receiver event allocator 4302 first reduces gain settings of receivers identified within the lowest priority receiver group (e.g., receiver group 4330(3)). When further reduction in the receiver events received is required, and the gain setting of receivers identified within the lowest priority receiver group have been reduced to a minimum setting, receiver event allocator 4302 then reduces the gain setting of receivers identified within the middle priority receiver group (e.g., receiver group 4330(2)). Finally, when further reduction of the number of receiver events is required and the gain setting of receivers identified within the middle priority receiver group is set to a minimum gain setting, receiver event allocator 4302 then reduces the gain setting of receivers identified within the high priority receiver group (e.g., receiver group 4330(1)).

When increasing the gain setting of receivers 104 due to insufficient receiver events 110 being received for tags 101 identified within highest priority tag set 3512(1), receiver event allocator 4302 first increases the gain setting of receivers identified within the highest priority receiver group (e.g., receiver group 4330(1)), since these receivers are most likely to detect pings from tags 101 identified within the highest priority tag set 3512(1). If further increase in the number of receiver events is desired and the gain setting of receivers identified within the highest priority receiver group is at a maximum gain setting, receiver event allocator 4302 then increases the gains of receivers identified within the middle priority receiver group (e.g., receiver group 4330(2)). If still further increase in the number of receiver events is desired and the gain setting of receivers identified within the middle priority receiver group is also at a maximum gain setting, receiver event allocator 4302 then increases the gain setting of receivers identified within the lowest priority receiver group (e.g., receiver group 4330(3)).

Thus, receivers 104 identified within the highest priority receiver group 4330(1) are the first to have gain setting increased when additional receiver events are desired, and are the last to have gain setting decreased when the number of receiver events is too high.

In step 4802, method 4800 determines receiver groups. In one example of step 4802, receiver event allocator 4302 determines receiver groups 4330(1), 4330(2), and 4330(3) based upon receiver group rules 4332 and locate data 120.

In step 4804, method 4800 sets receiver gains to eighty-five percent of the maximum gain value. In one example of step 4804, receiver event allocator 4302 sends configuration data 170 defining, for each receiver 104, a gain value of eighty-five percent of the maximum gain value to processing hub 150, which in turn sends gain data 4320 including the gain value, to each receiver 104.

In step 4806, method 4800 determines receiver events per second for the high priority tag set. In one example of step 4806, receiver event allocator 4302 processes locate data 120 to determine a total count of receiver events 110 associated with pings 402 of tags 101 identified within tag set 3512(1) over a selected sample period, and then calculates the number of receiver events per second.

Step 4808 is a decision. If, in step 4808, method 4800 determines that the receiver events per second determined in step 4806 is greater than TS1BT+ five percent, method 4800 continues with step 4810; otherwise method 4800 continues with step 4812.

In step 4810, method 4800 invokes sub-method 4900 to reduce bandwidth usage of system 100. Method 4800 then continues with step 4806.

Step 4812 is a decision. If, in step 4812, method 4800 determines that the receiver events per second determined in step 4806 is less than TS1BT—five percent, method 4800 continues with step 4814; otherwise method 4800 continues with step 4806.

In step 4814, method 4800 invokes sub-method 5100 to increase bandwidth usage of system 100. Method 4800 then continues with step 4806.

Steps 4806 through 4814 repeat continuously such that usage of system bandwidth of system 100 is controlled based upon receiver events 110 associated with tags 101 identified within highest priority tag set 3512(1).

In step 4902, sub-method 4900 determines receiver events per second for tags identified within the high priority tag set. In one example of step 4902, receiver event allocator 4302 processes locate data 120 to determine a total count of receiver events 110 associated with pings 402 of tags 101 identified within tag set 3512(1) over a selected sample period, and then calculates the number of receiver events per second.

Step 4904 is a decision. If, in step 4904, sub-method 4900 determines that the receiver events per second of step 4902 is greater than TS1BT, sub-method 4900 continues with step 4906; otherwise sub-method 4900 returns control to method 4800.

Step 4906 is a decision. If, in step 4906, sub-method 4900 determines that gain settings of receivers identified within receiver group 4330(3) are set to a minimum gain setting, sub-method 4900 continues with step 4910; otherwise sub-method 4900 continues with step 4908.

In step 4908, sub-method 4900 decreases gain settings of receivers identified within receiver group 4330(3). In one example of step 4908, receiver event allocator 4302 sends configuration data 170 containing reduced gain values for receivers 104 identified within receiver group 4330(3) to processing hub 150; processing hub 150 then sends gain data 4320 containing the reduced gain value to receivers 104(4), 104(5), 104(7), and 104(8) identified within receiver group 4330(3). Sub-method 4900 then continues with step 4902. Steps 4902 through 4906 repeat until (a) receiver events per second of step 4902 is not greater than TS1BT, whereupon sub-method 4900 returns control to method 4800, or (b) the gain setting of receivers 104 identified within receiver group 4330(3) is at a minimum gain setting, whereupon sub-method 4900 continues with step 4910.

Step 4910 is similar to step 4902. In step 4910, sub-method 4900 determines receiver events per second for tags identified within the high priority tag set.

Step 4912 is a decision. If, in step 4912, sub-method 4900 determines that the receiver events per second of step 4910 is greater than TS1BT, sub-method 4900 continues with step 4914 otherwise sub-method 4900 returns control to method 4800.

Step 4914 is a decision. If, in step 4914, sub-method 4900 determines that gain settings of receivers identified within receiver group 4330(2) are set to a minimum gain setting, sub-method 4900 continues with step 4918; otherwise sub-method 4900 continues with step 4916. In step 4916, sub-method 4900 decreases gain settings of receivers identified within receiver group 4330(2). In one example of step 4916, receiver event allocator 4302 sends configuration data 170 containing reduced gain values for receivers 104 identified within receiver group 4330(2) to processing hub 150, which then sends gain data 4320 containing the reduced gain value to receivers 104(2), 104(6), 104(10), and 104(12) identified within receiver group 4330(2). Sub-method 4900 then continues with step 4910. Steps 4910 through 4916 repeat until (a) receiver events per second of step 4910 is not greater than TS1BT, whereupon sub-method 4900 returns control to method 4800, or (b) the gain setting of receivers 104 identified within receiver group 4330(2) is at a minimum gain setting, whereupon sub-method 4900 continues with step 4918.

Step 4918 is similar to steps 4902 and 4910. In step 4918, sub-method 4900 determines receiver events per second for tags identified within the high priority tag set.

Step 4920 is a decision. If, in step 4920, sub-method 4900 determines that the receiver events per second of step 4918 is greater than TS1BT, sub-method 4900 continues with step 4922 otherwise sub-method 4900 returns control to method 4800.

Step 4922 is a decision. If, in step 4922, sub-method 4900 determines that gain settings of receivers identified within receiver group 4330(1) are set to a minimum gain setting, sub-method 4900 returns control to method 4800; otherwise sub-method 4900 continues with step 4924. In step 4924, sub-method 4900 decreases gain settings of receivers identified within receiver group 4330(1). In one example of step 4924, receiver event allocator 4302 sends configuration data 170 containing reduced gain values for receivers 104 identified within receiver group 4330(1) to processing hub 150, which then sends gain data 4320 containing the reduced gain value to receivers 104(1), 104(3), 104(9), and 104(11) identified within receiver group 4330(1). Sub-method 4900 then continues with step 4918. Steps 4918 through 4924 repeat until (a) receiver events per second of step 4918 is not greater than TS1BT, whereupon sub-method 4900 returns control to method 4800, or (b) the gain setting of receivers 104 identified within receiver group 4330(1) is at a minimum gain setting, whereupon sub-method 4900 returns control to method 4800.

In step 5102, sub-method 5100 determines receiver events per second for tags of the high priority tag set. In one example of step 5102, receiver event allocator 4302 processes locate data 120 to determine a total count of receiver events 110 associated with pings 402 of tags 101 identified within tag set 3512(1) over a selected sample period, and then calculates the number of receiver events per second.

Step 5104 is a decision. If, in step 5104, sub-method 5100 determines that the receiver events per second of step 5102 is less than TS1BT, sub-method 5100 continues with step S106; otherwise sub-method 5100 returns control to method 4800.

Step 5106 is a decision. If, in step 5106, sub-method 5100 determines that gain settings of receivers identified within receiver group 4330(1) are set to a maximum gain setting, sub-method 5100 continues with step 5110; otherwise sub-method 5100 continues with step 5108. In step S108, sub-method 5100 increases gain settings of receivers identified within receiver group 4330(1). In one example of step S108, receiver event allocator 4302 sends configuration data 170 containing increased gain values for receivers 104 identified within receiver group 4330(1) to processing hub 150, which then sends gain data 4320 containing the increased gain value to receivers 104(1), 104(3), 104(9), and 104(11) identified within receiver group 4330(1). Sub-method 5100 then continues with step S102. Steps S102 through S106 repeat until (a) receiver events per second of step S102 is not less than TS1BT, whereupon sub-method 5100 returns control to method 4800, or (b) the gain setting of receivers 104 identified within receiver group 4330(1) is at a maximum gain setting, whereupon sub-method 5100 continues with step S110.

Step S110 is similar to step S102. In step S110, sub-method 5100 determines receiver events per second for tags identified within the high priority tag set.

Step 5112 is a decision. If, in step 5112, sub-method 5100 determines that the receiver events per second of step S110 is less than TS1BT, sub-method 5100 continues with step 5114 otherwise sub-method 5100 returns control to method 4800.

Step 5114 is a decision. If, in step S114, sub-method 5100 determines that gain settings of receivers identified within receiver group 4330(2) are set to a maximum gain setting, sub-method 5100 continues with step S118; otherwise sub-method 5100 continues with step S116. In step 5116, sub-method 5100 increases gain settings of receivers within receiver group 4330(2). In one example of step S116, receiver event allocator 4302 sends configuration data 170 containing increased gain values for receivers 104 identified within receiver group 4330(2) to processing hub 150, which then sends gain data 4320 containing the increased gain value to receivers 104(2), 104(6), 104(10), and 104(12) identified within receiver group 4330(2). Sub-method 5100 then continues with step S110. Steps S110 through S116 repeat until (a) receiver events per second of step 5110 is not less than TS1BT, whereupon sub-method 5100 returns control to method 4800, or (b) the gain setting of receivers 104 identified within receiver group 4330(2) is at a maximum gain setting, whereupon sub-method 5100 continues with step 5118.

Step 5118 is similar to steps 5102 and 5110. In step 5118, sub-method 5100 determines receiver events per second for tags identified within the high priority tag set.

Step 5120 is a decision. If, in step 5120, sub-method 5100 determines that the receiver events per second of step 5118 is less than TS1BT, sub-method 5100 continues with step 5122 otherwise sub-method 5100 returns control to method 4800.

Step 5122 is a decision. If, in step 5122, sub-method 5100 determines that gain settings of receivers identified within receiver group 4330(3) are set to a maximum gain setting, sub-method 5100 returns control to method 4800; otherwise sub-method 5100 continues with step 5124. In step 5124, sub-method 5100 increases gain settings of receivers identified within receiver group 4330(3). In one example of step S124, receiver event allocator 4302 sends configuration data 170 containing increased gain values for receivers 104 identified within receiver group 4330(3) to processing hub 150, which then sends gain data 4320 containing the increased gain value to receivers 104(4), 104(5), 104(7), and 104(8) identified within receiver group 4330(3). Sub-method 5100 then continues with step S118. Steps S118 through S124 repeat until (a) receiver events per second of step S118 is not less than TS1BT, whereupon sub-method 5100 returns control to method 4800, or (b) the gain setting of receivers 104 identified within receiver group 4330(3) is at a maximum gain setting, whereupon sub-method 5100 returns control to method 4800.

As shown in the above examples, a hysteresis value of +/− five percent is used, however, other values may be used without departing from the scope hereof. For example, a ten percent hysteresis may result in fewer gain control settings being generated by receiver event allocator 4302.

Receiver event allocator 4302 may perform a second stage of dynamic receiver gain adjustment to improve performance of tags within lower priority tag sets (e.g., tag sets 3512(2) and 3512(3)) by using the remaining portion (e.g., thirty percent) of the SBWT. Continuing with the American football example, this second stage manages three thousand two hundred and fifty-one receiver events as shown by Equation 4:

$$(12750*0.85*0.30)=3,251 \qquad (4)$$

Receiver event allocator 4302 thereby allocates these receiver events using a method similar to method 4800 and sub-methods 4900 and 5100, by focusing on receiver events 110 received for tags 101 identified within the lower priority tag sets. However, for these lower priority tags sets, the gain setting of the receivers 104 are only increased (and not decreased) to use all remaining available system bandwidth, once performance of tags 101 identified within the high priority tag set (e.g., tag set 3512(1)) is optimal. By not decreasing the gain settings of receivers using this second stage of receiver gain adjustment, receiver event allocator 4302 avoids inadvertently decreasing the gain of receivers critical to tags identified within high priority tag set 3512(1).

Receiver Modifications

Figure 53:
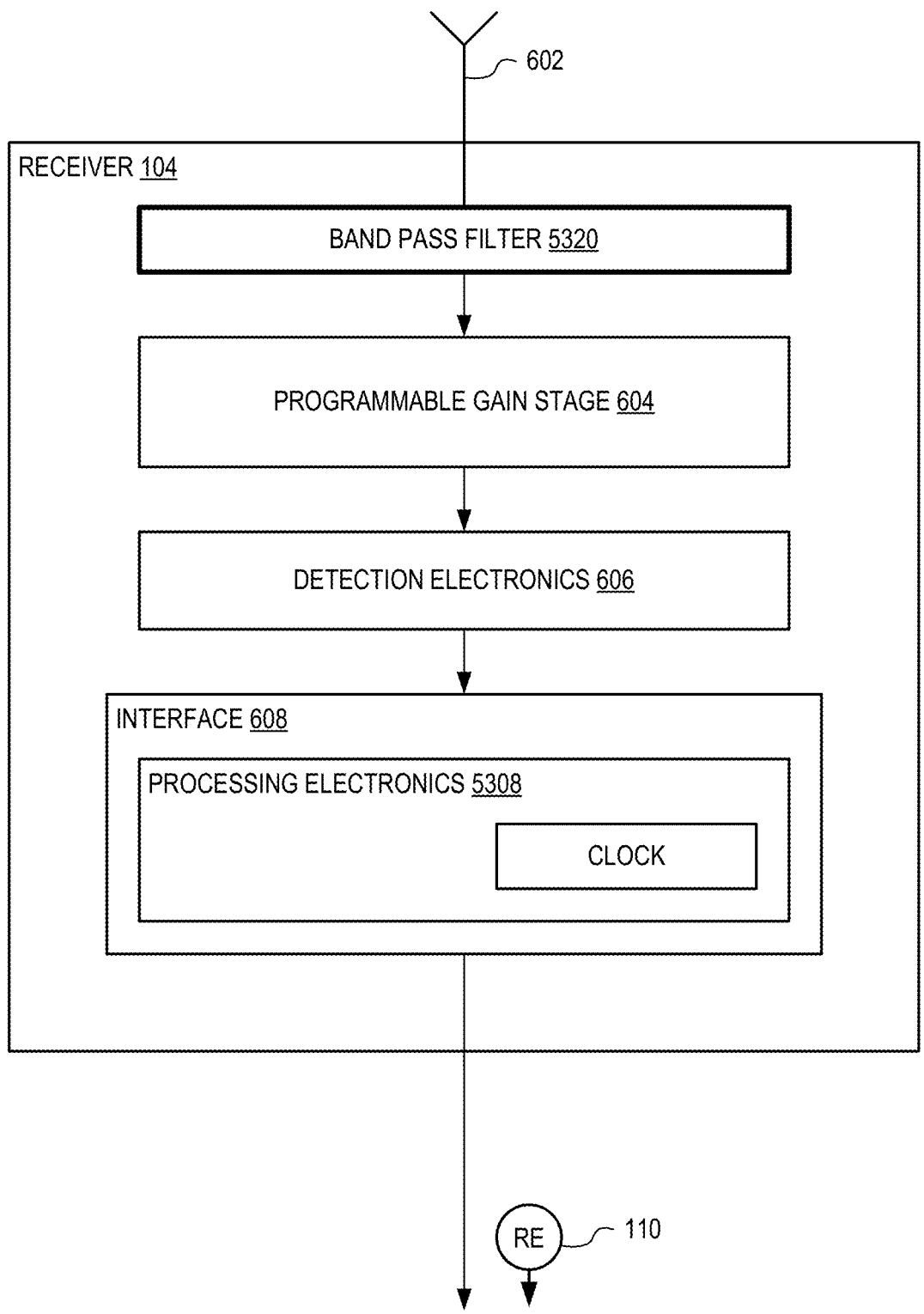
FIG. 53 shows exemplary detail of one receiver of FIG. 1, in an embodiment.
Figure 54:
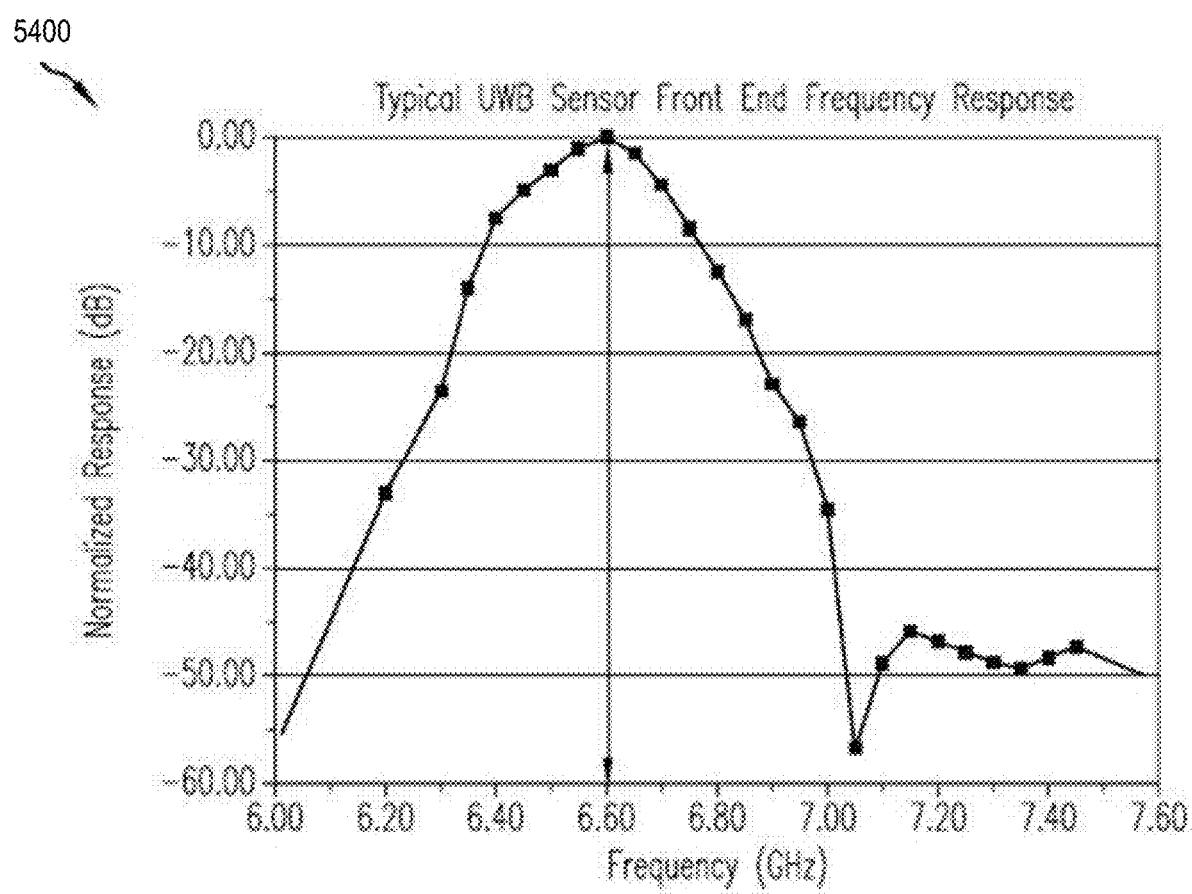
FIG. 54 shows a graph illustrating one exemplary response curve of an "off-the-shelf" receiver with unity gain at ~6.6 GHz.

FIG. 53 shows further exemplary detail of receiver 104 of FIG. 1. Receiver 104 includes transmit/receive antenna 602, programmable gain stage 604, analog signal detection electronics 606, and interface 608 for communicating with processing hub 150 and including signal processing electronics 5308. Tag 101 transmits a very low power (1 mW) signal with a 6.55 GHz center frequency and +/−200 Mhz. The total frequency range of the transmission from tag 101 is 6.35-6.75 GHz. Receiver 104 is tuned to receive at 6.55 GHz center frequency. FIG. 54 shows a graph 5400 illustrating one exemplary response curve of an "off-the-shelf" receiver with unity gain at approximately 6.6 GHz.

Absent other wireless signals within the operational environment (i.e., operational area 102) of system 100, detecting of pings 402 using the "off-the-shelf" receivers is relatively simple. In the typical environments where UWB tracking systems are deployed, such as hospitals and manufacturing plants, there is a high level of wireless signal coordination and interference from other wireless systems within the frequency range of 6-7 GHz does not occur. However, system 100 operates within a "Game Day" environment at a major sporting venue where there is a wide spectrum of other wireless systems including, but not limited to, venue WiFi at 5.8 GHz, coaching communication systems at varied frequencies, wireless broadcast camera systems at 2.4, 4.6, 5.8, and 7.1 GHz and transmission towers located outside the venue typically transmitting at 7.0 GHz or higher. Although, on paper, it seems that these other wireless systems do not transmit at the frequency range (6.35-6.75 GHz) used by system 100, and would therefore not interfere, in the real world, other wireless systems of the Game Day environment may cause the "off-the-shelf" receivers to be unable to detect the low power pings 402 from tags 101.

Many factors prevent the successful use of "off-the-shelf" receivers within the Game Day environment. For example, tags 101 are tuned to transmit at approximately 6.55 GHz, whereas, as shown in FIG. 54, the response curve of the "off-the-shelf" receiver has a center frequency (unity gain, or 0 dB attenuation) at 6.6 GHz. The attenuation of the "off-the-shelf" receiver at 6.35 GHz is ~14 dB and at 6.75

GHz is ~9 dB. Also note that the response curve of FIG. 54 shows that while attenuated, signals below 6.35 GHz and above 6.75 GHz are allowed to pass through the front end of the "off-the-shelf" receiver. Since tags 101 transmit in the 6.35-6.75 GHz range, ping 402 passes through the front end of the "off-the-shelf" receiver; however, since signal from tag 101 is transmitted at a power of 1 mW, these signals are not as strong as signals from other systems within the Game Day environment. For example, a wireless broadcast camera typically transmits signals at a power of 250 mW. Although the center frequency of these other wireless systems is outside the 6.35-6.75 GHz range, the higher output power at their center frequency typically results in harmonics and stray transmissions at frequencies close to the 6.35-6.75 GHz range.

Since the "off-the-shelf" receiver front end attenuates, rather than rejects, signals outside the 6.35-6.75 GHz range, some portion of the energy from these other wireless systems passes through the front end of to reach the analog detection electronics 606. Given the significantly stronger signals from these other transmission sources (250 times stronger from the wireless broad cast camera), the energy passing through the front end of the "off-the-shelf" receiver may saturate the analog detection electronics 606 and prevent detection of ping 402 from tag 101.

Band Pass Filtering

Figure 55:
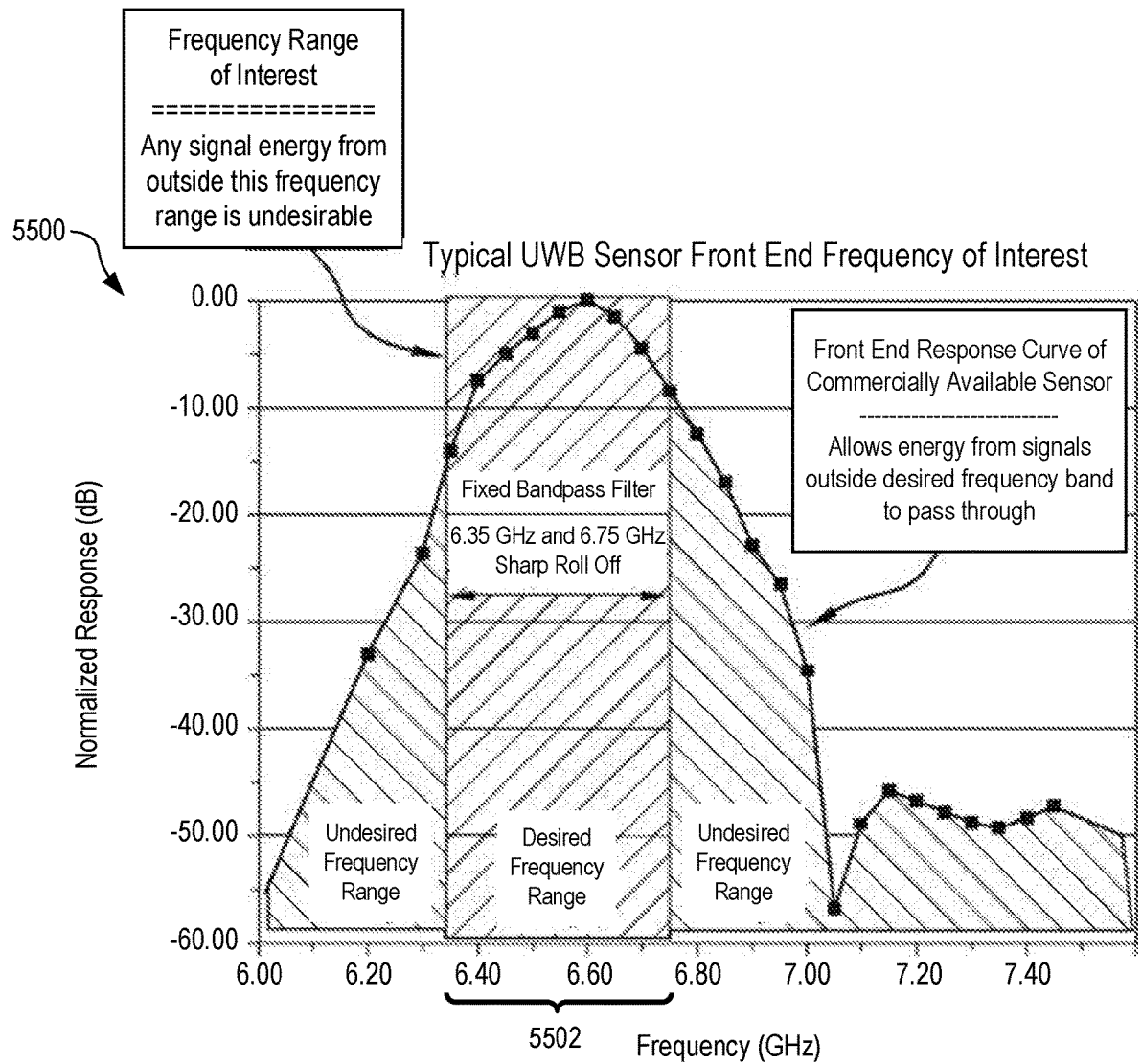
FIG. 55 shows the response curve of FIG. 54, and further illustrates the desired frequency range of 6.35-675 GHz, in an embodiment.

FIG. 55 is a composite graph 5500 showing the response curve of graph 5400, FIG. 54, and a desired frequency range 5502 of 6.35-675 GHz. Frequencies outside desired frequency range 5502 (i.e., below 6.35 GHz and above 6.75 GHz) are not desired. As noted above, energy from a signal at a frequency close to the desired range may pass through the front end to be received by the analog detection circuitry of the "off-the-shelf" receiver. Since ping 402 is transmitted at 1 mW, it does not take very much stray energy from a signal at a frequency outside desired frequency range 5502 to disrupt detection of the ping.

Receiver 104 is improved, as compared to the "off-the-shelf" receivers described above, by inserting a band-pass filter 5320 immediately after antenna 602 and before programmable gain stage 604, as shown in FIG. 53. An ideal band-pass filter has unity gain in the pass band (i.e., 6.35-6.75 GHz) and 100% attenuation outside the pass band (i.e., frequencies below 6.35 GHz and above 6.75 GHz). Desired frequency range 5502 represents an ideal 6.35-6.75 GHz band-pass filter implementation. In practice, at UWB frequencies, the introduction of any circuit elements in the signal path introduces some level of attenuation, known as "insertion loss". Insertion loss thereby degrades signals from tags 101. Therefore, a critical design goal of band-pass filter 5320 is to minimize insertion loss. In practice, analog filters also do not have a vertical roll off (i.e., fast change in response) between the pass and the reject bands. However, the steeper the roll off between pass band and reject bands, the more effective the band-pass filter is in blocking undesired energy from passing through to the programmable gain stage 604 and detection electronics 606. Thus, a second critical design goal of band-pass filter 5320 is to provide a very steep roll off between the pass band and the reject bands.

Physical Implementation

Figure 56:
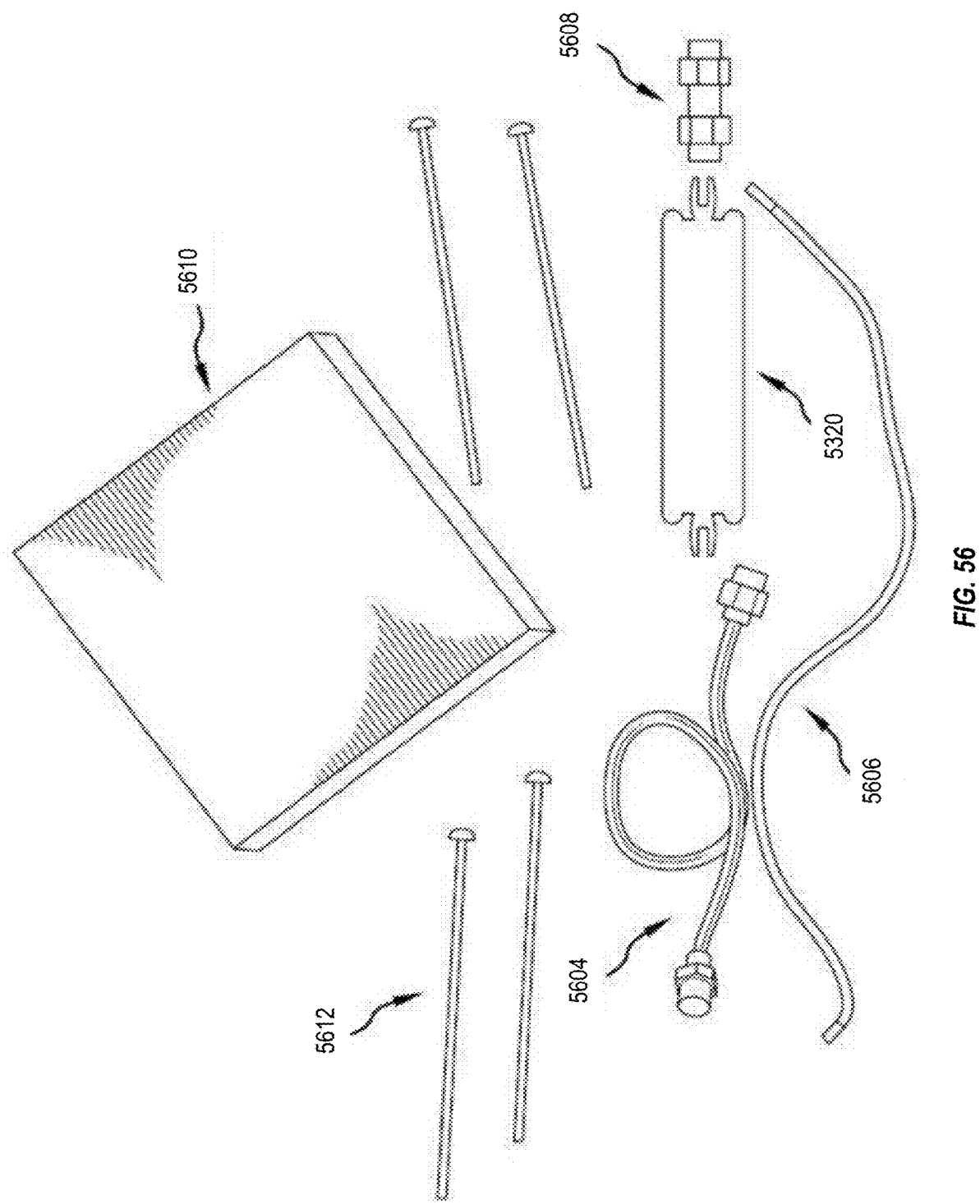
FIG. 56 shows exemplary components used to upgrade an "off-the-shelf" receiver to create a band-pass filter enhanced UWB receiver for use within a game day environment.

FIG. 56 shows exemplary components that are used to upgrade an "off-the-shelf" receiver (i.e., a commercially available UWB receiver) to a band-pass filter enhanced UWB Receiver (i.e., receiver 104) for use within a game day environment. In particular, FIG. 56 shows one 6.35-6.75 GHz band-pass filter stage 5320, one extended coax cable 5604, one extended data ribbon cable 5606, one coax coupler 5608, one extrusion extension 5610, and four extra-long housing screws 5612.

Figure 57:
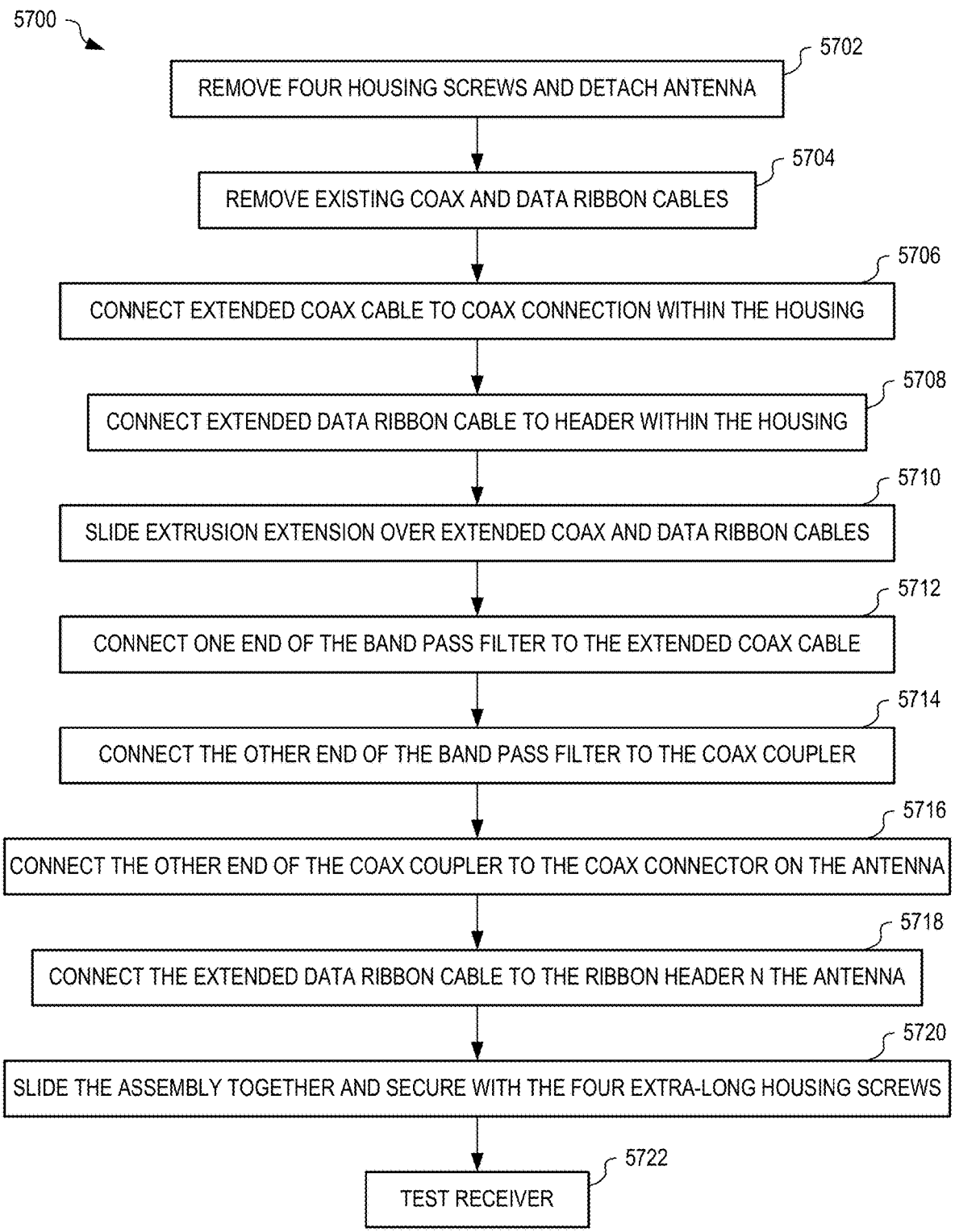
FIG. 57 is a flowchart illustrating one exemplary method for modifying and improving an "off-the-shelf" receiver to create the receiver of FIG. 1.
Figure 58:
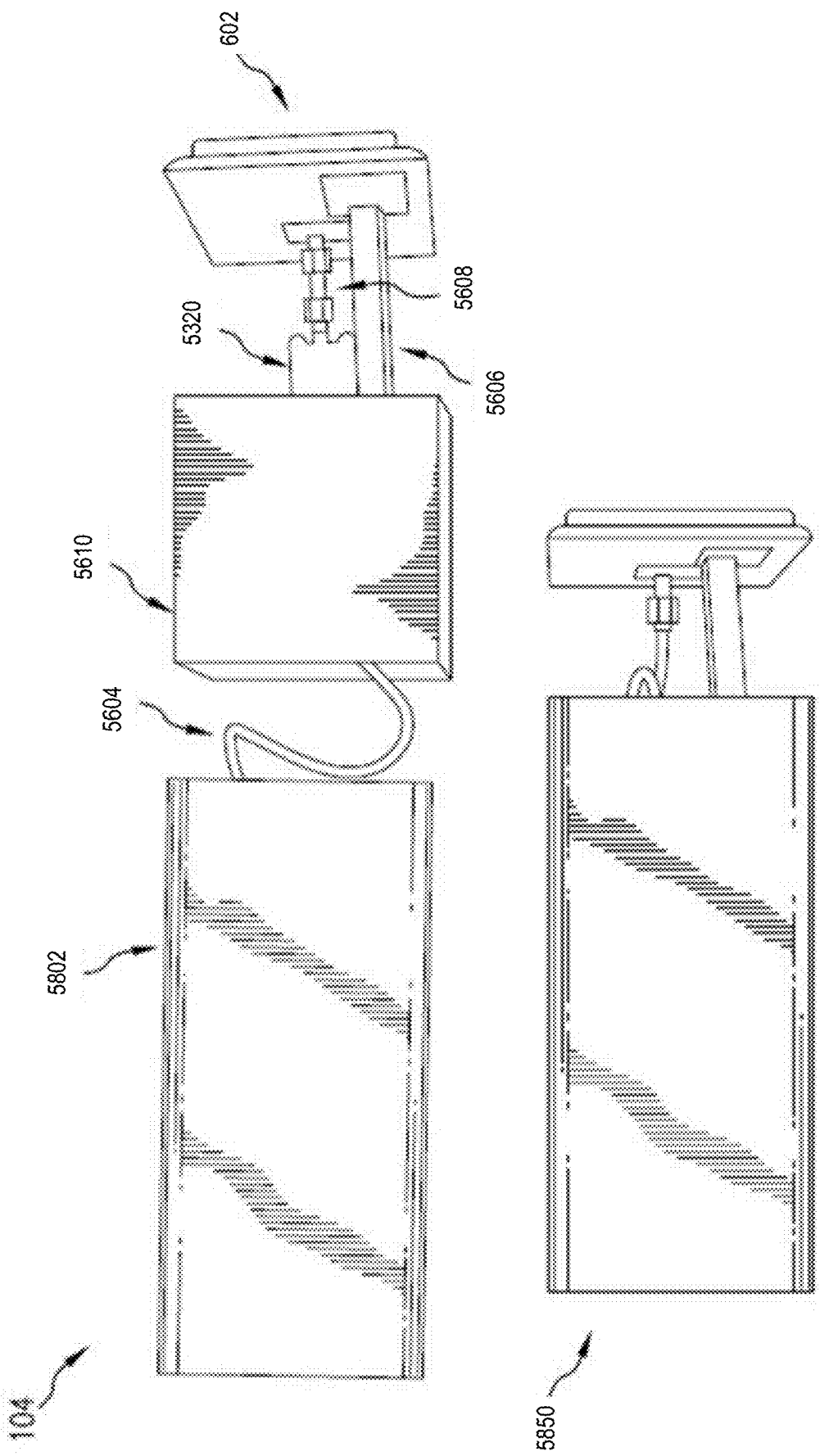
FIG. 58 shows an assembly view of the receiver of FIG. 1 and of an "off-the-shelf" receiver.
Figure 59:
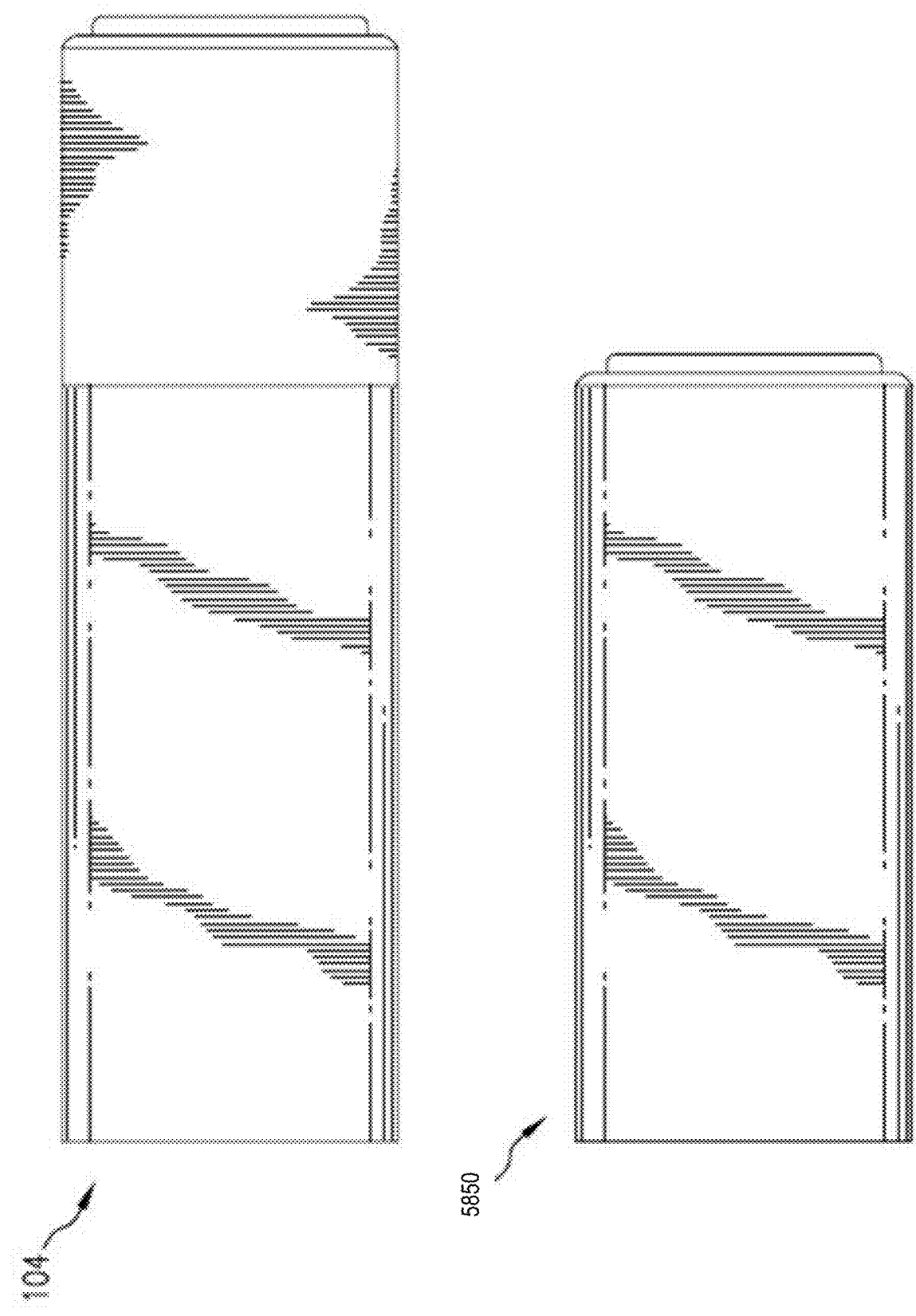
FIG. 59 shows the receiver of FIG. 1 assembled and in comparison to the assembled "off-the-shelf" receiver.

FIG. 57 is a flowchart illustrating one exemplary method 5700 for modifying and improving an "off-the-shelf" receiver to create a receiver 104 that receives ping 402 when operating within a game day environment. FIG. 58 shows an assembly view of receiver 104 and of an "off-the-shelf" receiver 5850. FIG. 59 is a side view showing receiver 104 assembled and in comparison to the assembled "off-the-shelf" receiver 5850. FIGS. 56 through 59 are best viewed together with the following description.

In step S702, method 5700 removes the four housing screws and detaches the antenna. In one example of step S702, four housing screws are removed and antenna 602 is detached from housing 5802. In step S704, method 5700 removes the existing coax and data ribbon cables. In step S706, method 5700 connects the extended coax cable to the coax connector in the housing. In one example of step S706, extended coax cable 5604 is coupled to a coax connector within housing 5802 of receiver 104. In step S708, method 5700 connects the extended data ribbon cable to the ribbon header in the receiver housing. In one example of step S708, extended ribbon cable 5606 connects to a ribbon cable header within housing 5802. In step 5710, method 5700 slides the extrusion extension over the extended coax and data ribbon cables. In one example of step S710, extrusion extension 5610 is slid over extended coax cable 5604 and extended ribbon cable 5606. In step 5712, method 5700 connects one end of the band-pass filter to the extended coax cable. In one example of step 5712, a first end of band pass filter 5320 couples to the free end of extended coax cable 5604. In step S714, method 5700 connects the free end of the band-pass filter to the coax coupler. In one example of step 5714, the second end of band pass filter 5320 couples with a first end of coax coupler 5608. In step S716, method 5700 connects the other end of the coax coupler to the coax connector on the antenna. In one example of step 5716, the second end of coax coupler 5608 is coupled with a coax connector of antenna 602. In step S718, method 5700 connects the extended data ribbon cable to the ribbon header on the antenna. In one example of step S718, the second end of extended ribbon cable 5606 is coupled with a ribbon cable header on antenna 602.

In step 5720, method 5700 carefully slides the assembly together and secure with 4 extra-long housing screws. In one example of step 5720, housing 5802, extruded extension 5610, and antenna 602 are slid together and secured with extra-long housing screws 5612.

In step 5722, method 5700 tests receiver 104 to make certain it was not compromised during the upgrade and that significant insertion losses were not incurred. In one example of step 5722, receiver 104 is evaluated within a test chamber to ensure that band pass filter 5320 does not introduce excessive insertion loss or cause excessive attenuation in the pass band.

Dynamic Antenna Orientation Adjustment

Figure 60:
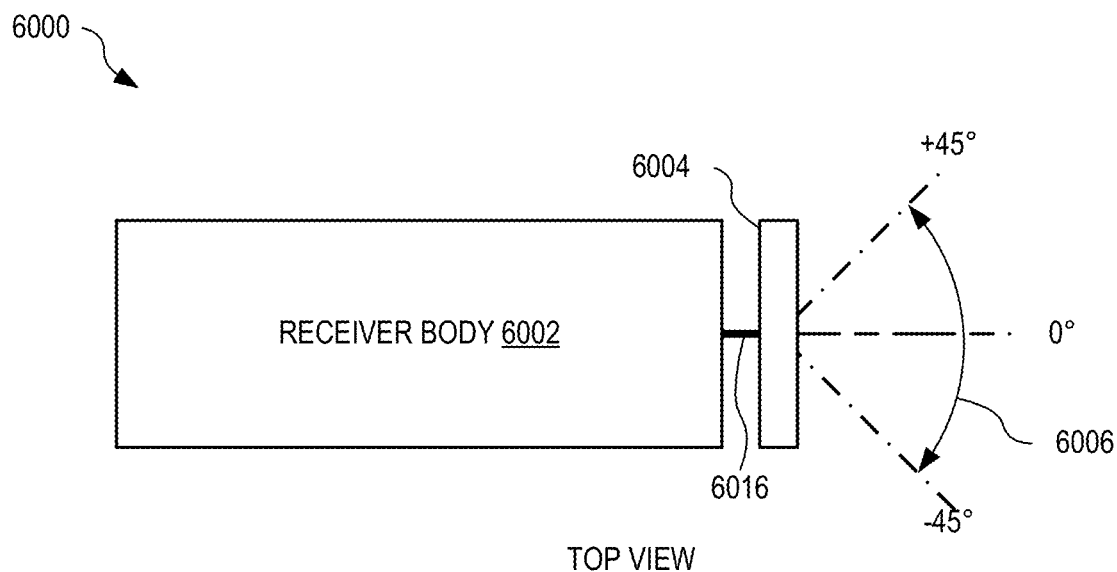
FIGS. 60 and 61 show one exemplary receiver having a receiver body and an antenna with remotely controlled pan and tilt functionality, in an embodiment.
Figure 61:
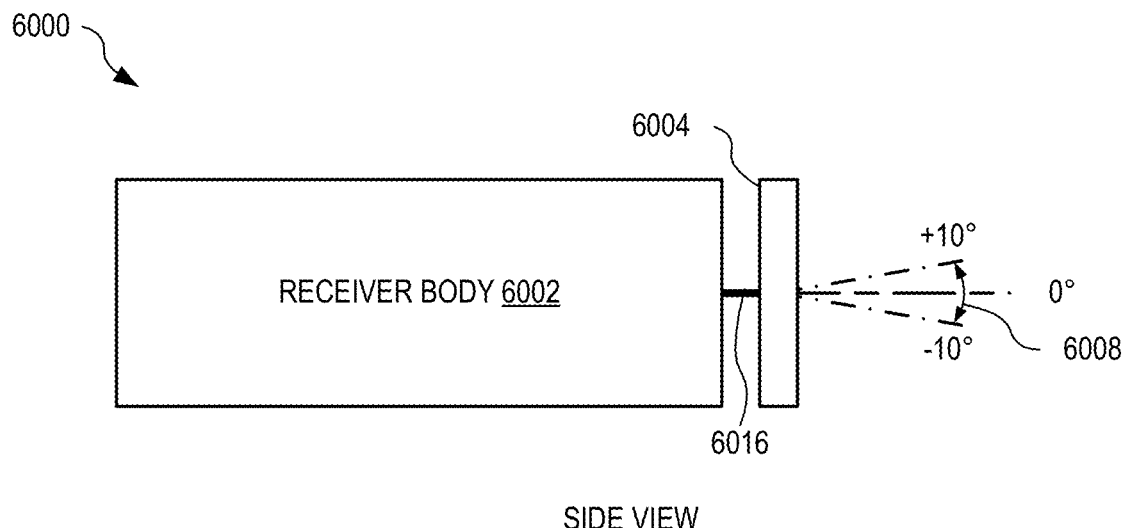

FIGS. 60 and 61 show one exemplary receiver 6000 having a receiver body 6002 and an antenna 6004 with remotely controlled pan and tilt functionality. Antenna 6004 is articulated 6016 (e.g., by servo motors) in response to received commands from processing hub 150 for example. FIG. 60 is a top view of receiver 6000 illustrating pan movement 6006 of antenna 6004 relative to receiver body 6002 and FIG. 61 is a side view of receiver 6000 illustrating tilt movement 6008 of antenna 6004 relative to receiver body 6002. Receiver 6000 has similar functionality to receiver 104 of FIG. 1, and may be used within object tracking system 100, FIG. 1, together with, or in place of, receivers 104. Optimizer 160 is configured with antenna direction optimization software (illustrated below in FIGS. 62, 63, and 64) for remotely controlling direction (pan and tilt) of antennae 6004 during operation of system 100.

In an alternate embodiment, receiver 104 is mounted on a remote-controlled mount that has pan and tilt functionality, wherein pan and tilt of receiver 104 may be controlled to optimize performance of object tracking system 100. For example, receiver 104 is mounted on a platform with pan and tilt functionality that may be controlled from optimizer 160 and optionally via receiver 104.

During installation of receivers 6000 for use with system 100, antenna 6004 of each receiver 6000 is positioned at its neutral position (e.g., mid-way in both pan and tilt motion) relative to receiver body 6002. Receivers 6000, as with receivers 104, are then each aligned to receive signals from their assigned area of interest within operational area 102 as evenly as possible. During operation of system 100, antennae 6004 are then each individually positioned (using pan and tilt commands for example) to optimize performance of system 100 based upon determined situations of interest (e.g., location of tags 101 of tag set 3512(1)) within operational area 102. For example, each antenna 6004 may be adjusted such that receiver events 110 generated by pings 402 from tags 101 associated with the situation of interest are maximized, thereby increasing the likelihood that receiver 6000 will be involved in locating these tags, increasing locate-to-ping ratio (e.g., locate-to-ping ratio 4340, FIG. 43) within system 100, and thereby increase data quality for those tags.

Figure 62:
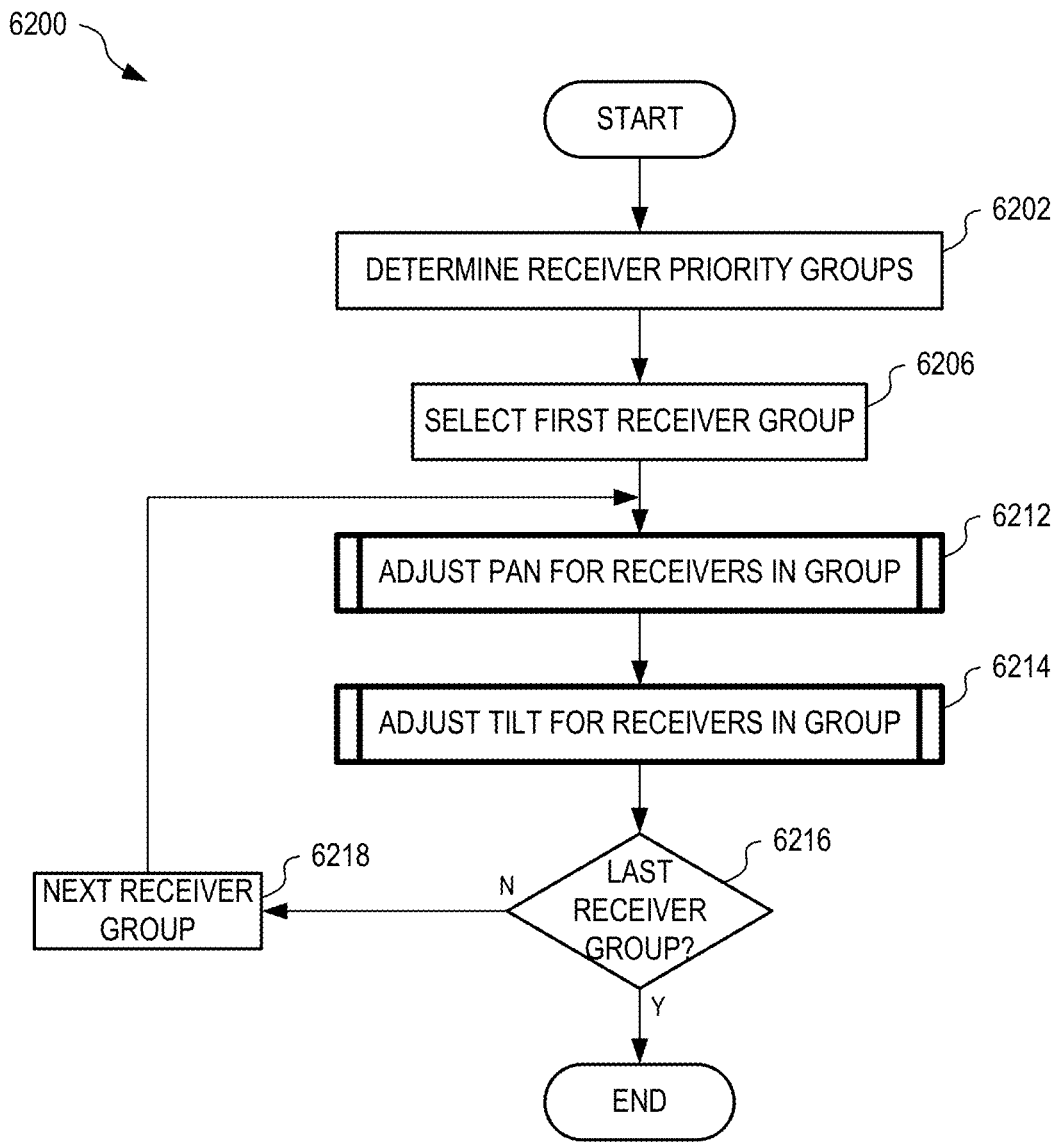
FIGS. 62, 63, and 64 are flowcharts illustrating one exemplary method and sub-methods for optimizing performance of the object tracking system of FIG. 1 by automatically and dynamically adjusting one or both of pan and tilt of the antennae of FIGS. 60 and 61 to improve data quality determined from tags associated with a situation of interest, in an embodiment.
Figure 63:
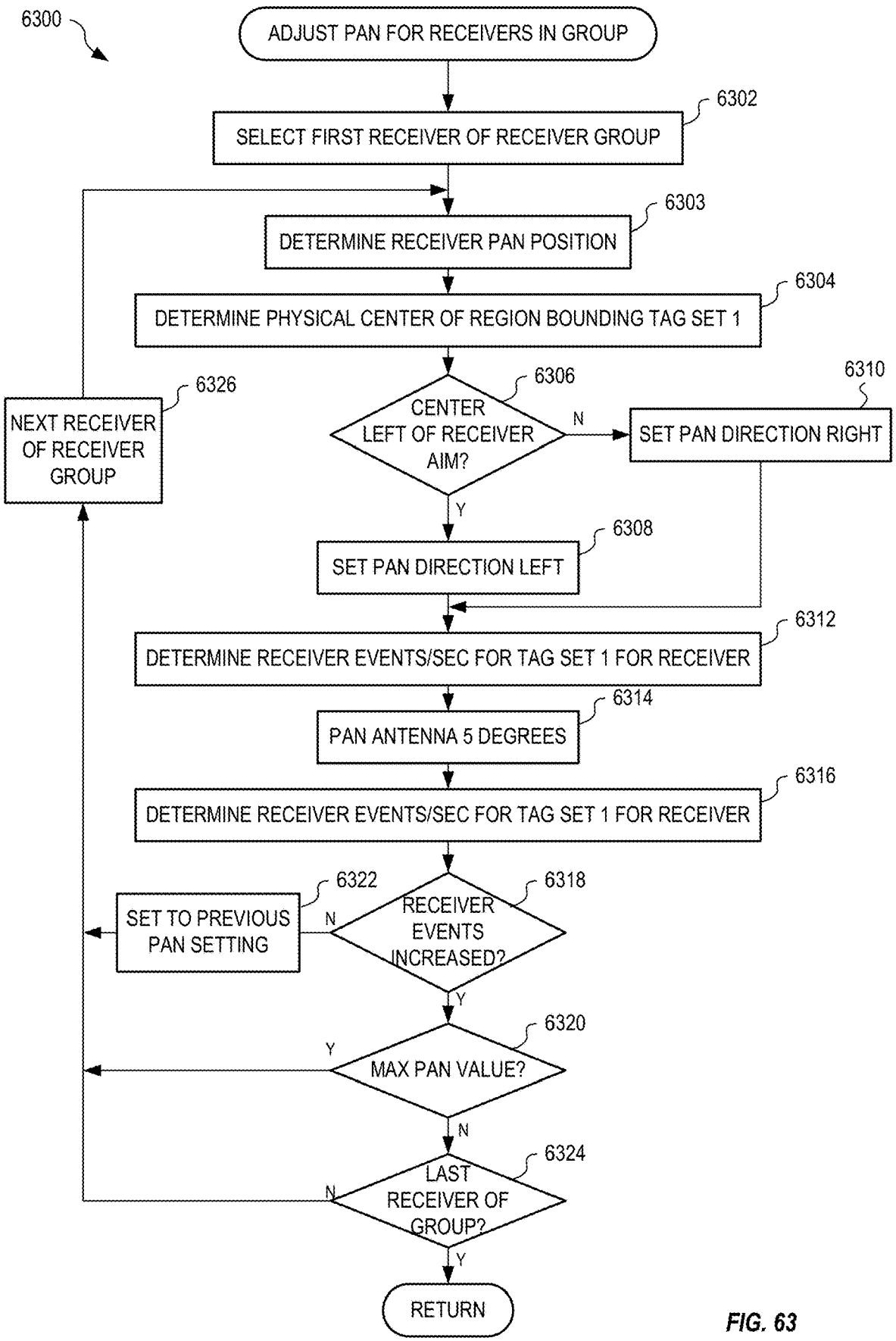
Figure 64:
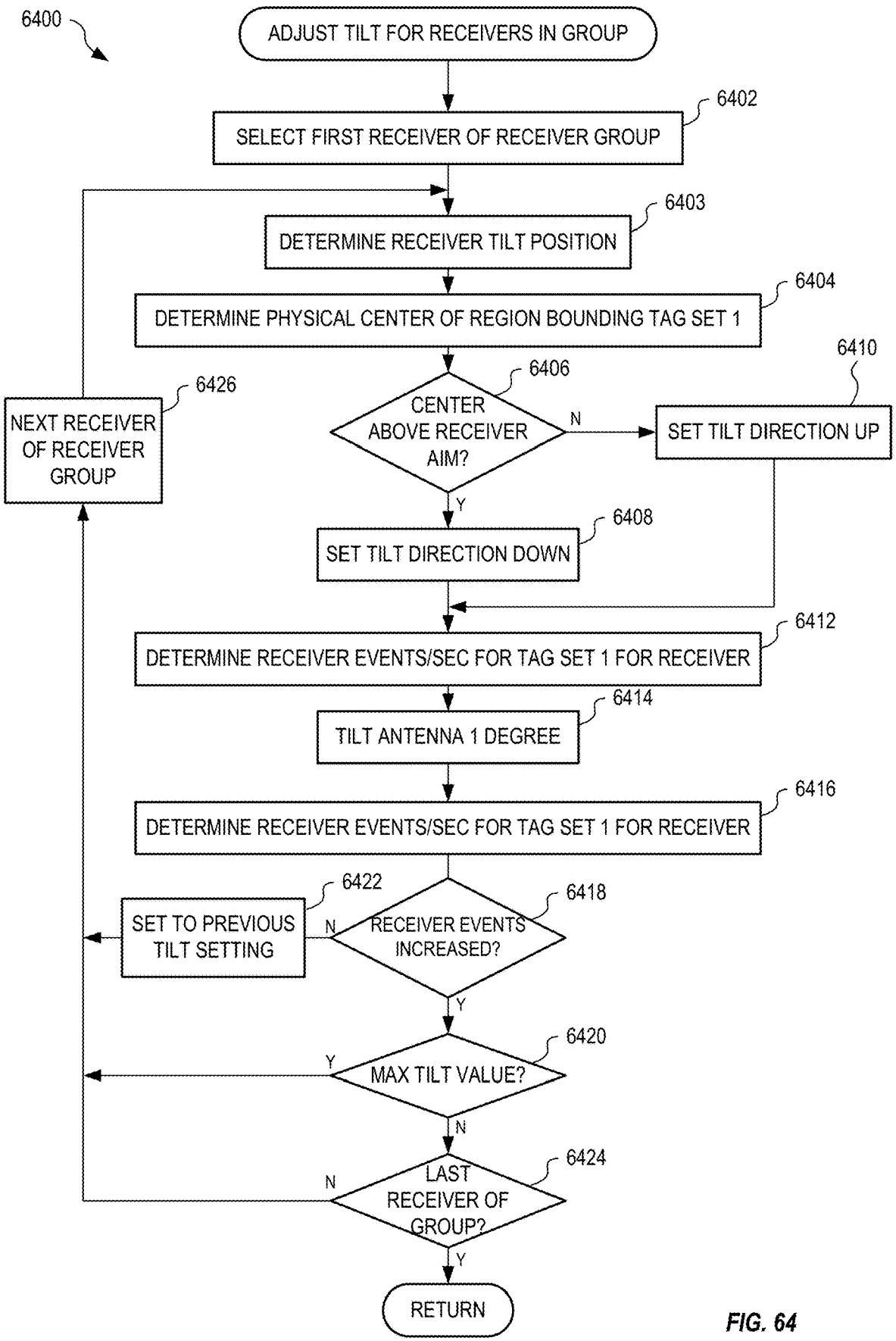

FIGS. 62, 63, and 64 are flowcharts illustrating one exemplary method 6200 and sub-methods 6300, 6400 for optimizing performance of object tracking system 100 by automatically and dynamically adjusting one or both of pan and tilt of antennae 6004 to improve data quality determined from tags 101 associated with a situation of interest. FIGS. 62, 63, and 64 are best viewed together with the following description. Method 6200 and sub-methods 6300 and 6400 are for example implemented within optimizer 160 of system 100, FIG. 1. In the following example, tag set 3512(1) defines the situation of interest; however, any tag 101 or group of tags may be used to define the situation of interest without departing from the scope hereof.

In step 6202, method 6200 determines receiver priority groups. In one example of step 6202, receiver event allocator 4302 determines receiver groups 4330 based upon the importance of each receiver 104 for determining locates of tags 101 identified within high priority tag set 3512(1).

In step 6206, method 6200 selects a first receiver group. In one example of step 6206, optimizer 160 selects receiver group 4330(1), as shown in the example of FIG. 47.

In step 6212, method 6200 invokes sub-method 6300 to adjust pan of receivers 6000 identified within the current receiver group. In step 6214, method 6200 invokes sub-method 6400 to adjust tilt of receivers 6000 identified within the current receiver group.

Step 6216 is a decision. If, in step 6216, method 6200 determines that the last receiver group has been processed, method 6200 terminates; otherwise method 6200 continues with step 6218. In step 6218, method 6200 selects the next receiver group. In one example of step 6218, optimizer 160 selects receiver group 4330(2). Method 6200 then continues with step 6212.

Steps 6212 through 6218 repeat for each receiver group.
Pan Adjustment

In step 6302, sub-method 6300 selects a first receiver of the current receiver group. In one example of step 6302, optimizer 160 selects receiver 104(1) of receiver group 4330(1). In step 6303, sub-method 6300 determines the current receiver pan angle. In one example of step 6303, optimizer 160 retrieves a stored value of antenna 6004 pan position of receiver 6000 that is set (a) during receiver initialization (e.g., when each receiver 6000 is set to zero degrees of pan and zero degree of tilt) and (b) when the position of antenna 6004 is updated (e.g., position updates from step 6314).

In step 6304, sub-method 6300 determines a physical center of a region bounding a tag set defining a situation of interest. In one example of step 6304, a center location of a smallest three-dimensional polygonal shape containing all locations of tags 101 within tag set 3512(1) is determined. Step 6304 may occur immediately after step 6302 such that the physical center of the region bounding tag set 1 is determined outside of the loop formed by repeated steps 6303 through 6326.

Step 6306 is a decision. If, in step 6306, sub-method 6300 determines that the center of the situation of interest is left of the current receiver's aim, then sub-method 6300 continues with step 6308; otherwise, sub-method 6300 continues with step 6310. In step 6308, sub-method 6300 sets a pan direction to "left". Sub-method 6300 then continues with step 6312. In step 6310, sub-method 6300 sets the pan direction to "right."

In step 6312, sub-method 6300 determines a receiver-events-per-second value for the tag set defining the situation of interest for the current receiver. In one example of step 6312, receiver event allocator 4302 processes locate data 120 to determine a total count of receiver events 110 associated with pings 402 of tags 101 identified within tag set 3512(1) over a selected sample period for receiver 6000, and then calculates the number of receiver events per second. In step 6314, sub-method 6300 commands the antenna 6004 of the current receiver to pan five degrees in the current pan direction. In one example of step 6314, optimizer 160 sends a command to receiver 6000 to pan antenna 6004 five degrees to the left. Other pan angle increments may be used without departing from the scope hereof. For example, step 6314 may pan antenna 6004 one and a half degrees in the current pan direction. Step 6316 is similar to step 6312, wherein sub-method 6300 determines a receiver events per second value for the tag set defining the situation of interest for the current receiver.

Step 6318 is a decision. If, in step 6318, sub-method 6300 determines that the number of receiver events for the current receiver has increased, sub-method 6300 continues with step 6320; otherwise, sub-method 6300 continues with step 6322. In step 6322, sub-method 6300 sets the antenna of the current receiver to the previous pan setting. In one example of step 6322, optimizer 160 commands antenna 6004 of receiver 6000 to pan back five degrees. Sub-method 6300 then continues with step 6326.

Step 6320 is a decision. If, in step 6320, sub-method 6300 determines that the antenna is at a maximum pan value, sub-method 6300 continues with step 6326; otherwise, sub-method 6300 continues with step 6324.

Step 6324 is a decision. If, in step 6324 sub-method 6300 determines that the current receiver is the last receiver of the current receiver group, sub-method 6300 returns control to method 6200; otherwise, sub-method 6300 continues with step 6326.

In step 6326, sub-method 6300 selects the next receiver of the current receiver group. In one example of step 6326, optimizer 160 selects receiver 104(3) of receiver group 4330(1). Sub-method 6300 then continues with step 6303. Steps 6303 through 6326 repeat for each receiver in the current receiver group, wherein pan of antenna 6004 of each receiver 6000 is adjusted to maximize receiver events per second at the receiver for tags 101 within tag set 3512(1) that identify the situation of interest.

Tilt Adjustment

In step 6402, sub-method 6400 selects a first receiver of the current receiver group. In one example of step 6402, optimizer 160 selects receiver 104(1) of receiver group 4330(1). In step 6403, sub-method 6400 determines the current receiver tilt angle. In one example of step 6403, optimizer 160 retrieves a stored value of antenna 6004 tilt position of receiver 6000 that is set (a) during receiver initialization (e.g., when each receiver 6000 is set to zero degrees of pan and zero degree of tilt) and (b) when the position of antenna 6004 is updated (e.g., position updates from step 6414).

In step 6404, sub-method 6400 determines a physical center of a region bounding a tag set defining a situation of interest. In one example of step 6404, a center location of a smallest three-dimensional polygonal shape containing all locations of tags 101 within tag set 3512(1) is determined. Step 6404 may occur immediately after step 6402 such that the physical center of the region bounding tag set 1 is determined outside of the loop formed by repeated steps 6403 through 6426.

Step 6406 is a decision. If, in step 6406, sub-method 6400 determines that the center of the situation of interest is above the current receiver's aim, then sub-method 6400 continues with step 6408; otherwise, sub-method 6400 continues with step 6410. In step 6408, sub-method 6400 sets a tilt direction to "down". Sub-method 6400 then continues with step 6412. In step 6410, sub-method 6400 sets the tilt direction to "up."

In step 6412, sub-method 6400 determines a receiver-events-per-second value for the tag set defining the situation of interest for the current receiver. In one example of step 6412, receiver event allocator 4302 processes locate data 120 to determine a total count of receiver events 110 associated with pings 402 of tags 101 identified within tag set 3512(1) over a selected sample period for receiver 6000, and then calculates the number of receiver events per second. In step 6414, sub-method 6400 commands the antenna 6004 of the current receiver to tilt one degree in the current tilt direction. In one example of step 6414, optimizer 160 sends a command to receiver 6000 to tilt antenna 6004 one degree up. Other tilt angle increments may be used without departing from the scope hereof. For example, step 6414 may tilt antenna 6004 one and a half decrees in the current tilt pan direction. Step 6416 is similar to step 6412, wherein sub-method 6400 determines a receiver events per second value for tags 101 within the tag set defining the situation of interest for the current receiver.

Step 6418 is a decision. If, in step 6418, sub-method 6400 determines that the number of receiver events for the current receiver has increased, sub-method 6400 continues with step 6420; otherwise, sub-method 6400 continues with step 6422. In step 6422, sub-method 6400 sets the antenna of the current receiver to the previous tilt setting. In one example of step 6422, optimizer 160 commands antenna 6004 of receiver 6000 to tilt back one degree. Sub-method 6400 then continues with step 6426.

Step 6420 is a decision. If, in step 6420, sub-method 6400 determines that the antenna is at a maximum tilt value, sub-method 6400 continues with step 6426; otherwise, sub-method 6400 continues with step 6424.

Step 6424 is a decision. If, in step 6424 sub-method 6400 determines that the current receiver is the last receiver of the current receiver group, sub-method 6400 returned control to method 6200; otherwise, sub-method 6400 continues with step 6426.

In step 6426, sub-method 6400 selects the next receiver of the current receiver group. In one example of step 6426, optimizer 160 selects receiver 104(3) of receiver group 4330(1). Sub-method 6400 then continues with step 6403. Steps 6403 through 6426 repeat for each receiver in the current receiver group, wherein tilt of antenna 6004 of each receiver 6000 is adjusted to maximize receiver events per second at the receiver for tags 101 within tag set 3512(1) that identify the situation of interest.

Method 6200 and sub-methods 6300 and 6400 adjust antennae 6004 of receivers 6000 beginning with receivers of a high priority group (e.g., receiver group 4330(1) that bound tags 101 of tag set 3512(1)), since these receivers are most likely to impact locate-to-ping ratio 4340 for tags associated with the situation of interest (e.g., tags 101 within tag set 3512(1)). The range of adjustment for panning antenna 6004 is much greater than the range for tilting antenna 6004 and panning is more likely to increase the number of receiver events 110 associated with tags 101 of tag set 3512(1). Therefore, first pan is adjusted for all receivers 6000 then tilt is adjusted for all receivers 6000.

Selectable Receiver Front-Ends

Although a sporting example is used within the following examples, other types of event and arena may be used without departing from the scope hereof.

Figure 65:
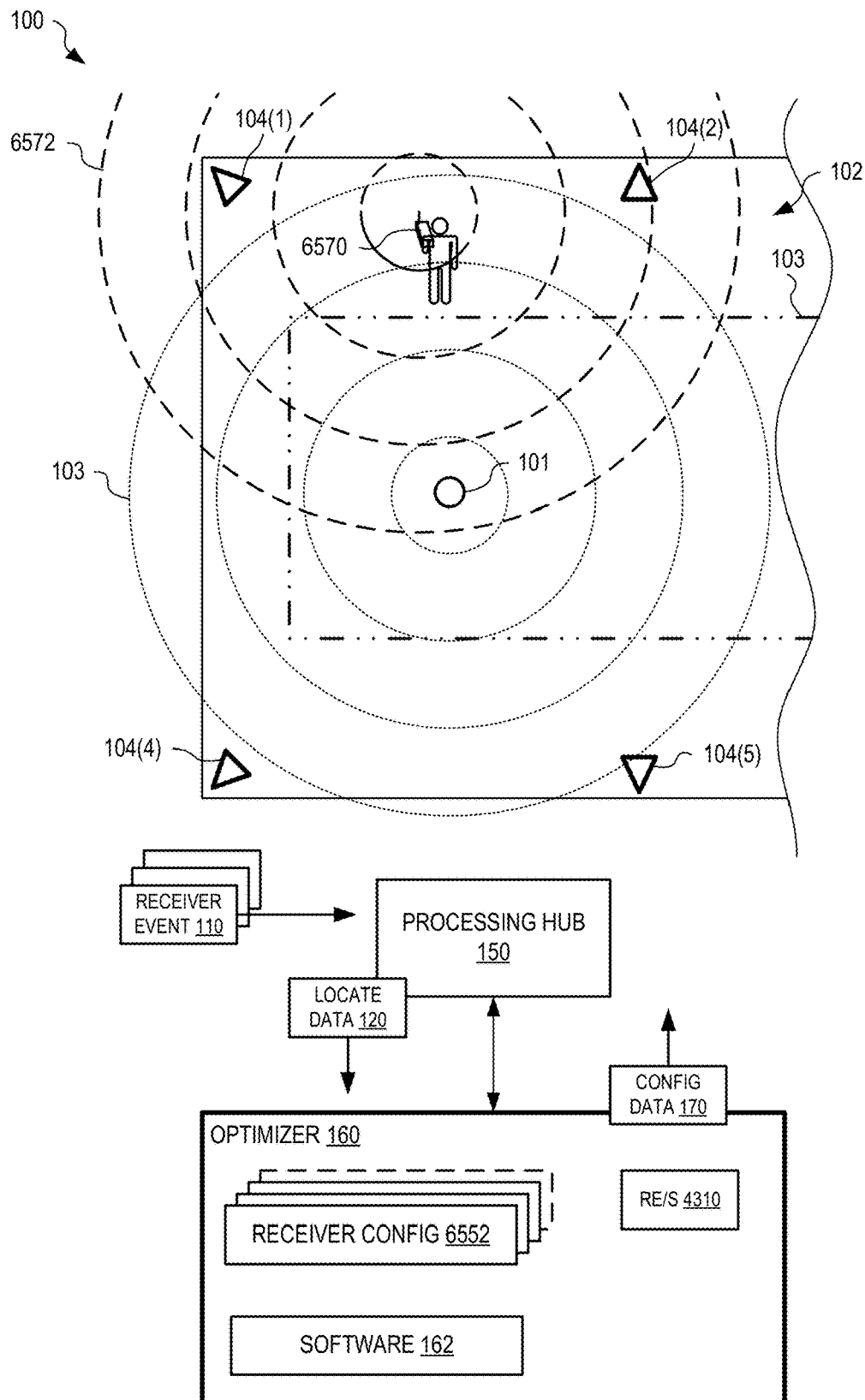
FIG. 65 shows one exemplary automatic object tracking system optimizer for automatically selecting optimal receiver configuration based upon environmental conditions, in an embodiment.

FIG. 65 shows one exemplary scenario where an interferer 6570 interferes with operation of system 100, FIG. 1. Object tracking system 100 inevitably encounters environmental and/or situational changes that were not present during installation of the system. For example, as shown in FIG. 65, interferer 6570 (e.g., a wireless camera) transmits a wireless signal 6572 that introduces changes in spectral content within operational area 102 that interferes with operation of object tracking system 100, particularly where wireless signal 6572 is at a frequency that is at, or near, a center frequency of wireless signals detected by receivers 104. Signal 6572 from interferer 6570 may be quite powerful relative to signal strength of ping 402 from tag 101, and interferer 6570 may also be located nearer to one or more receivers 104 than tag 101. Signal 6572 may therefore saturate sensitive front-end circuitry of receiver 104, thereby making the receiver unresponsive to pings 402 from tags 101.

In the embodiment of FIG. 65, receivers 104 are dynamically configurable, under control of optimizer 160, to overcome environmental and situational changes within operational area 102. For example, in-line frequency filtering circuitry, such as a band pass filter, may be introduced, under control of optimizer 160, within receiver 104 to block signal 6572 from saturating the sensitive analog circuitry (e.g., detection electronics 606) of the receiver. Receiver 104 may also benefit from further front end adjustment to maintain optimal performance of object tracking system 100. For example, where tag 101 densities (e.g., the number of tags within a certain area) are dynamically shifting, receiver 104 may benefit from different antenna configurations that offer a variety of range and scope capabilities.

Optimizer 160, based upon locate data 120, dynamically determines optimal configuration for each receiver 104 and sends each receiver 104 configuration data 170 to affect that optimal configuration.

Optimal configuration for each receiver 104 may be achieved by introduction of a single component in the receiver's front-end. However, electronically switching analog components operating at the high frequencies of UWB tags 101 is not practical because the analog circuitry is extremely sensitive and switching of analog components would be disruptive to operation. To overcome this impracticality, the analog circuitry is repeated for each desired analog configuration such that each receiver may have multiple self-contained analog front ends that vary in their components (e.g. antennas and/or frequency filters) and that are switched into use by the receiver based upon desired receiver performance. Specifically, switching between multiple front ends is implemented digitally, thereby avoiding the impracticalities of analog switching.

Figure 66:
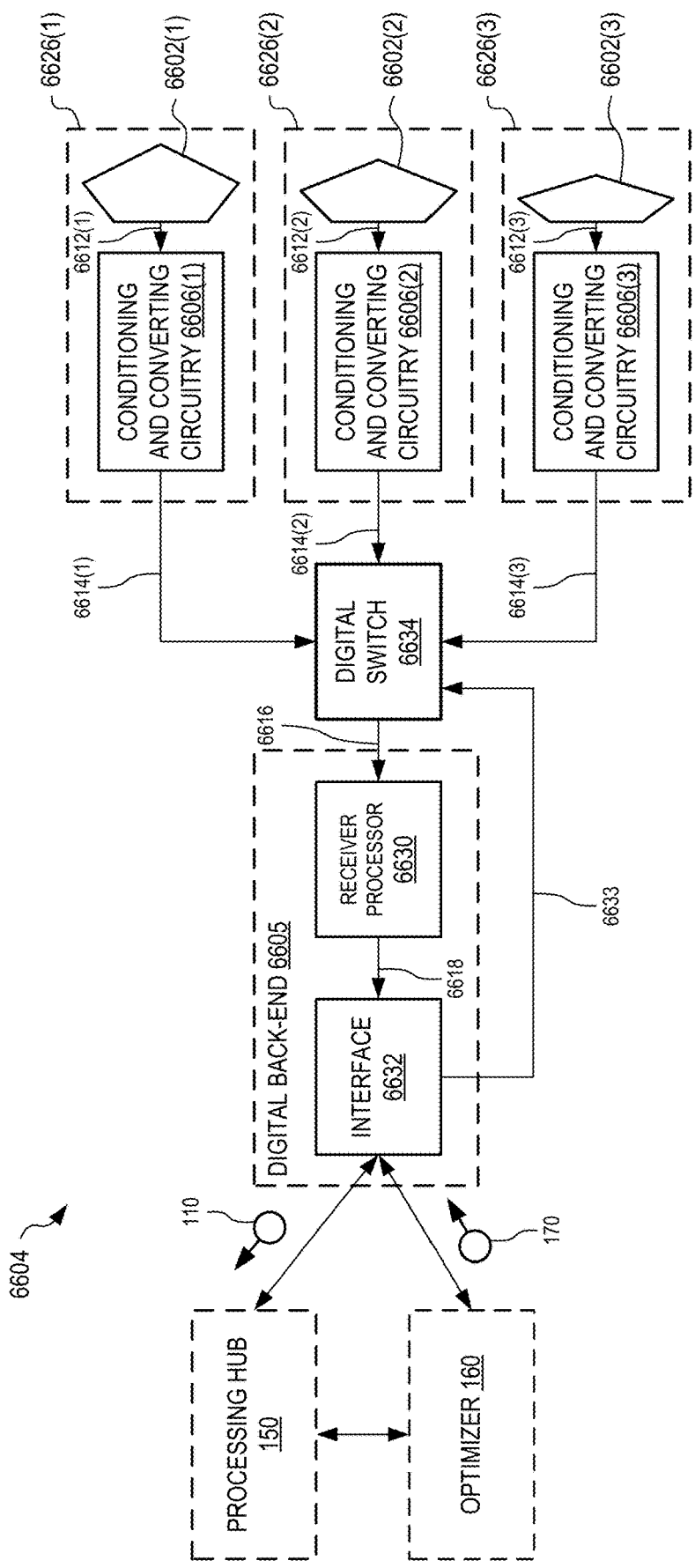
FIG. 66 is a schematic showing a receiver of the object tracking system of FIGS. 1 and 65 illustrating selectable different front ends, in an embodiment.

FIG. 66 is a schematic showing a receiver 6604 for use with object tracking system 100 of FIG. 1 and illustrating selectable different front ends 6626. Receiver 6604 may be used to implement any one or more of receivers 104 of FIG. 1. FIGS. 67-69 show exemplary scope and range characteristics of antennae 6602(1)-(3) of FIG. 66, respectively. FIGS. 66-69 are best viewed together with the following description.

Receiver 6604 includes a digital switch 6634 positioned between a digital backend 6605 and a plurality of analog front ends 6626(1)-(3). Each analog front end 6626(1)-(3) includes a conditioning and converting circuitry 6606(1)-(3), and an antenna 6602(1)-(3), respectively, where conditioning and converting circuitry 6606 is configured for conditioning an analog signal 6612 from antenna 6602 and converting the conditioned analog signal into a digital signal 6614 that is input to digital switch 6634.

Digital backend 6605 includes a receiver processor 6630, which receives and decodes a digital signal 6616 from digital switch 6634, and an interface 6632 for communicating with processing hub 150. For example, based upon decoded signal 6618, interface 6632 sends receiver event 110 to processing hub 150. Interface 6632 may also receive configuration data 170 from optimizer 160 (optionally via processing hub 150) and control 6633 digital switch 6634 to select one of the analog front ends 6626 based upon configuration data 170. Antennae 6602(1)-(3) each have different scope and range characteristics.

Antenna 6602(1) is configured with characteristics 6700(1) that have a long range 6702 (e.g., up to three-hundred and ninety feet) and a narrow scope 6704 (e.g., thirty degrees). Antenna 6602(2) is configured with characteristics 6700(2) that have a medium range 6802 (e.g., up to two-hundred-ten feet) and a medium scope 6804 (e.g., ninety degrees). Antenna 6602(3) is configured with characteristics 6700(3) that have a short range 6902 (e.g., up to one-hundred and twenty feet) and a wide scope 6904 (e.g., one-hundred and eighty degrees). Digital switch 6634 of receiver 6604 is controlled to select one analog front end 6626 having optimum characteristics for current conditions.

Analog front end 6626(1) allows receiver 6604 to detect tags at the greatest distance as compared to other analog front ends 6626(2) and (3). For example, when configured to receive information from analog front end 6626(1), receiver 6604 may detect ping 402 from tag 101 positioned at an opposite end of field of play 103 (e.g., an American Football playing field). This extended range comes at the expense of scope, which is limited to thirty degrees in this example. When configured to receive information from front end 6626(3), receiver 6604 may detect pings 402 from tag 101 when positioned anywhere across the entire width of field of play 103. However, this expanded scope comes at the expense of range, which, in this example, is limited to a maximum of one-hundred and twenty feet. Front end 6626(2) allows receiver 6604 to detect ping 402 from tag 101 within a range and scope that approximately midway between those of front ends 6626(1) and (3). Front end 6626(2) is the default configuration for receiver 6604 and is for example used during initial installation of object tracking system 100, and likely automatically selected by optimizer 160 for use in the vast majority of situations.

Front ends 6626 may be configured with alternative characteristics 6700 without departing from the scope hereof. For example, range and scope of each front end 6626 may be selected based upon the size and shape of operational area 102 and/or field of play 103. Further, not all receivers 104 need be configured with that same number of front ends 6626. For example, where receiver 6604 is positioned such that extended range is not required (e.g., where receiver is positioned at a sideline of an American football field), front end 6626(1) having the longest range 6702 may be omitted.

Figure 70:
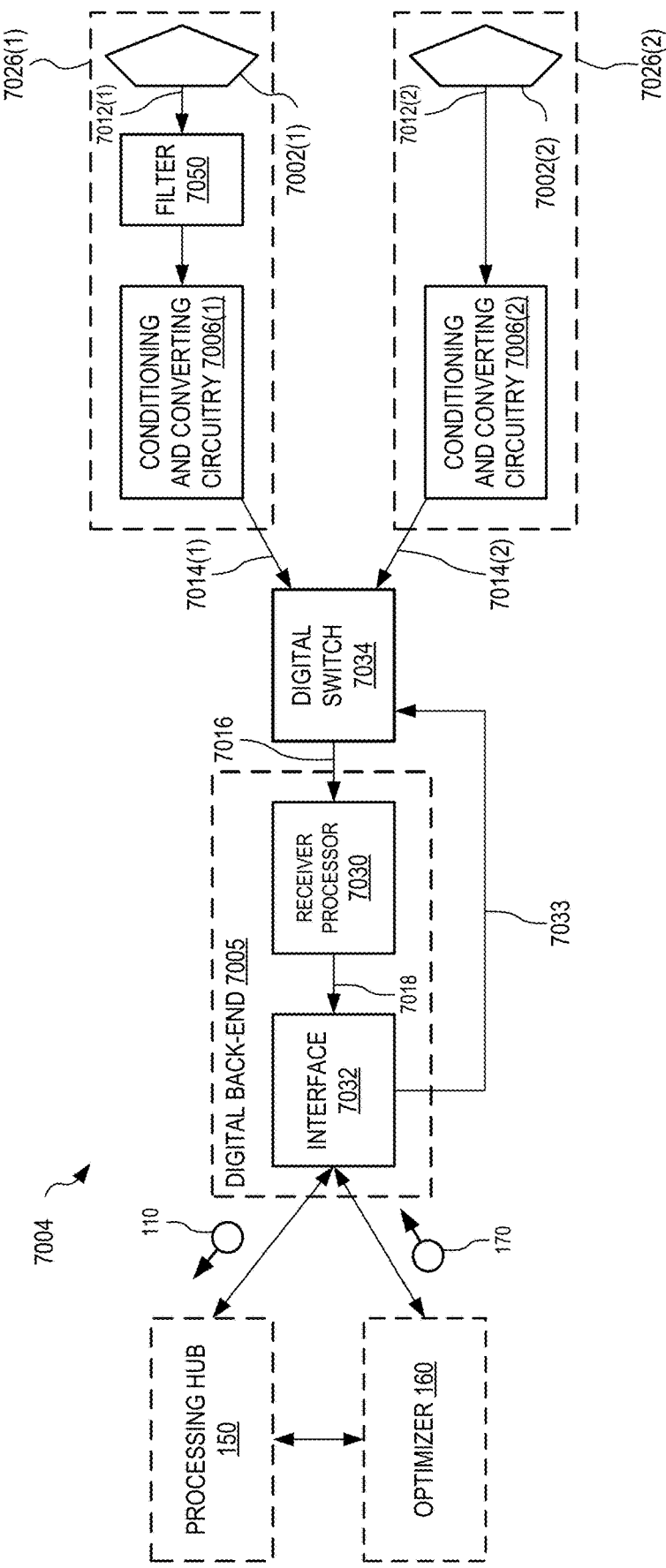
FIG. 70 is a schematic showing a receiver of the object tracking system of FIGS. 1 and 65 illustrating selectable front ends with and without a filter, in an embodiment.

FIG. 70 is a schematic showing a receiver 7004 for use with the object tracking system 100 of FIG. 1 and illustrating selectable front ends 7026 with and without a filter 7050. Receiver 7004 may be used to implement any one or more of receivers 104 of FIG. 1. Receiver 7004 is similar to receiver 6604, FIG. 66, and common components of receiver 7004 operate similarly to components of receiver 6604. Receiver 7004 includes a digital switch 7002 positioned between a digital back end 7005 and a plurality of analog front ends 7026(1)-(2). Digital backend 7005 includes a receiver processor 7030, which receives and decodes a digital signal 7016 from digital switch 7002, and an interface 7032 for communicating with processing hub 150. For example, based upon decoded signal 7018, interface 7032 sends receiver event 110 to processing hub 150. Interface 7032 may also receive configuration data 170 from optimizer 160 (optionally via processing hub 150) and control 7033 digital switch 7002 to select one of analog front ends 7026 based upon configuration data 170.

Each analog front end 7026(1)-(2) includes a conditioning and converting circuitry 7006(1)-(2), and an antenna 7002(1)-(2), respectively. Analog front end 7026(1) is further configured with a filter 7050 positioned between antenna 7002(1) and conditioning and converting circuitry 7006(1), wherein filter 7050 is configured to block frequencies of signal 6572 generated by interferer 6570, such that conditioning and converting circuitry 7006(1) is not saturated by signal 6572. Frequencies of ping 402 are able to pass through filter 7050 and are thereby conditioned and converted by conditioning and converting circuitry 7006(1) to produce signal 614(1) containing information of ping 402. Filter 7050 is for example a 6.5 GHz (+200 MHz) band pass filter. Band pass filters are not included within receivers by default since (a) they are expensive, (b) do not offer any value when interfering signals are not present, and (c) may unnecessarily attenuate pings when included and not needed.

Analog front end 7026(2) does not include a filter and antenna 610(2) is directly coupled with conditioning and converting circuitry 7006(2). Digital switch 7002 of receiver 7004 is controlled to select one analog front end 7026 having optimum characteristics for current conditions. Front end 7026(2) does not block frequencies of signal 6572 and is thereby less optimal when signal 6572 is present within the environment.

Object tracking system 100 may be deployed with one or more receivers 6604, 7004, each configured with digital switches 6634, 7034, and multiple front-ends 6626, 7026, and with optimizer 160 that automatically configures each receiver to handle specific environmental conditions and/or situational changes. Optimizer 160 and system 100 are easier to install, more flexible over time, provide optimal performance at all times, and result in object tracking that is far more fault tolerant than other systems that only have statically configured receivers.

Examples of Operation

Environmental Changes

Continuing with the example of FIG. 65, prior to operation of interferer 6570 (e.g., a wireless broadcast camera), object tracking system 100 is operating with optimal performance (i.e., processing hub 150 is receiving an optimal number of receiver events 110 per second (RE/s)) during an American Football game within operational area 102. When the wireless broadcast camera is activated, interferer 6570 starts generating wireless signal 6572 that immediately changes the environment of object tracking system 100. For example, where signal 6572 has a transmission frequency of 5.9 GHz and is transmitted at a power level of one watt, this is (a) only 600 MHz from the center operating frequency of 6.5 GHz of tag 101 and receivers 104, and (b) at a power level of an order of magnitude greater than the milliwatt transmission power of tag 101. The analog circuitry of some or all receivers 104 becomes saturated by signal 6572, such that one or more receivers 104 cannot detect ping 402. Thus, the number of receiver events 110 received and processed per second by processing hub 150 immediately drops to a sub-optimal level, such as from 1200 RE/s to 200 RE/s, such that location of tag 101 fails.

Within optimizer 160, the RE/s value is monitored during operation of system 100. When the RE/s value drops to a sub-optimal level (e.g., 200 RE/s), system 100 may attempt to employ other techniques to increase RE/s. However, where the environmental change is serious, such as with interferer 6570, these other techniques cannot restore operability of object tracking system 100, resulting in catastrophic loss of locates within locate data 120. Occurrence of such catastrophic failure indicates a significant change in the environment, such as the introduction of one or more interferers.

Optimizer 160 operates to configure characteristics of one or more receivers 7004 to filter out the effects of signal 6572. For example, optimizer 160 may send configuration data 170 to interface 7032, which controls digital switch 7002 to select signal 7014(1) from front end 7026(1) for input to digital back-end 7005, such that interference by signal 6572 is reduced.

Figure 71:
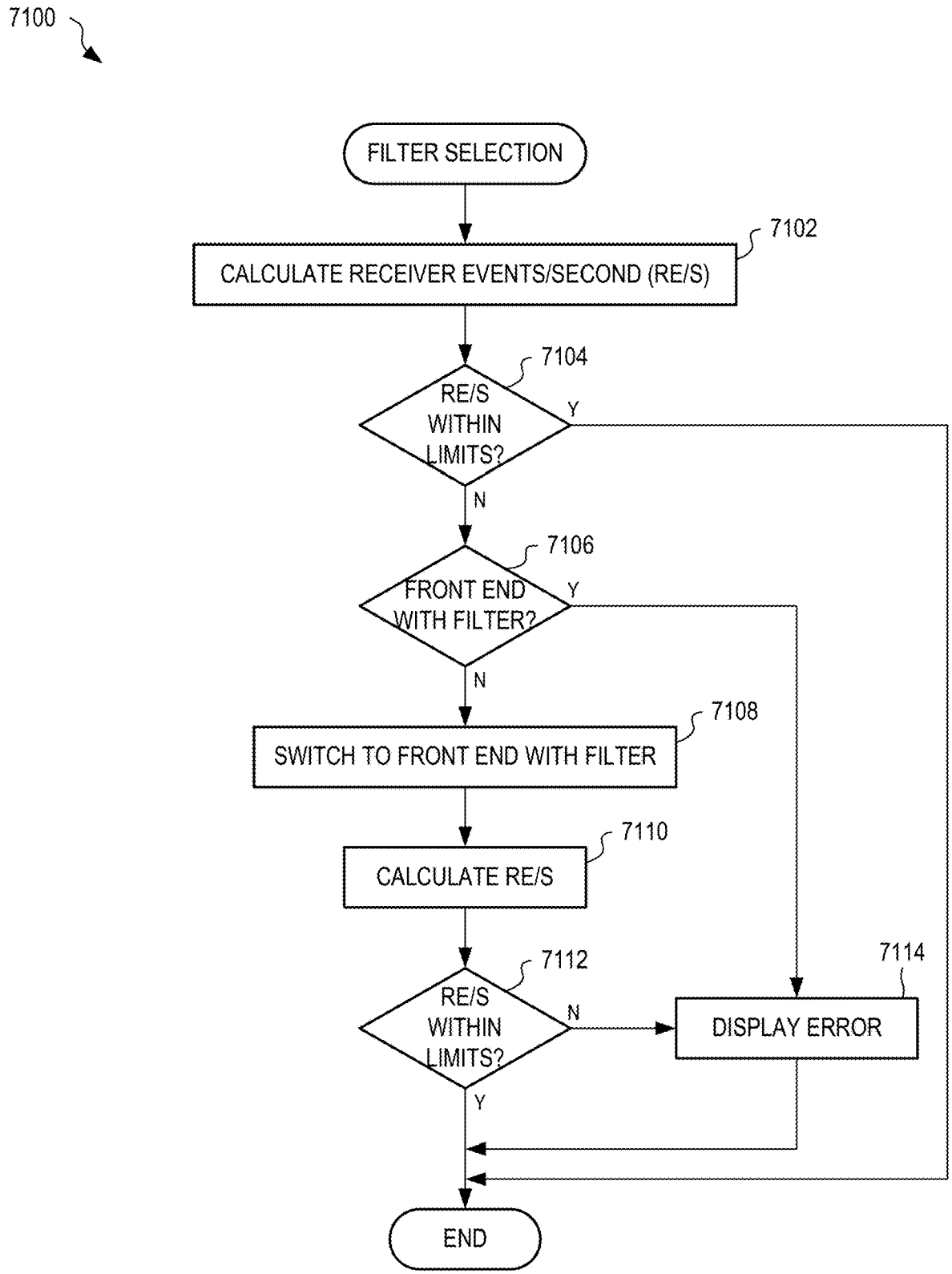
FIG. 71 is a flowchart illustrating one exemplary method for automatic object tracking system optimization based upon environmental changes, in an embodiment.

FIG. 71 is a flowchart illustrating one exemplary method 7100 for automatic object tracking system optimization based upon environmental changes. Method 7100 is for example implemented within software 162 of optimizer 160, FIG. 1, and is invoked periodically for each receiver 7004 within object tracking system 100.

In step 7102, method 7100 calculates RE/s. In one example of step 7102, optimizer 160 calculates RE/s 4310 for receiver 7004 to be two hundred. Step 7104 is a decision. If, in step 7104, method 7100 determines that RE/s is within operational limits, method 7100 terminates; otherwise method 7100 continues with step 7106. In one example of step 7104, optimizer 160 determines the 200 RE/s 4310 of receiver 7004 is not within operational limits and continues with step 7106.

Step 7106 is a decision. If, in step 7106, method 7100 determines that the front end with filter is already selected, method 7100 continues with step 7114; otherwise, method 7100 continues with step 7108. In one example of step 7106, optimizer 160 determines that front end 7026(2) without filter 7050 is selected for receiver 7004 from receiver configuration information 6552 and continues with step 7108. In step 7108, method 7100 switches the receiver to use the front end with the filter. In one example of step 7108, optimizer 160 sends configuration data 170 to receiver 7004, wherein interface 7032 controls digital switch 7034 to select analog front-end 7026(1) that contains filter 7050.

In step 7110, method 7100 calculates RE/s for the receiver. In one example of step 7110, optimizer 160 calculates RE/s 4310 for receiver 7004 to be one-thousand. Step 7112 is a decision. If, in step 7112, method 7100 determines that RE/s is within limits, method 7100 terminates; otherwise method 7100 continues with step 7114.

In step 7114, method 7100 displays an error indicating that the sub-optimal RE/s cannot be optimized. In one example of step 7114, optimizer 160 sends a message to an operator of system 100 indicating that RE/s cannot be returned to operational limits for the receiver. Method 7100 then terminates. Once analog front-end 6626(1) (implementing filter 7050) is selected, it remains selected until the system is reinitialized (e.g., until the end of the current event).

Situational Changes

Figure 72:
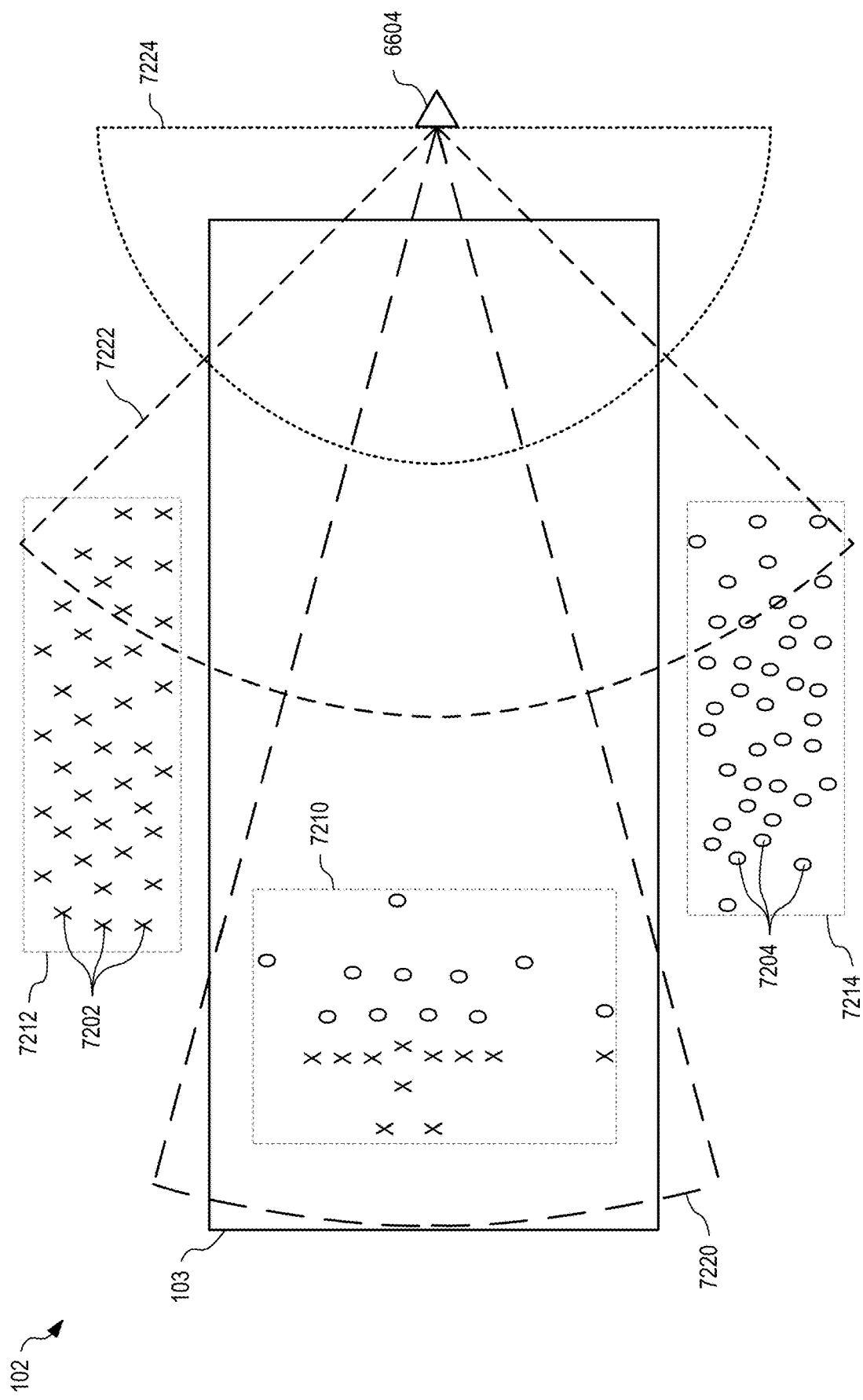
FIGS. 72 and 73 show one exemplary receiver positioned at one end of the field of play to illustrate selection of one analog front end of the receiver based upon situational changes.

FIG. 72 shows exemplary positioning of receiver 6604 at one end of field of play 103 (e.g., an American Football field) and illustrating selection of one analog front end 6626 based upon situational changes. Only one receiver 6604 is shown for clarity of illustration. As shown in FIGS. 66-69, receiver 6604 is configured with three analog front ends 6626(1)-(3) that have characteristics 6700(1)-(3), respectively. Characteristics 6700 are selected based upon operational area 102 and the intended activity of tracked objects (e.g., athletes) therein. In the example of FIG. 72, field of play 103 is an American Football field and expected activity is an American Football game. Receiver 6604 operating with front end 6626(1) selected has an exemplary receive area 7220 (indicated by dashed outline). Receiver 6604 operating with front end 6626(2) selected has an exemplary receive area 7222 (indicated by dashed outline). Receiver 6604 operating with front end 6626(3) selected has an exemplary receive area 7224 (indicated by dashed outline).

Locations of players 7202 of a first team are indicated by Xs and locations of players 7204 of a second team are indicated by Os. Each player 7202, 7204 is configured with at least one tag 101 that allows object tracking system 100 to determine at least the location of each player.

Optimizer 160 operates to automatically select an appropriate front end 6626 for receiver 6604 based upon determined locations of certain players 7202, 7204 within operational area 102. For example, optimizer 160 may send configuration data 170 to interface 6632, which controls digital switch 6634 to select signal 6614 from one of front ends 6626 for input to digital back-end 6605 based upon determined situational changes. In particular, optimizer 160 selects one of front end 6626 based upon location of players of interest, which, for the exemplary American Football game, are the players located on field of play 103 and actively participating in the game. Optimizer 160 first determines a bounding rectangle 7210, aligned to field of play 103 for example, that includes determined locations of RF tags 101 for players of interest. Based upon the location of the perimeter of bounding rectangle 7210 relative to receiver 6604, optimizer 160 selects an appropriate front end 6626. In the example of FIG. 72, optimizer 160 selects front end 6626(1) for receiver 6604 since bounding rectangle 7210 is within receive area 7220 and not within receive areas 7222 and 7224.

Figure 73:
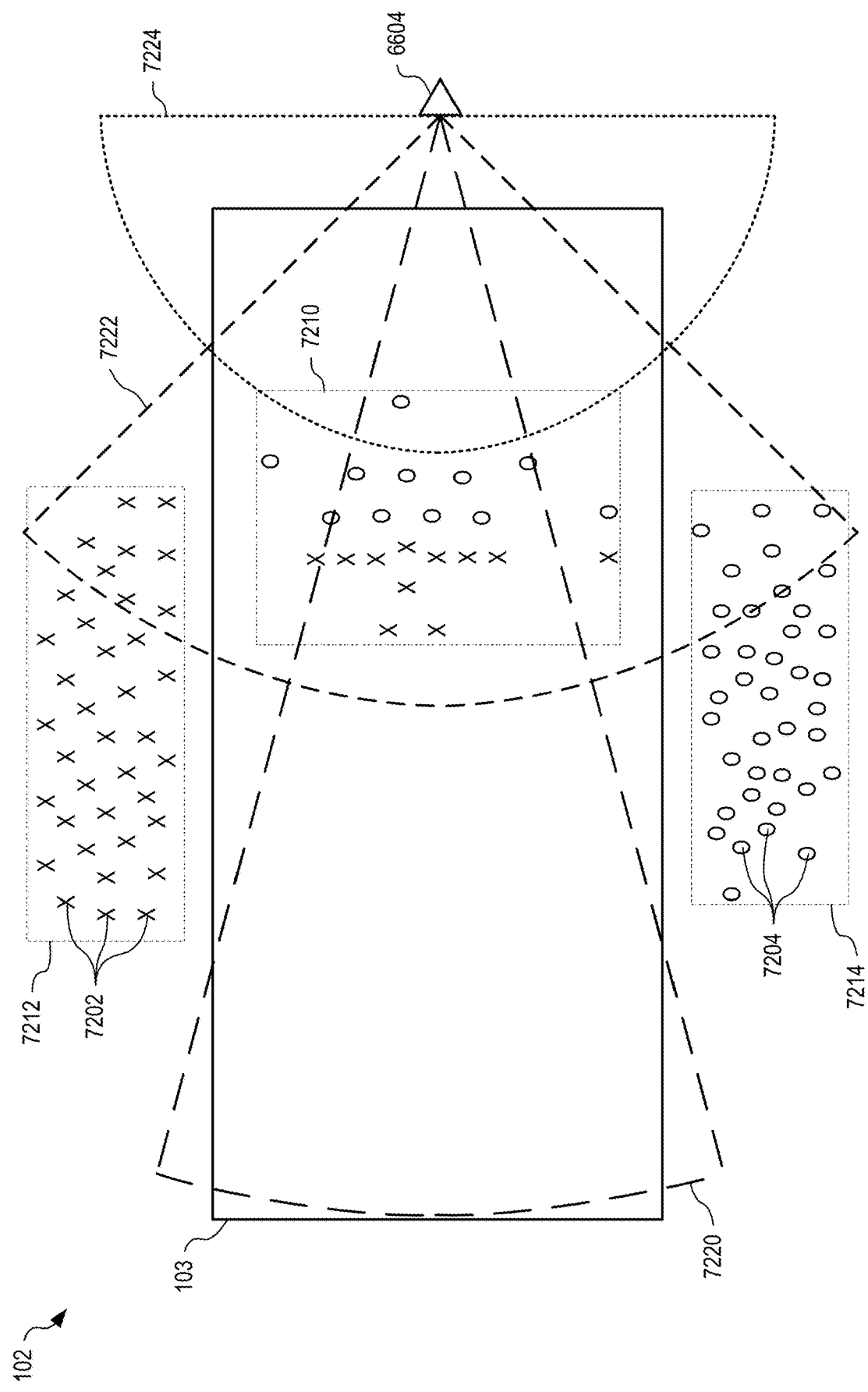

FIG. 73 is similar to FIG. 72 and shows progress of play in the exemplary American Football game on field of play 103, wherein bounding rectangle 7210 has moved relative to receiver 6604. Optimizer 160 repeatedly recalculates bounding rectangle 7210 and determines optimal configuration for each receiver 6604 as play progresses on field of play 103. Optimizer 160 then sends configuration data 170 to interface 6632, which controls digital switch 6634 to select signal 6614 from one of front ends 6626 for input to digital back-end 6605 based upon determined situational changes. In the example of FIG. 73, bounding rectangle 7210 is better covered by receive area 7222, since extended range is no longer required and increased scope provides better coverage of bounding rectangle 7210. Therefore, optimizer 160 automatically controls receiver 6604 to use front end 6626 (2).

As play progresses and bounding rectangle 7210 becomes even closer to receiver 6604, optimizer 160, based upon receive area 7224 and bounding rectangle 7210, may automatically control receiver 6604 to use front end 6626(3), since receiver 6604 achieves better performance using a Low Gain antenna, which provides maximum scope at the expense of range.

Optimizer 160 periodically determines bounding rectangle 7210, and then for each receiver 6604 of object tracking system 100, determines an appropriate front end 6626 for use based upon the orientation and location of each receiver 6604.

Figure 74:
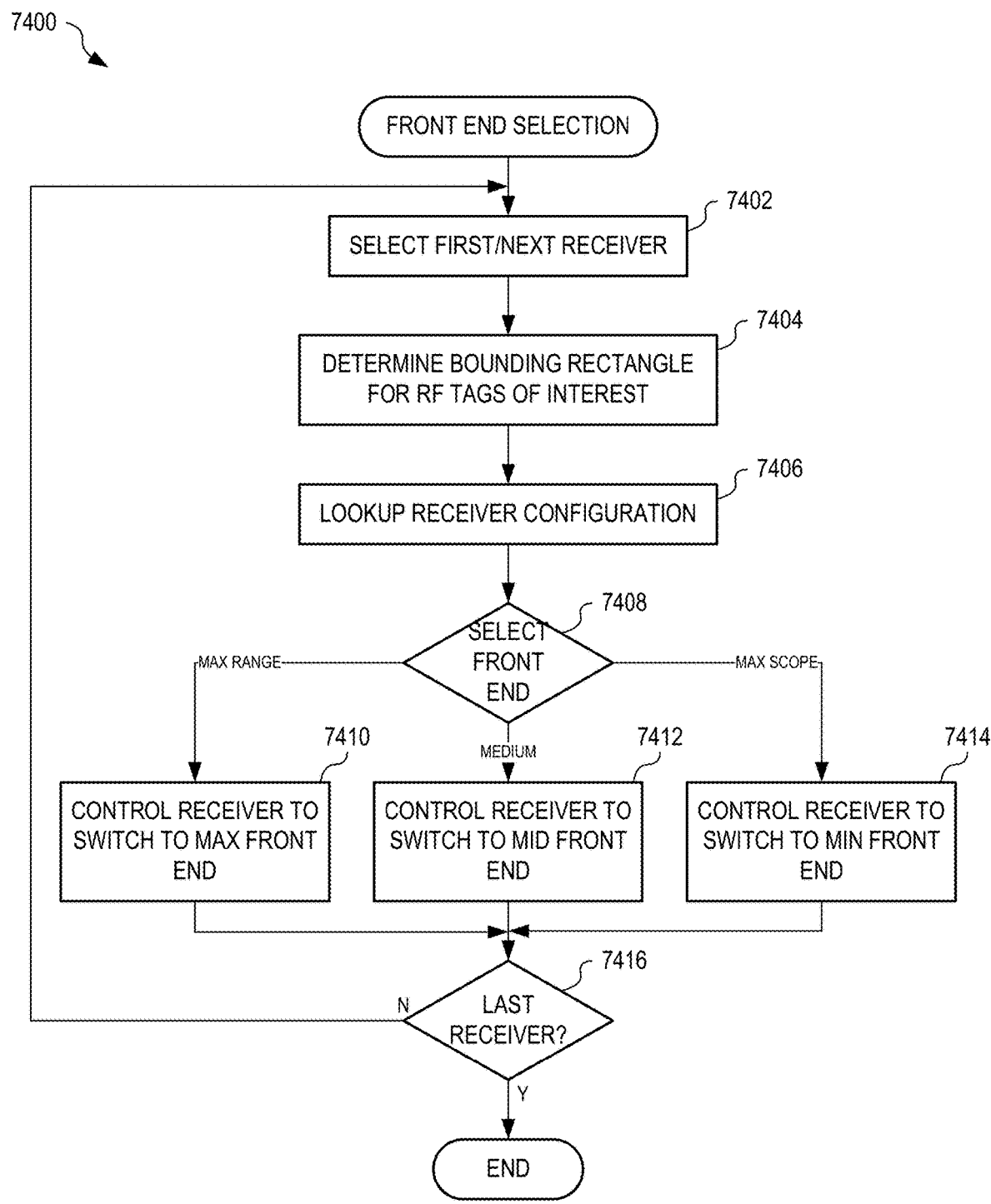
FIG. 74 is a flowchart illustrating one exemplary method for automatic object tracking system optimization based upon situational changes, in an embodiment.

FIG. 74 is a flowchart illustrating one exemplary method 7400 for automatic object tracking system optimization based upon environmental changes. Method 7400 is for example implemented within optimizer 160, FIG. 1. In step 7402, method 7400 selects a first receiver 6604 of object tracking system 100. In one example of step 7402, optimizer 160 selects receiver 104(1), implemented with receiver 6604. In subsequent iterations of step 7402, method 7400 selects a next receiver 6604 of object tracking system 100.

In step 7404, method 7400 determines a bounding rectangle for RF tags of interest. In one example of step 7404, optimizer 160 determines bounding rectangle 7210 for RF tags 101 of players participating on field of play 103. In step 7406, method 7400 looks up configuration information for the current receiver. In one example of step 7406, optimizer 160 retrieves receiver configuration information 6552 for receiver 104(1) to determine one or more of location, orientation, and configurability of receiver 104(1).

Step 7408 is a decision. If, in step 7408, method 7400 determines, based upon the bounding rectangle determined in step 7404 and the receiver configuration determined in step 7406, that a front end with maximum range is optimal for the receiver, method 7400 continues with step 7410. If, in step 7408, method 7400 determines, based upon the bounding rectangle determined in step 7404 and the current receiver configuration determined in step 7406, that a front end with medium range and medium scope is optimal for the current receiver, method 7400 continues with step 7412. If, in step 7408, method 7400 determines, based upon the bounding rectangle determined in step 7404 and the current receiver configuration determined in step 7406, that a front end with maximum scope is optimal for the current receiver, method 7400 continues with step 7414. In one example of step 7408, for a receiver 6604 positioned centrally at one end of field of play 103 (as shown in FIGS. 72 and 73), where optimizer 160 determines that bounding rectangle 7210 is beyond the fifty-yard line (as shown in FIG. 72), optimizer 160 continues with step 7410. In another example of step 7408, where optimizer 160 determines that bounding rectangle 7210 is between the fifty-yard line and beyond the fifteen-yard line (as shown in FIG. 73), optimizer 160 continues with step 7412. In another example of step 7408, where optimizer 160 determines that bounding rectangle 7210 is closer than the fifteen-yard line, optimizer 160 continues with step 7414.

In step 7410, method 7400 controls the current receiver to switch to the maximum range front end. In one example of step 7410, optimizer 160 sends configuration data 170 to receiver 104(1)/6604, instructing interface 6632 to control digital switch 6634 to select front end 6626(1). Method 7400 then continues with step 7416.

In step 7412, method 7400 controls the current receiver to switch to the medium range and medium scope front end. In one example of step 7412, optimizer 160 sends configuration data 170 to receiver 104(1)/6604, instructing interface 6632 to control digital switch 6634 to select front end 6626(2). Method 7400 then continues with step 7416.

In step 7414, method 7400 controls the current receiver to switch to the maximum scope front end. In one example of step 7414, optimizer 160 sends configuration data 170 to receiver 104(1)/6604, instructing interface 6632 to control digital switch 6634 to select front end 6626(3). Method 7400 then continues with step 7416.

Step 7416 is a decision. If, in step 7416, method 7400 determines that the current receiver is not the last receiver, method 7400 continues with step 7402; otherwise, method 7400 terminates. Steps 7402 through 7416 thereby repeat for each receiver 104/6604, of object tracking system 100.

Post-Locate Filter Adjustments

Under extreme conditions (e.g. receiver failure, cable failure, torrential rain and other adverse weather conditions), even with all available receivers 104 configured with a maximum gain value (e.g., one-hundred percent), the locate-to-ping ratio (e.g., locate-to-ping ration 4340) of system 100 may fail to reach the target range (e.g., 55%). Under these extreme conditions, system 100 may not generate sufficient locates, resulting in non-contiguous tracking data (i.e., where gaps appear in tracking movements).

Figure 75:
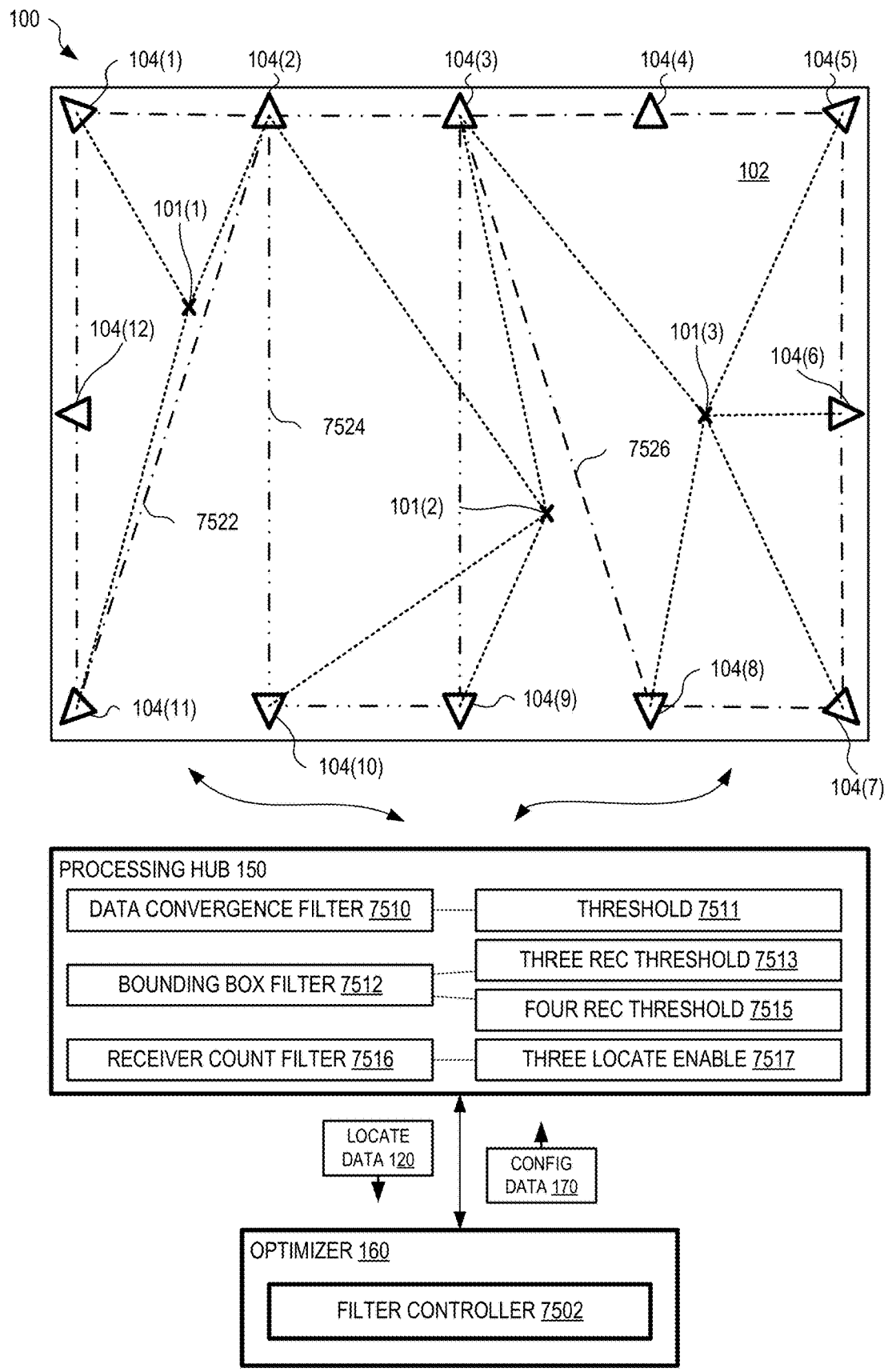
FIG. 75 shows the system of FIG. 1 determining locates of tags within the operational area, wherein the calculated locates pass through an array of filter algorithms.

FIG. 75 shows system 100 of FIG. 1 determining locates of tags 101(1)-(3) within operational area 102, where the calculated locates pass through an array of filter algorithms within processing hub 150. These filtering algorithms include a data convergence filter 7510, a bounding box filter 7512, and a receiver count filter 7516. A threshold 7511 controls operation of data convergence filter 7510; a three-receiver threshold 7513 and a four-receiver threshold 7515 control operation of bounding box filter 7512; and a three locate enable 7517 controls operation of receiver count filter 7516.

In general, contiguous tracking data with reduced overall accuracy is far more valuable to applications 130 that use this information than non-contiguous data with higher accuracy (i.e., where system 100 is configured to filter out locates with reduced accuracy). In normal operation of system 100, reduced accuracy locates are filtered out of locate data 120 by post-locate filters such as data convergence filter 7510, bounding box filter 7512, and receiver count filter 7516.

However, when system 100 fails to generate sufficient locates, a filter controller 7502 within optimizer 160 operates to automatically adjust controlling parameters (e.g., thresholds 7511, 7513 and 7515, and three locate enable 7517) of one or more post locate filters (e.g., data convergence filter 7510, bounding box filter 7512, and receiver count filter 7516) to increase tolerance within these filters to allow more locates to be output within locate data 120 at the expense of accuracy of those generated locates.

The reliability level of locates varies depending on a number of different factors. There are various methods of estimating the reliability level of locates, as discussed below. Within processing hub 150, generated locates pass through an array of filtering algorithms. These filtering algorithms fall into two general categories: (a) signal processing and (b) identify & drop. Dynamic optimization is performed only for (b) identify & drop algorithms such as data convergence filter 7510, bounding box filter 7512, and receiver count filter 7516, which operate to evaluate several attributes of each locate to estimate its reliability. If the estimated reliability of the locate is below a specified threshold in any of these, then the locate is discarded to reduce the number of locates generated by system 100 in favor of higher reliability locates.

Where all receivers 104 are operating at maximum gain and locate-to-ping ratio 4340 of system 100 is still insufficient, filter controller 7502 within optimizer 160 automatically adjusts thresholds 7511, 7513 and 7515, and three locate enable 7517 of data convergence filter 7510, bounding box filter 7512, and receiver count filter 7516, respectively, to achieve an acceptable locate-to-ping ratio 4340. These adjustments are made at the expense of generating locates with less reliable location information and of thereby potentially reducing overall accuracy of system 100. The rationale for this is that once locate-to-ping ratio 4340 falls below a certain level, gaps in locate data 120 represent a more serious problem than does a decrease in average system accuracy.

Data convergence filter 7510, bounding box filter 7512, and receiver count filter 7516 are examples of identify and drop algorithms. Other identify and drop algorithms may be included within processing hub 150 and automatically controlled by filter controller 7502 without departing from the scope hereof.

Data Convergence Filter

When more than three receiver events 110 result from the same ping 402 and are used to determine a locate, processing hub 150 determines a data convergence estimate for the locate based upon difference in calculated locations for each different set of three receiver events. The greater the convergence in (e.g., the smaller the average distance between) the calculated locations, the more likely the calculated location is accurate. Data convergence filter 7510 discards data when the data convergence estimate is above threshold 7511. Filter controller 7502 operates to increase threshold 7511 when the locate-to-ping ratio 4340 of system 100 is low, which increases the number of locates generated by system 100, since fewer locates are discarded due to inaccuracy. Similarly, filter controller 7502 decreases threshold 7511 when locate-to-ping ratio 4340 of system 100 is greater than a desired value (e.g., above fifty-five percent) to reduce the number of locates generated.

Bounding Box Filter

A bounding box is the smallest polygon that includes all receivers 104 involved in calculating a particular locate. For any locate calculation, a bounding box for that locate is formed by drawing a line between all receivers involved in the calculation. For example, FIG. 26 shows a three-receiver bounding box 7522 formed by receivers 104(1), 104 (2) and 104(11) that each generated one receiver event 110 used to calculate the location of tag 101(1). Similarly, a four-receiver bounding box 7524 is formed by receivers 104(2), 104(3), 104(9), and 104(10) that each generated one receive event 110 used to calculate the location of tag 101(2). Similarly, again, a five-receiver bounding box 7526 is formed by receivers 104(3), 104(5), 104(6), 104(7), and 104(8) that each generated one receiver event 110 used to calculate the location of tag 101(3). In the example of FIG. 75, the locate of tag 101(1) is within bounding box 7522, but is very close to the boundary; the locate of tag 101(2) is outside the boundary of bounding box 7524; and the locate of tag 101(3) is well inside the boundary of bounding box 7526.

As the calculated location approaches the edge of the bounding box, the reliability of the calculated location (i.e., the locate) decreases. If the calculated location is outside the bounding box (e.g., locate of tag 101(2) is outside bounding box 7524), the reliability of the calculated location (i.e., the locate) decreases even further. The further the calculated location is outside the bounding box, the lower the reliability of that locate. Bounding box filter 7512 operates to discards locates where the calculated location is outside the boundary of the bounding box (e.g., one of bounding boxes 7522, 7524, 7526). For example, locates having calculated locations within the bounding box (e.g., bounding boxes 7522, 7524, 7526) defined by the receivers used to determine the locate are output within locate data 120, whereas locates with calculated locations outside of the bounding boxes are discarded.

Figure 78:
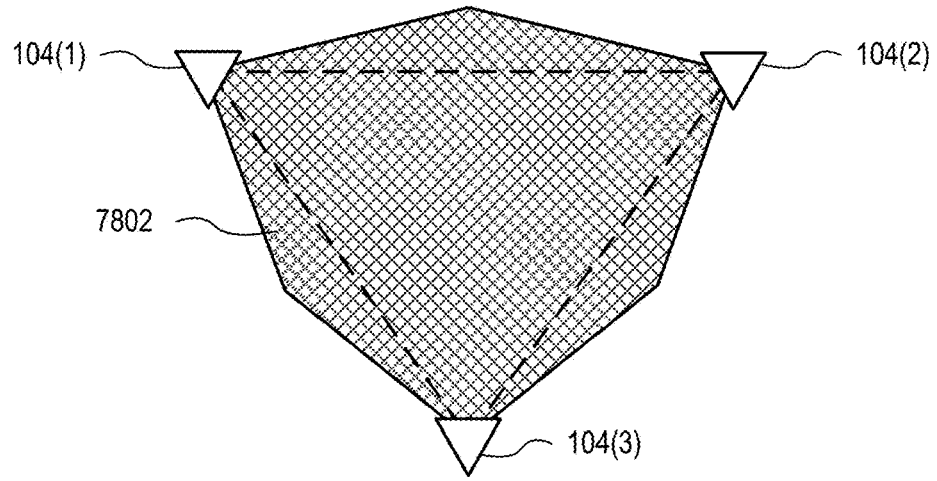
FIGS. 78-81 are schematics showing one exemplary bounding boxes for three and four receivers for each of positive and negative threshold values.
Figure 79:
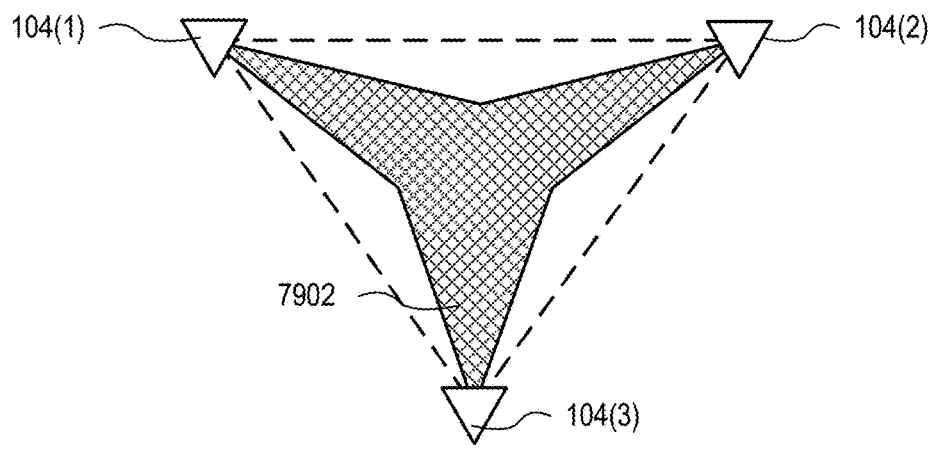
Figure 80:
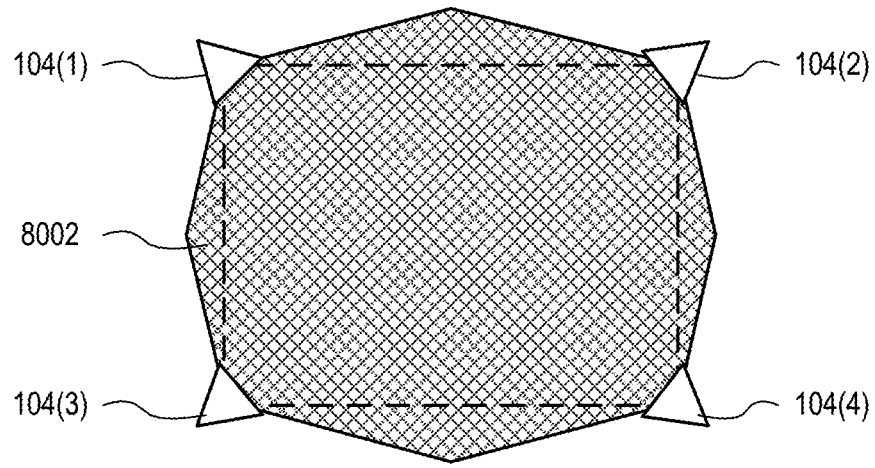
Figure 81:
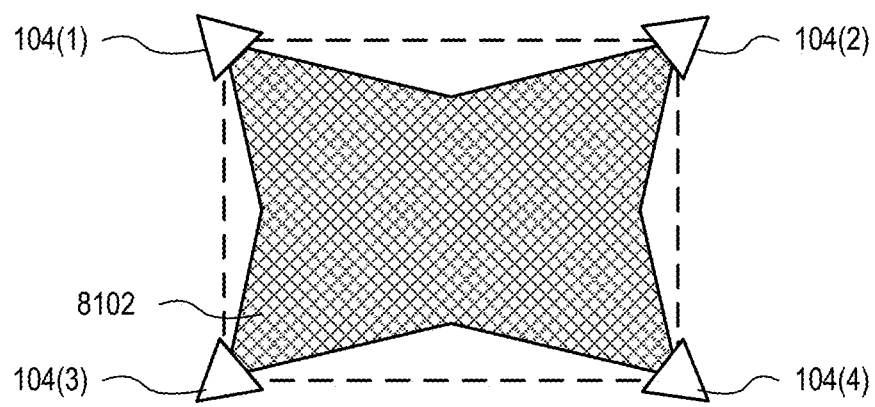

The size of the bounding boxes may be adjusted by thresholds (e.g., three-receiver threshold 7513 and four receiver threshold 7515) that increase the size of the bounding box when positive and decrease the size of the bounding box when negative. These thresholds are angular adjustments relative to the straight lines between receiver pairs. FIG. 78 is a schematic showing one exemplary bounding box 7802 for three receivers 104(1), 104(2), 104(3) where three-receiver threshold 7513 is a positive value. FIG. 79 is a schematic showing one exemplary bounding box 7902 for three receivers 104(1), 104(2), 104(3) where three-receiver threshold 7513 is negative. FIG. 80 is a schematic showing one exemplary bounding box 8002 for four receivers 104(1), 104(2), 104(3), 104(4) where four-receiver threshold 7515 is a positive value. FIG. 81 is a schematic showing one exemplary bounding box 8102 for four receivers 104(1), 104(2), 104(3), 104(4) where four-receiver threshold 7515 is a negative value.

Bounding box filter 7512 operates in two modes: a three-receiver locate mode and a four-receiver locate mode (which uses four or more receivers). In the four-receiver locate mode, where the number of receiver events 110 used to determine a locate is greater than three, bounding box filter 7512 uses four-receiver threshold 7515 to define the bounding box (e.g., bounding box 8002, 8102) and thereby determine whether the locate should be discarded. In three-receiver locate mode, where the number of receiver events 110 used to determine a locate is three, bounding box filter 7512 uses three-receiver threshold 7513 to define the bounding box (e.g., bounding box 7802, 7902) and thereby determine whether the locate should be discarded. All three-receiver locates, regardless of the bounding box setting, are gated by the "Receiver Count Filter." Three-receiver threshold 7513 is typically set tighter than four-receiver threshold 7515, since convergence information for a locate is not available when only three receiver events 110 are used to calculate the locate and thus data convergence filter 7510 cannot be used.

As described below, and shown in FIGS. 76 and 77, operation of bounding box filter 7512 is controlled using three-receiver threshold 7513 and four-receiver threshold 7515. Both thresholds 7513 and 7515 have a default value of zero, a lower limit of minus-thirty, and an upper limit of plus-thirty. Each may also have a default increment/decrement amount of five.

Receiver Count Filter

During normal operation of system 100, three locate enable 7517 is set to false and receiver count filter 7516 operates to discard locates determined from only three receiver events 110 since no data convergence estimate is available for that locate. However, where system 100 is operating below the defined locate-to-ping ratio (e.g., fifty-five percent), three locate enable 7517 is set to true by filter controller 7502 such that receiver count filter 7516 does not discard locates generated from only three receiver events 110.

Post-Locate Filter Adjustment Process

When locate-to-ping ratio 4340 falls below a defined target threshold, optimizer 160 adjusts one or more post-locate filters to increase the number of receiver events 110 and thereby improve locate-to-ping ratio 4340. The specific parameter adjustment algorithm employed within optimizer 160 is selected based upon the condition, or conditions, responsible for the reduced locate-to-ping ratio.

Figure 76:
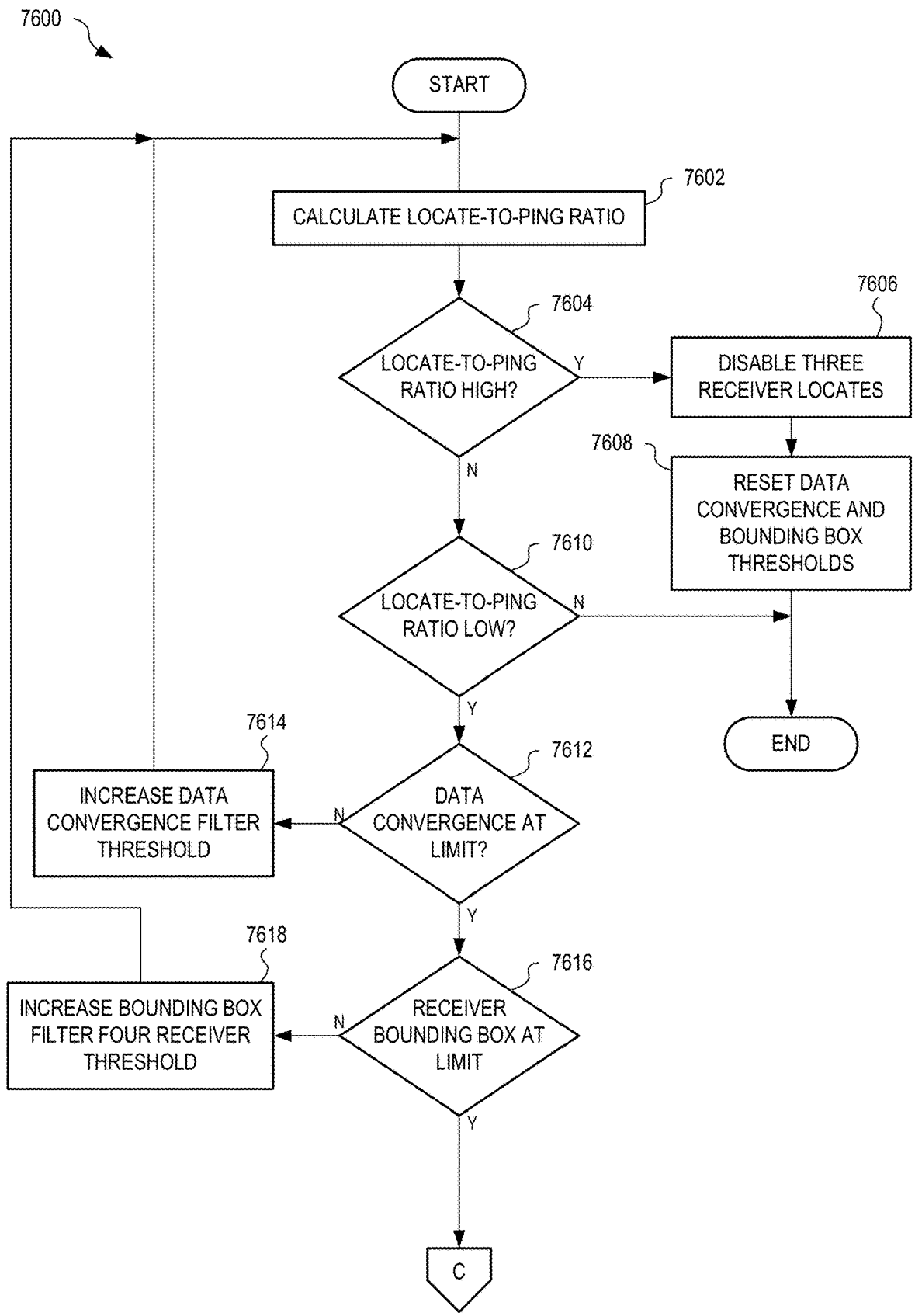
FIGS. 76 and 77 show one exemplary generic method for automatically adjusting post-locate filters within the processing hub of the system of FIG. 1 based upon a locate-to-ping ratio.
Figure 77:
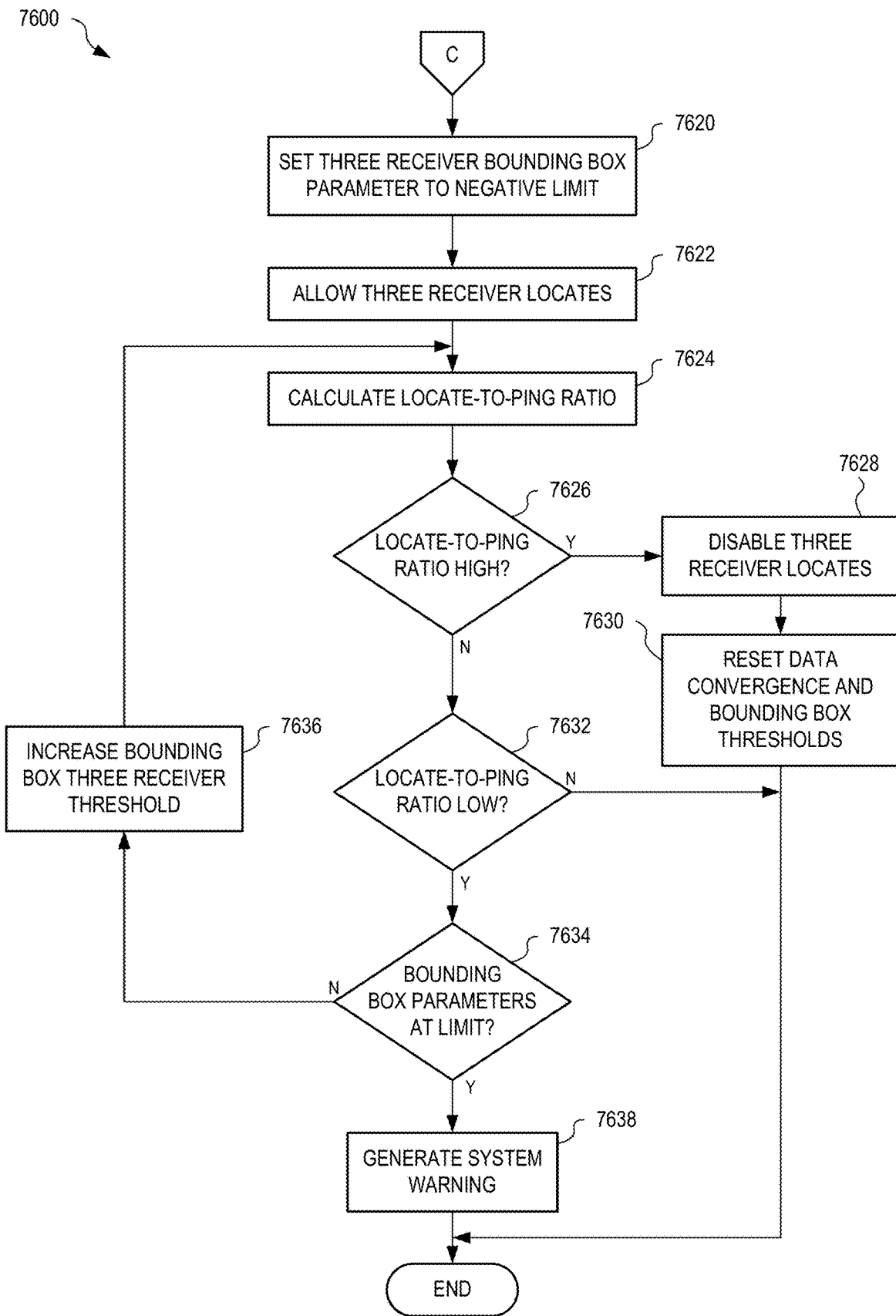

FIGS. 76 and 77 show one exemplary generic method 7600 for automatically adjusting post-locate filters within processing hub 150 based upon locate-to-ping ratio 4340 of system 100. Method 7600 is implemented within filter controller 7502 of optimizer 160 and invoked periodically to manage post-locate filters for example.

In step 7602, method 7600 calculates a locate-to-ping ratio for system 100. In one example of step 7602, filter controller 7502 determines a locate-to-ping ratio for system 100.

Step 7604 is a decision. If, in step 7604, method 7600 determines that the locate-to-ping ration is high, method 7600 continues with step 7606; otherwise method 7600 continues with step 7610. In step 7606, method 7600 disables three receiver locates. In one example of step 7606, filter controller 7502 sets three locate enable 7517 to false, whereupon receiver count filter 7516 discards locates generated from only three receiver events 110. In step 7608, method 7600 resets data convergence and bounding box thresholds. In one example of step 7608, filter controller 7502 resets threshold 7511 to a value representative of normal operation of system 100, and sets thresholds 7513 and 7515 to zero. Method 7600 then terminates.

Step 7610 is a decision. If, in step 7610, method 7600 determines that the locate-to-ping rate is too low, method 7600 continues with step 7612; otherwise method 7600 terminates.

Step 7612 is a decision. If, in step 7610, method 7600 determines that the data convergence filter is at the limit, method 7600 continues with step 7616; otherwise method 7600 continues with step 7614. In step 7614, method 7600 increases the convergence threshold. In one example of step 7614, filter controller 7502 increases threshold 7511 such that fewer locates are discarded due to poor accuracy. Method 7600 then continues with step 7602.

Step 7616 is a decision. If, in step 7616, method 7600 determines that the receiver bounding box filter is at its limit, method 7600 continues with step 7620; otherwise method 7600 continues with step 7618. In step 7618, method 7600 increases the bounding box filter four receiver threshold by a predefined amount. In one example of step 7618, filter controller 7502 increases the value of four receiver threshold 7515 by five such that the area of the defined bounding box is increased for bounding box filter 7512. Method 7600 then continues with step 7602. Steps 7602 through 7618 repeat to control locate-to-ping ratio 4340 of system 100 by increasing first the data convergence filter threshold and then the bounding box filter convergence adjustment to increase tolerance in accuracy of the calculated location of locates.

In step 7620, method 7600 sets the three-receiver bounding box parameter to a negative limit. In one example of step 7620, filter controller 7502 sets three receiver threshold 7513 to minus thirty to reduce the size of the bounding box, wherein locates that are not within the bounding box are discarded.

In step 7622, method 7600 allows three receiver locates. In one example of step 7622, filter controller 7502 sets three locate enable 7517 to true, thereby preventing receiver count filter 7516 from rejecting locates generated from only three receiver events 110.

In step 7624, method 7600 calculates the locate-to-ping ratio. In one example of step 7624, filter controller 7502 calculates locate-to-ping ratio 4340 based upon, for a defined period, expected pings 402 from tags 101 and a count of generated locates within locate data 120.

Step 7626 is a decision. If, in step 7626, method 7600 determines that the locate-to-ping ratio is high, method 7600 continues with step 7628; otherwise method 7600 continues with step 7632. In step 7628, method 7600 disables three receiver locates. In one example of step 7628, filter controller 7502 sets three locate enable 7517 to false, thereby allowing receiver count filter 7516 to discard locates calculated from only three receiver events 110. In step 7630, method 7600 resets data convergence and bounding box parameters. In one example of step 7630, filter controller 7502 sets threshold 7511 to a default value defining normal operation of data convergence filter 7510, and sets thresholds 7513 and 7515 to a default values defining normal operation of bounding box filter 7512. Method 7600 then terminates.

Step 7632 is a decision. If, in step 7632, method 7600 determines that the locate-to-ping ration is low, method 7600 terminates; otherwise method 7600 continues with step 7634.

Step 7634 is a decision. If, in step 7634, method 7600 determines that the bounding box parameters are at a limit, method 7600 continues with step 7638; otherwise method 7600 continues with step 7636. In step 7636, method 7600 increases the bounding box parameters by a predefined amount. In one example of step 7636, filter controller 7502 increases each of thresholds 7513 and 7515 by five. Method 7600 then continues with step 7624. Steps 7624 through 7636 repeat to continually monitor and control the locate-to-ping ratio 4340 of system 100 by adjusting three locate parameters of bounding box filter 7512 to increase the area in which calculated locations are not rejected.

In step 7638, method 7600 generates a system warning. In one example of step 7638, filter controller 7502 generates a warning message indicating that the desired locate-to-ping ratio cannot be achieved for display to one or more operators of system 100. Method 7600 then terminates.

As noted above, method 7600 is a generic control algorithm for clarity of illustration. Other potentially more advanced control algorithms may be implemented within filter controller 7502 to control operation of data convergence filter 7510, bounding box filter 7512 and receiver count filter 7516 without departing from the scope hereof.

In summary, when locate-to-ping ratio 4340 decreases below a predefined threshold, method 7600 incrementally increases threshold 7511 of data convergence filter 7510 until it reaches a predefined limit (i.e., maximum value). Data convergence filter 7510 is adjusted first since this allows more locates to be generated that are directly tied to a calculated reliability metric. Although the overall accuracy of system 100 is impacted by allowing generating locates with higher data convergence values, the potential inaccuracy of these locates are introduced in a controlled manner. Where adjustment to threshold 7511 of data convergence filter 7510 fails to increase locate-to-ping ratio 4340 to a sufficient level, filter controller 7502 then incrementally makes positive adjustments to four-receiver threshold 7515 of bounding box filter 7512, where each increase in the value of four-receiver threshold 7515 increases the area within which calculated locations are not discarded by bounding box filter 7512. Although calculated locations of each locate may be outside their bounding box, and therefore have an inherently higher level of inaccuracy, these locates have not been discarded by data convergence filter 7510, and therefore have a pre-defined acceptable data convergence measure.

If a predefined maximum value for four-receiver threshold 7515 is reached and the locate-to-ping ratio 4340 is still not at a sufficient level, filter controller 7502 then initiates more drastic measures to increase the locate-to-ping ratio by allowing locates to be generated from three receiver events (i.e., three different receivers). As noted above, when calculating location using only three receiver events 110, a data convergence value cannot be used to estimate reliability and/or accuracy of the locate. Thus, for locates generated using only three receiver events, three-receiver threshold 7513 is set to have a smaller (i.e., tighter) area for accepting locates within bounding box filter 7512. Therefore, the three-receiver threshold 7513 is initially set to its most negative value, corresponding to its smallest area (i.e., tightest setting). This area is then gradually increased until an acceptable locate-to-ping ratio 4340 is achieved.

Where filter controller 7502 is still unable to achieve a satisfactory locate-to-ping ratio 4340, a system warning is generated to indicate that the locate-to-ping ratio is low and that gaps in data may result. By generating this warning, filter controller 7502 alerts an operator of system 100 to potential problems or faults within system 100.

Where reduced locate-to-ping ratio is a result of a condition such as extreme weather or a disconnected cable for example, the condition may rapidly disappear, such as when weather improves or the cable is reconnected. When the condition disappears, filter controller 7502 detects the increase in locate-to-ping ratio 4340 and automatically reconfigures one or more of data convergence filter 7510, bounding box filter 7512, and receiver count filter 7516 for normal operation by resetting one or more of thresholds 7511, 7513, 7515, and three locate enable 7517 to default values for normal operation of object tracking system 100.

Location Data Visualization Tools

Figure 82:
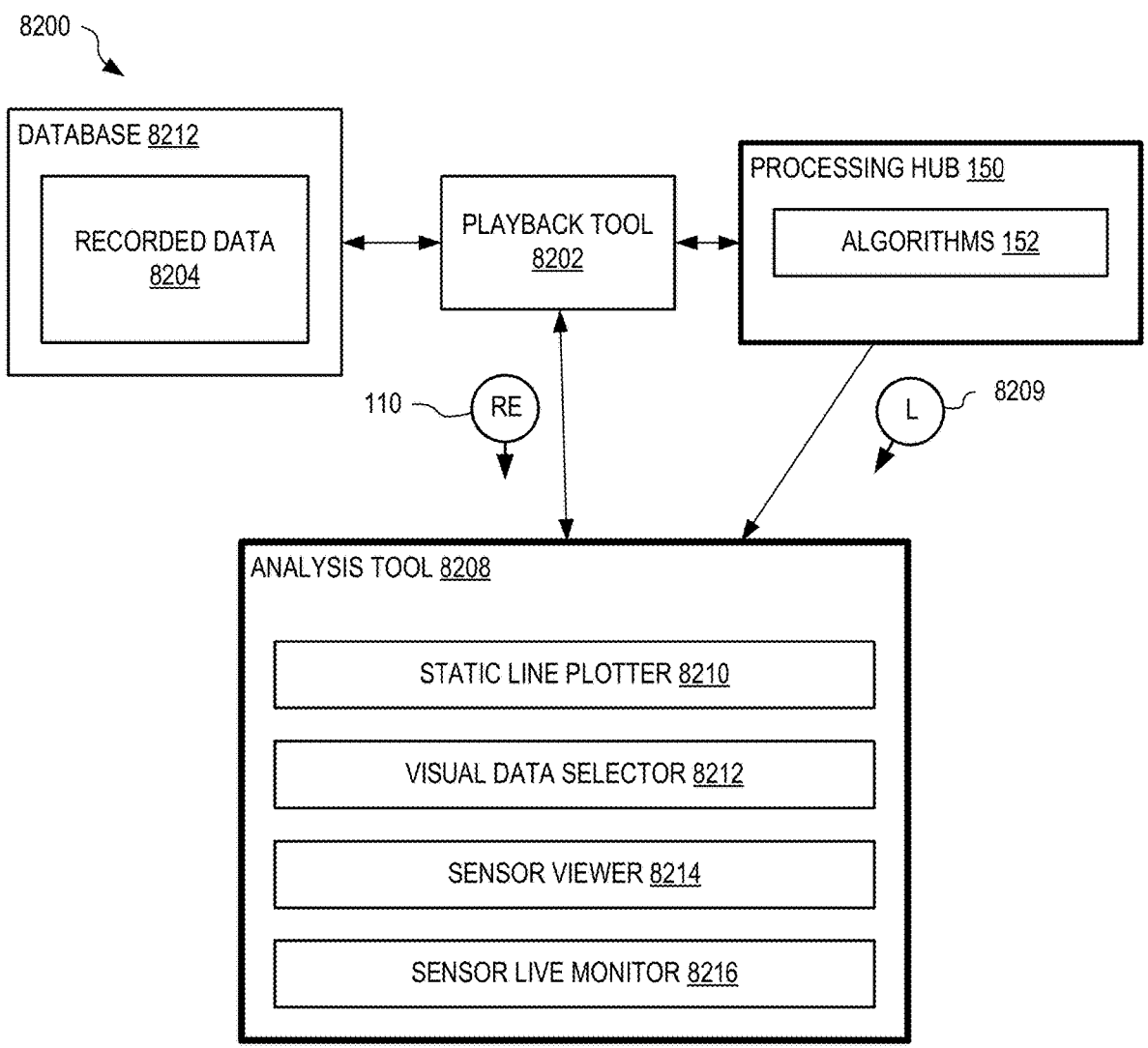
FIG. 82 shows the processing hub of FIG. 1 communicatively coupled with a database, a playback tool, and an analysis tool, in an embodiment.

FIG. 82 shows processing hub 150 of system 100, FIG. 1 communicatively coupled with a database 8203, a playback tool 8202, and an analysis tool 8208. Tool 8208 may operate with live data from processing hub 150 (i.e., as tags 101 are tracked within operational area 102); however, tool 8208 more usefully processes recorded data 8204 that includes tag IDs 208, receiver IDs (e.g., receiver ID 714) of receivers 104 involved in both successful and failed locates, errors, and other information from receivers 104 as stored in database 8203. For example, during operation of system 100, receiver events 110, errors, receiver list data, and other information (e.g., type of data (successful/unsuccessful locate), Tag ID, xyz data, error code, indication of data quality, and a list of involved receivers 104 in determining the locate) are stored as recorded data 8204 within database 8203. Playback tool 8202 communicates with database 8203 and processing hub 150 to replay, through processing hub 150, both successful and unsuccessful locates and other information from receivers 104 stored within database 8203. Playback tool 8202 may repeatedly "replay" a portion of recorded data 8204 so that parameters (e.g., filtering) within processing hub 150 and locate algorithms 152 may be adjusted, permitting a system administrator to enhance performance of system 100 for a particular environment. Playback tool 8202 also allows a user to view alternative aspects of the data, and to analyze different portions of the playing field on a graphical representation (e.g., generated by application 130) of the recorded event.

Playback tool 8202 may replay recorded data 8204 at the captured rate (i.e., replicating the exact conditions as they were when the data was collected). However, playback tool 8202 may also replay recorded data 8204 at other speeds; for example, recorded data 8204 may be replayed as fast as other components of system 100 will allow, which is typically many times the recording speed. In one example of operation, playback tool 8202 is used to repeatedly replay at least a portion of recorded data 8204 at high speed when iteratively tuning and/or troubleshooting a problem with system 100.

When configuring system 100 at a new installation (i.e., a new sporting venue), one useful data set is a "Test Lap". In a Test Lap, a single tag 101 is moved methodically within operational area 102. For example, a person wears a hat that includes tag 101 and walks a grid pattern over field of play 103 within operational area 102. System 100 stores recorded data 8204 during the test lap such that playback tool 8202 may replay the data, through processing hub 150, into analysis tool 8208. During the test lap, system 100 is operating with ideal conditions, where tag 101 is approximately 2 meters off the ground, positioned in a horizontal plane, and has clear unobstructed lines of sight to all receivers 104 positioned around operational area 102.

Analysis tool 8208 incorporates one or more software modules that include machine readable instructions that, when executed by a processor of a computer, implement functionality described below. In one embodiment, analysis tool 8208 is implemented as a separate, communicatively connected (e.g., networked), computer from processing hub 150.

Analysis tool 8208 may operate with any type of data within recorded data 8204, but is particularly useful when recorded data 8204 contains information recorded from a test lap. For example, where recorded data 8204 contains a single test lap data set, analysis tool 8208 provides for analyzing a wide variety of different types of problems with the installation calibration and filter adjustments of system 100.

Figure 83:
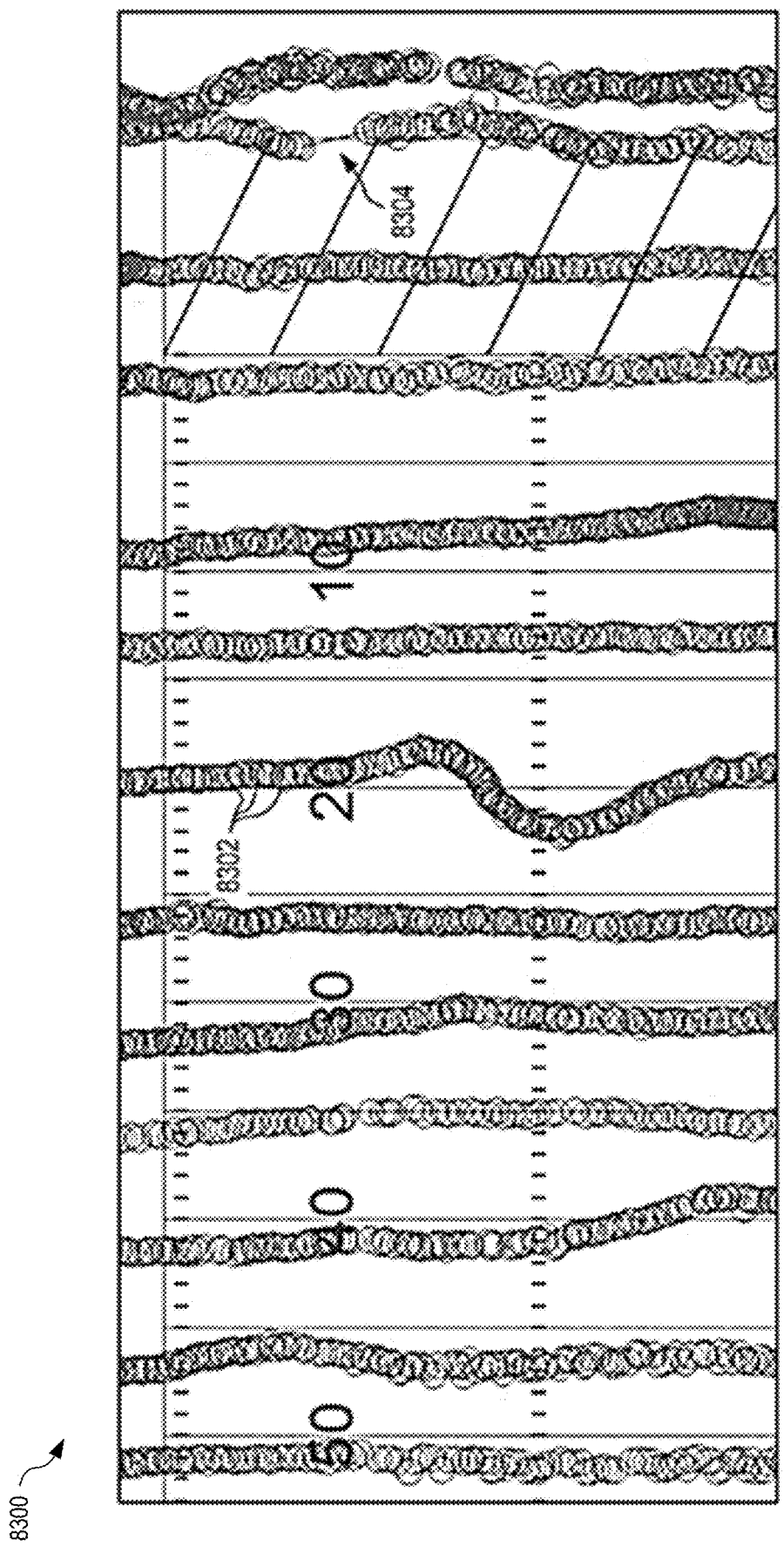
FIG. 83 shows one exemplary static line plot generated by a static line plotter of the analysis tool of FIG. 82.

FIG. 83 shows one exemplary static line plot 8300 generated by a static line plotter 8210 of analysis tool 8208. Static line plot 8300 is for example generated from determined locations (locates 8209 within locate data 120) of tag 101 during replay of recorded data 8204. Within plot 8300, static line plotter 8210 displays each determined locate 8209 of tag 101 as a symbol 8302 on a visual representation of operational area 102, such that all locates 8209 are displayed simultaneously. (Other typical tracking displays show only a moving point representing the location of a tracking tag at any one point in time.) In the example of FIG. 83, symbol 8302 is a yellow circle representing the position of each locate 8209 within an American football field (field of play 103) within operational area 102. Although plot 8300 shows an area 8304 where tracking information appears to be missing, the majority of the display appears to be visually correct. For example, it's only when a large number of consecutive errors occur that a sudden jump in the reported position becomes visible. Even when such gaps are visible, there is no indication of what type of problem caused the gap in reported positions. In system 100, processing hub 150 may implement many types of filters that condition the received data and that may indicate many distinct error conditions that may cause the determination of the location of tag 101 to fail.

Figure 84:
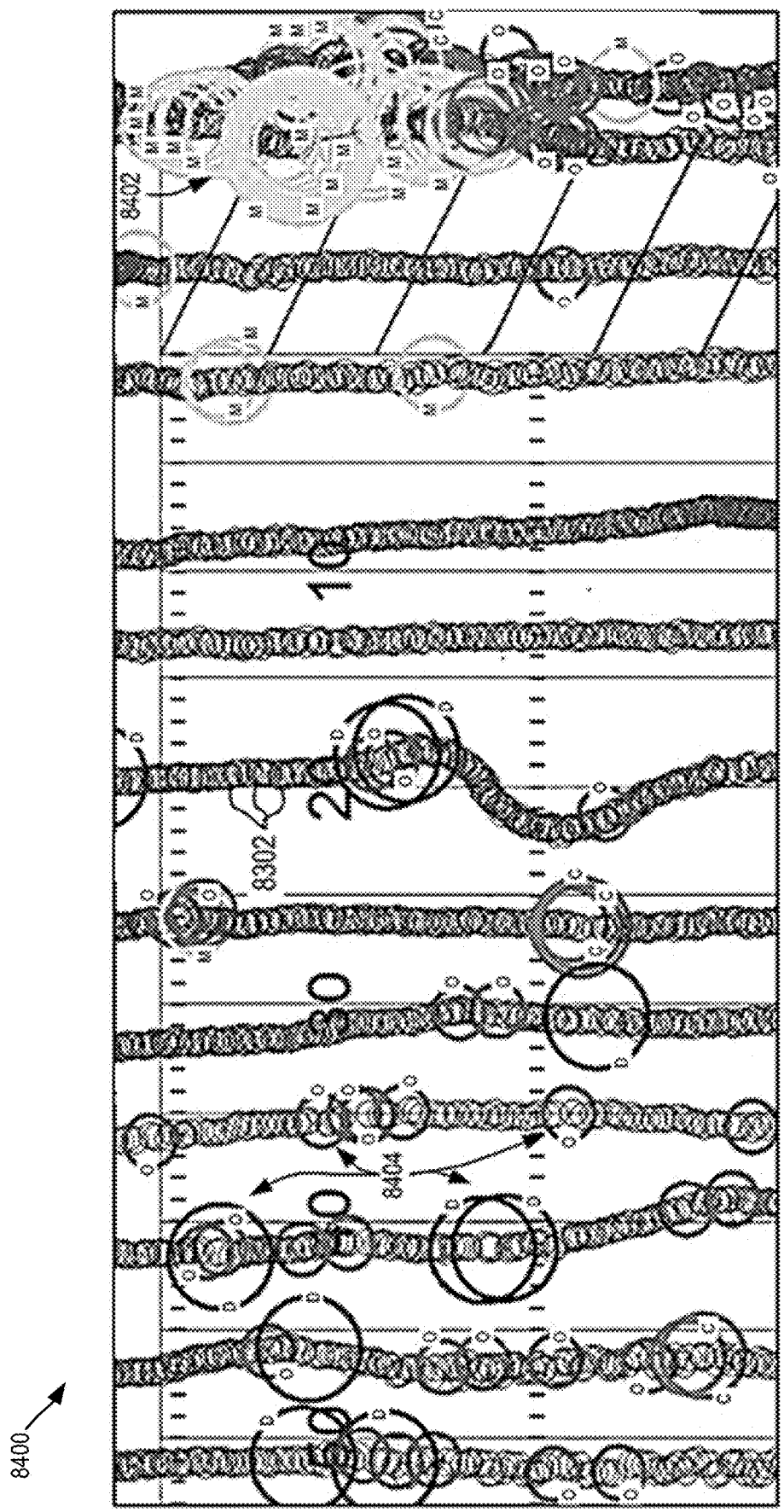
FIG. 84 shows one exemplary enhanced static line plot that further combines additional error and receiver information from the recorded data of FIG. 82 with the plotted symbols of FIG. 83 that represent determined locates.

FIG. 84 shows one exemplary enhanced static line plot 8400 that further combines additional error and receiver information from recorded data 8204 with the plotted symbols 8302 that represent determined locates 8209. Often, since test lap data is generated and collected under ideal conditions, what appears to be minor issues in test lap data may actually indicate bigger problems that will manifest at those same field locations during "game day" conditions. The "game day" environment is far more demanding than a test lap since tag transmissions may be partially blocked by nearby athletes.

Static line plotter 8210 also generates and plots symbols that visually represent errors occurring within system 100, even errors that would not be noticeable during normal operation of system 100. Plotter 8210 visually displays these errors and other information on plot 8400 as symbols positioned to represent the location of tag 101 when the error and/or information occurred. Plot 8400 thereby provides a method of distinguishing between different types of error conditions and information that occurs within system 100. Most importantly, plot 8400 relates error conditions to the position within tracking area 100 (i.e., on field of play 103) where they occurred.

Plotter 8210 displays a symbol even when no valid locate 8209 has been determined. In that case, plotter 8210 plots a symbol at the last known tag location and in a different color to represent the type of error. For example, each error condition (e.g. too few receivers, no convergence, etc.) is color coded, as represented by letters shown in FIG. 84. In the example of FIG. 84, letters positioned on the symbols indicate a color corresponding to data type selections of FIG. 85, described below.

Where a single error occurs between two locates 8209 (i.e., valid location determinations), the plotted symbol is the same size as the symbol plotted for a locate. Where more than one ('n') consecutive pings 402 result in the same error, the size of the plotted symbol increases proportional to 'n'. Thus, the greater the number of consecutive, recurring errors of the same type, the more visibly noticeable the plotted symbol.

Plot 8400 allows errors associated with a specific location within operational area 102 to be immediately apparent. For example, as tag 101 crosses the problem area within operational area 102, that area within plot 8400 turns a color consistent with the error type, and where the error persists for consecutive pings 402, that area within plot 8400 "blooms" into a large color coded visual representation 8402.

As shown in plot 8400, a large number of errors occurred during replay of recorded data 8204 (i.e., the test lap data set). Nearly all of these errors are invisible when viewed using plot 8300 of FIG. 83. In particular, plot 8400 visually indicates 8404 exactly where an error occurred, why it occurred, and how frequently it occurred. Easy assimilation of this information by a system administrator (or install engineer) is crucial when initially configuring system 100 within a new environment, and for adjusting all of the possible filtering algorithms within processing hub 150.

Playback tool 8202 may be used to repeatedly replay recorded data 8204 at high speed and generate plot 8400 with modified filter parameters. With each adjustment, the administrator sees the effect on the adjustments on the test lap data set. This provides a fast and visible way of initially "tuning" system 100.

Figure 85:
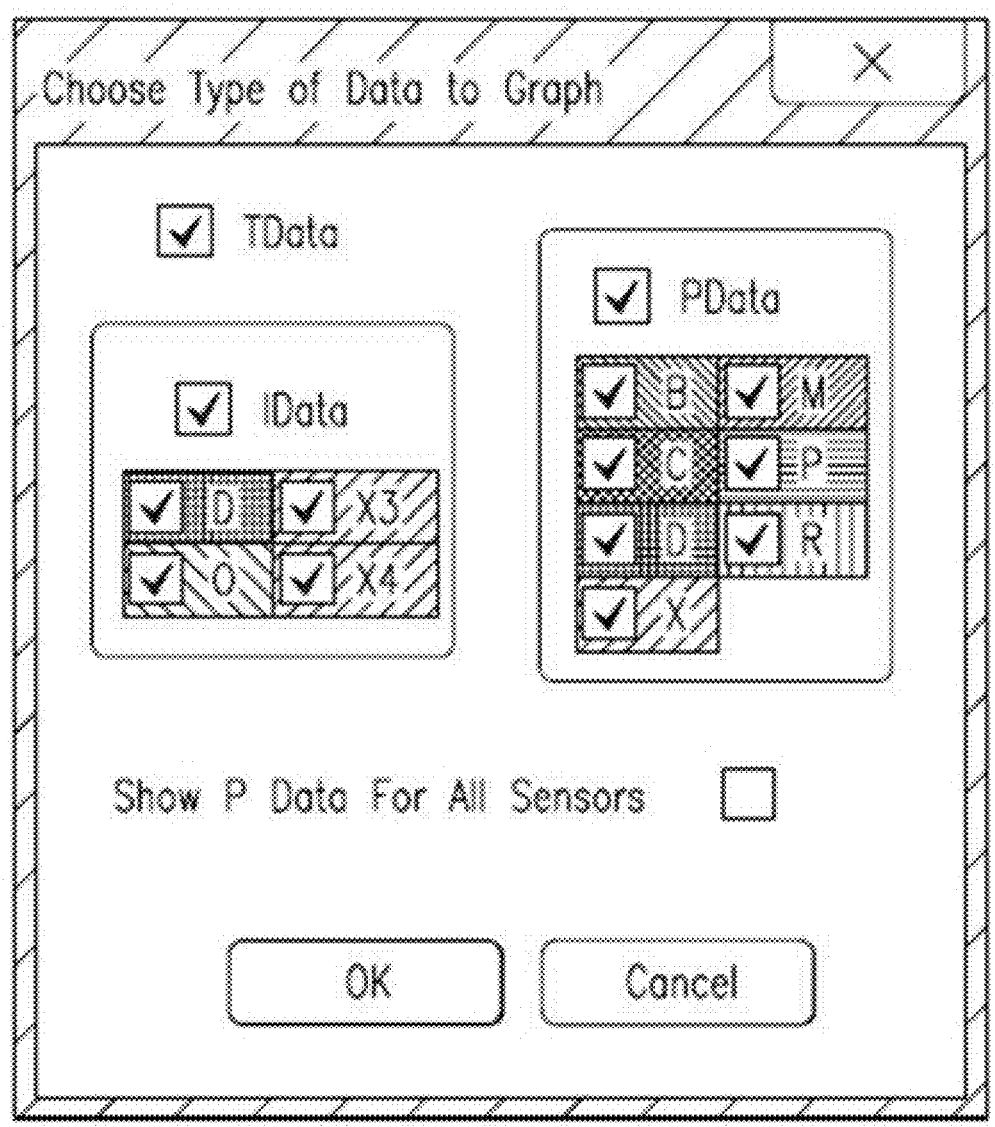
FIG. 85 shows one exemplary dialog box for selecting features for inclusion within the plot of FIG. 84.

FIG. 85 shows one exemplary dialog box 8500 for selecting features for inclusion within plot 8400, wherein each feature is color coded (as represented by the letters, such a C—Cyan, M—Magenta, O—orange, and so on.). For example, a user may select the type of error to be displayed within plot 8400, wherein the symbol is displayed on plot 8400 in the associated color. Even where plot 8400 represents a short period, a large number of individual tags 101 and tens or hundreds of thousands of individual locates 8209 may be included. Plotter 8210 provides a very quick and simple way to visually identify a problem in a sea of data. However, when diagnosing a cause of the problem, it is nearly always necessary to look at a relatively small amount of data associated with a single tag 101, immediately before and after the error occurred.

FIG. 86 shows a portion 8600 of recorded data 8204 selected by a visual data selector 8212 within analysis tool 8208. In particular, selector 8212 cooperates with plotter 8210 and plot 8400 to select the portion of recorded data 8204 based upon the user clicking with a mouse on plot 8400. In one embodiment, analysis tool 8208 stores a copy of all information used to generate plot 8400, together with an identifier (TagID) of tag 101. Selector 8212 finds the nearest plotted point to the click location on plot 8400, determines the TagID of that plotted point, and then retrieves n number of the underlying data samples for that TagID, from both immediately before/after the nearest plotted point.

Thus, the combination of plotter 8210 and selector 8212 provides a powerful tool for quickly looking deeply into the lowest level data to ease identification of system problems and diagnosing their causes. This combination is also valuable for adjusting the many different types of filters that may potentially be part of system 100, and getting immediate visual feedback corresponding to each adjustment.

In a typical installation of system 100, anywhere from 4-12 receivers 104 are arranged around operational area 102. To ensure complete and reliable coverage of operational area 102, ping 402 from tag 101, positioned at any location within operational area 102, is detected by a minimum of at least three receivers 104. A coverage area, within operational area 102, of each receiver 104 is defined by a combination of the receiver's antenna pattern, the receiver alignment, and distance. When installing system 100, based upon learned experience, a first approximation for placement and alignment of receivers 104 is done visually. While this is a good start, the detailed coverage area is just a guess, and accuracy of predicting receiver coverage may be significantly degraded by various physical obstacles in the facility (e.g., the goal post).

Figure 87:
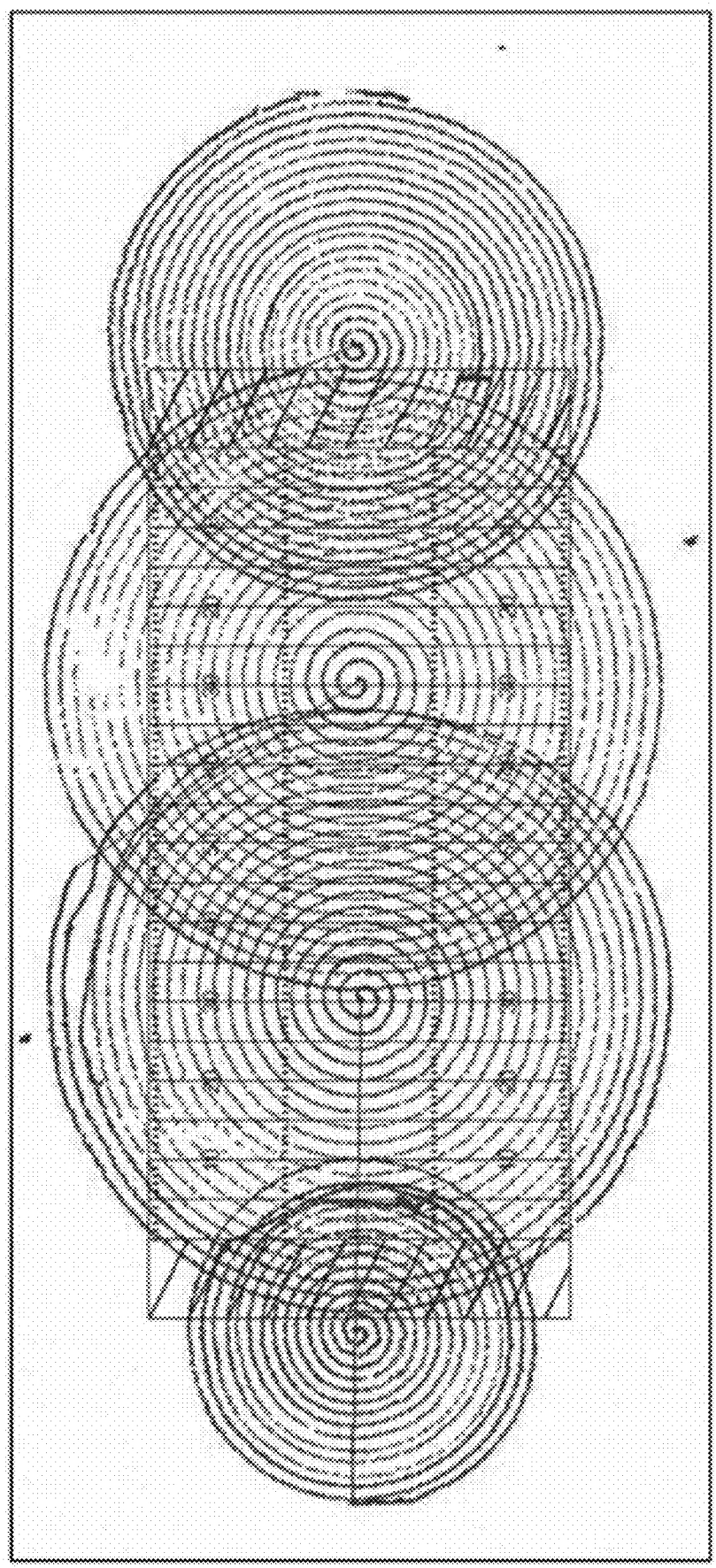
FIG. 87 shows one exemplary static line plot illustrating a very detailed circular Test Lap data set.

FIG. 87 shows one exemplary static line plot 8700 illustrating a very detailed circular Test Lap data set. This data was collected by putting four equally spaced barrels on a football field. Tag 101 was installed on a small motorized cart, which was attached to the first barrel by a long string. System 100 was activated to create recorded data 8204 and the cart was turned on and continuously drove in circles around the barrel, getting closer to the barrel as the string wound around the barrel and continuously got shorter. The same process was done for each of the other barrels. This type of test lap data set gives a very fine-grained view of coverage by each receiver 104.

Figure 88:
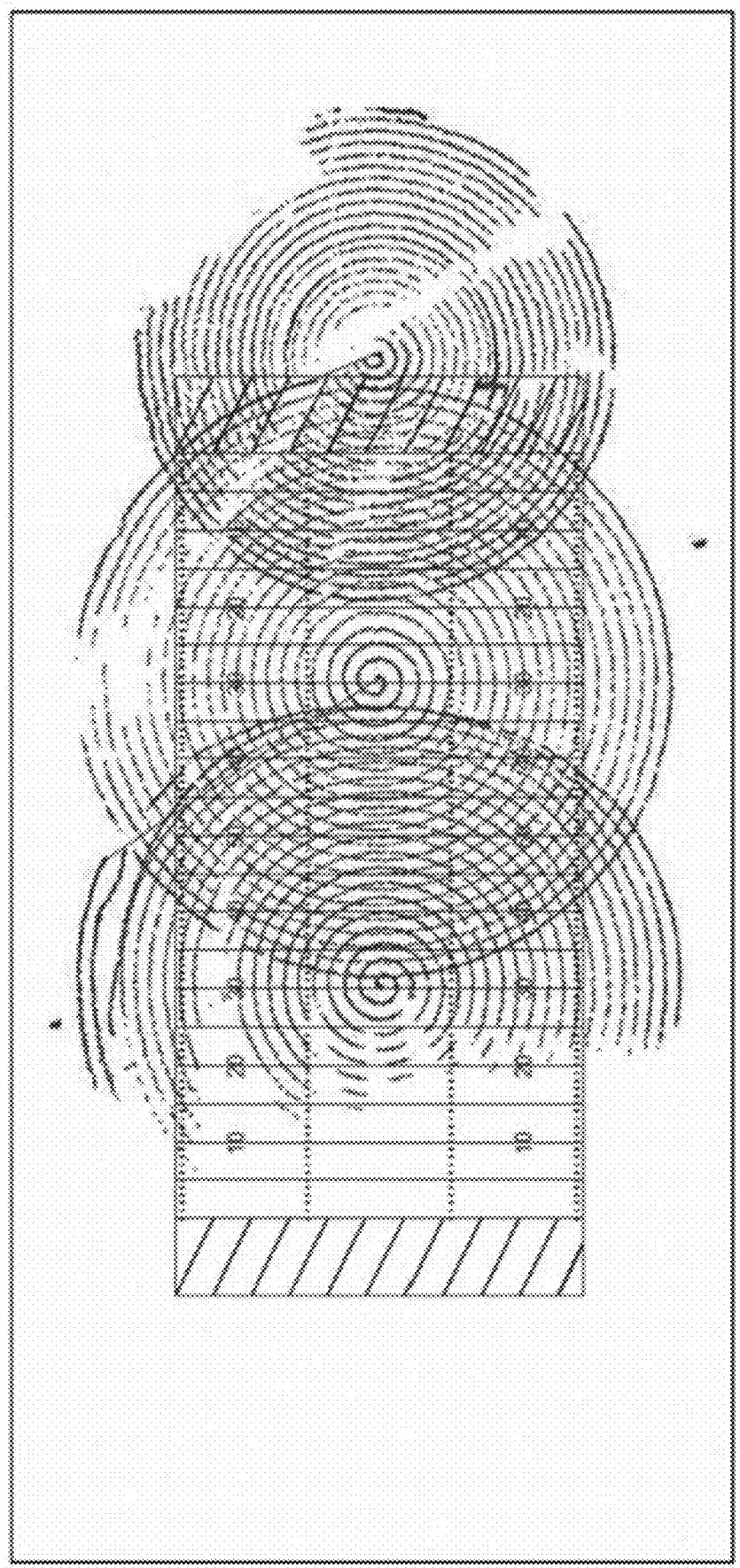
FIG. 88 shows one exemplary static line plot generated by the receiver viewer and the plotter of FIG. 82 of locates to display a coverage area of a particular receiver.

FIG. 88 shows one exemplary static line plot 8800 generated by a receiver viewer 8214 and plotter 8210 of locates 8209 to display a coverage area of a particular receiver 104. Where tag 101 is traversed throughout operational area 102, by generating plot 8800 using only locates 8209 resulting from receiver events 110 from a particular receiver 104, plot 8800 shows the area of coverage for that particular receiver 104. Thus, receiver viewer 8214 provides a simple and methodical means of adjusting the position and orientation of receivers 104 to ensure that their coverage areas all overlap sufficiently to ensure uniform coverage of operational area 102.

Receiver viewer 8214 and plotter 8210 may also be used with plot 8400 of FIG. 84, to display errors associated with receiver positioning. The visual error plotting within plot 8400 may indicate a specific region within operational area 102 where errors are occurring because too few receivers 104 have coverage of that area. By using receiver viewer 8214 to display the coverage area of each receiver 104, the installer may quickly determine which receivers 104 should be adjusted to provide coverage of that region. For example, playback tool 8202 may repeatedly replay a portion of recorded data 8204 where receiver viewer 8214 selects a different receiver, thereby showing different coverage areas for the different receiver.

Receiver viewer 8214 is typically used with recorded data 8204, where playback tool 8202 repeatedly plays the recorded data back while receiver viewer 8214 selects one of receivers 104. A receiver live monitor 8216 within analysis tool 8208 provides a real-time view of behavior of all receivers 104 simultaneously as a single tag 101 is moved around operational area 102.

Figure 89:
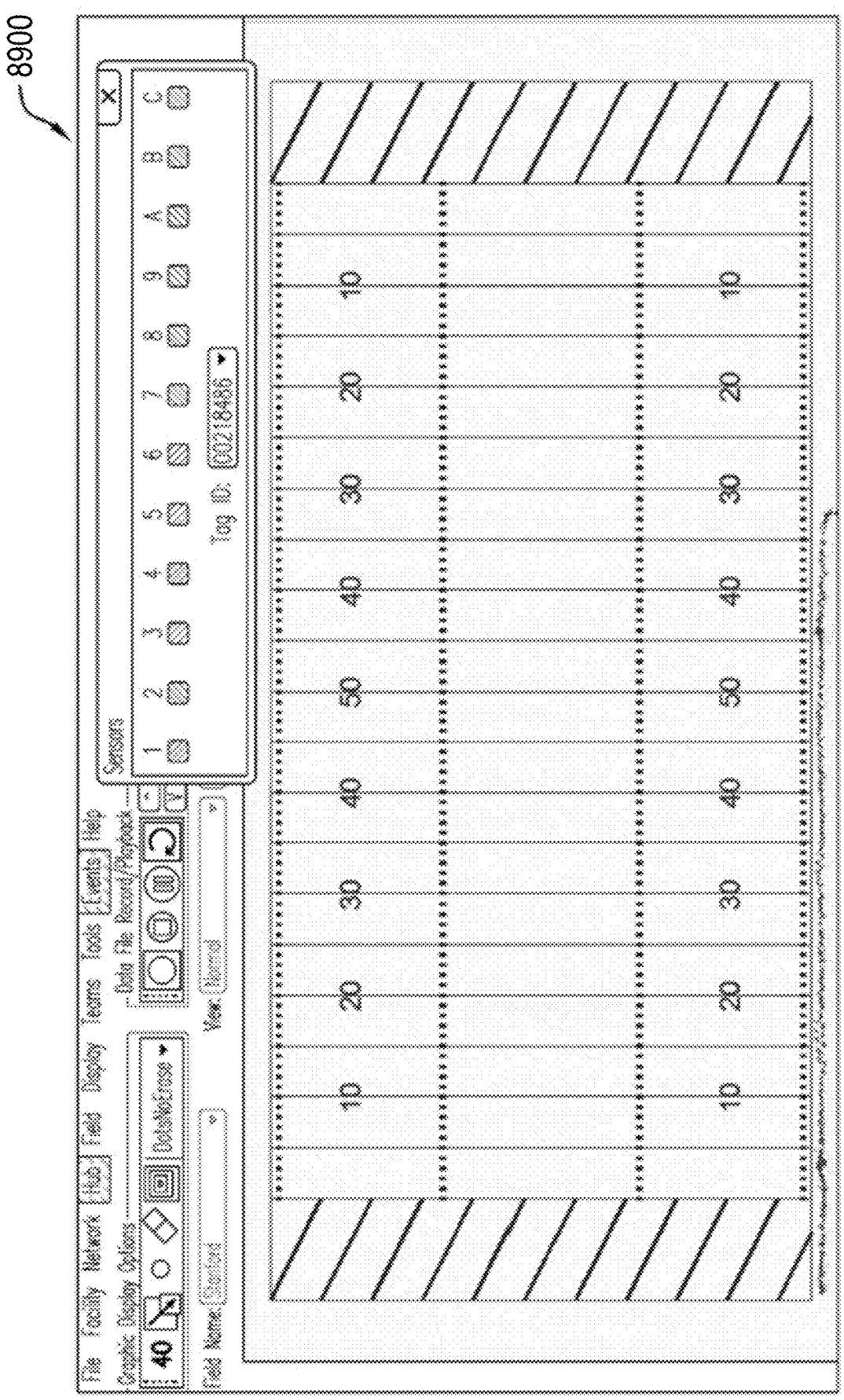
FIG. 89 shows an exemplary receiver display illustrating the receivers of FIG. 1 used to determine a location of a single tag moving within the tracking area.

FIG. 89 shows an exemplary receiver display 8900 illustrating receivers 104 used to determine a location of a single tag 101 moving within operational area 102. As each new data item (either a locate 8209 or an error) for tag 101 is determined, display 8900 is updated to show the receivers generating a receiver event 110 for tag 101. In the example of FIG. 89, twelve receivers are used within system 100, and receivers 1, 3, 4, 5, and 6 received ping 402 from tag 101. Receiver display 8900 is useful when diagnosing problems with overlapping receiver coverage, especially in systems with larger number of receivers. By moving tags through the areas of the field with spotty coverage, a user may quickly see where intermittent coverage of specific receivers occurs.

Robotic Vehicle

The level of system knowledge, manpower, and time required to complete an installation, configuration, and calibration of system 100, FIG. 1, within operational are 102 may be further reduced to simultaneously achieve optimal performance of the RF tag based object tracking system and consistency of receiver coverage between installations.

A wirelessly controlled robotic vehicle carrying a tag, remote controlled pan and tilt (P/T) mechanisms for adjusting aim of each receiver and/or antenna of each receiver, and a plurality of algorithms for automatically controlling the robotic vehicle, automatically analyzing location data, and automatically adjusting orientation of each receiver of the object tracking system are used to achieve optimal performance. By automating these systems and methods, the level of system knowledge, manpower, and time required to install, configure and calibrate the object tracking system in a sporting environment is significantly reduced. By automating the testing and adjustment of each receiver's aim, this may be repeated as many times as necessary to achieve optimal performance. Thus, a defined level of performance may be achieved for each installation, thereby increasing installation to installation consistency.

The following examples describe a step by step process for controlling movement of the robotic vehicle within the operational area, collecting data from the object tracking system for the tag mounted on the vehicle, analyzing that data, and automatically making adjustments to the aim of each receiver within the object tracking system to optimize receiver coverage of the field of play within the operational area.

Figure 90:
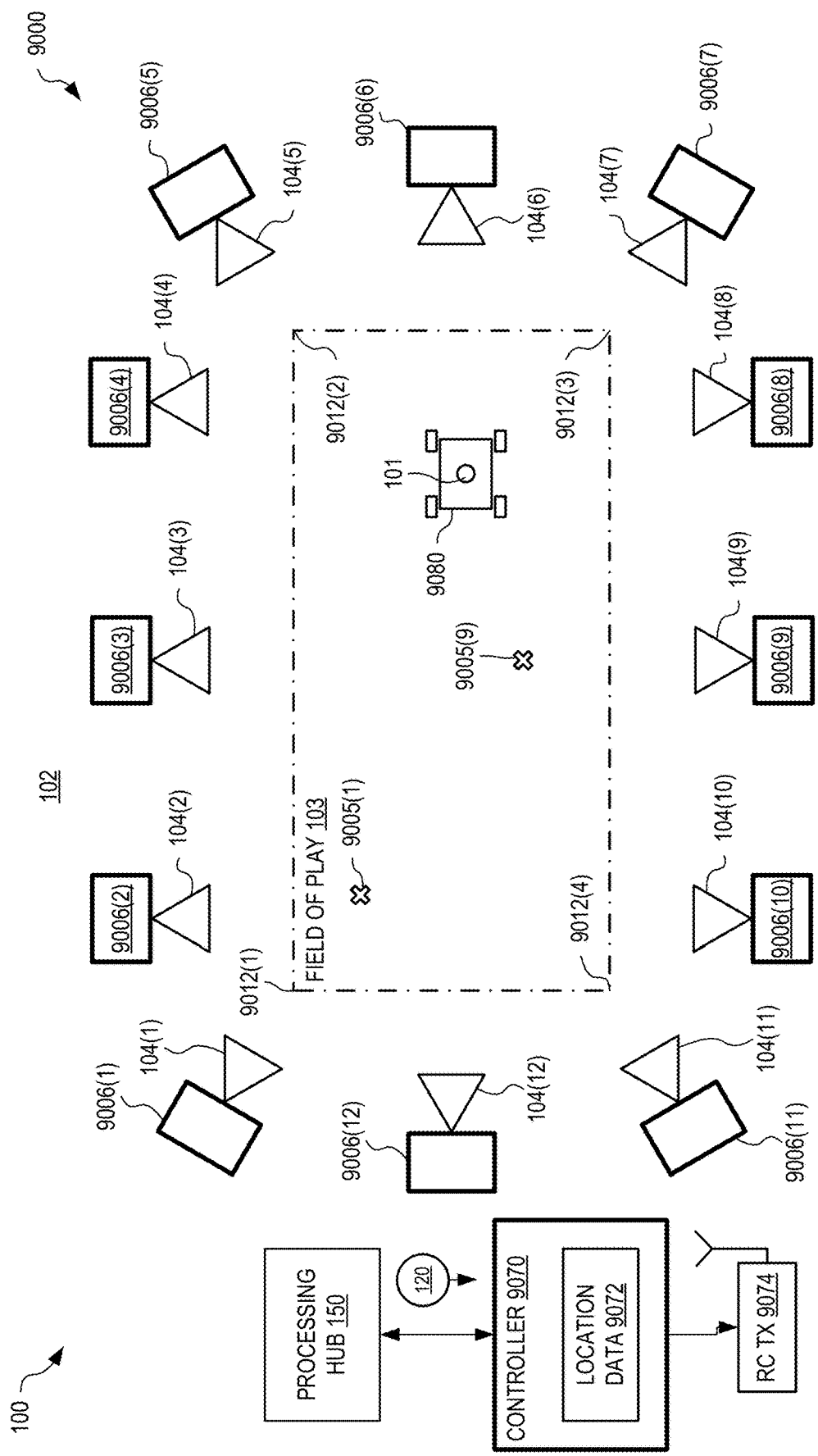
FIG. 90 is a schematic showing one exemplary automated installation and calibration (AIC) system for an object tracking system, in an embodiment.

FIG. 90 is a schematic showing one exemplary automated installation and calibration (AIC) system 9000 for object tracking system 100 of FIG. 1. In this example, object tracking system 100 has twelve receivers 104, positioned within operational area 102 and around field of play 103. In the following example, operational area 102 is an American football stadium and field of play 103 is an American football field. AIC system 9000 includes an install/configuration controller 9070 that is in communication with processing hub 150 and a remote-controlled vehicle 9080 configured with a tag 101. Remote controlled vehicle 9080 is wirelessly controlled by controller 9070 using a remote control transmitter 9074 for example. Tag 101 periodically transmits a ping that is detectable, when in range, by receivers 104 of object tracking system 100. The location of each receiver 104 and the location of field of play 103 (e.g., each corner 9012(1)-(4) of field of play 103) are accurately measured and their coordinates are recorded for use by object tracking system 100. Once object tracking system 100 is configured, as receivers 104 receive pings from one or more tags 101, processing hub 150 determines locate data 120 that defines a location of the one or more tags 101 within operational area 102.

During initial installation of object tracking system 100, receivers 104 are positioned around field of play 103 and each is manually aimed at a predefined location on field of play 103. For example, receiver 104(1) is manually aimed at location 9005(1), receiver 104(9) is manually aimed at location 9005(9), and so on. One goal in positioning receivers 104 within operational area 102 is to enable object tracking system 100 to reliably locate tags 101 anywhere within operational area 102. Each receiver 104 is mounted on a remote-controlled P/T mechanism 9006 that operates to adjust aim of receiver 104 and/or antenna 602 of receiver 104. For example, P/T mechanism 9006(3) operates to aim receiver 104(3), P/T mechanism 9006(11) operates to aim receiver 104(11), and so on. In an alternate embodiment, P/T mechanism 9006(3) operates to aim antenna 602 of receiver 104(3), P/T mechanism 9006(11) operates to aim antenna 602 of receiver 104(11), and so on. Each P/T mechanism 9006 is in communication with, and controlled by, controller 9070. In the description of the embodiments herein below, where reference is made to the P/T mechanism controlling aim of the receiver, the P/T mechanism may alternatively control aim of the receiver's antenna without departing from the scope hereof.

Coverage Data Collection (Gross)

In a first step, controller 9070 operates object tracking system 100 to determine location data for tracking tag 101 mounted on remote controlled vehicle 9080, and controls vehicle 9080 to follow a predetermined path within operational area 102. Controller 9070 receives locate data 120 from processing hub 150 and determines whether the initial receiver installation configuration (i.e. mounting location and aim) meets specific criteria such that object tracking system 100 will be able to detect tag 101 on remote controlled vehicle 9080 in subsequent steps.

Figure 91:
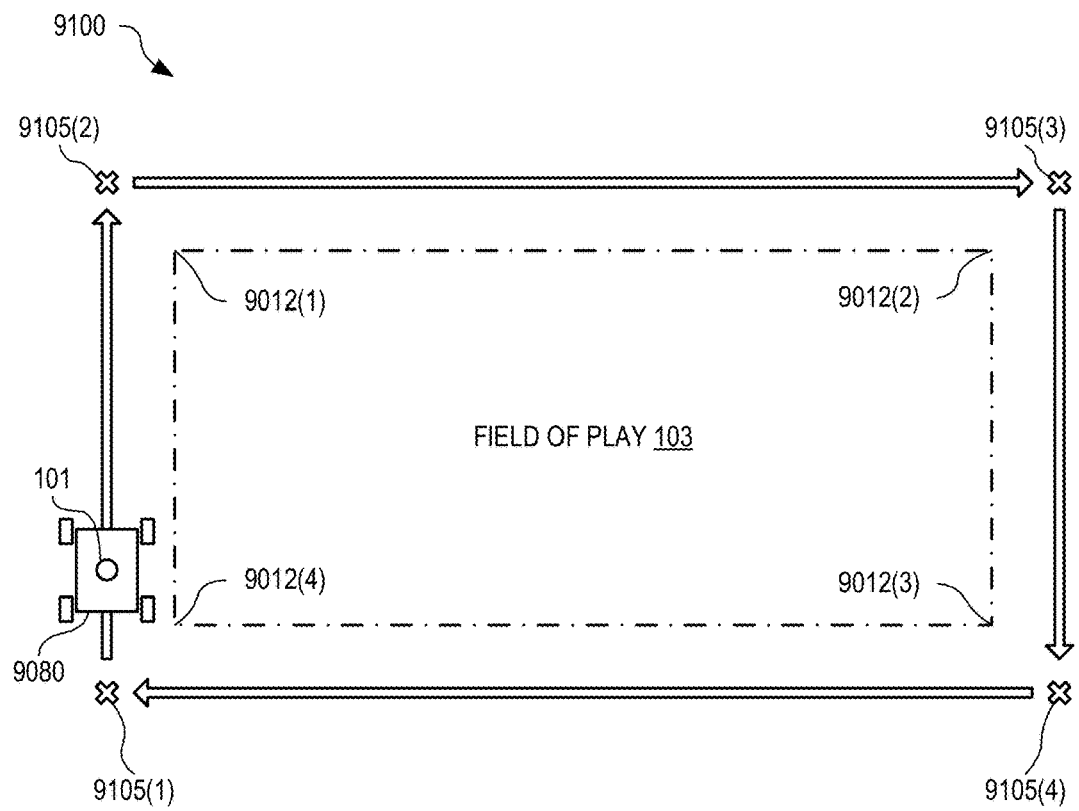
FIG. 91 shows one exemplary predetermined gross path that the vehicle of FIG. 90 follows under control of the controller, in an embodiment.

FIG. 91 shows one exemplary predetermined gross path 9100 that vehicle 9080 follows under control of controller 9070. Path 9100 is for example considered a "gross" path since it has reduced complexity as compared to other paths described herein. Path 9100 is defined by points 9105(1)-(4) and vehicle 9080 is controlled to travel from point 9105(1) to point 9105(2), then from point 9105(2) to point 9105(3), then from point 9105(3) to point 9105(4), and then from point 9105(4) to point 9105(1). Although path 9100 is shown outside and around a periphery of field of play 103, since points 9105 are outside of field of play 103, points 9105 may be positioned elsewhere within operational area 102 without departing from the scope hereof.

Figure 92:
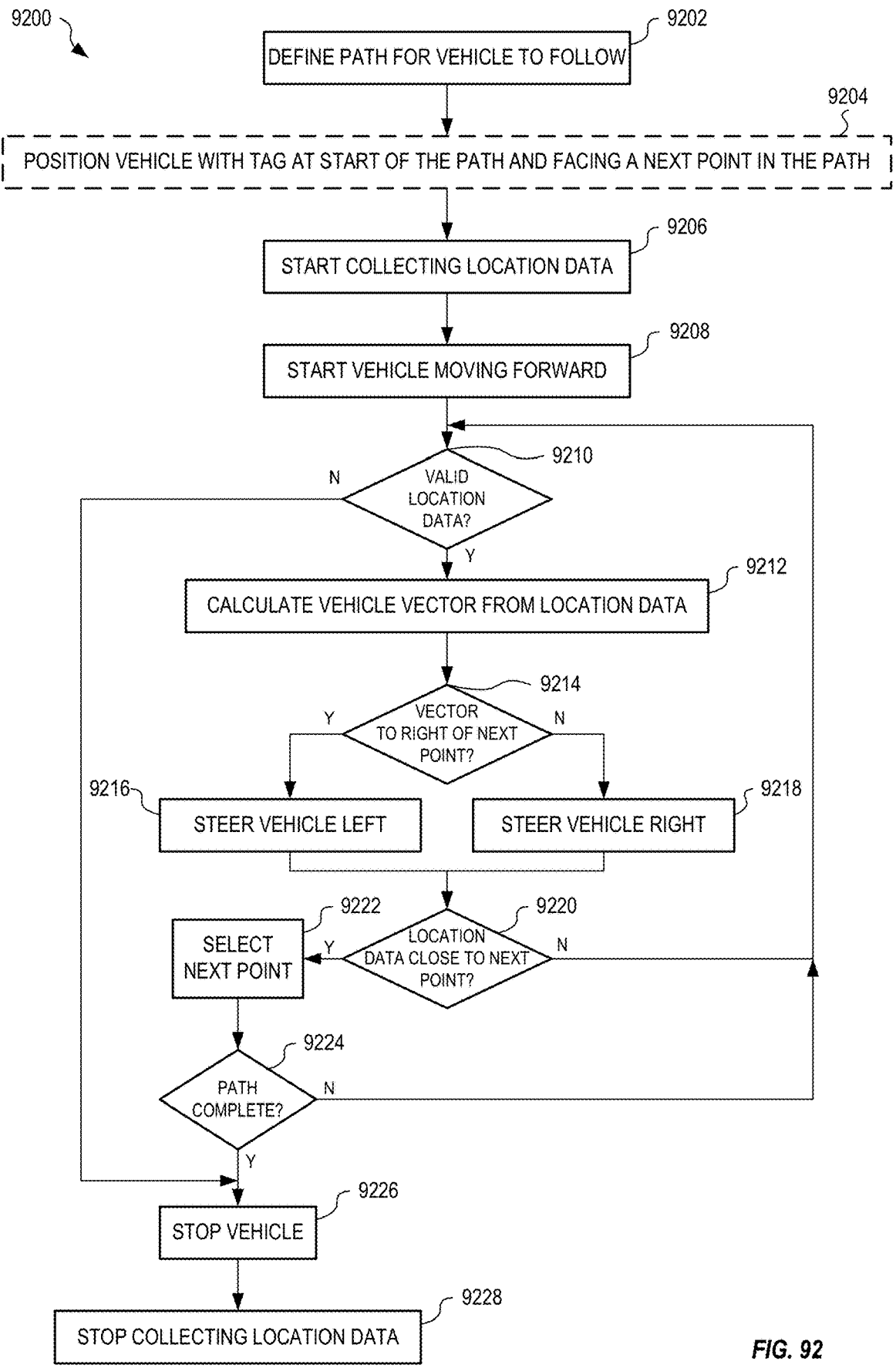
FIG. 92 is a flowchart illustrating one exemplary AIC method for automated location data collection using the object tracking system, the vehicle, and the RF tag of FIG. 90, in an embodiment.

FIG. 92 is a flowchart illustrating one exemplary AIC method 9200 for automated location data collection using object tracking system 100, vehicle 9080, and tag 101 of FIG. 1. Method 9200 is for example implemented within controller 9070. If method 9200 does not complete successfully, the installation of object tracking system 100 needs physical evaluation and method 9200 repeated before continuing.

In step 9202, method 9200 defines a path for the vehicle to follow. In one example of step 9202, controller 9070 generates points 9105 based upon field of play 103 which define path 9100 for vehicle 9080 to follow. In another example of step 9202, controller 9070 received data for points 9105 from a user.

In step 9204, method 9200 positions the vehicle with the tag at the start of the defined path and facing a next point in the path. In one example of step 9204, controller 9070 controls vehicle 9080, with tag 101 attached, to stop vehicle 9080 at point 9105(1) and facing towards point 9105(2). In another example of step 9204, a technician positions vehicle 9080, with tag 101 attached, at point 9105(1) and facing point 9105(2) and then notifies controller 9070 that the vehicle is ready.

In step 9206, method 9200 starts collecting location data. In one example of step 9206, controller 9070 starts collecting locate data 120 from object tracking system 100 for tag 101 and stores each collected locate within location data 9072. In step 9208, method 9200 starts the vehicle moving forward. In one example of step 9208, controller 9070 sends a wireless signal to vehicle 9080 instructing it to move forward continuously. In one example of operation, controller 9070 controls vehicle 9080 to move forward at two meters per second.

Step 9210 is a decision. If, in step 9210, method 9200 determines that valid location data is received for tag 101, method 9200 continues with step 9212; otherwise, method 9200 continues with step 9226. In one example of step 9210, controller 9070 determines the location of vehicle 9080 from locate data 120 and considers if the location has been received within the last five hundred milliseconds. In one example of step 9210, if controller 9070 determines that valid location data has not been received for tag 101 within the last five hundred milliseconds, controller 9070 aborts the current test and continues with step 9226.

In step 9212, method 9200 calculates the vehicle's movement vector using location data. In one example of step 9212, controller 9070 calculates a movement vector from the last four determined locations for tag 101 within locate data 120.

Step 9214 is a decision. If, in step 9214, method 9200 determines that the vector is right of the next point, method 9200 continues with step 9216; otherwise method 9200 continues with step 9218.

In step 9216, method 9200 steers the vehicle to the left. In one example of step 9216, controller 9070 sends a wireless command to vehicle 9080 to steer it to the left by an amount proportional to the error between the vector and the direction of the next point. Method 9200 then continues with step 9220.

In step 9218, method 9200 steers the vehicle to the right. In one example of step 9218, controller 9070 sends a wireless command to vehicle 9080 to steer it to the right by an amount proportional to the error between the vector and the direction of the next point. Method 9200 then continues with step 9220.

Figure 93:
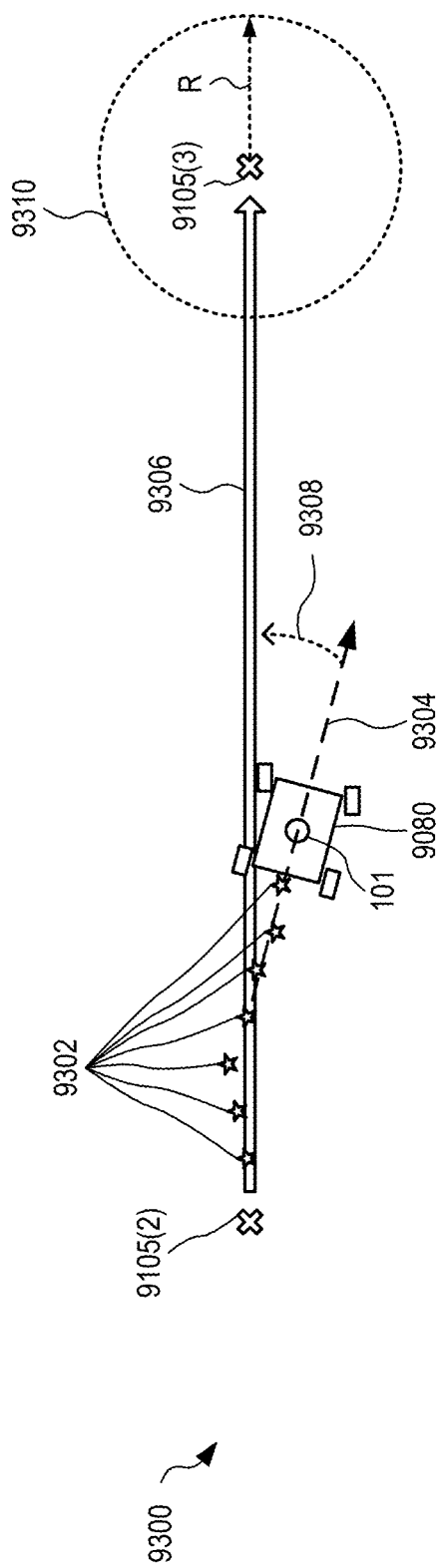
FIG. 93 shows one exemplary scenario where the vehicle of FIG. 90 is travelling between points of FIG. 91.

FIG. 93 shows one exemplary scenario where vehicle 9080 is travelling from point 9105(2) towards point 9105(3). Arrow 406 indicates an ideal path between points 9105(2) and 9105(3). A plurality of stars 9302 represent determined locations, received within locate data 120, of vehicle 9080, and a most recent four of these locations are used to calculate a movement vector 9304 of vehicle 9080. Since vector 9304 points to the right of next point 9105(3), controller 9070 steers vehicle to the left, as indicated by arrow 9308.

Step 9220 is a decision. If, in step 9220, method 9200 determines that the current location of the vehicle is close to the next point in the path, method 9200 continues with step 9222; otherwise method 9200 continues with step 9210. Steps 9210 through 9220 repeat to monitor and control vehicle 9080 as it progresses between each point 9105 of path 9100. In one example of step 9220, as shown in FIG. 93, vehicle 9080 is considered close to the current destination point when it is within a radius R of that point. As shown in FIG. 93, when vehicle 9080 is within circle 9310 it is considered close to point 9105(3). R is for example 1 meter. Circle 9310 is used since even with an accurately aligned system, it is unreasonable to expect vehicle 9080 to arrive at the exact location of each point 9105. For example, accuracy of the determined location and unevenness of the terrain typically contribute to positioning errors for vehicle 9080.

In step 9222, method 9200 selects the next point in the path. In one example of step 9222, controller 9070 selects point 9105(4) when the determined location of vehicle 9080 is within circle 9310 around point 9105(3).

Step 9224 is a decision. If, in step 9224, method 9200 determines that the path is complete, method 9200 continues with step 9226; otherwise, method 9200 continues with step 9210. Steps 9210 through 9224 repeat until vehicle 9080 reaches the end point 9105 of the path 9100. It should be noted that in steps 9212 through 9218, vehicle 9080 is automatically controlled to steer towards the next selected point 9105 when vector 9304 does not already point towards the location of that point.

In step 9226, method 9200 stops the vehicle. In one example of step 9226, controller 9070 wirelessly sends a stop command to vehicle 9080. In step 9228, method 9200 stops collecting location data. In one example of step 9228, controller 9070 stops collecting locate data 120.

Method 9200 may be performed to collect location data using other paths, as described below.

Coverage Data Analysis (Gross)

Once method 9200 is successfully completed (i.e., vehicle 9080 reached the final point 9105 in path 9100), controller 9070 analyzes the collected location data to ensure that each receiver 104 was used to determine the location of tag 101 when vehicle 9080 was within an area of interest (e.g., expected reception area) of the receiver. Controller 9070 compares locates derived from each receiver 104 against ideal reception area for that receiver 104. If controller 9070 determines that any receiver 104 was not involved in determining any locates of tag 101 when vehicle 9080 was located within the ideal reception area of the receiver, automatic evaluation is halted until evaluation of the receiver(s) is performed by the technician.

Figure 94:
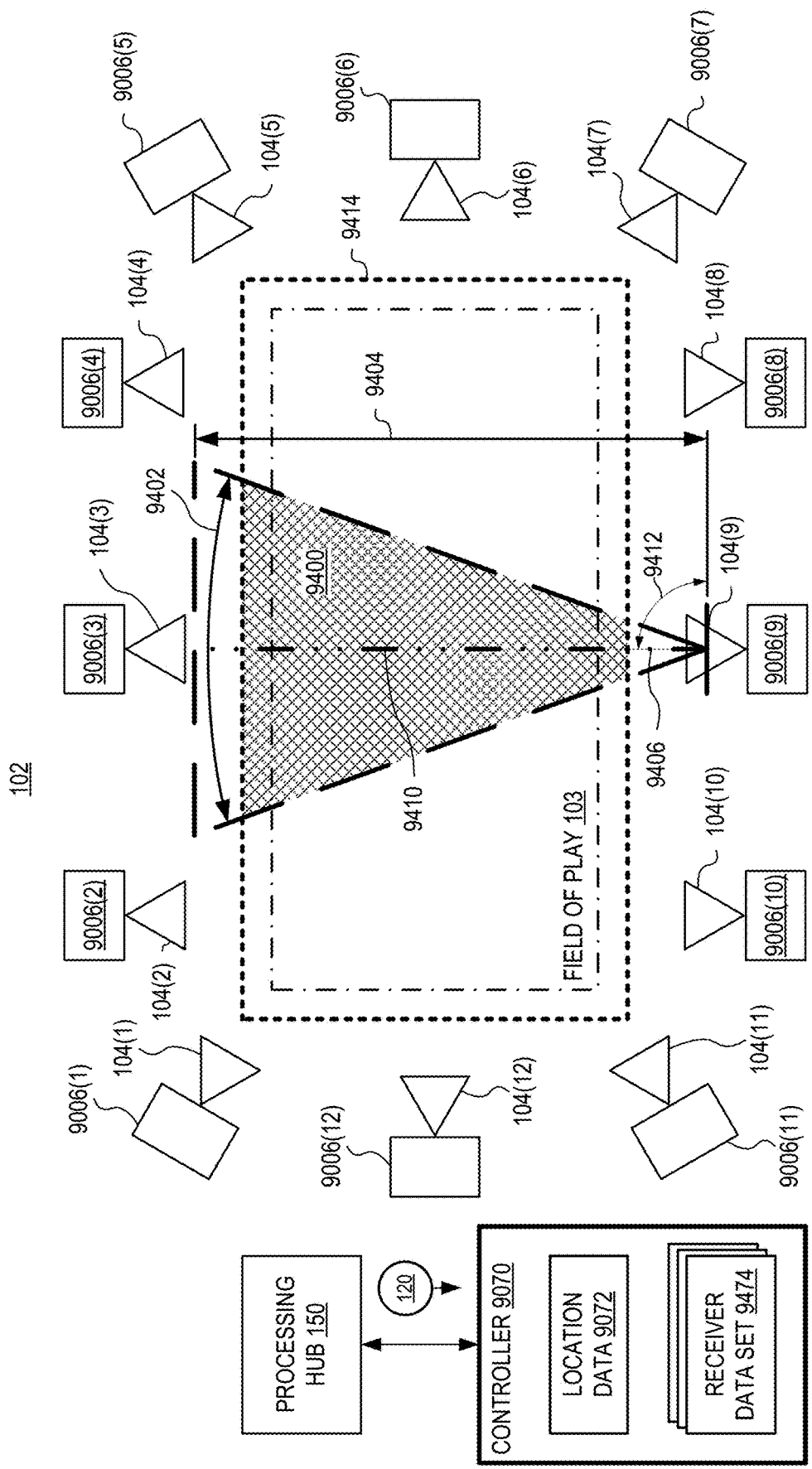
FIG. 94 shows one exemplary area of consideration (AOC) for the receiver of the object tracking system of FIG. 90.

FIG. 94 shows one exemplary area of consideration (AOC) 9400 for receiver 104(9) of object tracking system 100 of FIG. 1. Receiver 104(9) is used within the example of FIG. 94, but each receiver has a similarly defined AOC 9400. Receiver 104(9) has a scope 9402 that defines angular bounds of its receiving area and a range 9404 that defines a maximum distance from the receiver that a ping from tag 101 will be detected. A perimeter 9414 around field of play 103 defines an operation area for object tracking system 100. Perimeter 9414 is for example one meter greater on each side than field of play 103.

A receiver centerline 9406 of receiver 104(9) defines its desired angular orientation 9412, that in conjunction with the location of receiver 104(9), scope 9402, and range 9404, define a triangular area of ideal reception for receiver 104(9). AOC 9400, shown shaded for clarity in FIG. 94, is determined as the overlap of the triangular area of ideal reception with the area defined by perimeter 9414. An AOC first centerline 9410 aligns with receiver centerline 9406. AOC 9400 thereby defines the desired operational area of receiver 104(9) within operational area 102. An AOC is determined for each receiver 104 such that all locations within field of play 103 are covered by AOCs of at least three receivers. Although aim of one or more receivers 104 may be automatically adjusted, AOC 9400 for each receiver is not recalculated.

Figure 95:
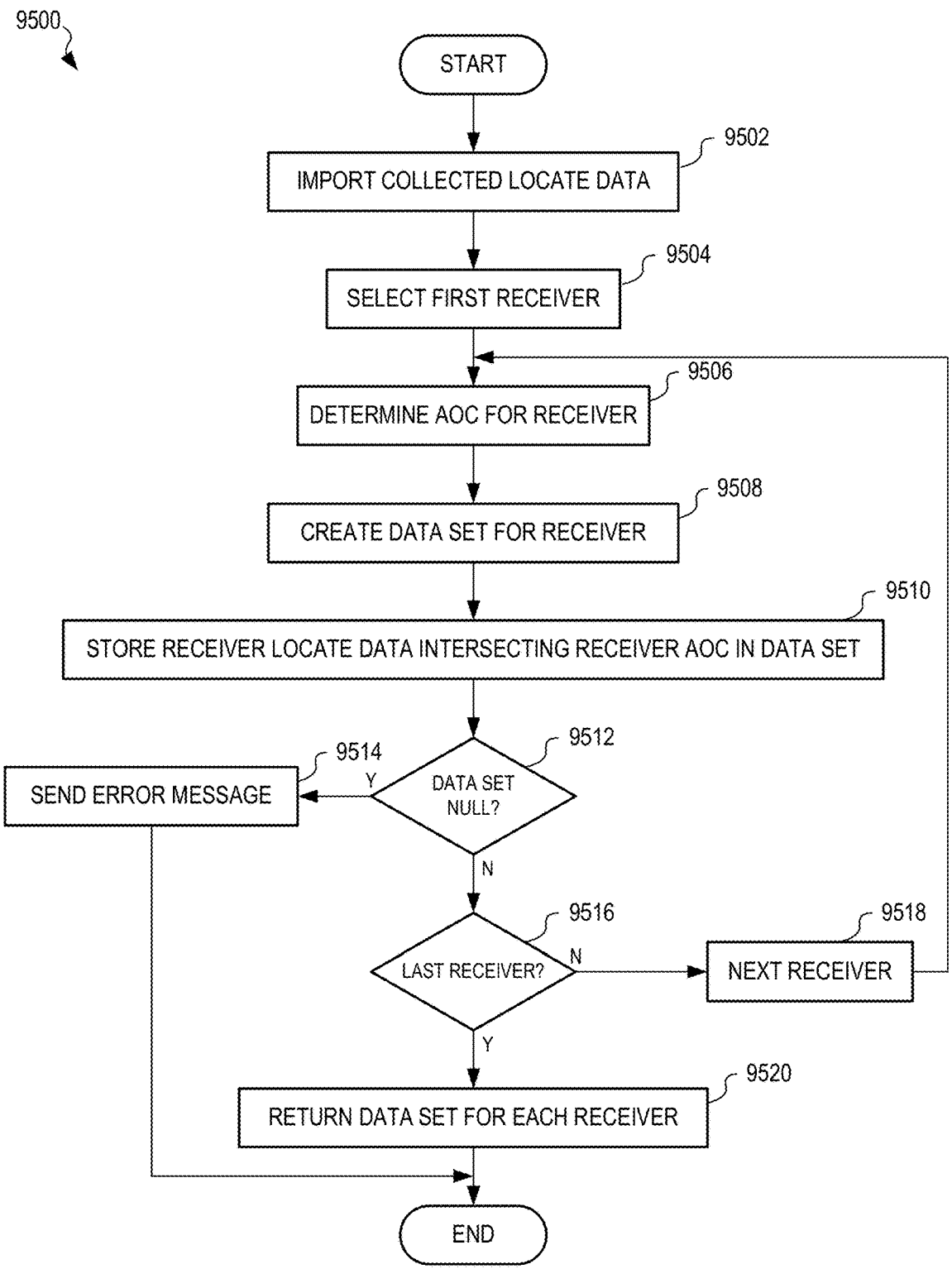
FIG. 95 is a flowchart illustrating one exemplary method for creating a data set for each receiver from location data collected by the method of FIG. 92, in an embodiment.

FIG. 95 is a flowchart illustrating one exemplary method 9500 for creating a data set 9474 for each receiver 104 from location data 9072 collected by method 9200 of FIG. 92. Method 9500 is for example implemented within controller 9070 of FIG. 90.

In step 9502, method 9500 imports collected location data. In one example of step 9502, controller 9070 imports location data 9072, collected by method 9200, into working storage. In step 9504, method 9500 selects a first receiver. In one example of step 9504, controller 9070 selects receiver 104(9). In step 9506, method 9500 determines an AOC for the current receiver selected in step 9504. In one example of step 9506, controller 9070 determines AOC 9400 for receiver 104(9). In step 9508, method 9500 creates an empty data set for the current receiver. In one example of step 9508, controller 9070 creates data set 9474 with no entries. In step 9510, method 9500 stores receiver locate data intersecting the receiver AOC in the data set. In one example of step 9510, locate data that was determined using receiver 104(9) and that defines a locate that falls within AOC 9400 is stored within data set 9474.

Step 9512 is a decision. If, in step 9512, method 9500 determines that the data set is null, method 9500 continues with step 9514; otherwise method 9500 continues with step 9516. In step 9514, method 9500 sends an error message. In one example of step 9514, controller 9070 displays an error message indicating that receiver 104(9) did not generate location data 9072 within its determined AOC 9400. Method 9500 then terminates. In an alternate embodiment, method 9500 continues with step 9516 and processes subsequent receivers such that should more than one receiver 104 fail to generate locates within its determined AOC 9400, the technician is notified thereof.

Step 9516 is a decision. If, in step 9516, method 9500 determines that the current receiver is the last receiver to be processed, method 9500 continues with step 9520; otherwise method 9500 continues with step 9518. In step 9518, method 9500 selects a next receiver for processing. In one example of step 9518, controller 9070 selects receiver 104(10). Method then continues with step 9506. Steps 9506 through 9518 repeat for each receiver 104 of object tracking system 100.

In step 9520, method 9500 returns a data set for each receiver. In one example of step 9520, controller 9070 stores data set 9474 for each receiver 104. Method 9500 then terminates.

Method 9500 may process collected locate data from paths other than path 9100, as described in detail below.

Coverage Data Collection (Coarse)

Figure 96:
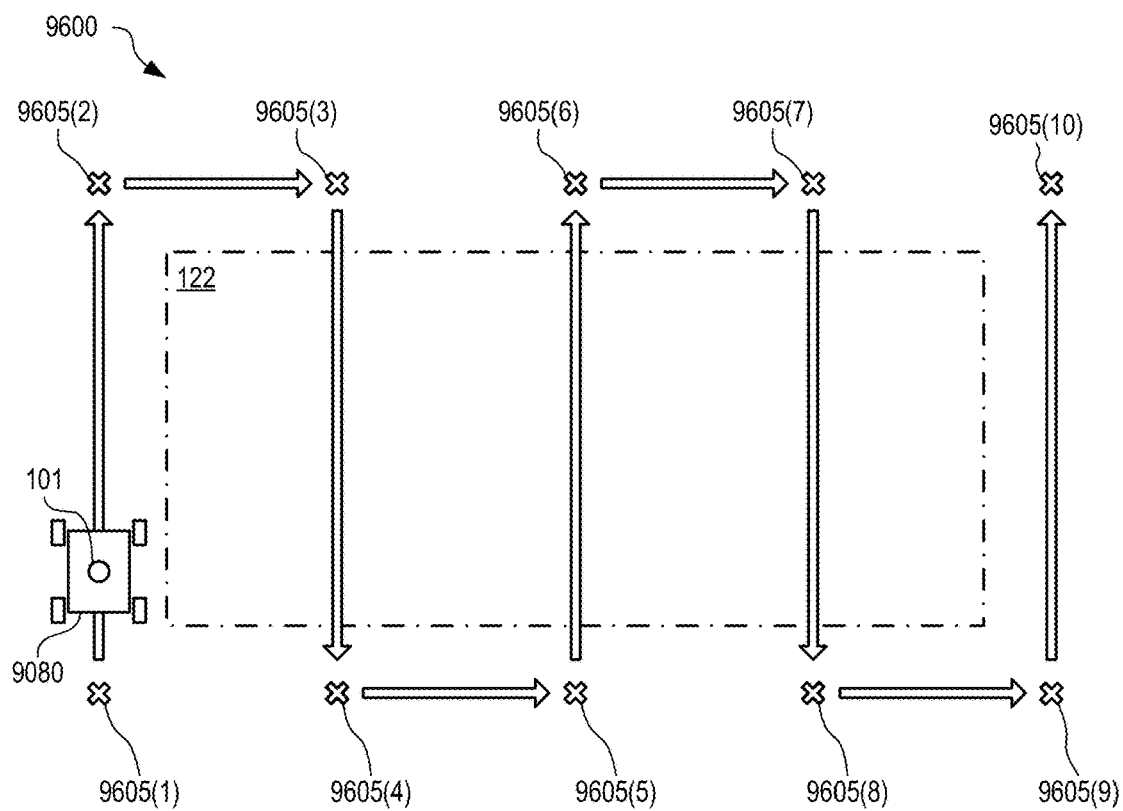
FIG. 96 shows one exemplary predetermined coarse path that the vehicle of FIG. 90 follows under control of the controller, in an embodiment.

FIG. 96 shows one exemplary predetermined coarse path 9600 that vehicle 9080 follows under control of controller 9070. Path 9600 is for example considered a "coarse" path since it has more complexity that gross path 9100 of FIG. 91, but less complexity as compared to fine path 10000 of FIG. 100 described below. Path 9600 is defined by points 9605 (1)-(10) and vehicle 9080 is controlled to travel from point 9605(1) to point 9605(2), then from point 9605(2) to point 9605(3), and so on until vehicle 9080 reaches point 9605 (10). Although points 9605 of path 9600 are positioned outside and around a periphery of field of play 103, points 9605 may be positioned elsewhere within operational area 102 without departing from the scope hereof.

Controller 9070 repeats method 9200 of FIG. 92 to control vehicle 9080 to follow coarse path 9600 and to collect locate data 120 from object tracking system 100, which is stored as location data 9072 within controller 9070. Controller 9070 then repeats method 9500 of FIG. 95 to process location data 9072 and generate receiver data sets 9474.

Coverage Data Analysis and Antenna Adjustment (Coarse)

Each ping (e.g., ping 402, FIG. 4) received by receiver 104 generates a receiver event (e.g., receiver event 110, FIG. 1). Each locate generated by object tracking system 100 is determined using at least three receiver events for the same ping. Thus, for a location to be generated for a ping, at least three receivers detect the ping and generate a receiver event.

Figure 97:
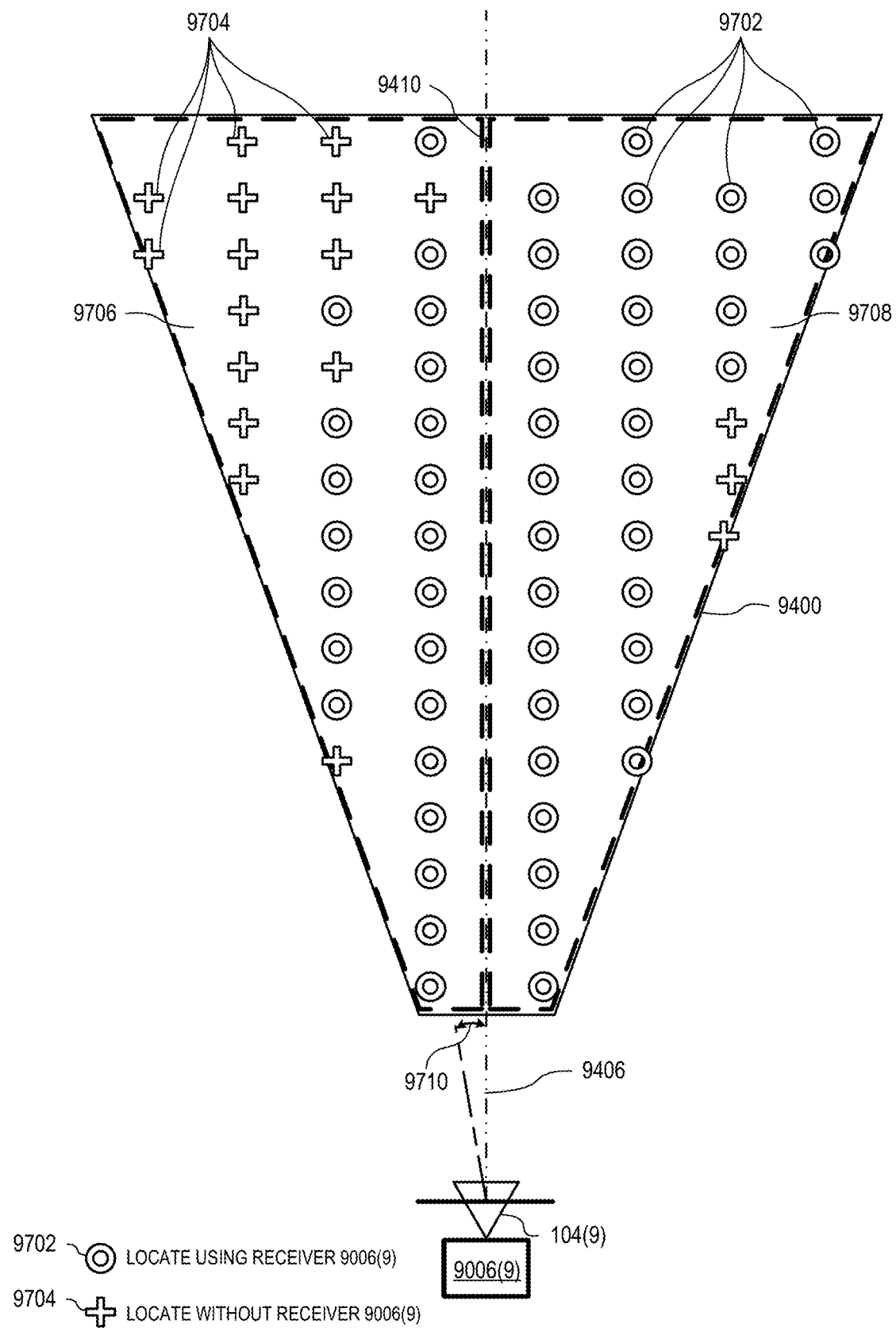
FIG. 97 is a top view of one receiver and its AOC showing exemplary distribution of involving locates between a left half and a right half of the AOC when determining automatic pan of the receiver.

FIG. 97 is a top view of receiver 104(9) and its AOC 9400 showing exemplary distribution of locates 9702, determined using receiver events generated by receiver 104(9), between a left half 9706 and a right half 9708 of AOC 9400 for determining automatic pan 9710 of receiver 104(9). In the example of FIG. 97, approximately sixty-one percent of locates are within right half 9708, wherein pan 9710 of receiver 104(9) is made to the left. Involving locates 9702 (indicated by circles) represents locates of receiver data set 9474 that were determined within object tracking system 100 using receiver events generated by receiver 104(9). Non-involving locates 9704 (indicated by crosses) represent locates of receiver data set 9474 that were determined within object tracking system 100 without using information provided by receiver 104(9). Receiver 104(9) is therefore panned 9710 to the left in an attempt to balance involving locates 9702 more evenly between halves 9706 and 9708.

Figure 98:
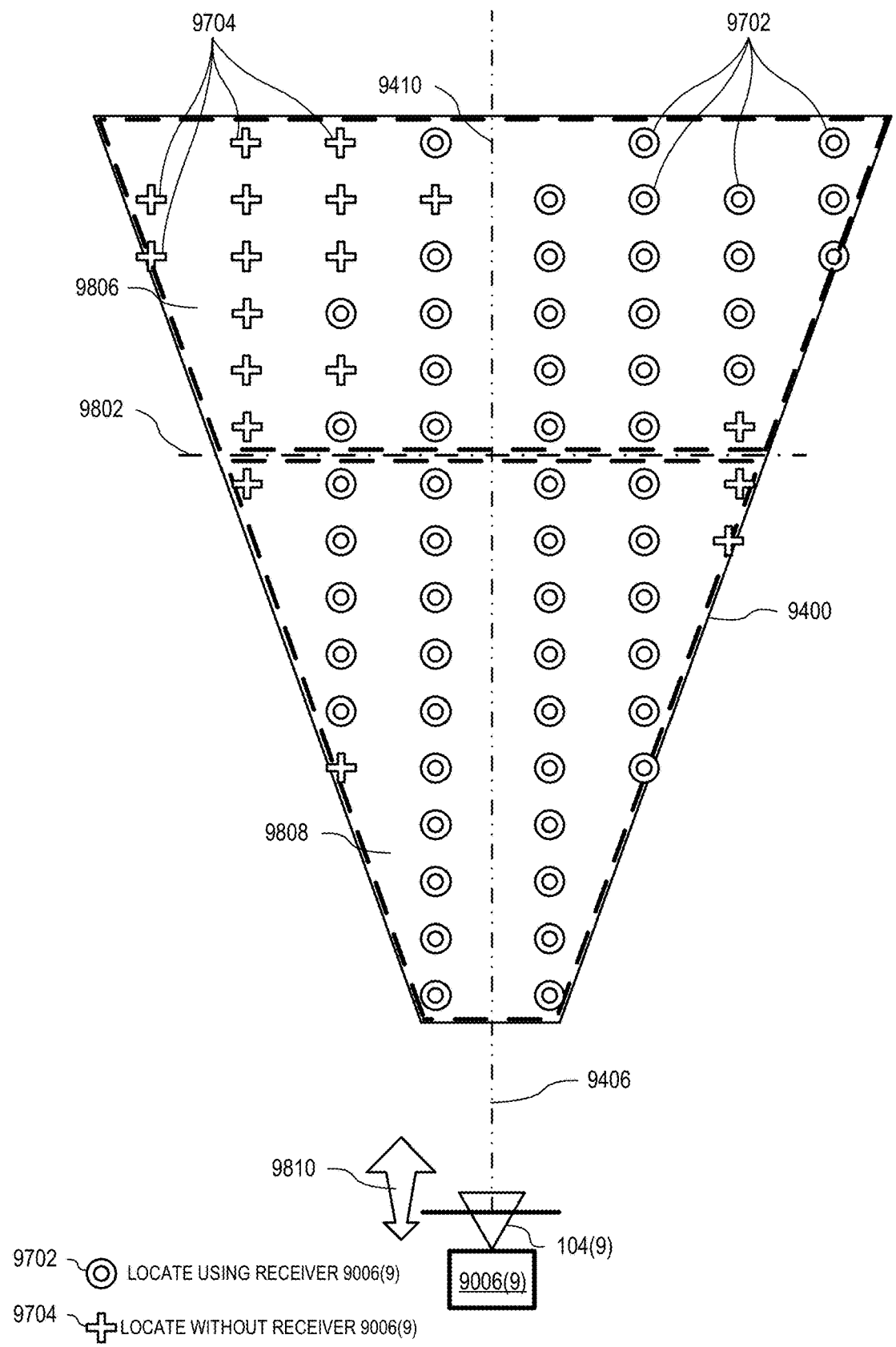
FIG. 98 is a top view of one receiver and its AOC of FIG. 94 showing exemplary distribution of involving locates between a top half and a bottom half of the AOC when determining automatic tilt of the receiver.

FIG. 98 is a top view of receiver 104(9) and its AOC 9400 showing exemplary distribution of involving locates 9702 between a top half 9806 and a bottom half 9808 of AOC 9400 for determining automatic tilt 9810 of receiver 104(9). Second centerline 9802 divides AOC 9400 such that area of each half 9806 and 9808 are substantially equal. In the example of FIG. 98, approximately sixty-one percent of involving locates are within bottom half 9808, wherein tilt 9810 of receiver 104(9) is made upwards. Involving locates 9702 (indicated by circles) represents locates of receiver data set 9474 that were determined within object tracking system 100 using receiver events generated by receiver 104(9). Non-involving locates 9704 (indicated by crosses) represent locates of receiver data set 9474 that were determined within object tracking system 100 without using information provided by receiver 104(9). Receiver 104(9) is therefore tilted 9810 up in an attempt to balance involving locates 9702 more evenly between halves 9806 and 9808.

Figure 99:
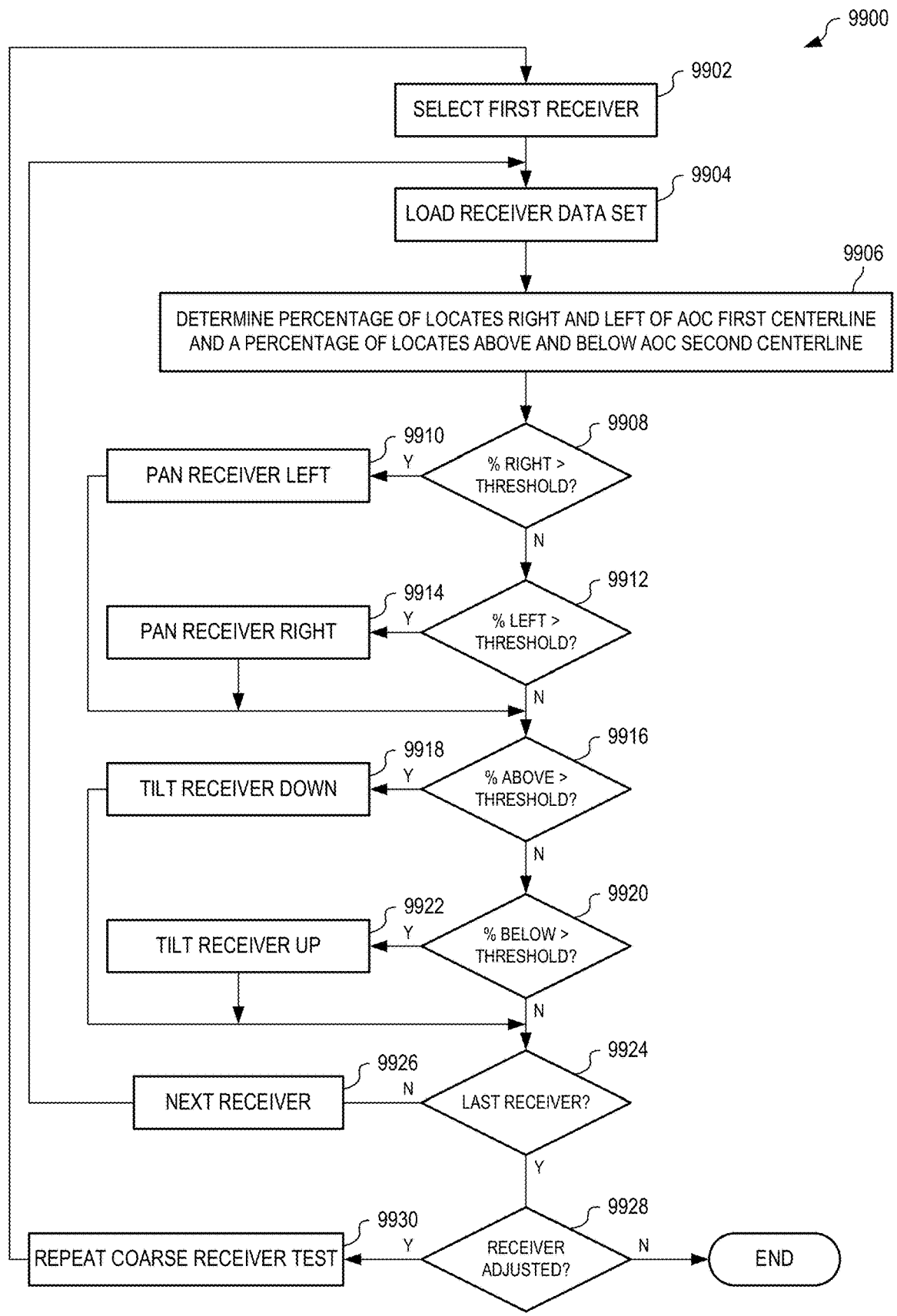
FIG. 99 is a flowchart illustrating one exemplary method for automatically adjusting orientation of the receivers of the object tracking system of FIG. 90, in an embodiment.

FIG. 99 is a flowchart illustrating one exemplary method 9900 for automatically adjusting orientation of receivers 104 of object tracking system 100. FIGS. 97, 98 and 99 are best viewed together with the following description. Method 9900 is for example implemented within controller 9070 of AIC system 9000, FIG. 90. Upon completion of method 9200 for collection location data using coarse path 9600, controller 9070 invokes method 9900 to analyze each data set 9474 and automatically adjust orientation of each receiver 104 as necessary. Coarse path 9600 is provided as an illustrative example, in practice granularity of coarse path 9600 is increased to improve uniformity of distribution of location points within each AOC 9400.

In step 9902, method 9900 selects a first receiver. In one example of step 9902, controller 9070 selects receiver 104(9). In step 9904, method 9900 loads the receiver dataset for the current receiver. In one example of step 9904, controller 9070 loads receiver data set 9474 that was generated by method 9200 using coarse path 9600. In step 9906, method 9900 determines a percentage of locates right and left of the AOC first centerline and a percentage of locates above and below the AOC second centerline. In one example of step 9906, controller 9070 determines a percentage of locates, determined using receiver events generated by receiver 104(9), within each of left half 9706 and right half 9708 of AOC 9400 and determines a percentage of those locates within each of top half 9806 and bottom half 9808 of AOC 9400.

Step 9908 is a decision. If, in step 9908, method 9900 determines that the percentage of locates in the right half of the AOC is greater than a predefined threshold, method 9900 continues with step 9910; otherwise, method 9900 continues with step 9912. In one example of step 9908, controller 9070 continues with step 9910 when the determined percentage of locates within right half 9708 is greater than fifty-five percent. In step 9910, method 9900 pans the receiver to the left by a predefined amount. In one example of step 9910, controller 9070 commands P/T mechanism 9006(9) to pan receiver 104(9) left by five degrees. Method 9900 then continues with step 9916.

Step 9912 is a decision. If, in step 9912, method 9900 determines that the percentage of locates in the left half of the AOC is greater than a predefined threshold, method 9900 continues with step 9914; otherwise, method 9900 continues with step 9912. In one example of step 9912, controller 9070 continues with step 9914 when the determined percentage of locates within left half 9706 is greater than fifty-five percent. In step 9914, method 9900 pans the receiver to the right by a predefined amount. In one example of step 9914, controller 9070 commands P/T mechanism 9006(9) to pan receiver 104(9) right by five degrees. Method 9900 then continues with step 9916.

Step 9916 is a decision. If, in step 9916, method 9900 determines that the percentage of locates in the top (wider) half of the AOC is greater than a predefined threshold, method 9900 continues with step 9918; otherwise, method 9900 continues with step 9920. In one example of step 9916, controller 9070 continues with step 9918 when the determined percentage of locates within top half 9806 is greater than fifty-five percent. In step 9918, method 9900 tilts the receiver down by a predefined amount. In one example of step 9918, controller 9070 commands P/T mechanism 9006 (9) to tilt receiver 104(9) down by one degree. Method 9900 then continues with step 9924.

Step 9920 is a decision. If, in step 9920, method 9900 determines that the percentage of locates in the lower half of the AOC is greater than a predefined threshold, method 9900 continues with step 9922; otherwise, method 9900 continues with step 9924. In one example of step 9920, controller 9070 continues with step 9922 when the determined percentage of locates within lower half 9808 is greater than fifty-five percent. In step 9922, method 9900 tilts the receiver up by a predefined amount. In one example of step 9922, controller 9070 commands P/T mechanism 9006(9) to tilt receiver 104(9) up by one degree. Method 9900 then continues with step 9924.

Step 9924 is a decision. If, in step 9924, method 9900 determines that the current receiver is the last receiver, method 9900 continues with step 9928; otherwise, method 9900 continues with step 9926. In step 9926, method 9900 selects the next receiver. In one example of step 9926, controller 9070 selects receiver 104(10). Method 9900 then continues with step 9904.

Steps 9904 through 9926 repeat for each receiver within object tracking system 100.

Step 9928 is a decision. If, in step 9928, method 9900 determines that orientation of at least one receiver was adjusted, method 9900 continues with step 9930; otherwise method 9900 terminates. In step 9930, method 9900 invokes methods 9200 and 9500 to repeat the receiver test using coarse path 9600. Controller 9070 thereby repeats pan and tilt adjustment of receivers 104 until no further adjustment is needed.

Coverage Data Collection (Fine)

Figure 100:
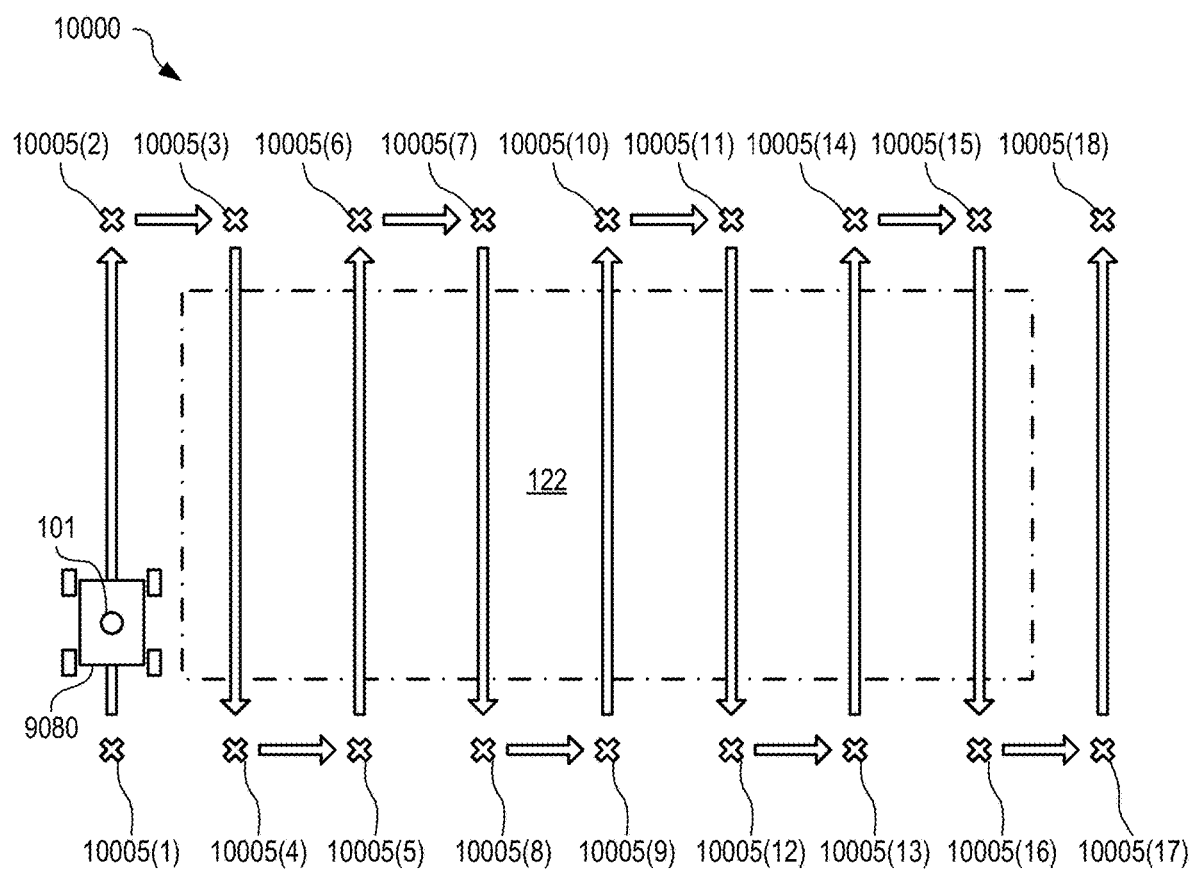
FIG. 100 shows one exemplary predetermined "fine" path that the vehicle of FIG. 90 is controlled to follow.

FIG. 100 shows one exemplary predetermined "fine" path 10000 that vehicle 9080 follows under control of controller 9070. Path 10000 is for example considered a "fine" path since it has more complexity that coarse path 9600 of FIG. 96. Path 10000 is defined by points 10005(1)-(18) and vehicle 9080 is controlled to travel from point 10005(1) to point 10005(2), then from point 10005(2) to point 10005(3), and so on until vehicle 9080 reaches point 10005(18). Although points 10005 of path 10000 are positioned outside and around a periphery of field of play 103, points 10005 may be positioned elsewhere within operational area 102 without departing from the scope hereof.

Controller 9070 repeats method 9200 of FIG. 92 to control vehicle 9080 to follow fine path 10000 and to collect locate data 120 from object tracking system 100, which is stored as location data 9072 within controller 9070. Path 10000, as followed by vehicle 9080, is selected to include the entire field of play 103 in a "fine" fashion. Controller 9070 then repeats method 9500 of FIG. 95 to process location data 9072 and generate receiver data sets 9474.

Coverage Data Analysis and Antenna Adjustment (Fine)

Controller 9070 then repeats method 9900 of FIG. 99 to analyze coverage of field of play 103 by receivers 104, making necessary adjustments to orientation of individual receivers 104. However, during analysis of receiver data sets 9474 collected using fine path 10000, method 9900 makes smaller (e.g., two degrees on pan and half a degree of tilt) adjustments to orientation of receivers 104 to achieve optimal system performance.

Figure 101:
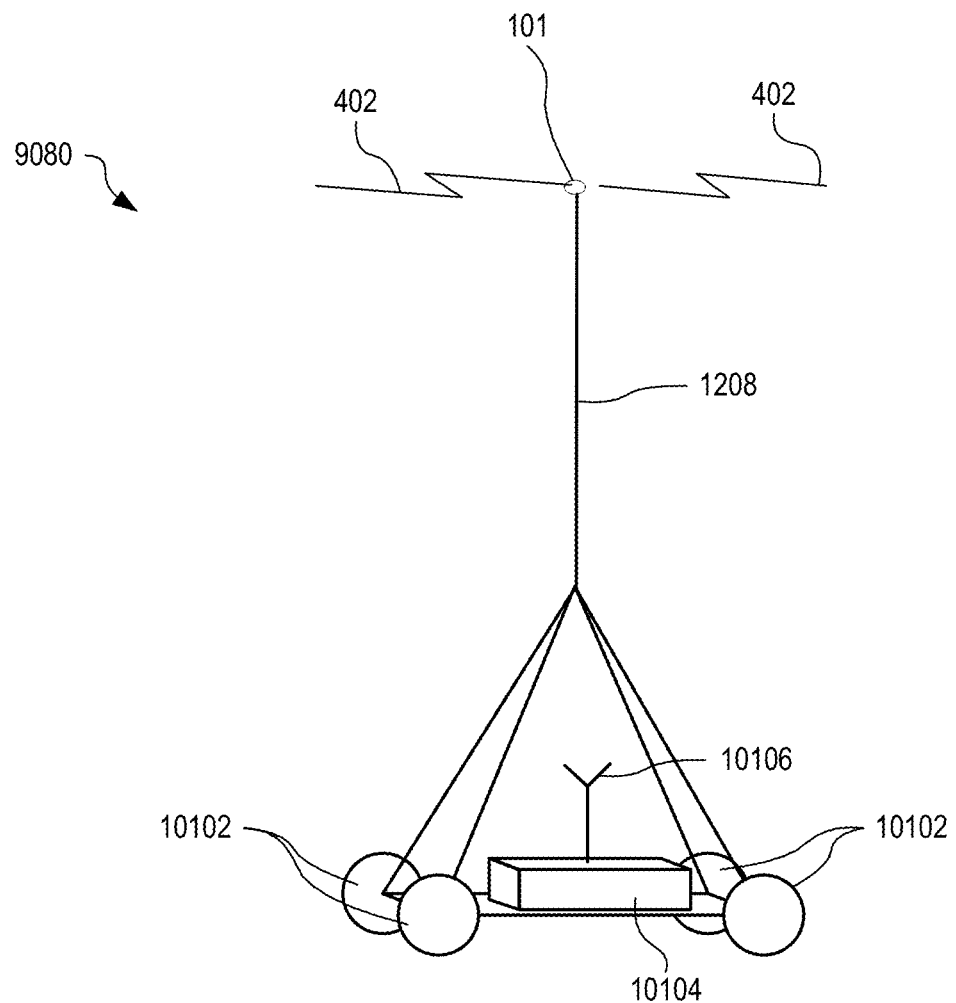
FIG. 101 shows the vehicle of FIG. 90 in further exemplary detail, in an embodiment.

FIG. 101 shows vehicle 9080 of FIG. 90 in further exemplary detail. Vehicle 9080 is shown with four wheels 10102, a receiver/controller 10104 that receives wireless commands, via an antenna 10106, from controller 9070 and controls wheels 10102 to move and turn vehicle 9080. For example, two or more of wheels 10102 may be steerable, under control of receiver/controller 10104, to allow controller 9070 to control vehicle 9080 to follow each of paths 9100, 9600, and 10000 of FIGS. 91, 96 and 100, respectively. Optionally, vehicle 9080 includes a mast 10108 to position tag 101 at a predetermined height above the ground (e.g., a surface of field of play 103) on which vehicle 9080 travels, thereby better simulating tags 101 attached to players in a game played on field of play 103. As described above, tag 101 periodically generates pings 402 that propagate omnidirectionally from tag 101. Receiver/controller 10104 may include other sensors (e.g., accelerometers) and functionality for autonomously assisting in control one or more of speed and direction of vehicle 9080.

Combination of Features

Features described above as well as those claimed below may be combined in various ways without departing from the scope hereof. The following examples illustrate possible, non-limiting combinations the present invention has been described above, it should be clear that many changes and modifications may be made to the process and product without departing from the spirit and scope of this invention:

(A1) A trackable protection pad for use by an athlete, includes a first tracking tag configured with the protection pad, and positioned such that the first tracking tag is substantially horizontal when the athlete is competing.

(A2) In the trackable protection pad denoted as (A1), the first tracking tag being positioned such that safety of the athlete is not compromised.

(A3) In either of the trackable protection pads denoted as (A1) or (A2) the first tracking tag being protected by the pad.

(A4) In any of the trackable protection pads denoted as (A1)-(A3) the first tracking tag being positioned to minimize line of sight blocking by the athlete.

(A5) In any of the trackable protection pads denoted as (A1)-(A4) the first tracking tag being positioned within the shoulder pad and as far from the athlete's neck and head as possible.

(A6) In any of the trackable protection pads denoted as (A1)-(A5) the trackable protection pad further including a second tracking tag positioned with the protection pad and separate from the first tracking tag.

(A7) In the trackable protection pads denoted as (A6) the first tracking tag being positioned on a first shoulder of the athlete and the second tracking tag being positioned on the other shoulder of the athlete.

(A8) In either of the trackable protection pads denoted as (A6) and (A7) the separation of the first and second tracking tags permit determination of the orientation of the athlete.

(B1) A computer implemented tool for visually displaying performance of an athlete tracking system that generates tracking position information for each signal received from a tracking tag located within a tracking area, the tracking position information having a determined location, a position error, and a timestamp, the tool including: a visual plotting module comprising machine readable instructions stored within memory and executed by a processor to perform, for each signal transmitted by the tracking tag, the step of: displaying a symbol on a graphical representation of the tracking area at a position representing the location of the tag within the tracking area, wherein the symbol is selected based upon one or more of: (a) the accuracy of the determined location based upon the receiver events, and (b) errors in the determined location.

(B2) In the computer implemented tool denoted as (B1), the errors in the determined location being selected from the group including: insufficient receiver events, missing receiver events, and inconsistent receiver events.

(B3) In either of the computer implemented tools denoted as (B1) and (B2) wherein a color of the symbol being based upon a type of the error.

(B4) In any of the computer implemented tools denoted as (B1)-(B3) a size of the symbol increasing proportional to a number of consecutive errors in the determined location.

(B5) In any of the computer implemented tools denoted as (B1)-(B4) the symbol being displayed only when a selected one of a plurality of sensors for receiving the signal is used to determine the location of the tag.

(B5) In any of the computer implemented tools denoted as (B1)-(B5) the tracking information being replayed at a speed substantially equal to the speed it was recorded.

(B6) In any of the computer implemented tools denoted as (B1)-(B6) the tracking information being replayed at a speed substantially faster than the speed it was recorded.

(C1) A tag manager for configuring an athlete tracking system, including software, stored within memory of a portable computing device configured with a wireless transceiver for communicating with a tracking tag associated with an athlete tracked by the athlete tracking system, that when executed by a processor of the portable computing device implement the steps of: automatically assigning a tag ID of the tracking tag to the athlete within a roster list; and communicating the roster list to the athlete tracking system.

(C2) In the tag manager denoted as (C1), the step of automatically assigning further comprising: generating, within the memory, a first list of a first plurality of tags; generating, within the memory, the roster list comprising information of the athlete; and automatically reading the tag ID from the tag attached to protective pads of the athlete.

(C3) In either of the tag managers denoted as (C1) and (C2), the software further including instructions that when executed by the processor perform the step of automatically setting a configuration of the tag based upon the information of the athlete within the roster list.

(C4) In any of the tag managers denoted as (C1)-(C3), the configuration being set only when the tag ID is included within the roster list.

(C5) In any of the tag managers denoted as (C1)-(C4), the software further including instructions that when executed by the processor perform the step of automatically turning the tag on or off.

(C6) In any of the tag managers denoted as (C1)-(C5), the software further including instructions that when executed by the processor perform the step of automatically turning the tag off.

(C7) In any of the tag managers denoted as (C1)-(C6), the software further including instructions that when executed by the processor perform the step of automatically indicating when the tag is not assigned to the athlete.

(D1) A method for continuously evaluating performance of an athlete tracking system, including: determining, using the athlete tracking system, the location of a test tag fixedly positioned within a tracking area of the athlete tracking system; and determining a positioning error of the athlete tracking system based upon a difference between the determined location and a known location of the test tag.

(D2) In the method denoted as (D1), the location being averaged over a plurality of consecutive determined locations of the test tag.

(D3) In either of the methods denoted as (D1) and (D2), further including generating an alert if the positioning error if greater than a predefined tolerance of the athlete tracking system.

(E1) A method for automatically optimizing performance of an object tracking system, including: receiving, within an optimizer, locations of each of a plurality of tags, where each tag is attached to an object tracked by the object tracking system; grouping identifiers of the tags within two or more tag sets; and configuring each tag identified within a first tag set of the two or more tag sets with a first ping rate and configuring tags identified within the other tags sets of the two or more tag sets with a second ping rate. The first ping rate being higher than the second ping rate.

(E2) In the method denoted as (E1), the first ping rate and the second ping rate being based upon a system bandwidth of the object tracking system, a number of tags in the first tag set and a number of tags in the second tag set.

(E3) In either of the methods denoted as (E1) and (E2), wherein tags identified within the first tag set are located on a field of play and tags identified within the other tag sets are not located on the field of play.

(E4) In either of the methods denoted as (E1) and (E3), further including: grouping identifiers of the tags identified within the first tag set into at least two sub-tag sets, wherein a first of the at least two sub-tag sets identifies tags of objects expected to move faster than objects associated with tags identified within the other sub-tag sets; and determining a high ping rate for tags identified within the first sub-tag set and a low ping rate for tags identified within other of the two or more sub-tag sets. The high ping rate being greater than the low ping rate and the low ping rate being greater than the second ping rate.

(E5) In any of the methods denoted as (E1)-(E4), the high ping rate and the low ping rate being based upon a system bandwidth of the object tracking system, a number of tags identified within the first sub-tag set, a number of tags identified within the other sub-tag sets, and a number of tags identified within the second tag set.

(E6) In any of the methods of (E1)-(E5), the high ping rate and the low ping rate being further based upon a determined formation of objects on the field of play.

(E7) In any of the methods of (E1)-(E6), the steps of receiving, grouping, and configuring occurring immediately prior to start of a next play in an American Football game.

(E8) In any of the methods of (E1)-(E7), the step of configuring including: generating configuration data containing the ping rate; sending the configuration data to a transmitter; and transmitting the ping rate to the tag.

(E9) In any of the methods of (E1)-(E8), further including: periodically determining, within the optimizer, an average number of receiver events per second generated by all receivers of the object tracking system; if the average number is greater than a predefined upper limit, decreasing the gain of all receivers by a predefined amount; if the average number is less than a predefined lower limit, increasing the gain of all receivers by the predefined amount. The upper limit being equal to a system bandwidth target (SBWT) plus a first hysteresis amount and the lower limit being equal to the SBWT minus a second hysteresis amount.

(E10) In any of the methods of (E1)-(E9), the SBWT being eighty-five percent of the system bandwidth.

(E11) In any of the methods of (E1)-(E5), further including: determining, within the optimizer, first, second and third receiver groups based upon the location of tags identified within the first tag set and location of the receivers; determining, within the optimizer, an average number of receiver events per second generated by all receivers of the object tracking system for tags identified within the first tag set; if the average number of receiver events per second is greater than a predefined upper limit, reducing system bandwidth usage by controlling receiver gains; if the average number of receiver events per second is less than a predefined lower limit, increasing system bandwidth usage by controlling receiver gains. The upper limit being equal to a portion of a system bandwidth target (SBWT) allocated to tags identified within the first tag set plus a hysteresis amount and the lower limit being equal to the portion of the SBWT allocated to tags identified within the first tag set minus a hysteresis amount.

(E12) In any of the methods of (E1)-(E11), the step of determining receiver groups including: determining a bounding rectangle for tags identified within the first tag set; determining the first receiver group identifying four receivers of the object tracking system having locations that form the smallest rectangle that encompasses the bounding rectangle; determining the second receiver group identifying receivers of the object tracking system located along the sides of the rectangle; and determining the third receiver group identifying receivers of the object tracking system not identified within either of the first and second group.

(E13) In any of the methods of (E1)-(E12), the step of reducing system bandwidth usage including: if gain settings of receivers identified within the third receiver group are greater than a minimum gain setting, then decreasing the gain setting of each receiver identified within the third receiver group; otherwise, if gain settings of receivers identified within the second receiver group are greater than the minimum gain setting, then decreasing the gain setting of each receiver identified within the second receiver group; and otherwise, if gain settings of receivers identified within the first receiver group are greater than the minimum gain setting, then decreasing the gain setting of each receiver identified within the first receiver group.

(E14) In any of the methods of (E1)-(E13), the step of increasing system bandwidth usage including: if gain settings of receivers identified within the first receiver group are less than a maximum gain setting, then increase the gain setting of each receiver identified within the first receiver group; otherwise, if gain settings of receivers identified within the second receiver group are less than the maximum gain setting, then increase the gain setting of each receiver identified within the second receiver group; and otherwise, if gain settings of receivers identified within the third receiver group are greater than the maximum gain setting, then increasing the gain setting of each receiver identified within the third receiver group.

(E15) In any of the methods of (E1)-(E14), further including: periodically determining, within the optimizer, a locate-to-ping ratio based upon a number of pings transmitted by the plurality of tags during a sample period and a number of locates resulting within the object tracking system from these pings; and if the locate-to-ping ratio is below a predefined threshold, increasing tolerance of post-locate filters of the object tracking system.

(E16) In any of the methods of (E1)-(E15), the step of increasing tolerance including increasing a convergence threshold of a post-locate convergence filter, wherein the post-locate convergence filter discards locates determined from receiver events from four or more different receivers of the object tracking system when a convergence value of the locate is above the convergence threshold.

(E17) In any of the methods of (E1)-(E16), the step of increasing tolerance comprising increasing a four receiver threshold of a post-locate bounding box filter, wherein the post-locate bounding box filter discards locates having a location outside of a bounding box defined by the location of at least four receivers used to determine the locate and further based upon the four receiver threshold and a distance of the locate from a boundary of the bounding box.

(E18) In any of the methods of (E1)-(E17), the step of increasing tolerance comprising increasing a three-receiver threshold of a post-locate bounding box filter, wherein the post-locate bounding box filter discards locates having a location outside of a bounding box defined by the location of only three receivers when only three receivers are used to determine the locate and further based upon the three-receiver threshold and a distance of the locate from a boundary of the bounding box.

(E19) In any of the methods of (E1)-(E19), the step of increasing tolerance comprising setting a three-locate enable to true wherein a receiver count filter is prohibited from discarding locates determined from only three receivers.

(F1) An self-configurable tracking tag for determining location of an object, including: a processor; a transmitter for transmitting, under control of the processor, pings at a ping rate and that are detectable by an object tracking system; a movement sensor coupled with the processor for sensing movement of the tracking tag; and a memory storing an algorithm comprising machine-readable instructions that when executed by the processor perform the steps of: determining, using the movement sensor, movement of the tag; and adjusting the ping rate based upon the movement.

(F2) In the self-configurable tracking tag denoted as (F1), the algorithm implementing one or more of simple linear relationship, a thresholded relationship, a weighted relationship, and a non-linear relationship.

(F3) In either of the self-configurable tracking tags denoted as (F1) and (F2), the algorithm increasing the ping rate as the determined movement increases.

(F4) In any of the self-configurable tracking tags denoted as (F1)-(F3), the algorithm decreasing the ping rate as the determined movement decreases.

(G1) A method for automatically optimizing performance of an object tracking system having a plurality of receivers for receiving ping signals from a plurality of tags, wherein each tag is attached to an object tracked by the object tracking system, including: receiving, within an optimizer, locations of each of the plurality of tags; grouping identifiers of the tags within two or more tag sets, wherein a first of the tag sets identifies tags attached to objects involved in a situation of interest; determining, within the optimizer, a first receiver group based upon the location of tags identified within the first tag set and location of each of the plurality of receivers; determining a center of a smallest 3D polygonal shape bounding the locations of tags identified in the first tag set; and incrementally moving aim of an antenna of each receiver within the first receiver group towards the center while a number of receiver events per second generated by the receiver for tags identified within the first tag set increases.

(G2) In the method denoted as (G1), further including: determining, within the optimizer, a second receiver group based upon the location of tags identified within the first tag set and location of each of the plurality of receivers; and incrementally moving aim of an antenna of each receiver within the second receiver group towards the center while a number of receiver events per second generated by the receiver for tags identified within the first tag set increases.

(G3) In either of the methods denoted as (G1) and (G2), the step of incrementally moving including: first panning the antenna of each receiver within the first receiver group towards the center while a number of receiver events per second generated by the receiver for tags identified within the first tag set increases; and then tilting the antenna of each receiver within the first receiver group towards the center while a number of receiver events per second generated by the receiver for tags identified within the first tag set increases.

(G4) In any of the methods denoted as (G1)-(G3), the step of incrementally moving comprising moving aim of the antenna back to an immediately previous position when the number of receiver events per second generated by the receiver for tags identified within the first tag set does not increase.

(H1) A method for optimizing performance of an object tracking system, including: determining a number of receiver events per second generated by a receiver of the object tracking system; and controlling the receiver to switch between an analog front end without a filter and an analog front end with a filter based upon the receiver events per second.

(H2) In the method denoted as (H1), the step of controlling including: determining whether the number of receiver events per second is within a predefined limit; and controlling the receiver to switch to using the analog front end with the filter when the number of receiver events per second is not within the predefined limit.

(H3) In either of the methods denoted as (H1) and (H2), further including repeating the steps of determining and controlling for each receiver of the object tracking system.

(I1) A reconfigurable receiver for use within an object tracking system, including: a plurality of analog front ends, each generating a digital signal; a digital back end for processing one of the digital signals; and a digital switch for selecting, under control of the digital back end, the one digital signal.

(I2) In the reconfigurable receiver denoted as (I1), each of the plurality of analog front ends including: an antenna having a desired range and scope for receiving a ping transmitted by an RF tag tracked by the object tracking system and outputting an analog signal; and conditioning and converting circuitry for conditioning the analog signal and converting the conditioned analog signal to the digital signal.

(I3) In either of the reconfigurable receivers denoted as (I1) and (I2), the digital back end comprising an interface for (a) receiving a command from a remote device to select the one digital signal, and (b) controlling the digital switch to select the one digital signal.

(I4) In any of the reconfigurable receivers denoted as (I1)-(I3), the command being received from an optimizer of an object tracking system to dynamically modify characteristics of the receiver during operation.

(I5) In any of the reconfigurable receivers denoted as (I1)-(I4), the object tracking system including a plurality of receivers and wherein the steps of determining a location and controlling are repeated for each of the plurality of receivers.

(I6) In any of the reconfigurable receivers denoted as (I1)-(I5), one of the plurality of analog front ends further including a band pass filter positioned between the antenna and the conditioning and converting circuitry.

(I7) In any of the reconfigurable receivers denoted as (I1)-(I6), the object tracking system including a plurality of receivers and the steps of determining a location and controlling repeating for each of the plurality of receivers.

(J1) A method for optimizing performance of an object tracking system, including: determining, within an optimizer configured with the object tracking system, a bounding rectangle for locations of RF tags attached to objects of interest; determining, within the optimizer, a location of the bounding rectangle relative to a location of a receiver of the object tracking system; and controlling, from the optimizer, the receiver to switch from a first analog front end to a second analog front end based upon the relative location of the bounding rectangle. The first analog front end is configured with a first range and a first scope and the second analog front end is configured with a second range that is different from the first range and a second scope that is different from the second scope.

(J2) In the method denoted as (J1), the object tracking system including a plurality of receivers wherein the steps of determining a location and controlling are repeated for each of the plurality of receivers.

(J3) In the methods denoted as either (J1) or (J2), the receiver including at least three selectable analog front ends each having different range and/or scope from any other of the at least three analog front ends.

(K1) An automated installation and calibration (AIC) system for an object tracking system, including: a wirelessly controlled vehicle; an RF tag configured with the vehicle; and a controller for (a) receiving location data for the RF tag from the object tracking system, (b) controlling the vehicle to follow a path based upon the location data, and (c) adjusting orientation of at least one receiver of the object tracking system based upon analysis of the location data associated with the receiver.

(K2) In the AIC system denoted as (K1), the receiver being mounted on a remote-controlled pan and tilt mechanism, the controller commanding the pan and tilt mechanism to adjust the orientation of the receiver.

(K3) In the AIC systems denoted as either (K1) or (K2), the RF tag periodically generating a ping that is detected by the object tracking system to generate the location data.

(L1) An automated installation and calibration method for an object tracking system, including: receiving location data generated by the object tracking system for an RF tag attached to a wirelessly controlled vehicle; controlling movement of the vehicle to follow a path based upon the location data; determining a data set of locates from the location data based upon an area of consideration for a receiver of the object tracking system; and adjusting the orientation of the receiver based upon analysis of the data set.

(L2) In the method denoted as (L1), the step of controlling including controlling the vehicle to follow the path at a constant speed.

(L3) In the methods denoted as either (L1) or (L2), the path being selected from one of a gross path, a coarse path, and a fine path, wherein the coarse path is more complex than the gross path and less complex than the fine path.

(L4) In any of the methods denoted as (L1)-(L3), wherein the steps of receiving, controlling, determining and adjusting are repeated for at least two of the gross path, the coarse path, and the fine path.

(L5) In any of the methods denoted as (L1)-(L4), the area of consideration being defined by at least two of a range of the receiver, a scope of the receiver, and an operational area of the object tracking system.

(L6) In any of the methods denoted as (L1)-(L5), the step of determining including determining whether each locate within the location data is located within the area of consideration.

(L7) In any of the methods denoted as (L1)-(L6), the step of adjusting including determining a percentage of locates, generated by the object tracking system using receiver events from the receiver, that are located in one half of the area of consideration.

(L8) In any of the methods denoted as (L1)-(L7), the step of adjusting including panning the receiver when the one half is one of a left and a right half of the area of consideration.

(L9) In any of the methods denoted as (L1)-(L8), the step of adjusting including tilting the receiver when the one half is one of a top and a bottom half of the area of consideration.

(M1) A software product including instructions, stored on non-transitory computer-readable media, wherein the instructions, when executed by a computer, perform steps for automating installation and calibration of an object tracking system, comprising: instructions for receiving location data generated by the object tracking system for an RF tag attached to a wirelessly controlled vehicle; instructions for controlling movement of the vehicle to follow a path based upon the location data; instructions for determining a data set of locates from the location data based upon an area of consideration for a receiver of the object tracking system; and instructions for adjusting the orientation of the receiver based upon analysis of the data set.

(M2) In software product denoted as (M1), the instructions for controlling including instructions for controlling the vehicle to follow the path at a constant speed.

(M3) In software products denoted as either (M1) or (M2), the path being selected from one of a gross path, a coarse path, and a fine path. The coarse path is more complex than the gross path and less complex than the fine path.

(M4) In any of the software products denoted as (M1)-(M3), the instructions for receiving, controlling, determining and adjusting are repeated for at least two of the gross path, the coarse path, and the fine path.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A tracking tag, comprising:
a processor;
a transceiver communicatively coupled with the processor;
a movement sensor communicatively coupled with the processor; and
a memory communicatively coupled with the processor and storing machine-readable instructions that, when executed by the processor, control the tracking tag to:
determine, using the movement sensor, movement of the tracking tag,
periodically transmit, from the transceiver at a ping rate, pings detectable by an object tracking system, each of the pings including a movement value based on the determined movement,
receive, from the object tracking system, an optimal ping rate determined by the object tracking system at least partly based on the movement value transmitted by the tracking tag and a bandwidth of the object tracking system, and
set the ping rate equal to the optimal ping rate.

2. The tracking tag of claim 1, the movement being speed of the tracking tag in a horizontal plane.

3. The tracking tag of claim 1, the movement sensor comprising three orthogonally orientated accelerometers configured to detect acceleration of the tracking tag in three dimensions.

4. A method for adjusting a ping rate of a tracking tag, comprising:
determining movement of the tracking tag with a movement sensor of the tracking tag;
periodically transmitting, from the tracking tag and at a ping rate, pings detectable by an object tracking system, each of the pings including a movement value based on the determined movement;
receiving, from the object tracking system, an optimal ping rate determined by the object tracking system at least partly based on the movement value transmitted by the tracking tag and a bandwidth of the object tracking system; and
setting, by the tracking tag, the ping rate equal to the optimal ping rate.

5. The method of claim 4, the movement being speed of the tracking tag in a horizontal plane.

6. The method of claim 4, wherein said determining movement of the tracking tag includes detecting acceleration of the tracking tag in three dimensions using three orthogonally oriented accelerometers.

7. The method of claim 4, further comprising transmitting, from a transceiver of the tracking tag, the pings at the optimal ping rate.

8. A method for allocating bandwidth of an object tracking system to each tracking tag of a plurality of tracking tags, comprising:
receiving, from each tracking tag, at least one ping that includes a movement value indicative of movement of said each tracking tag;
determining an optimal ping rate for each tracking tag based on the movement values for all the tracking tags, and based on the bandwidth of the object tracking system; and
transmitting, for each tracking tag, the corresponding optimal ping rate to said each tracking tag.

* * * * *